(12) United States Patent
Wyler et al.

(10) Patent No.: US 8,694,680 B2
(45) Date of Patent: Apr. 8, 2014

(54) METHODS AND APPARATUS FOR ENABLING USE OF WEB CONTENT ON VARIOUS TYPES OF DEVICES

(75) Inventors: Eran Shmuel Wyler, Modi'in (IL); Gil Ilani, Tel-Aviv (IL); Ron Elrom, Ra'anana (IL); Naaman Shefi, Tzoran (IL); Jonathan Ganzi, Tel-Aviv (IL); Gal Briner, Petach Tikva (IL)

(73) Assignee: InfoGin Ltd., Kfar Saba (IL)

( * ) Notice: Subject to any disclaimer, the term of this patent is extended or adjusted under 35 U.S.C. 154(b) by 893 days.

(21) Appl. No.: 11/713,584

(22) Filed: Mar. 1, 2007

(65) Prior Publication Data

US 2009/0024719 A1    Jan. 22, 2009

Related U.S. Application Data

(60) Provisional application No. 60/778,434, filed on Mar. 1, 2006.

(51) Int. Cl.
G06F 15/16    (2006.01)

(52) U.S. Cl.
USPC .......................................... 709/246; 709/218

(58) Field of Classification Search
USPC ........................... 709/202, 218, 246; 715/864
See application file for complete search history.

(56) References Cited

U.S. PATENT DOCUMENTS

| | | | |
|---|---|---|---|
| 5,572,573 A | 11/1996 | Sylvan et al. |
| 5,860,073 A | 1/1999 | Ferrel et al. |
| 5,864,863 A | 1/1999 | Burrows |
| 5,909,568 A | 6/1999 | Nason |
| 5,983,216 A | 11/1999 | Kirsch et al. |
| 6,014,702 A | 1/2000 | King et al. |
| 6,023,714 A * | 2/2000 | Hill et al. ...................... 715/235 |
| 6,157,389 A | 12/2000 | Knowlton |
| 6,157,935 A | 12/2000 | Tran et al. |
| 6,199,082 B1 | 3/2001 | Ferrel et al. |
| 6,300,947 B1 | 10/2001 | Kenevsky |
| 6,363,418 B1 | 3/2002 | Conboy et al. |
| 6,374,267 B1 | 4/2002 | Tam |
| 6,421,717 B1 | 7/2002 | Kloba et al. |
| 6,434,563 B1 | 8/2002 | Pasquali et al. |
| 6,539,392 B1 | 3/2003 | Rebane |
| 6,670,968 B1 | 12/2003 | Schilit et al. |
| 6,781,609 B1 | 8/2004 | Barker et al. |
| 6,836,768 B1 | 12/2004 | Hirsch |
| 6,845,102 B1 | 1/2005 | Bendelac et al. |
| 6,859,931 B1 | 2/2005 | Cheyer et al. |
| 6,918,090 B2 | 7/2005 | Hesmer et al. |
| 7,047,033 B2 | 5/2006 | Wyler |

(Continued)

OTHER PUBLICATIONS

An International Search Report and A Written Opinion, both dated Oct. 31, 2008, which issued during the prosecution of Applicant's PCT Patent Application No. PCT/IL07/00272.

(Continued)

Primary Examiner — Brian J Gillis
(74) Attorney, Agent, or Firm — Abelman, Frayne & Schwab

(57) ABSTRACT

A method system for interactive communication with a web site using a mobile communicator having the following functionalities: receiving, at a server, an http request from a mobile communicator being used by a user, the http request identifying a website and should the mobile communicator not support a client-side script employed by the website, causing the server to emulate the script so as to enable the user to interact with the website.

34 Claims, 114 Drawing Sheets

(56) References Cited

U.S. PATENT DOCUMENTS

| | | |
|---|---|---|
| 7,050,603 B2 | 5/2006 | Rhoads et al. |
| 7,054,952 B1 * | 5/2006 | Schwerdtfeger et al. ..... 709/246 |
| 7,082,426 B2 | 7/2006 | Musgrove et al. |
| 7,116,765 B2 | 10/2006 | Summers et al. |
| 7,143,359 B2 * | 11/2006 | Aggarwal et al. ............ 715/760 |
| 7,240,067 B2 | 7/2007 | Timmons |
| 2002/0116534 A1 | 8/2002 | Teeple |
| 2002/0156779 A1 | 10/2002 | Elliott et al. |
| 2003/0069975 A1 | 4/2003 | Abjanic et al. |
| 2003/0188021 A1 | 10/2003 | Challenger et al. |
| 2004/0093376 A1 | 5/2004 | De Boor et al. |
| 2004/0128270 A1 | 7/2004 | Bachman et al. |
| 2004/0210923 A1 | 10/2004 | Hudgenons et al. |
| 2005/0055420 A1 | 3/2005 | Wyler |
| 2005/0122997 A1 | 6/2005 | Bendelac et al. |
| 2005/0177805 A1 | 8/2005 | Lynch et al. |
| 2005/0256933 A1 * | 11/2005 | Millington et al. ........... 709/207 |
| 2005/0267915 A1 | 12/2005 | Zhulong et al. |
| 2005/0275662 A1 | 12/2005 | Distefano |
| 2006/0190812 A1 | 8/2006 | Ellenby et al. |
| 2007/0061700 A1 * | 3/2007 | Kothari et al. ................ 715/505 |
| 2007/0100648 A1 | 5/2007 | Borquez et al. |
| 2007/0192684 A1 | 8/2007 | Bodin et al. |
| 2008/0133923 A1 | 6/2008 | Sakamura et al. |
| 2008/0134031 A1 | 6/2008 | Aufricht et al. |
| 2008/0189360 A1 | 8/2008 | Kiley et al. |
| 2009/0044098 A1 | 2/2009 | Wyler et al. |
| 2009/0221307 A1 | 9/2009 | Wolak et al. |

OTHER PUBLICATIONS

An Office Action dated Mar. 19, 2009, which issued during the prosecution of Applicant's U.S. Appl. No. 11/337,299.

U.S. Appl. No. 60/778,434, Mar. 1, 2006.

Spyglass Prism, Concepts and Applications, Spyglass Inc., 1997, pp. 1-7.

http://www.w3.org/protocols/HTTP/HTRO_Headers.html, 1994.

An Office Action dated Oct. 13, 2009, which issued during the prosecution of Applicant's U.S. Appl. No. 11/713,589.

An Office Action dated Dec. 10, 2009, which issued during the prosecution of Applicant's U.S. Appl. No. 11/713,583.

An Office Action dated Jan. 29, 2010, which issued during the prosecution of Applicant's U.S. Appl. No. 11/337,299.

An Office Action dated Sep. 1, 2010, which issued during the prosecution of Applicant's U.S. Appl. No. 11/713,585.

An Office Action dated Aug. 10, 2010, which issued during the prosecution of Applicant's U.S. Appl. No. 11/713,589.

An Office Action dated Jul. 30, 2010, which issued during the prosecution of Applicant's U.S. Appl. No. 11/980,140.

An Office Action dated Oct. 24, 2013, which issued during the prosecution of U.S. Appl. No. 11/713,589.

An Office Action dated Apr. 26, 2013, which issued during the prosecution of U.S. Appl. No. 12/808,970.

An Office Action dated Jun. 19, 2012, which issued during the prosecution of U.S. Appl. No. 11/713,585.

* cited by examiner

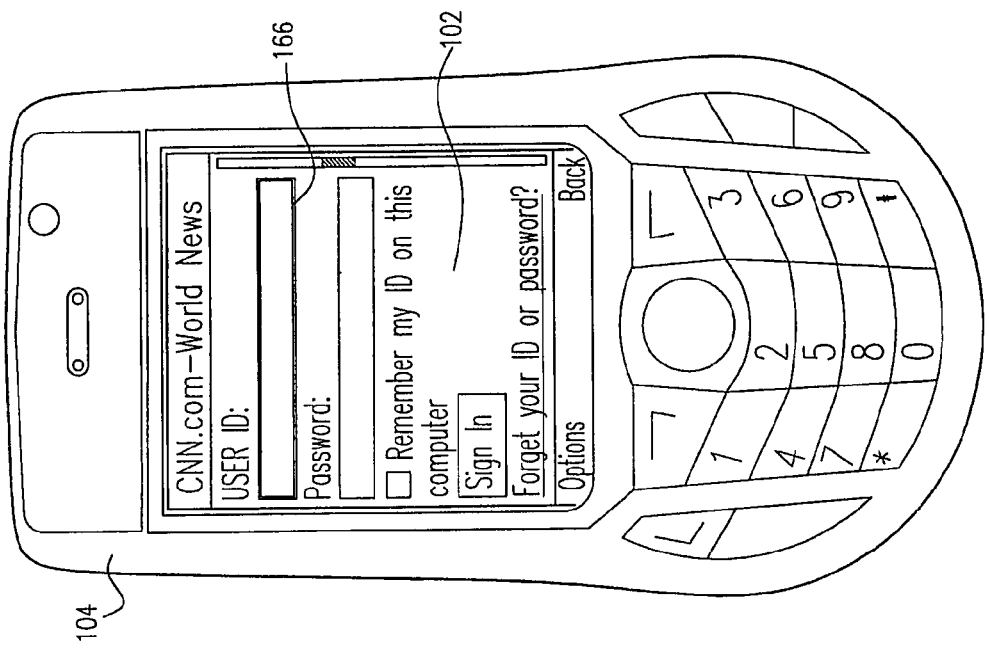
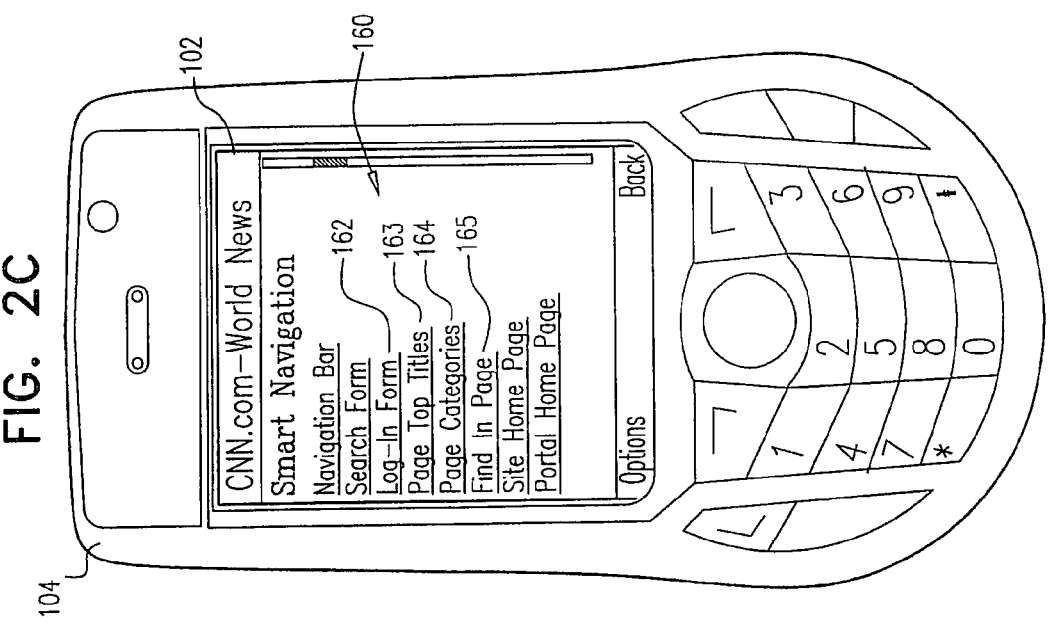

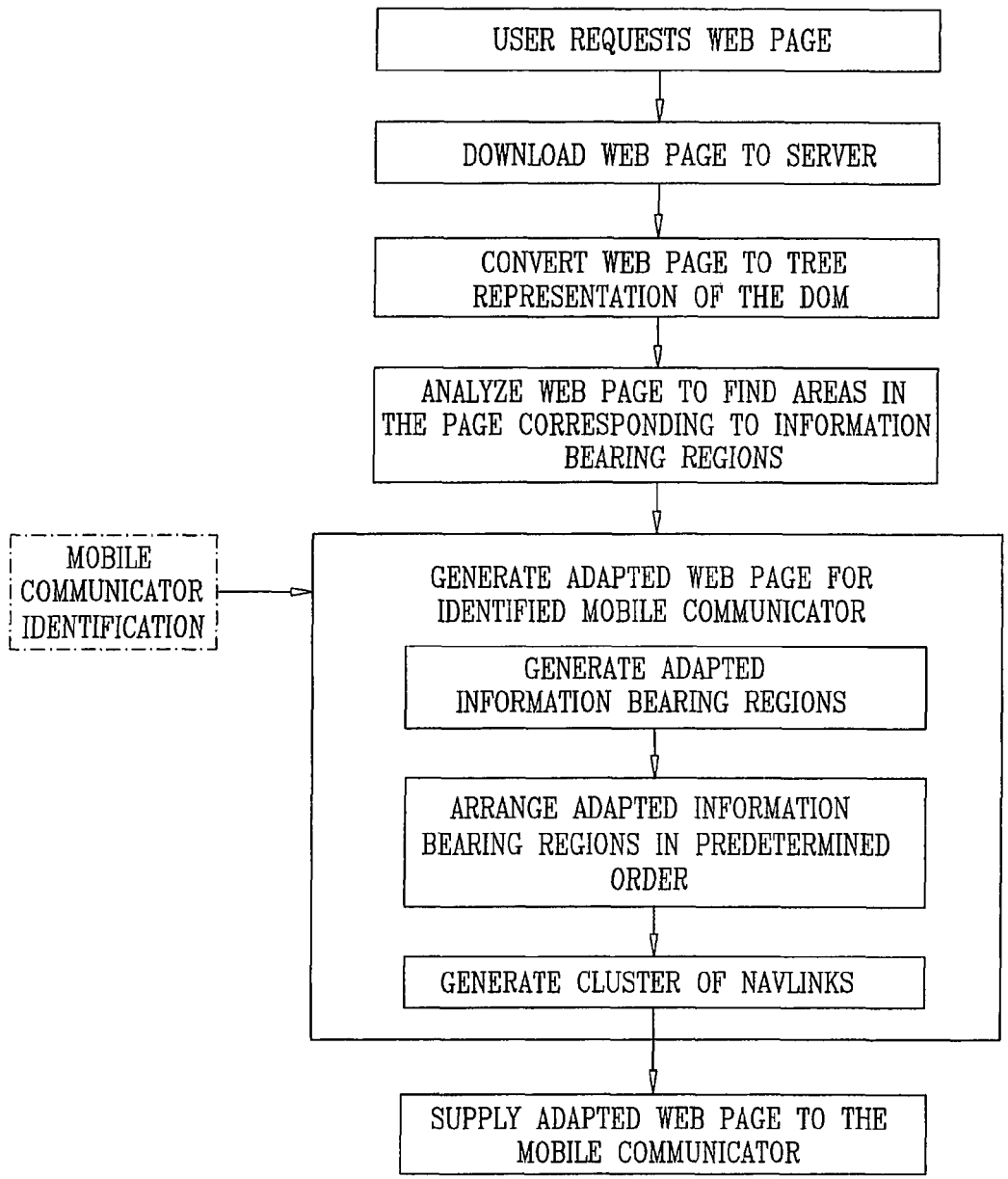

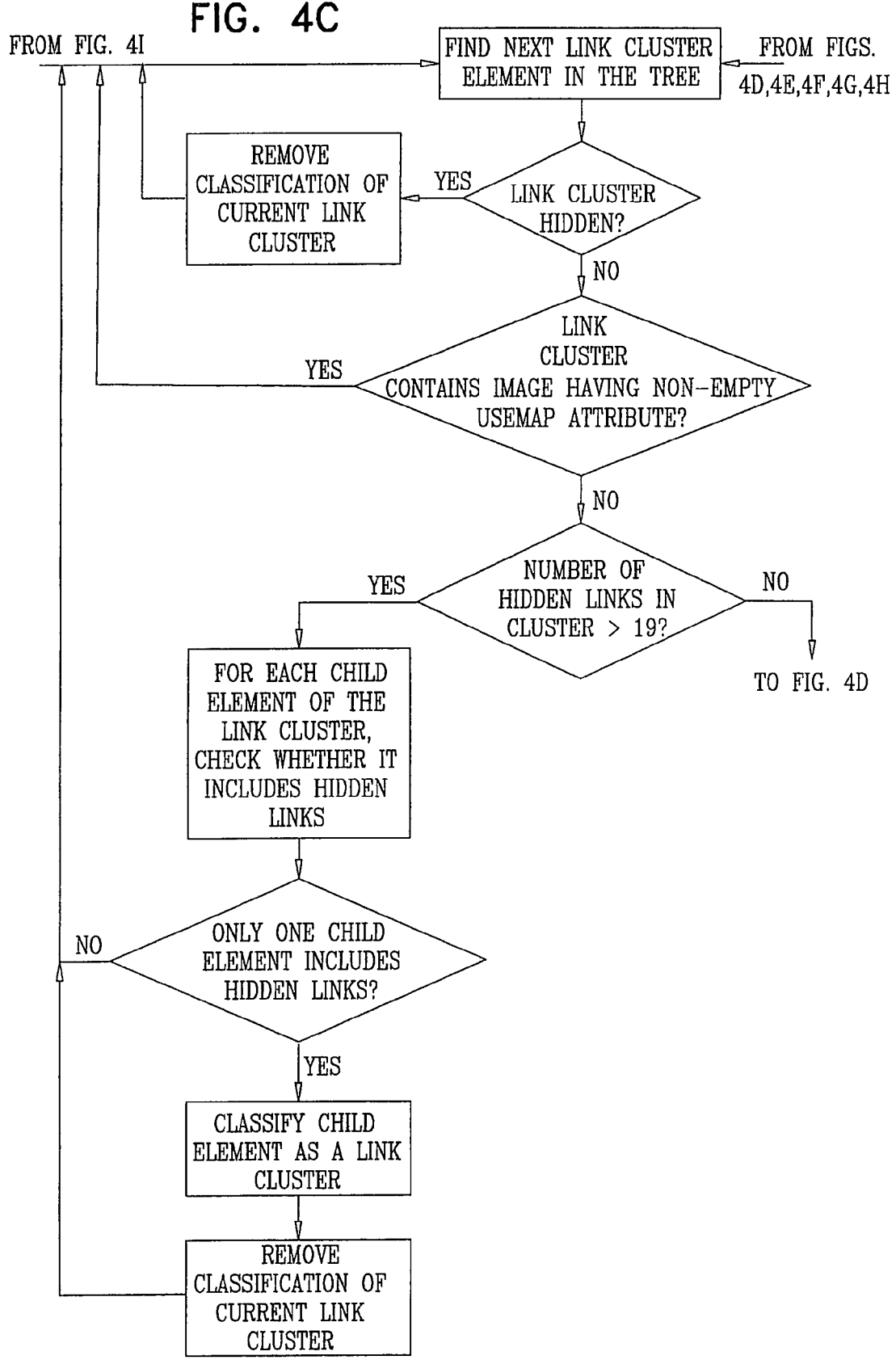

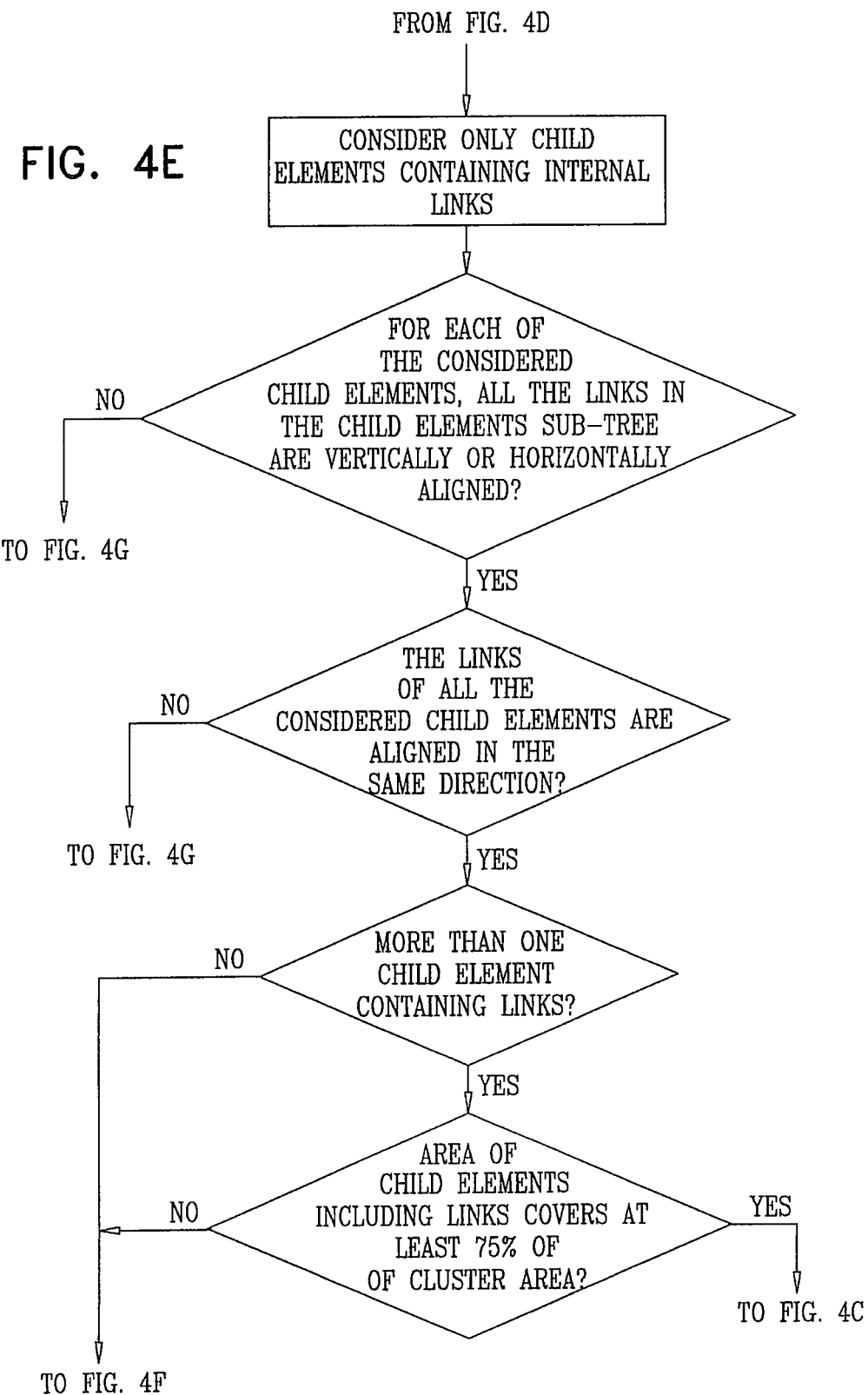

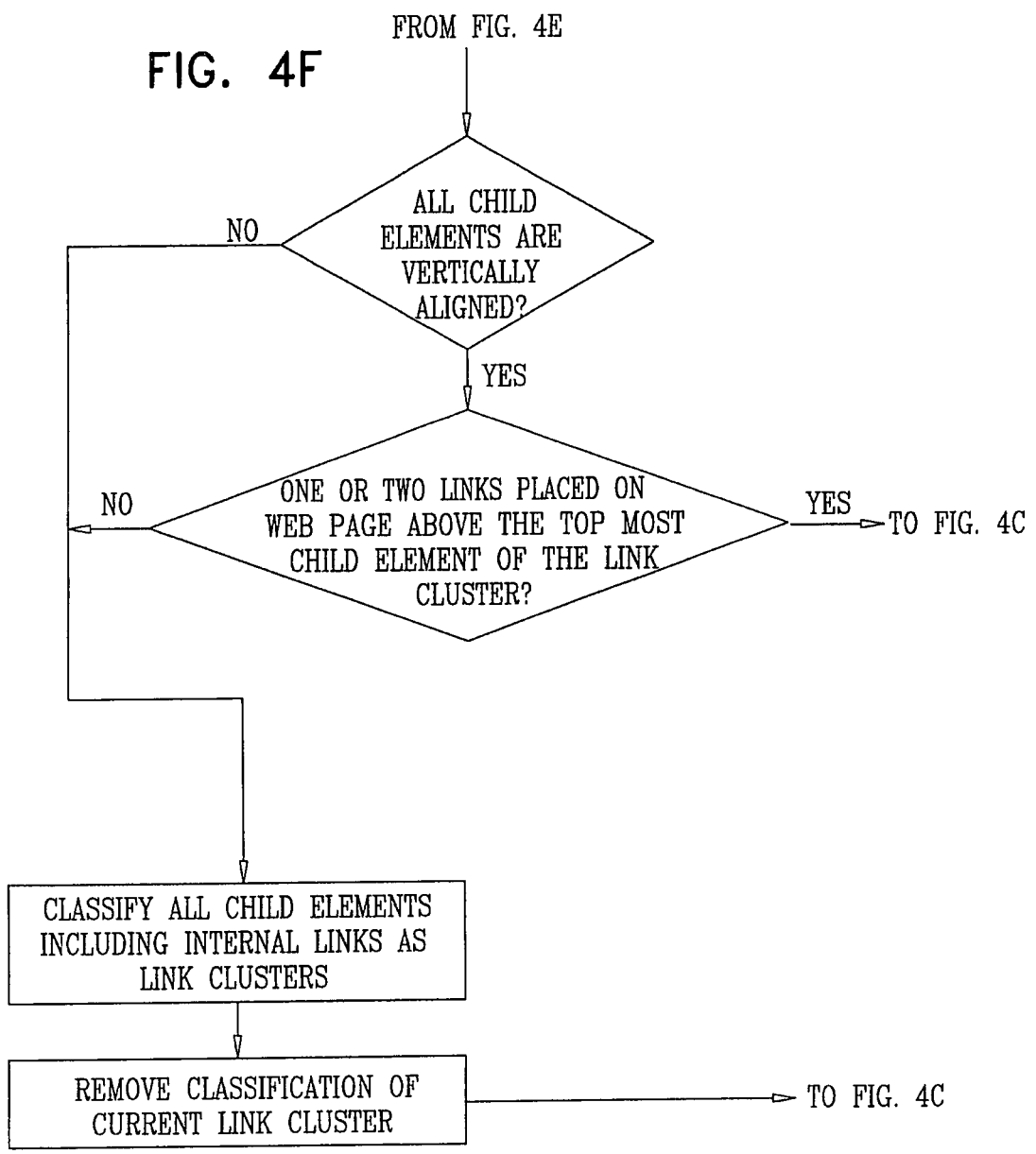

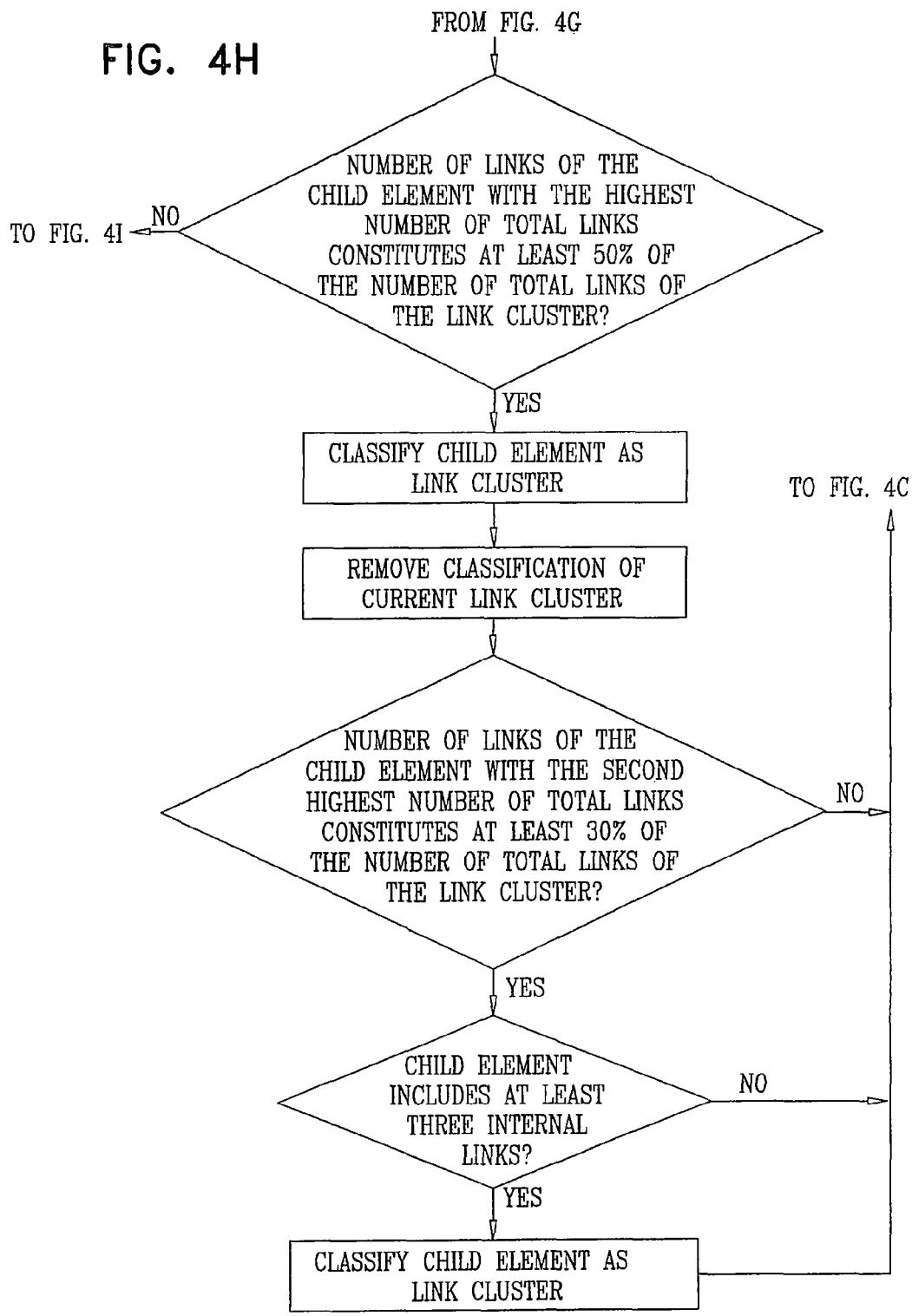

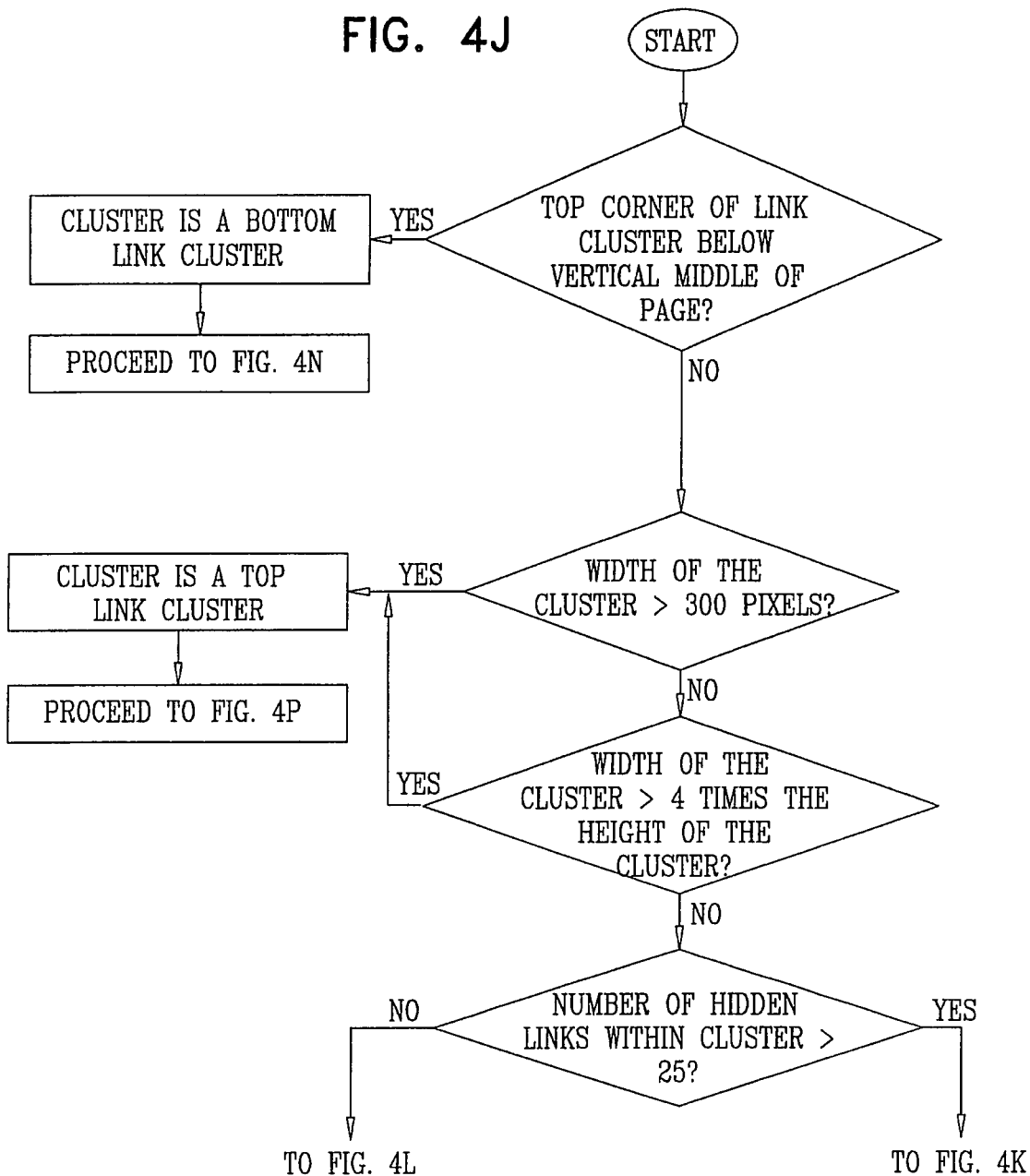

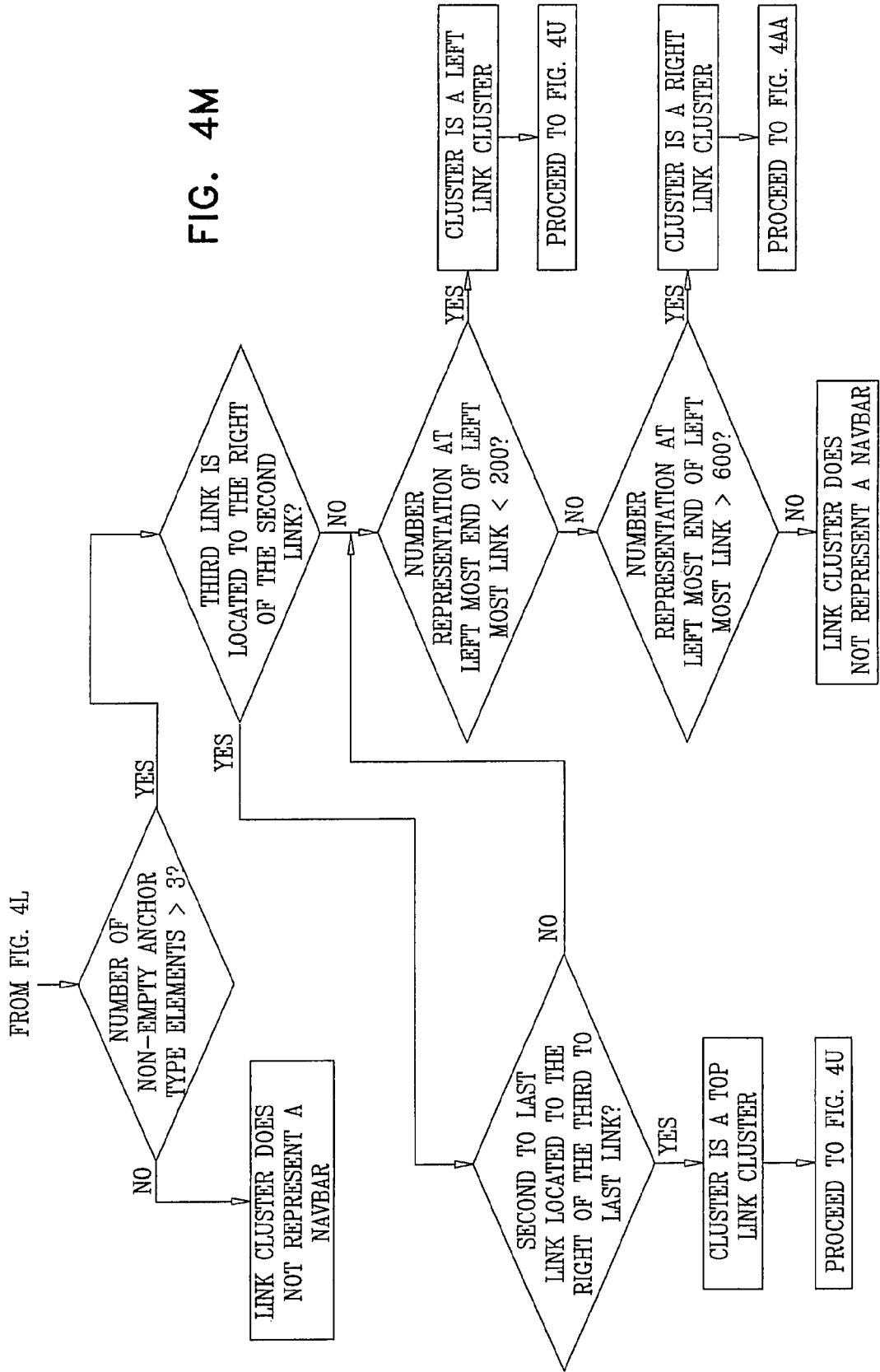

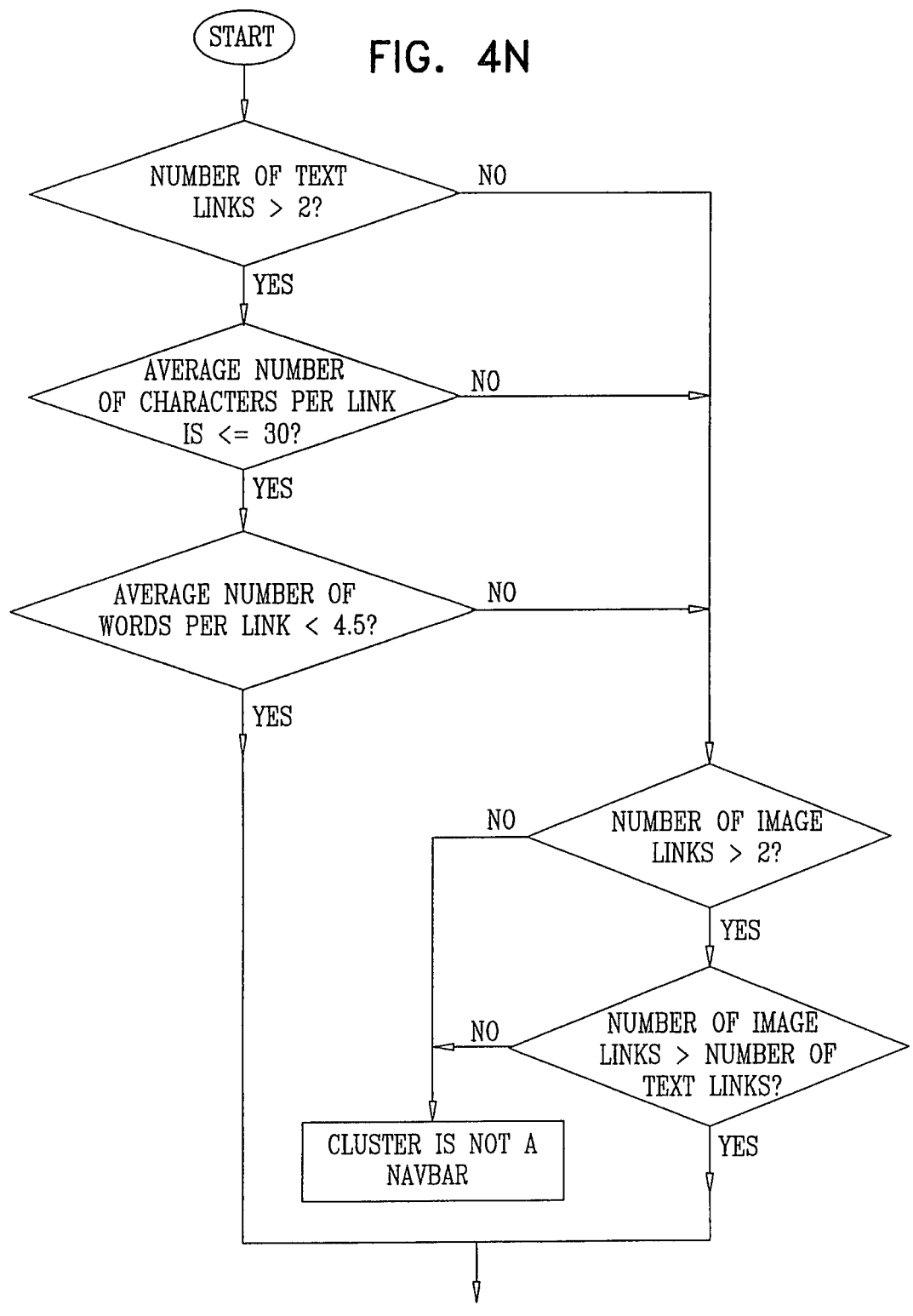

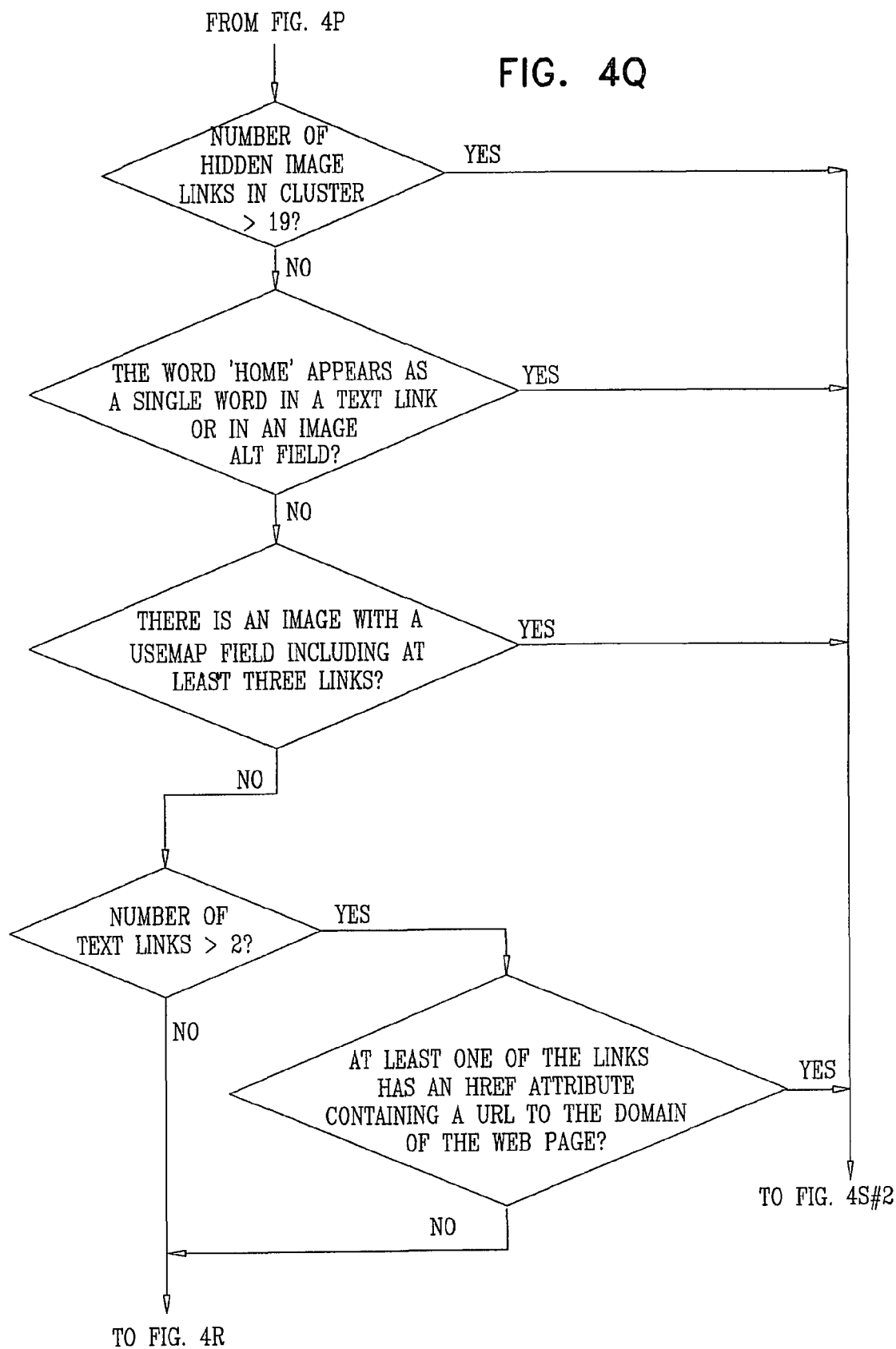

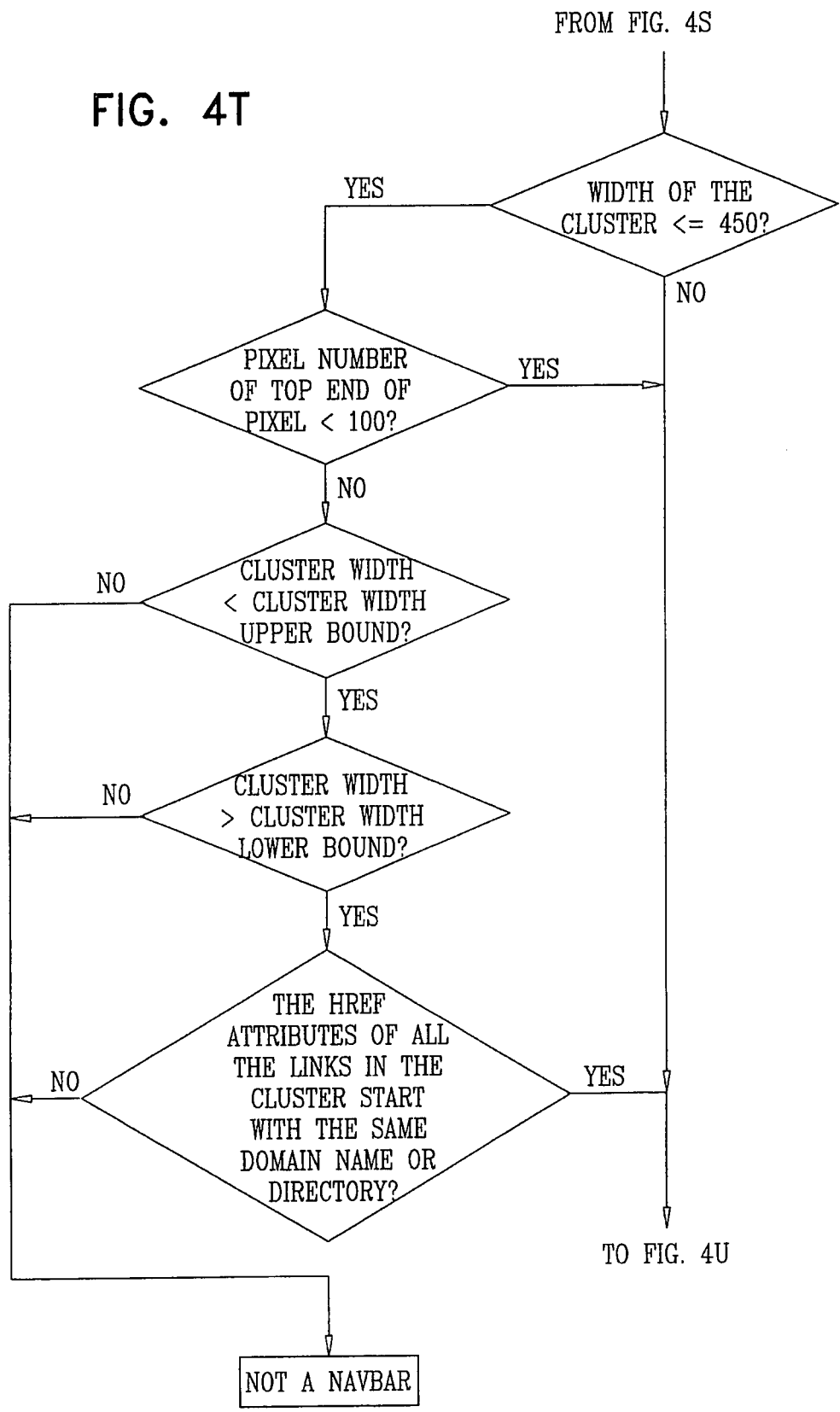

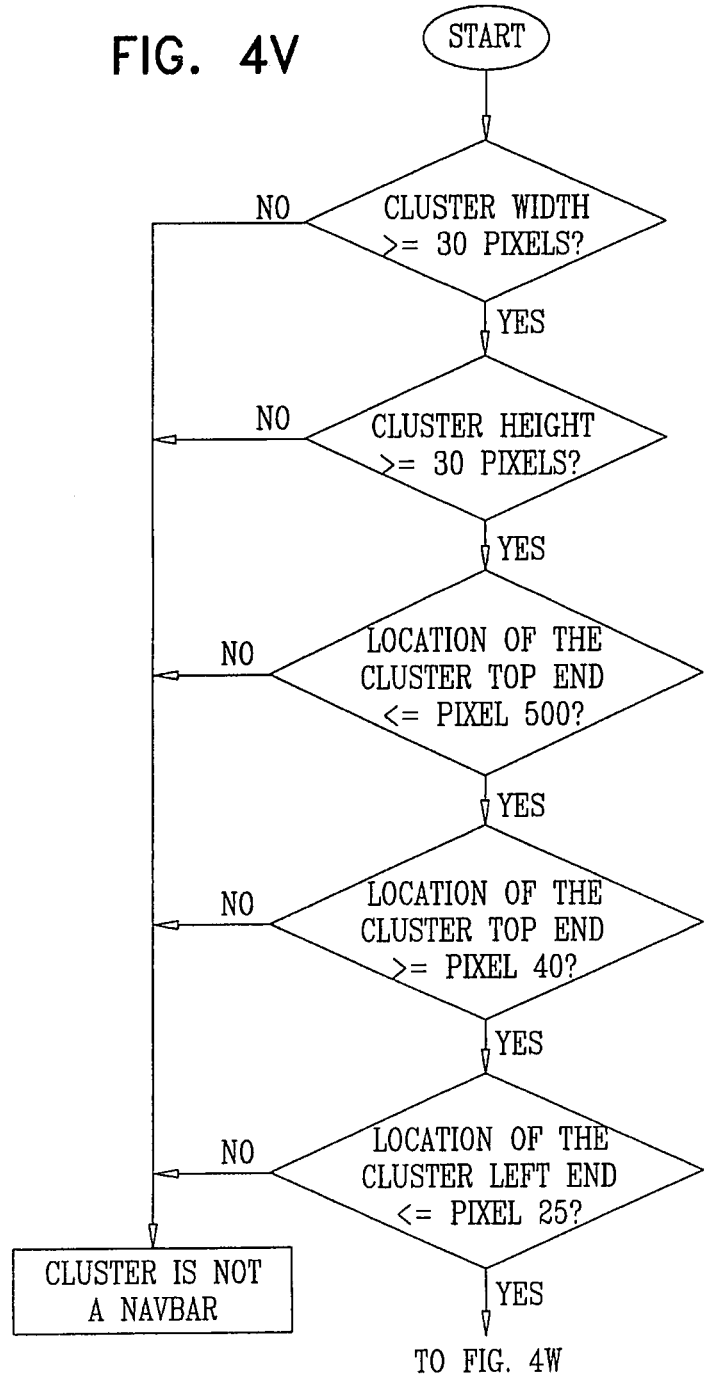

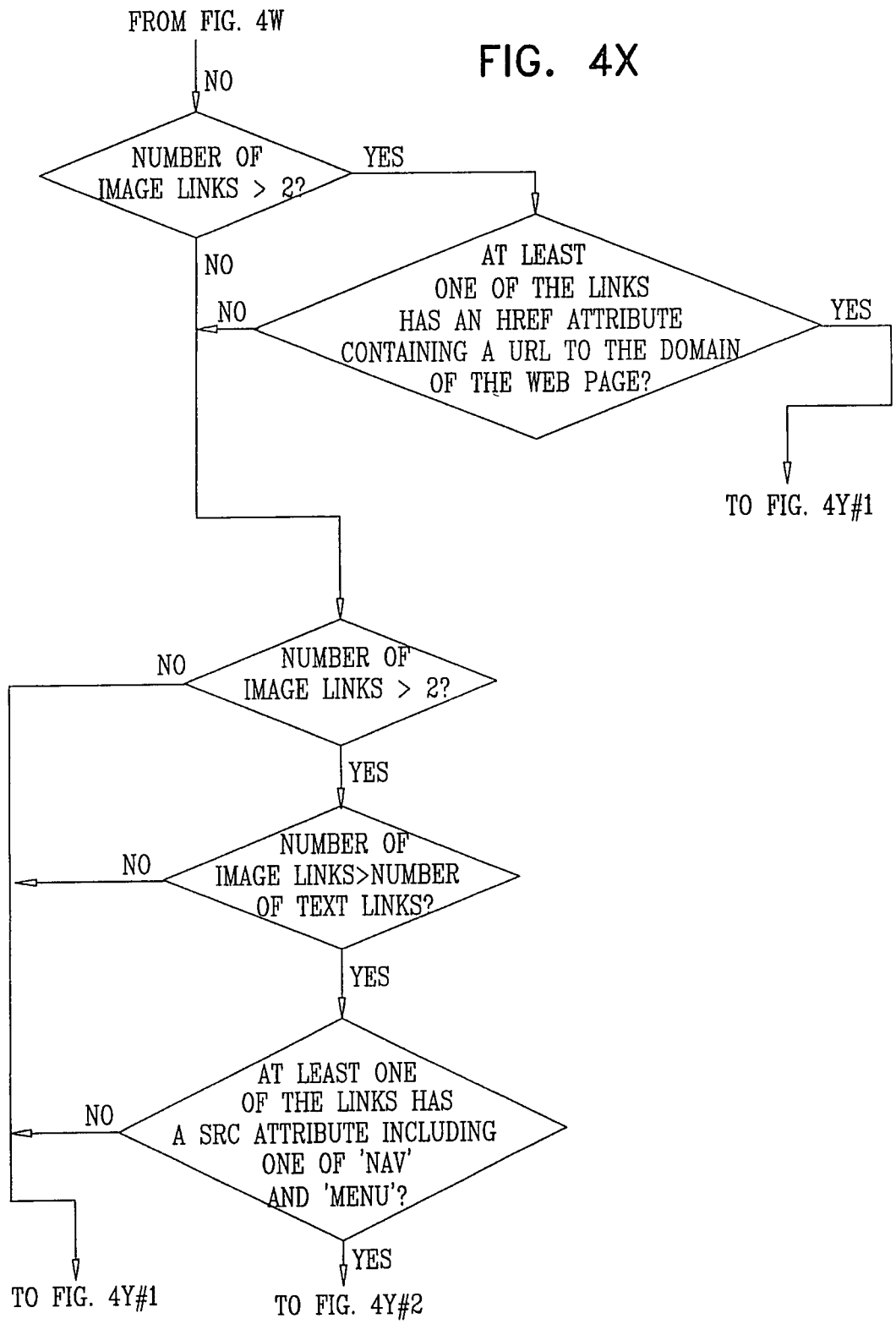

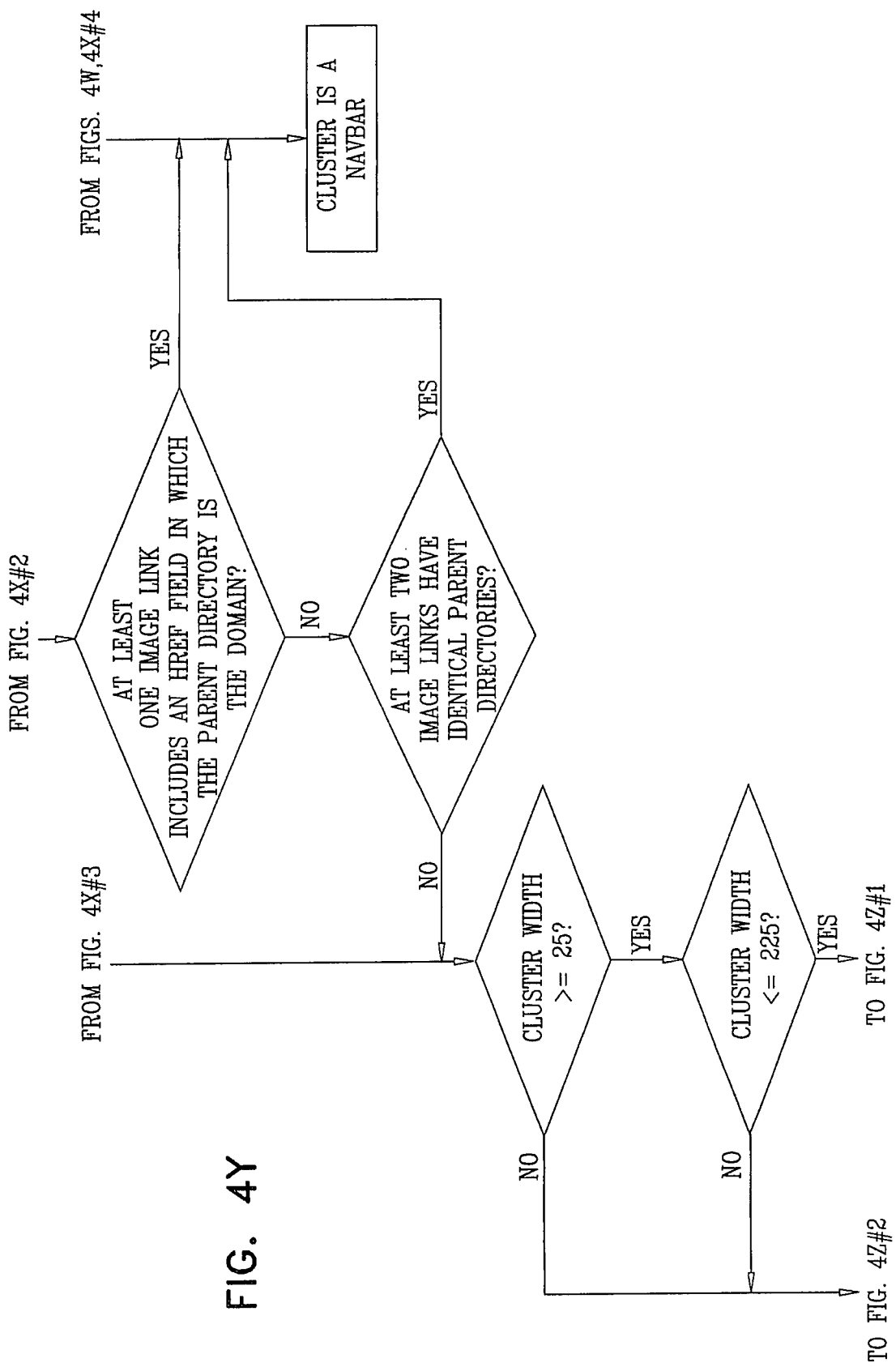

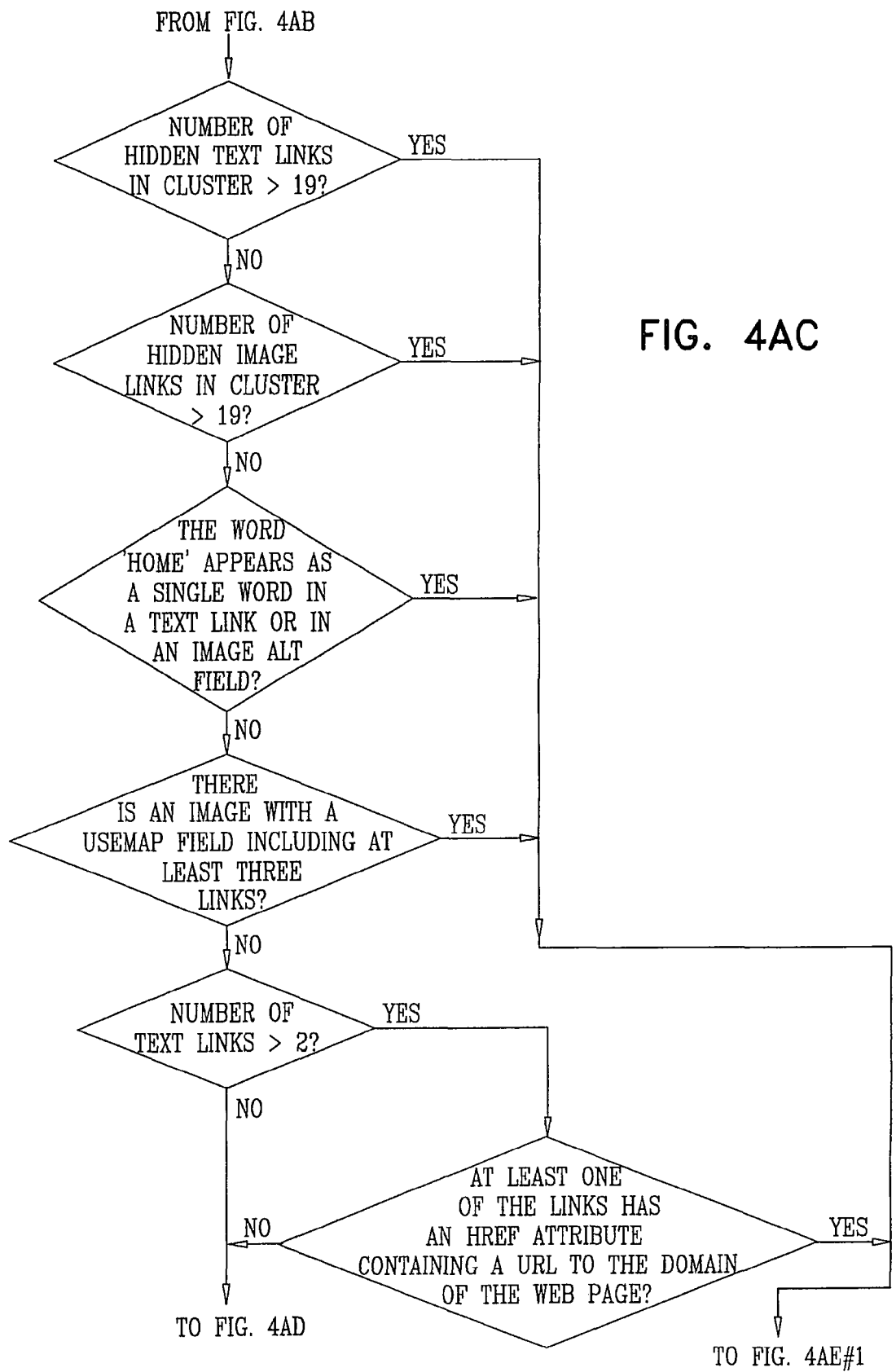

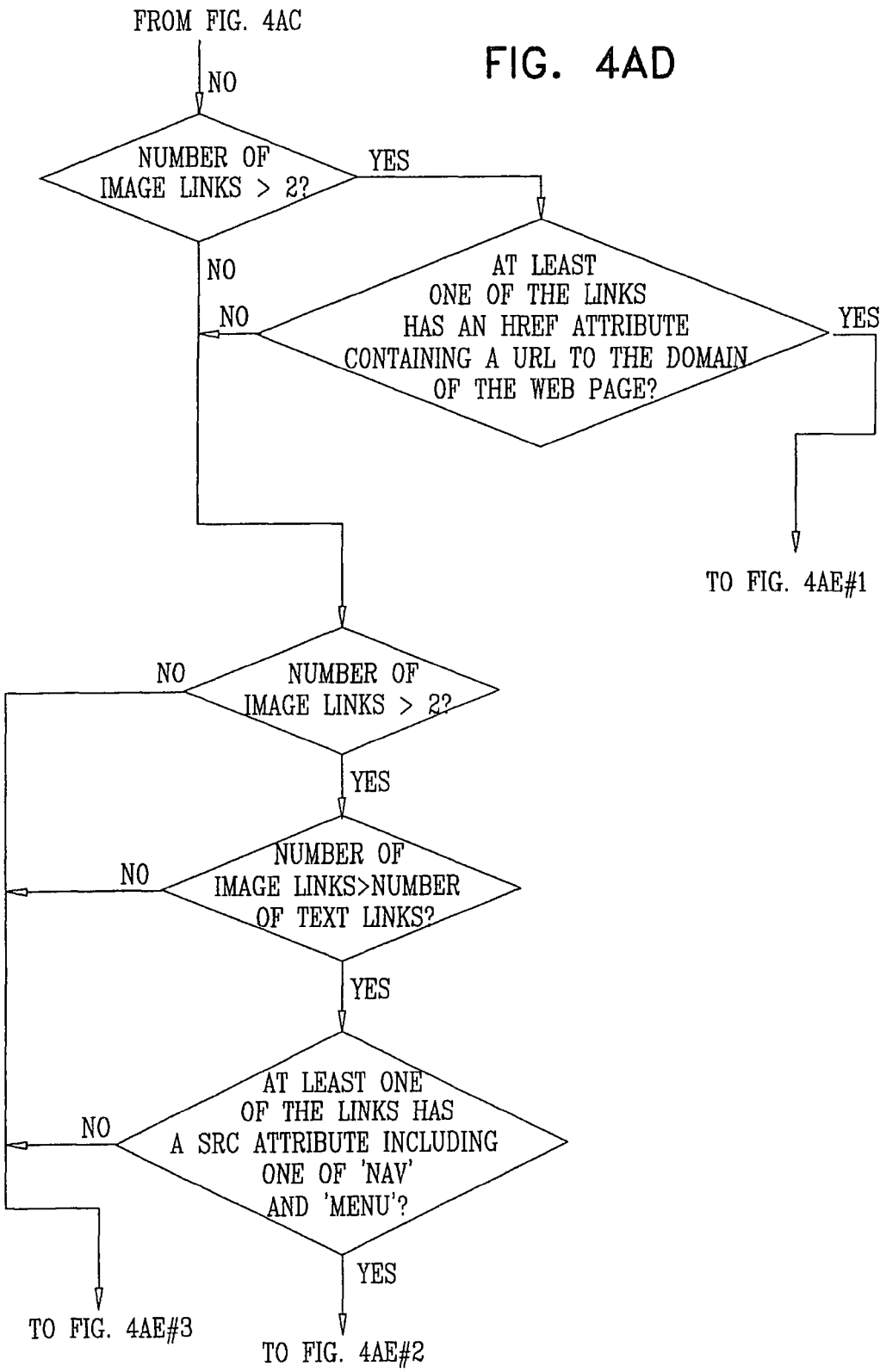

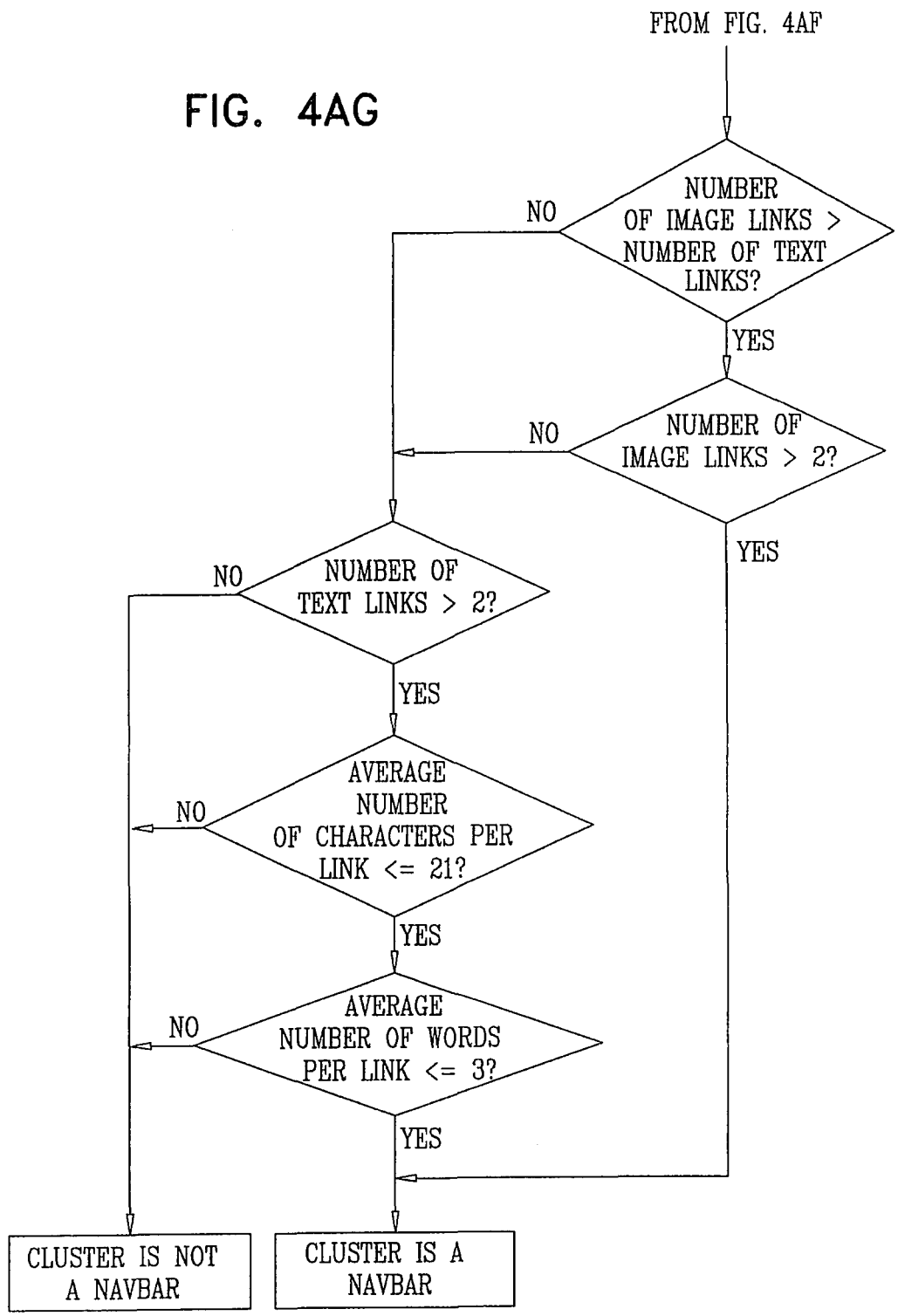

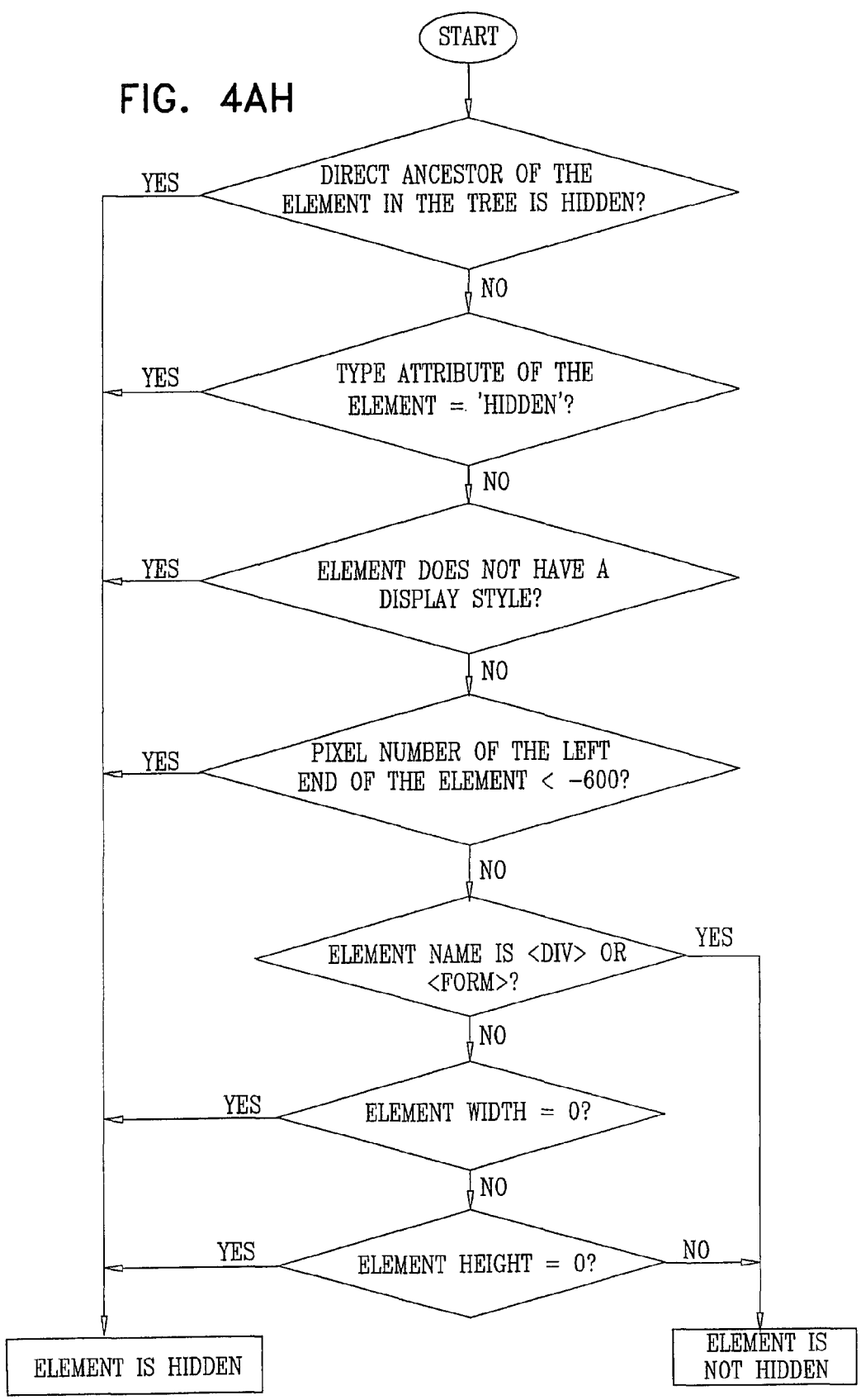

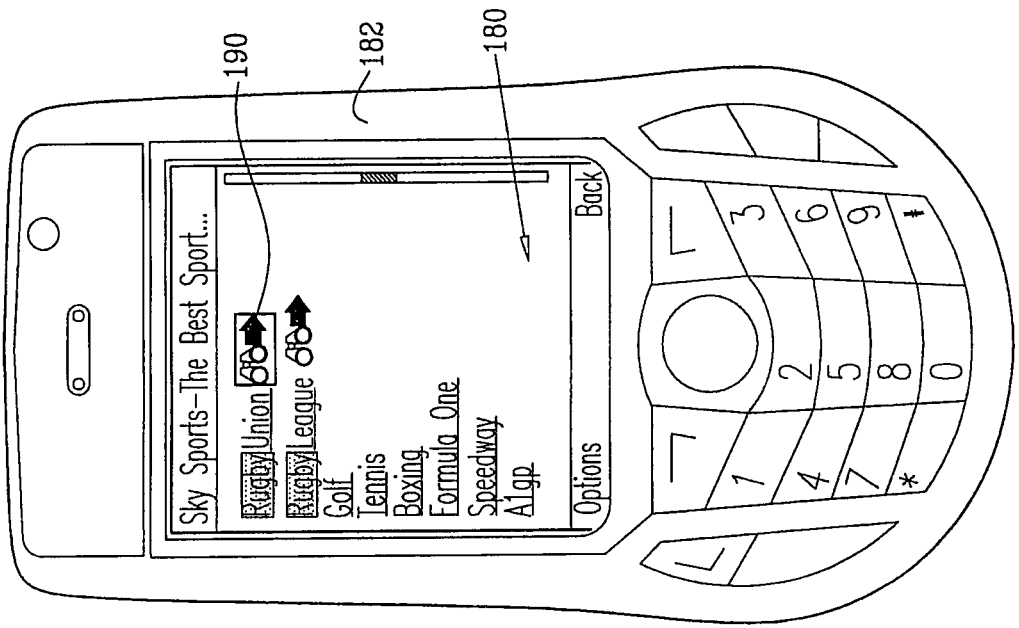
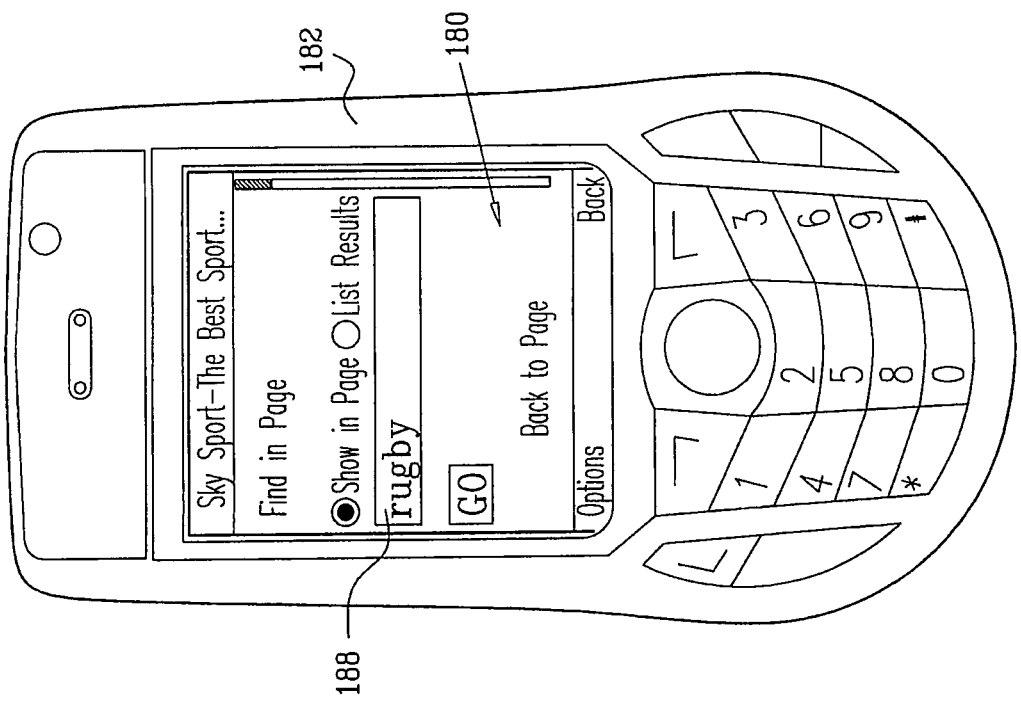

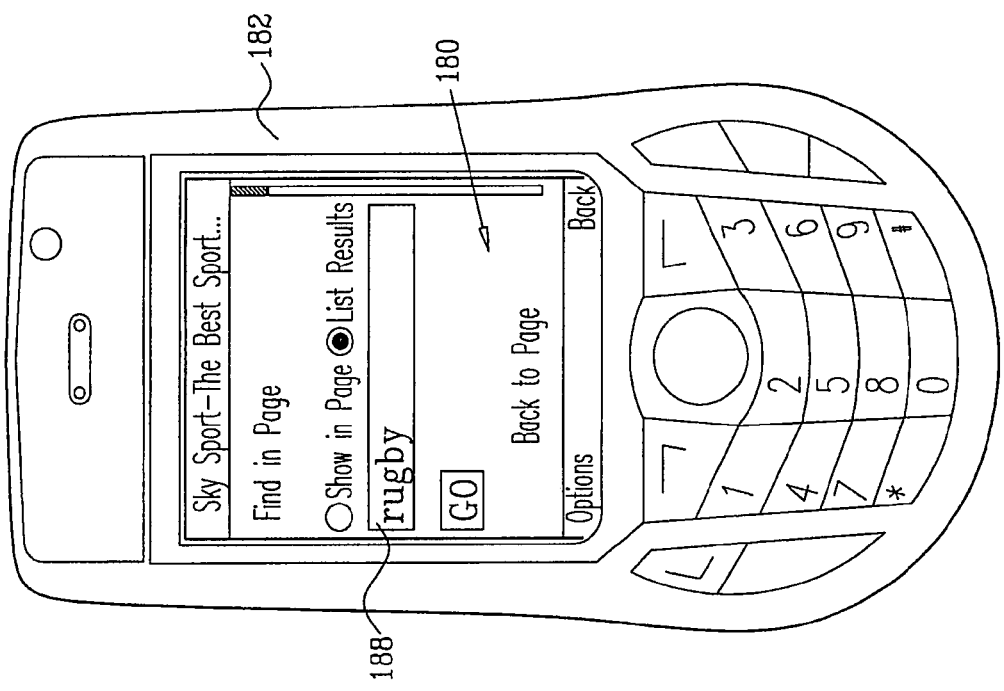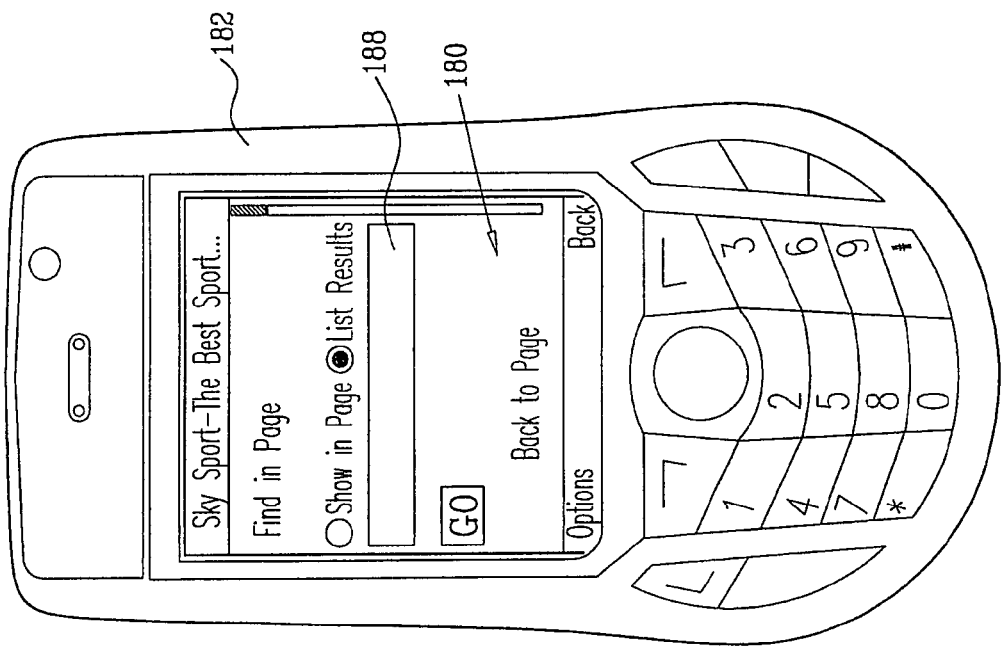

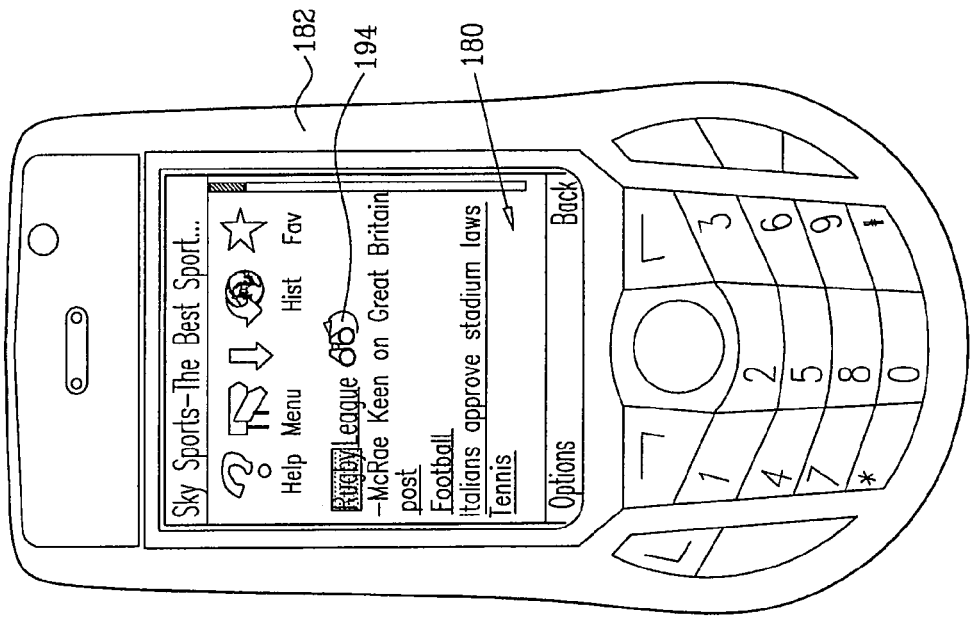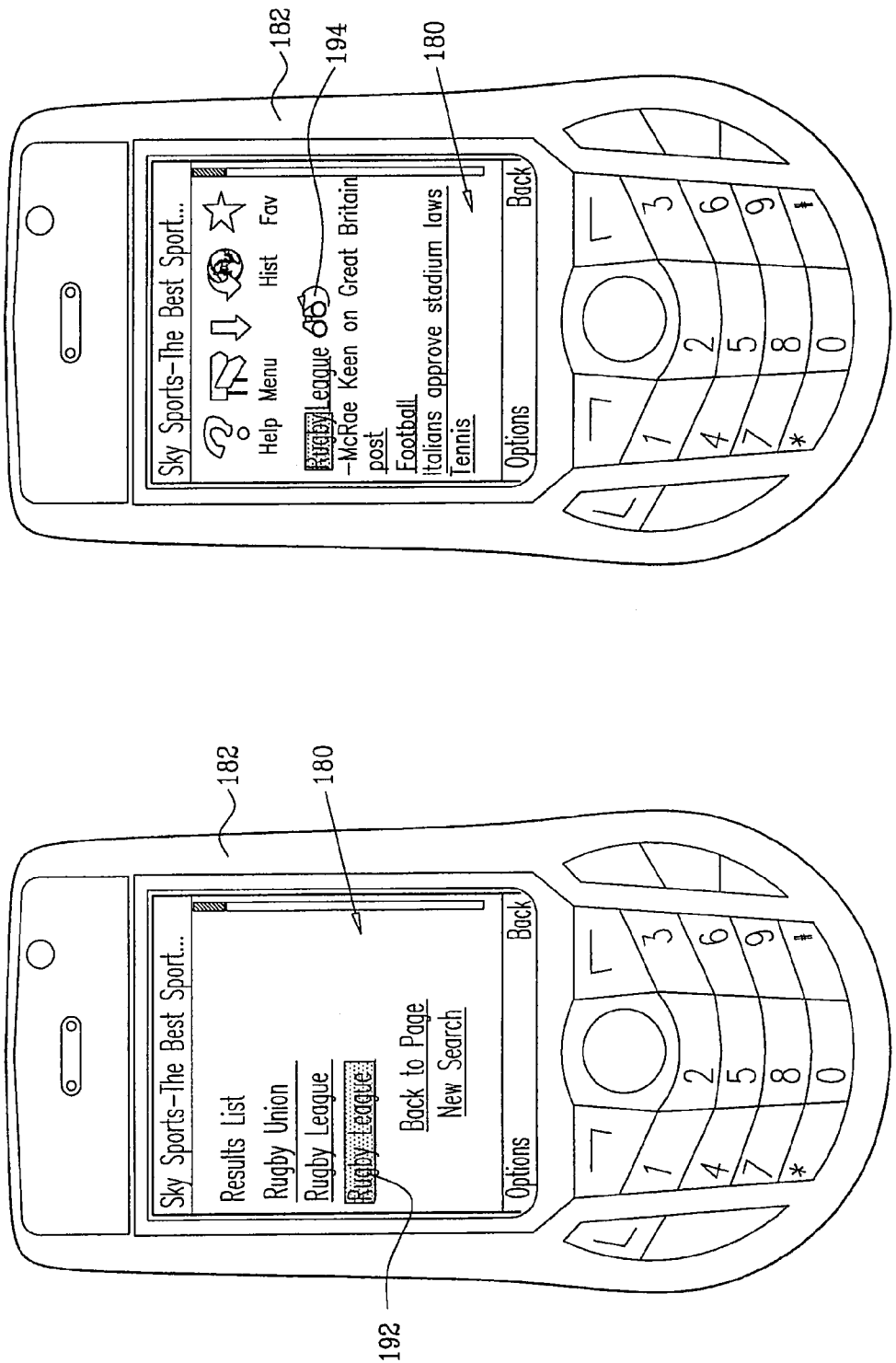

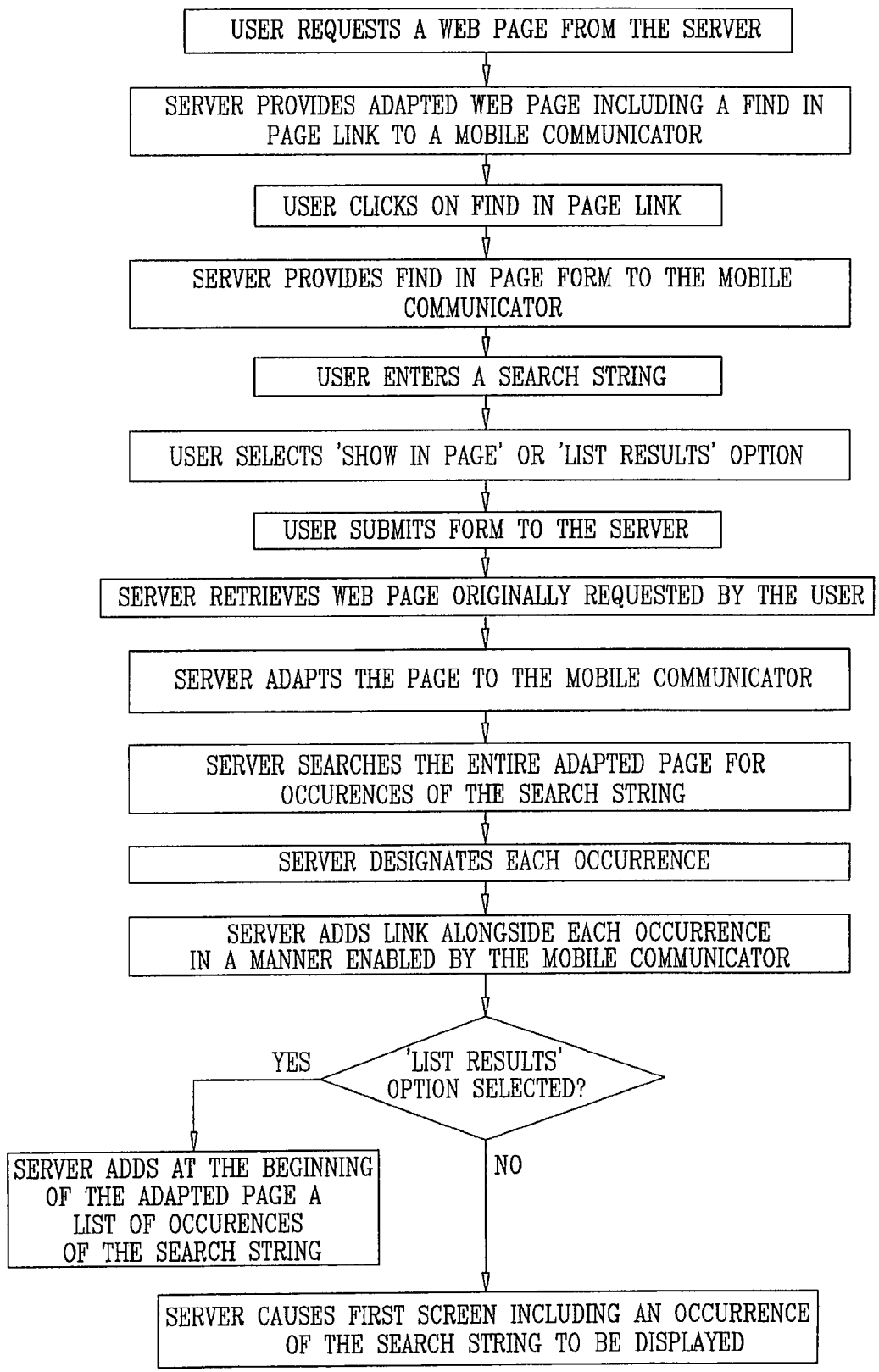

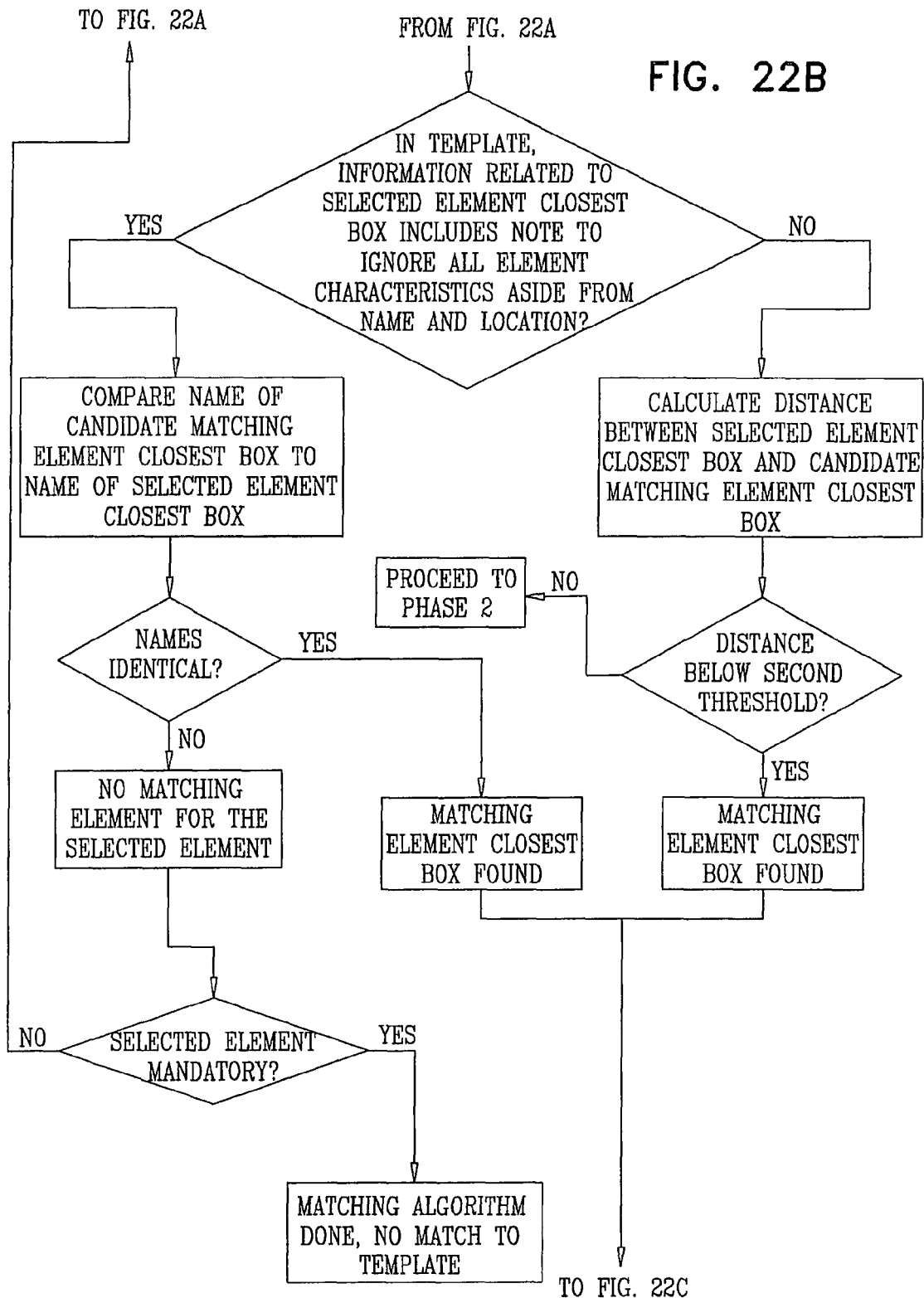

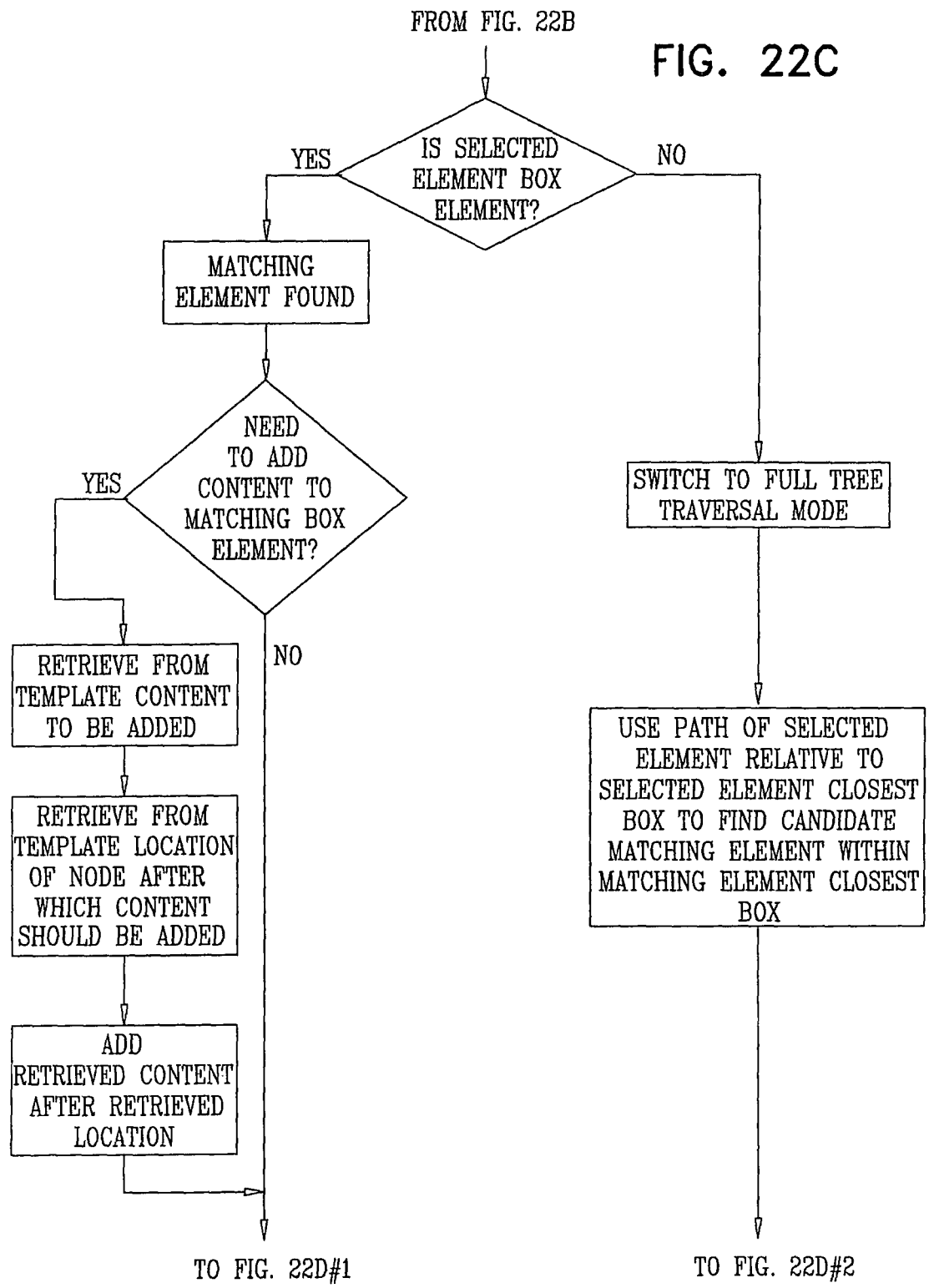

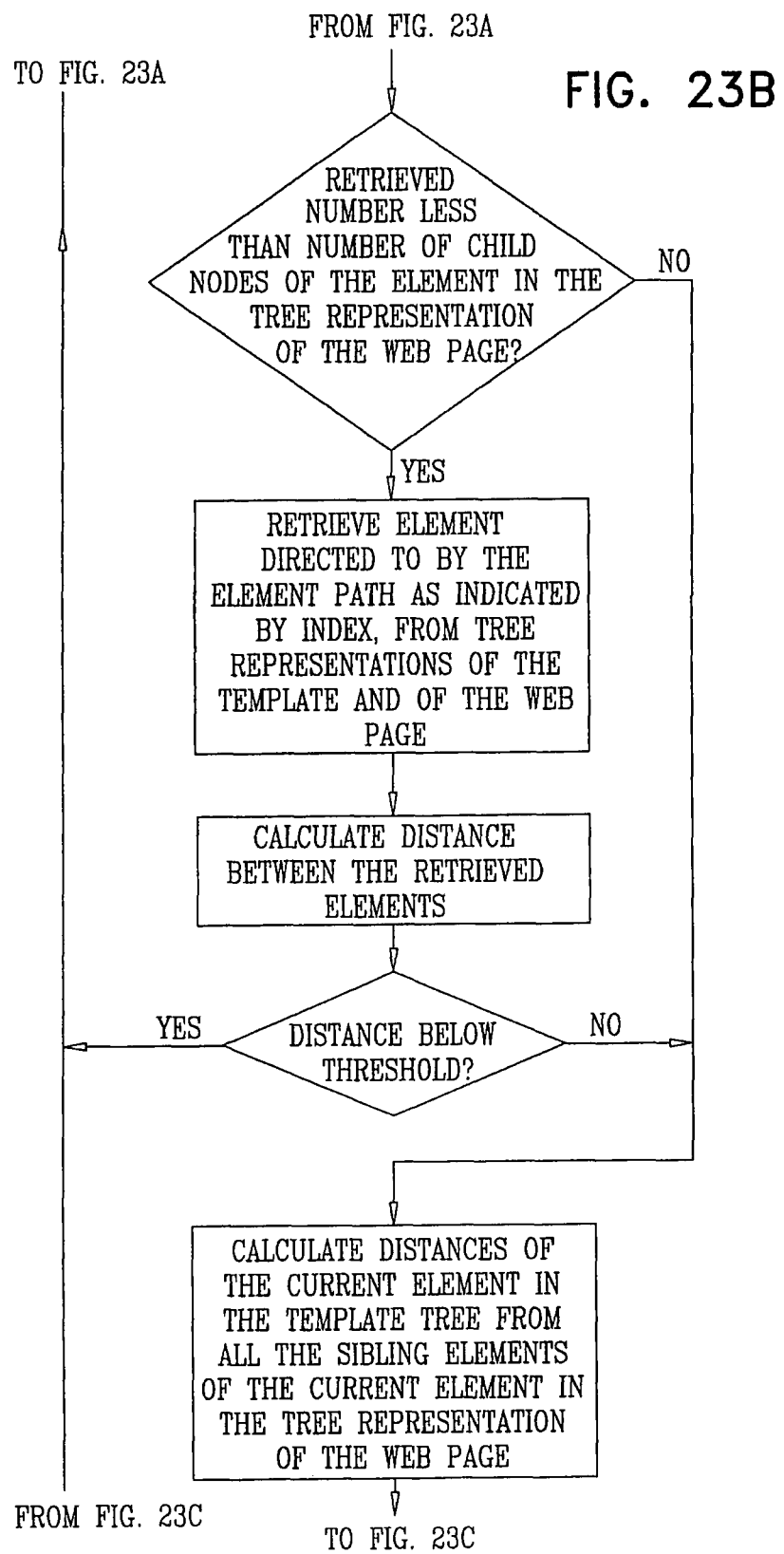

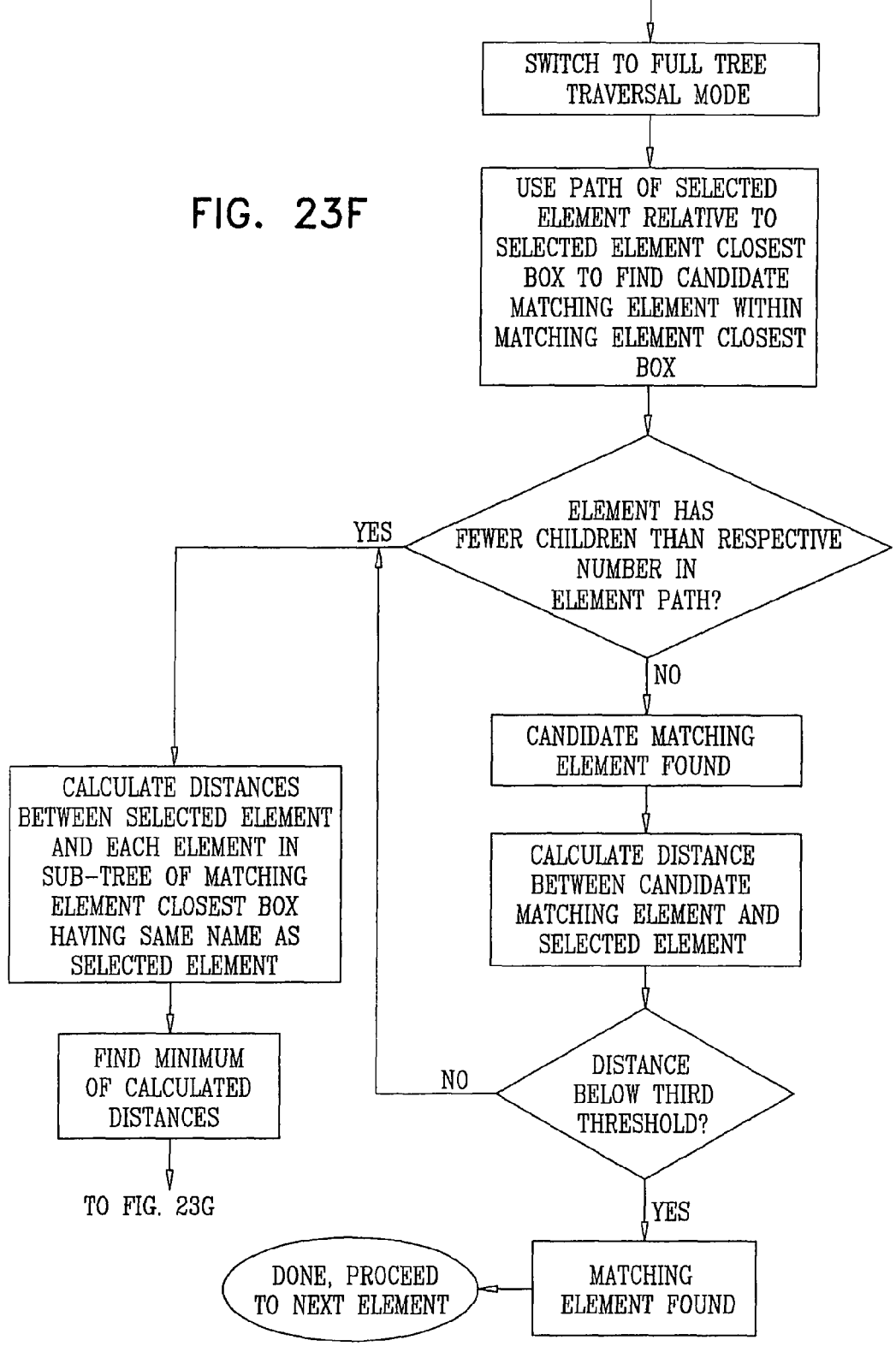

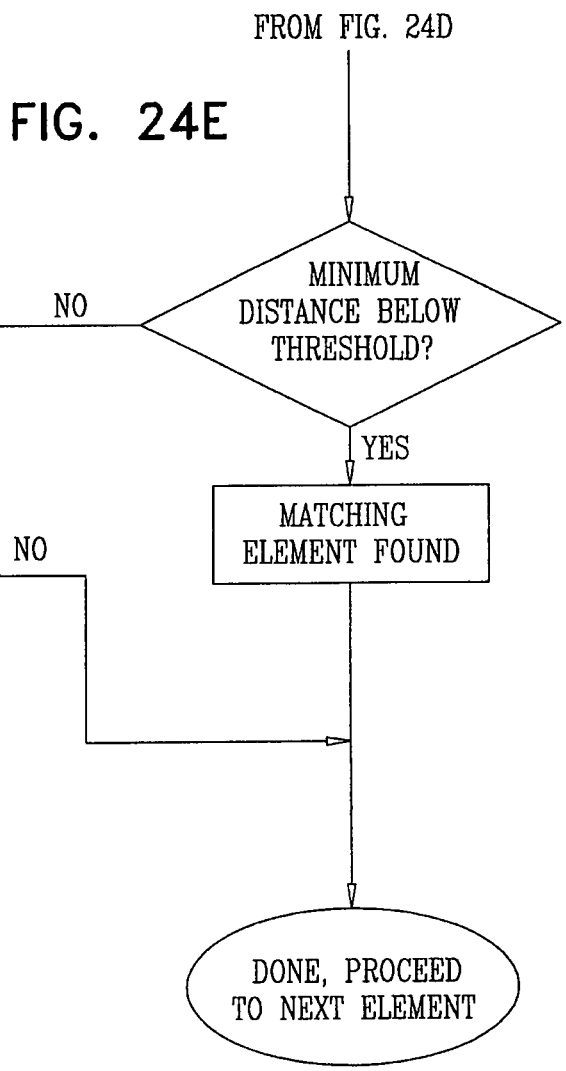

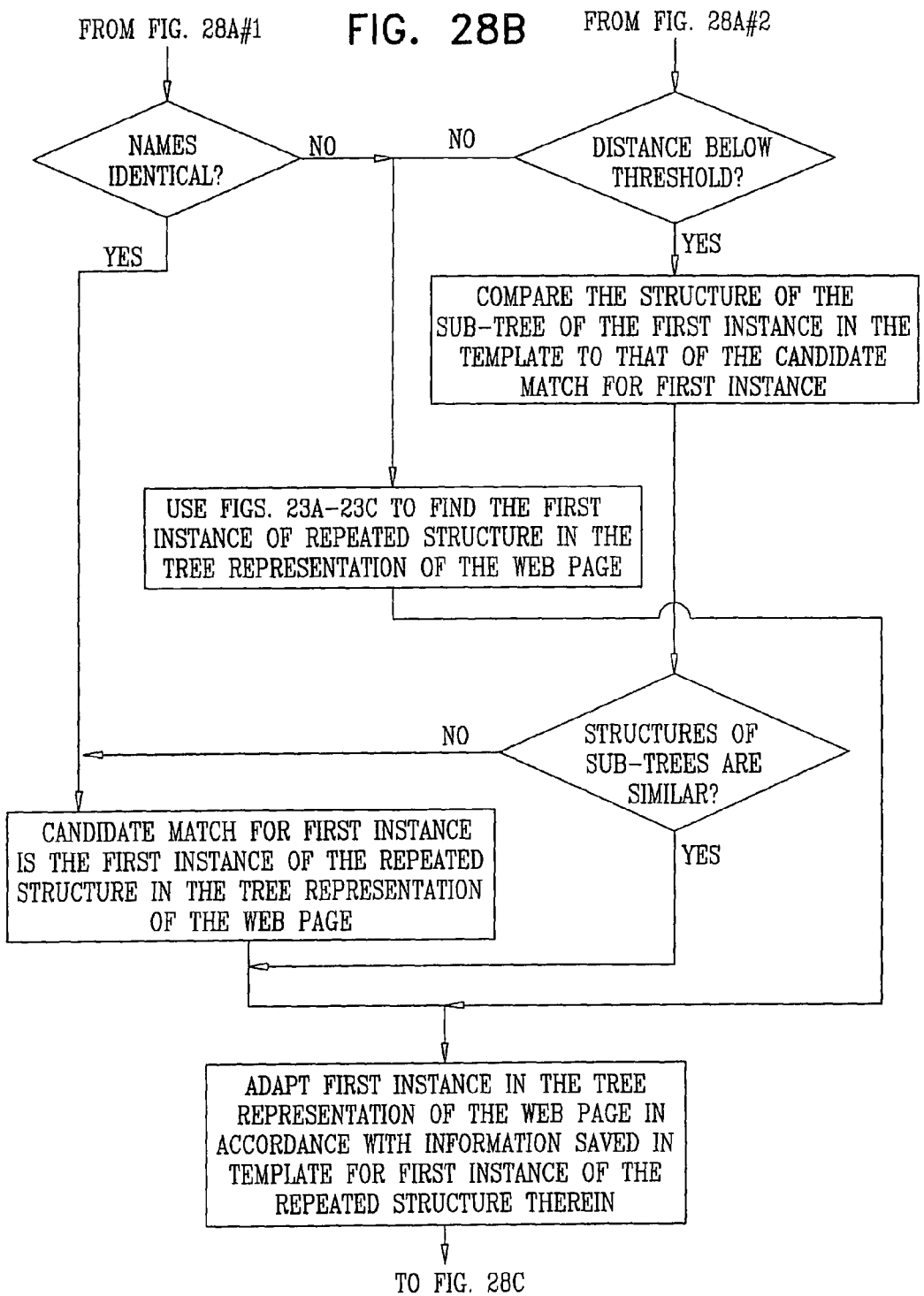

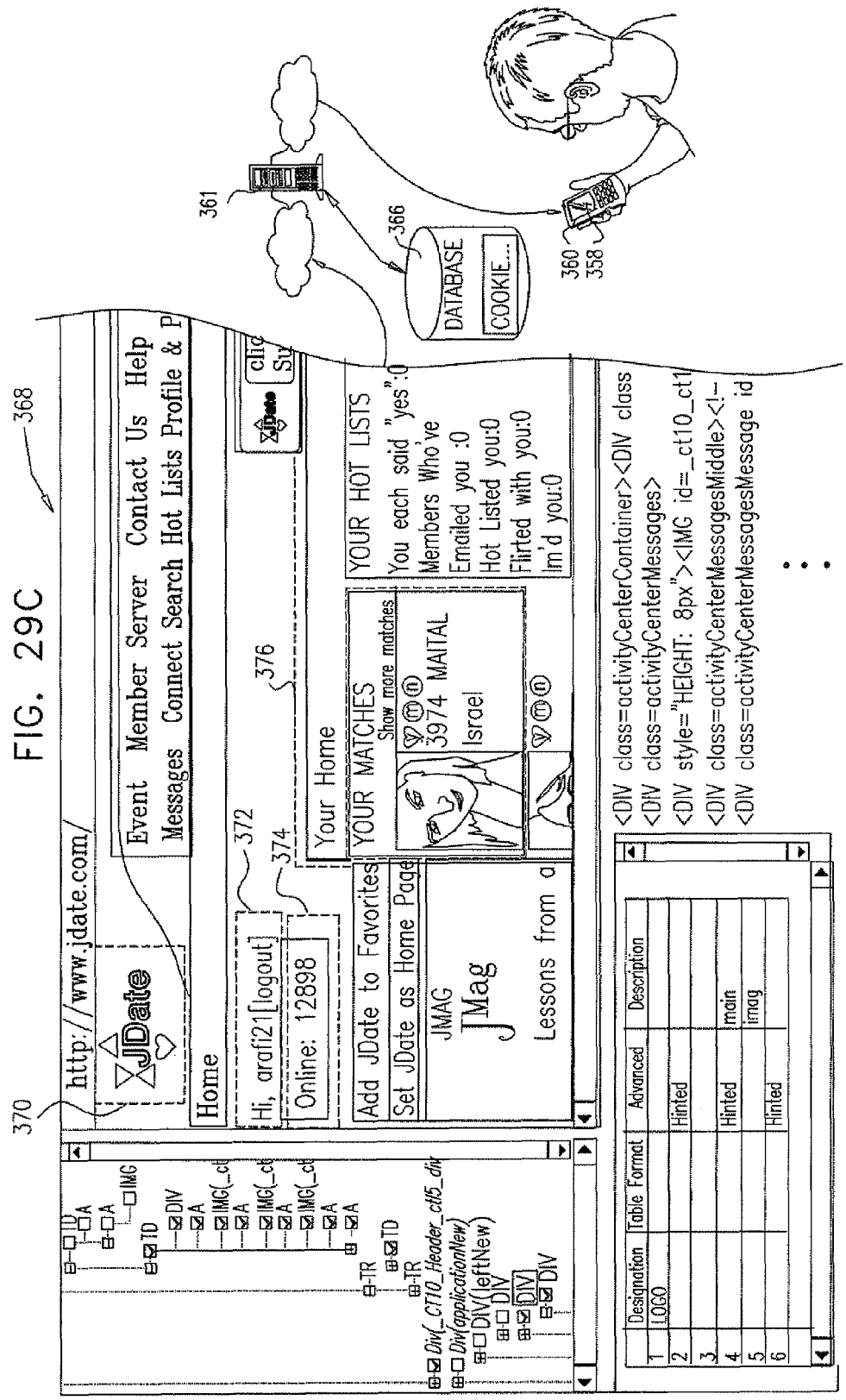

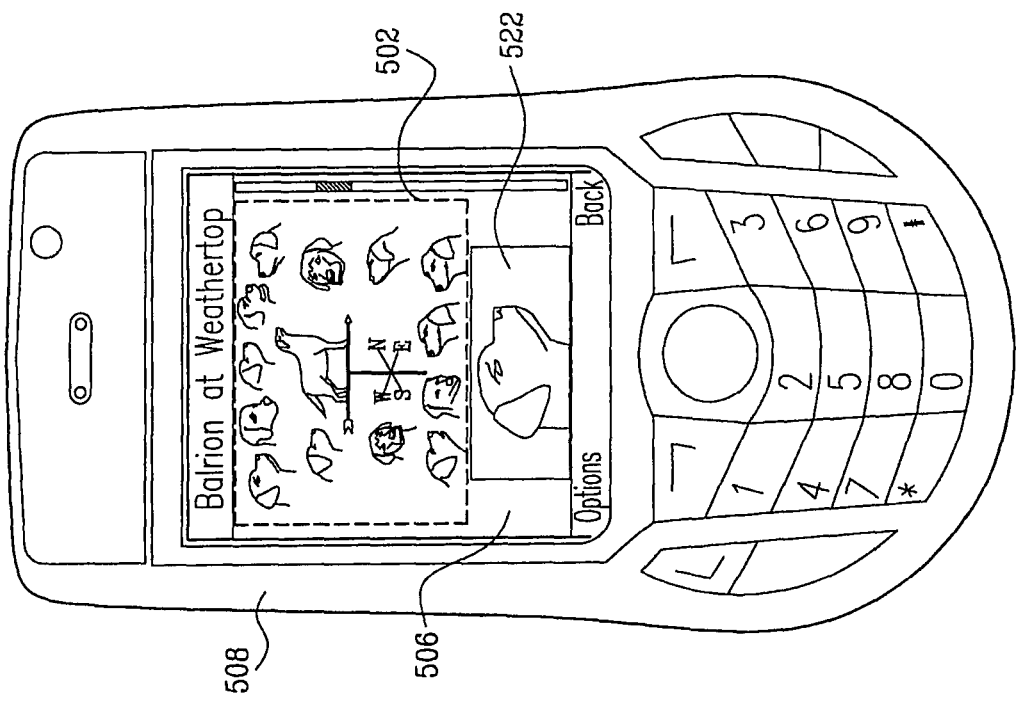
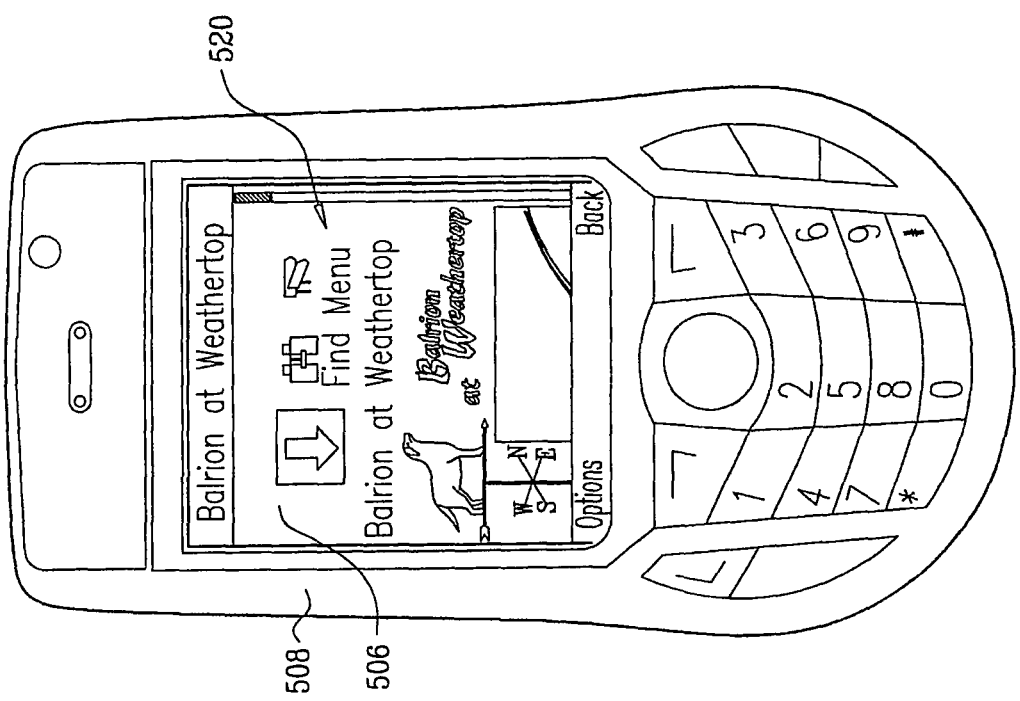

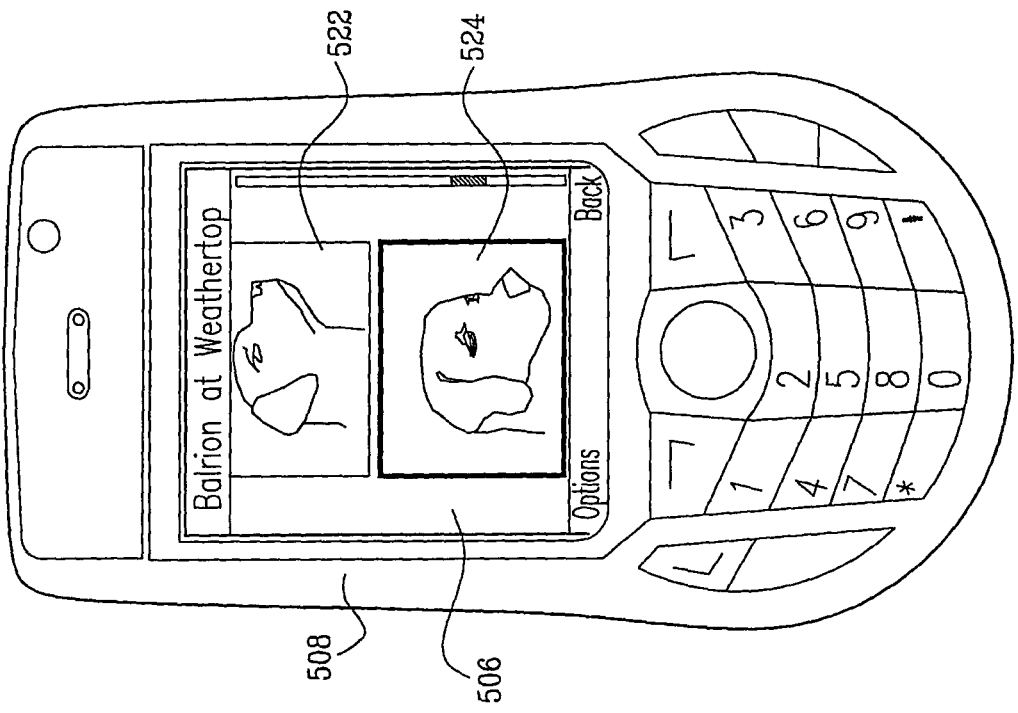
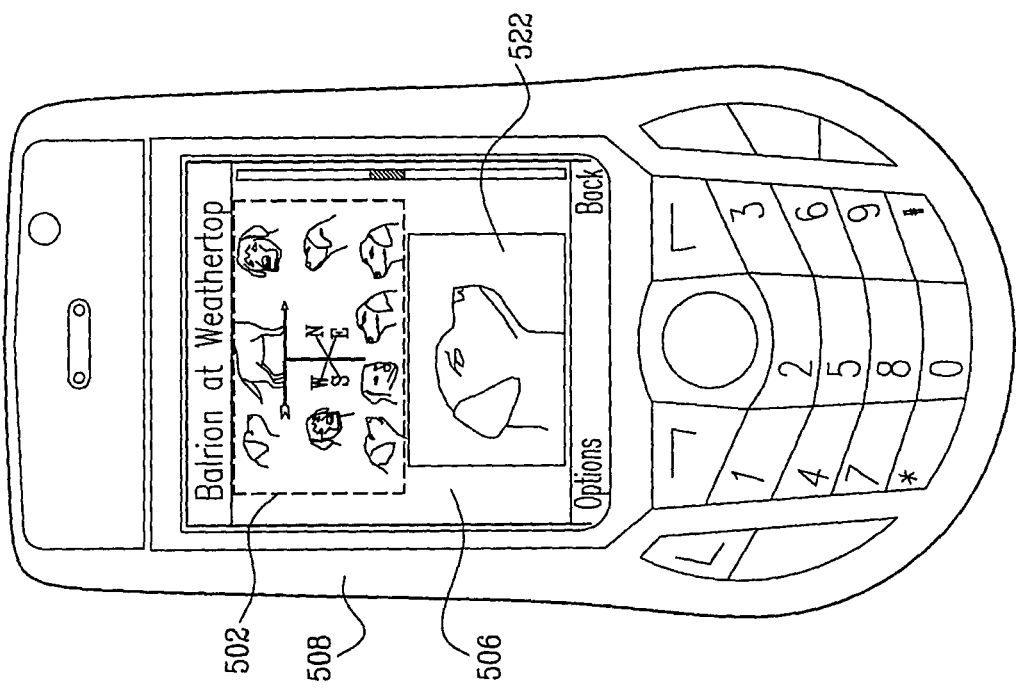

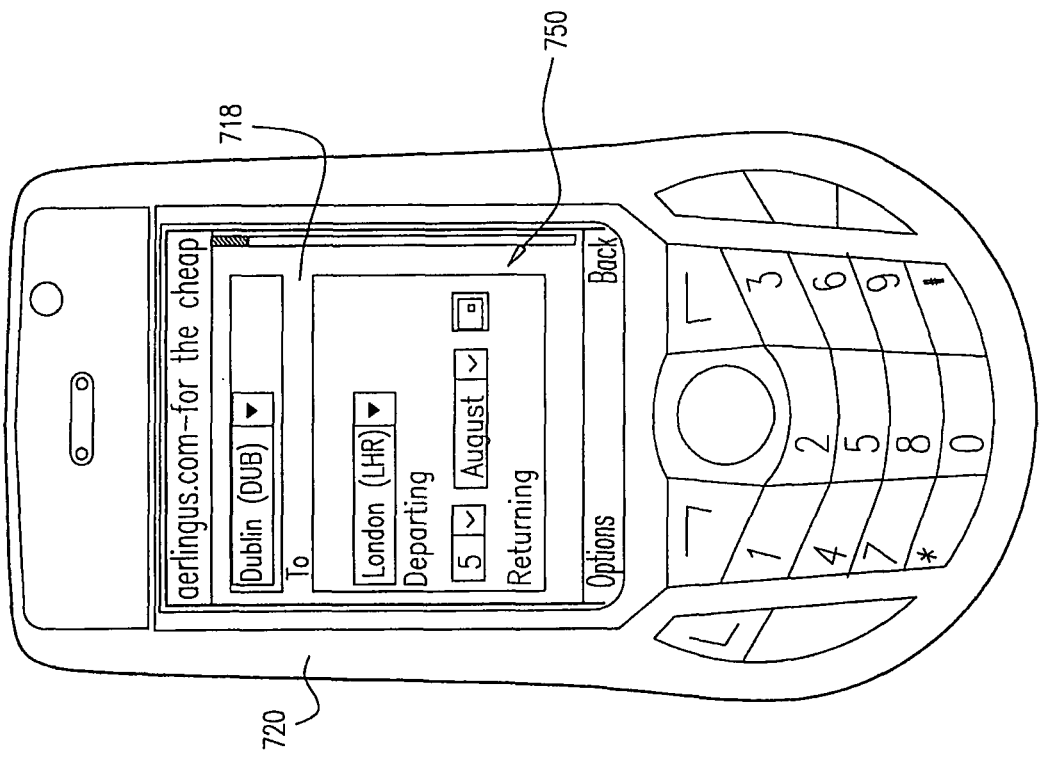
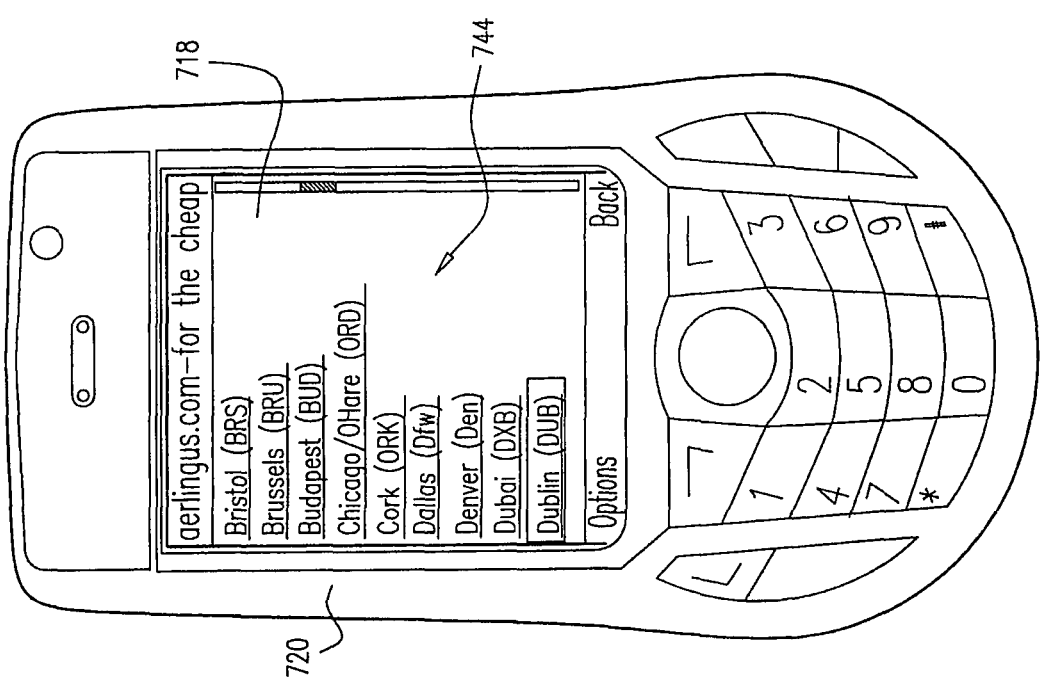

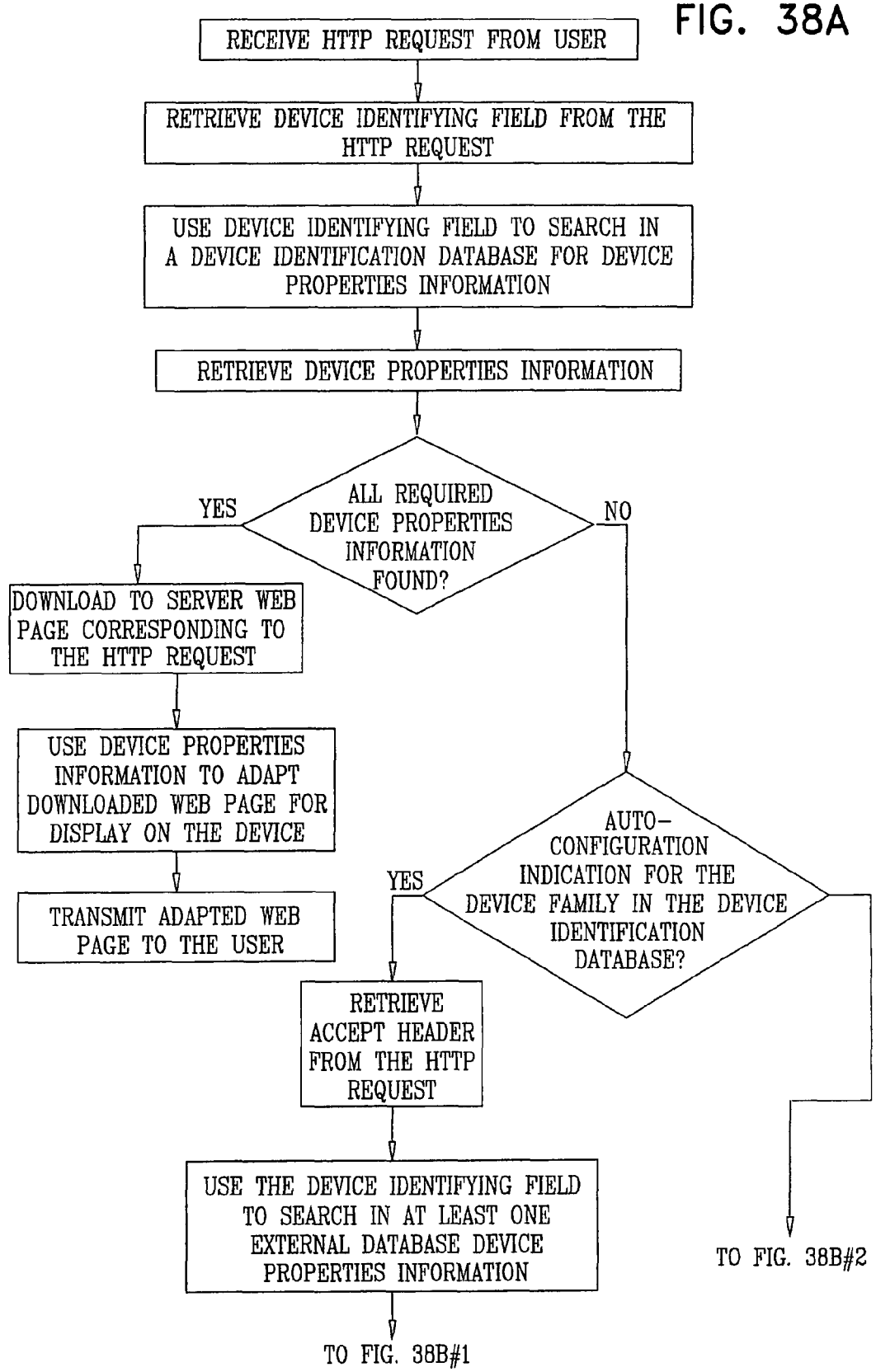

METHODS AND APPARATUS FOR ENABLING USE OF WEB CONTENT ON VARIOUS TYPES OF DEVICES

REFERENCE TO RELATED APPLICATIONS

Reference is made to U.S. Provisional Patent Application No. 60/778,434, entitled TABLE OF CONTENTS, filed Mar. 1, 2006, the disclosure of which is hereby incorporated by reference and priority of which is hereby claimed pursuant to 37 CFR 1.78(a) (4) and (5)(i).

REFERENCE TO COMPUTER PROGRAM LISTING APPENDIX

Computer program listing appendices are submitted herewith on one compact disc and one duplicate compact disc. The total number of compact discs, including duplicates, is two. The files on the compact disc are software object code and accompanying files for carrying out the functionalities of a preferred embodiment of the invention. Their names, dates of creation, directory locations, and sizes in bytes are:
 1. setupexe.txt of Jul. 28, 2008 located in folder apndx-I and of length 7,634,597 bytes;
 2. proxyexe.txt of Jul. 28, 2008 located in folder apndx-I and of length 70,259,383 bytes;
 3. setupini.txt of Jul. 27, 2008 located in folder apndx-I and of length 2,124 bytes.

These files are referred to herein as Appendix I. The material on the compact discs is incorporated by reference herein.

FIELD OF THE INVENTION

The present invention relates to functionalities for enabling the use of web content on various types of devices.

BACKGROUND OF THE INVENTION

The following publications are believed to represent the current state of the art:
 U.S. Pat. Nos. 5,860,073; 5,909,568; 6,023,714; 6,157,935; 6,199,082; 7,047,033; 7,050,603 and 7,116,765;
 U.S. Patent Application Publication Nos.: 2004/0093376 and 2005/0122997;
 Spyglass Prism, Concepts and Applications, Spyglass Inc., 1997, pp. 1-7; and
 http://www.w3.org/protocols/HTTP/HTRO_Headers.html.

SUMMARY OF THE INVENTION

The present invention seeks to provide improved functionalities for displaying web content on mobile communicators. The functionalities described hereinbelow are preferably implemented together with all or part of the functionality described in U.S. Pat. No. 7,047,033, the entire disclosure of which is hereby incorporated by reference, and may be implemented separately or in any suitable combination, all within the scope of the present invention.

There is thus provided in accordance with a preferred embodiment of the present invention a method for displaying web content on a mobile communicator, the method including:
 arranging the web content to be readily viewable on a display screen of the mobile communicator, in the form of at least one mobile communicator adapted page including a plurality of adapted information bearing regions; and
 providing a plurality of navlinks on the at least one mobile communicator adapted page, at least some of the plurality of navlinks providing clickable access to corresponding ones of the plurality of adapted information bearing regions.

In accordance with a preferred embodiment of the present invention, the providing the plurality of navlinks includes:
 analyzing the information bearing regions;
 based on the analyzing, distinguishing between at least some of the plurality of adapted information bearing regions;
 based on the analyzing and distinguishing, labeling the at least some of the plurality of adapted information bearing regions; and
 constructing the plurality of navlinks in accordance with the labeling.

In accordance with another preferred embodiment of the present invention the at least one mobile communicator adapted page includes a plurality of sequentially arranged adapted web page screens and at least some of the plurality of adapted information bearing regions appear on different ones of the plurality of adapted web page screens. Preferably, the plurality of navlinks includes navlinks providing clickable access to each of the adapted information bearing regions, each navlink providing clickable access to a corresponding one of the plurality of adapted information bearing regions. Additionally or alternatively, the plurality of navlinks includes navlinks providing clickable access to less than all of the plurality of adapted information bearing regions.

In accordance with yet another preferred embodiment of the present invention, the plurality of navlinks includes navlinks providing clickable access to multiple ones of the plurality of adapted information bearing regions. Preferably, the plurality of navlinks includes navlinks providing clickable access to multiple ones of other navlinks. Additionally or alternatively, the plurality of navlinks includes a cluster of navlinks.

In accordance with still another preferred embodiment of the present invention, the plurality of navlinks provides clickable access to ones of the adapted information bearing regions, which are not seen simultaneously on one of the plurality of sequentially arranged adapted web page screens due to screen size limitations. Preferably, the navlinks are clickable icons, which provide direct access to the adapted information bearing regions. Additionally or alternatively, the plurality of navlinks include at least one of a Navbar navlink; a Search navlink; a Menu navlink; a Login navlink and a page categories navlink.

There is also provided in accordance with another preferred embodiment of the present invention a method for displaying web content, including a plurality of information bearing regions, on a mobile communicator, the method including:
 arranging the web content, including the plurality of information bearing regions, to be readily viewable on a display screen of the mobile communicator, in the form of at least one mobile communicator adapted page including a plurality of adapted information bearing regions, at least some of the plurality of adapted information bearing regions having identified titles;
 providing a clickable titleslink which displays the titles and provides clickable access to individual ones of the plurality of adapted information bearing regions corresponding to the titles.

In accordance with a preferred embodiment of the present invention, the method also includes providing a user operable text search functionality. Preferably, the method also includes providing a user operable link search functionality. Additionally or alternatively, the arranging the web content includes converting the web page to a tree representation of the Document Object Model (DOM).

In accordance with another preferred embodiment of the present invention the method also includes on-the-fly analysis of the web content and indicating in the tree representation of the DOM those elements which correspond to the information bearing regions. Preferably, the providing a plurality of navlinks includes identifying a mobile communicator which is requesting the web page and employing the DOM representation to provide the at least one mobile communicator adapted page which contains the plurality of adapted information bearing regions, corresponding to the information bearing regions, arranged in a predetermined order. Additionally or alternatively, the predetermined order is as follows: first a logo, then a cardinal region and last a navbar.

There is further provided in accordance with yet another preferred embodiment of the present invention, a system for displaying web content, including information bearing regions, on mobile communicators, the system including:

a server programmed to provide the following functionality:

arranging the web content to be readily viewable on a display screen of the mobile communicator, in the form of at least one mobile communicator adapted page including a plurality of adapted information bearing regions; and providing a plurality of navlinks on the at least one mobile communicator adapted page, at least some of the plurality of navlinks providing clickable access to corresponding one of the plurality of adapted information bearing regions.

In accordance with a preferred embodiment of the present invention the providing the plurality of navlinks includes:

analyzing the information bearing regions;

based on the analyzing, distinguishing between at least some of the plurality of adapted information bearing regions;

based on the analyzing and distinguishing, labeling the at least ones of the plurality of adapted information bearing regions; and constructing the plurality of navlinks in accordance with the labeling.

In accordance with another preferred embodiment of the present invention the at least one mobile communicator adapted page includes a plurality of sequentially arranged adapted web page screens and at least some of the plurality of adapted information bearing regions appear on different ones of the plurality of adapted web page screens. Preferably, the plurality of navlinks includes navlinks providing clickable access to each of the information bearing regions, each navlink providing clickable access to a corresponding one of the plurality of adapted information bearing regions. Additionally or alternatively, the plurality of navlinks includes navlinks providing clickable access to less than all of the plurality of adapted information bearing regions.

In accordance with yet another preferred embodiment of the present invention the plurality of navlinks includes navlinks providing clickable access to multiple ones of the plurality of adapted information bearing regions. Preferably, the plurality of navlinks includes navlinks providing clickable access to multiple ones of other navlinks. Additionally or alternatively, the plurality of navlinks includes a cluster of navlinks.

In accordance with still another preferred embodiment of the present invention the plurality of navlinks provide clickable access to ones of the adapted information bearing regions, which are not seen simultaneously on one of the plurality of sequentially arranged adapted web page screens due to screen size limitations. Preferably, the navlinks are clickable icons, which provide direct access to the adapted information bearing regions. Additionally or alternatively, the plurality of navlinks include at least one of a Navbar navlink; a Search navlink; a Menu navlink; a Login navlink and a page categories navlink.

There is additionally provided in accordance with an additional preferred embodiment of the present invention a system for displaying web content, including a plurality of information bearing regions, on a mobile communicator, the system including:

a server programmed to provide the following functionality:

arranging the web content to be readily viewable on a display screen of the mobile communicator, in the form of at least one mobile communicator adapted page including a plurality of adapted information bearing regions, at of at least some of the plurality of adapted information bearing areas having identified titles; and providing a clickable titleslink which displays the titles and provides clickable access to individual ones of the plurality of adapted information bearing areas corresponding to the titles.

In accordance with a preferred embodiment of the present invention the functionality also includes providing a user operable text search functionality. Preferably, the functionality also includes providing a user operable link search functionality. Additionally or alternatively, the arranging the web content includes converting the web page to a tree representation of the Document Object Model (DOM).

In accordance with another preferred embodiment of the present invention the system also includes functionality providing on-the-fly analysis of the web content and indicating in the tree representation of the DOM those elements which correspond to the information bearing regions. Preferably, the providing includes identifying a mobile communicator which is requesting the web content and employing the DOM representation to provide the adapted web page which contains the plurality of adapted information bearing regions corresponding to the plurality of information bearing regions arranged in a predetermined order. Additionally or alternatively, the predetermined order is as follows: first a logo, then a cardinal region and last a navbar.

There is also provided in accordance with yet another preferred embodiment of the present invention a method for configuring web content for display on mobile communicators including:

receiving an operator-selected web page;

selection, by an operator, of at least one cell-based element of the web page;

arrangement, by an operator, of the at least one cell-based element at a desired position in a page template; and creating at least one mobile communicator adapted page by automatically placing at least one cell-based element, indicated by the template, of at least another web page, having a page structure similar to the operator-selected web page, at a desired position indicated by the template.

In accordance with a preferred embodiment of the present invention, the operator initially views web sites on the Internet and thereafter arranges and prioritizes the web content thereof for viewing on mobile communicators. Preferably, the operator decides how given web sites appear on display screens of the mobile communicators. Additionally or alternatively, the operator instructs a server how to arrange the web content displayed on display screens of the mobile communicators.

In accordance with another preferred embodiment of the present invention, there is displayed on a display screen of a computer of the operator:

the operator-selected web page;
a Document Object Model (DOM);
a prioritization and arrangement table; and
a table containing the HTML code corresponding to the at least one cell-based element selected by the operator.

In accordance with yet another preferred embodiment of the present invention the creating employs a matching algorithm. Preferably, the at least another web page is a future web page having at least certain structural similarities to the operator-selected web page. Additionally or alternatively, the at least another web page is a different web page having at least certain structural similarities to the operator-selected web page.

In accordance with still another preferred embodiment of the present invention selection, arrangement and creating steps take place without changing HTML code of the operator-selected web page. Additionally or alternatively, the creating includes adding additional content, within selected elements, which was not present in the operator-selected web page.

In accordance with a further preferred embodiment of the present invention the creating includes removal of web content from selected elements when creating the template. Preferably, the operator initially selects the scope of a template to be created by using regular expressions. Additionally, the operator thereafter clicks on cell-based elements in the DOM or in the operator-selected web page in order to select them for addition to the template.

In accordance with a yet further preferred embodiment of the present invention the selection includes filtering part of the content from at least one selected cell-based element. Preferably, if there exist cell-based elements template having an attribute which is likely to be different at different times at which the web page is viewed, the operator is enabled to instruct that such attribute be ignored in the creating step. Additionally or alternatively, following the arrangement, by an operator, of the at least one cell-based element at a desired position in the template, the template is saved on a server.

In accordance with a still further preferred embodiment of the present invention information saved on the server for each cell-based element in the template includes at least one of a priority of the cell-based element, its X and Y positions within the operator-selected web page, the area of the operator-selected web page taken up by the cell-based element, the number of images included in the cell-based element, the number of forms included in the cell-based element, the percentage of the area of the cell-based element which is covered by text and the percentage of the area of the cell-based element which is covered by links and the path of the cell-based element relative to the <body> tag as it appears in the tree representation of the template DOM. Preferably, information saved on the server for each cell-based element in the template include at least one of the following:

for cell-based elements in which the operator added or removed content, an indication that such features exist;
cell-based elements which include a basic structure which is repeated several times.

In accordance with another further preferred embodiment of the present invention the operator may indicate whether one or more cell-based elements in the template are mandatory elements, such that when employing the template to generate an adapted web page for display on a mobile communicator display screen, if one of these cell-based elements in the template is not matched by an cell-based element in the web page being adapted, the template is not used. Preferably, the template is created for a single URL. Alternatively, the template is created for a group of URLs defined by a regular expression.

There is further provided in accordance with a further preferred embodiment of the present invention a system for configuring web content for display on mobile communicators including a computer programmed to provide the following functionalities:

receiving an operator-selected web page;
selection, by an operator, of at least one cell-based element of the web page;
arrangement, by an operator, of the at least one cell-based element at a desired position in a page template; and
creating at least one mobile communicator adapted page by automatically placing at least one cell-based element, indicated by the template, of at least another web page, having a page structure similar to the operator-selected web page, at a desired position indicated by the template.

In accordance with a preferred embodiment of the present invention the computer is programmed to enable the operator initially to view web sites on the Internet and thereafter arrange and prioritize the web content thereof for viewing on mobile communicators. Preferably, the computer is programmed to enable the operator to decide how given web sites appear on display screens of the mobile communicators. Additionally or alternatively, the computer is programmed to enable the operator to instruct a server how to arrange the web content displayed on display screens of the mobile communicators.

In accordance with another preferred embodiment of the present invention the computer is programmed such that there is displayed on a display screen of the computer of the operator:

the operator-selected web page;
a Document Object Model (DOM);
a prioritization and arrangement table; and
a table containing the HTML code corresponding to the at least one cell-based element selected by the operator.

In accordance with yet another preferred embodiment of the present invention the computer is programmed to enable the creating to employ a matching algorithm. Preferably, the at least another web page is a future web page having at least certain structural similarities to the operator-selected web page.

In accordance with still another preferred embodiment of the present invention the at least another web page is a future web page having at least certain structural similarities to the operator-selected web page. Preferably, the computer is programmed to enable the selection, arrangement and creating steps to take place without changing HTML code of the operator-selected web page. Additionally or alternatively, the computer is programmed to enable the creating to include adding additional content, within selected elements, which was not present in the operator-selected web page.

In accordance with a further preferred embodiment of the present invention the computer is programmed to enable the creating to include removal of web content from selected elements when creating the template. Preferably, the computer is programmed to enable the operator initially to select the scope of a template to be created by using regular expressions and thereafter to select an appropriate web page and views it along with a tree representation of a Document Object Model (DOM). Additionally or alternatively, the computer is programmed to enable the operator thereafter to click on cell-based elements in the DOM or in the operator-selected web page in order to select them for addition to the template.

In accordance with a yet further preferred embodiment of the present invention the computer is programmed such that if there exist cell-based elements template having an attribute which is likely to be different at different times at which the web page is viewed, the operator may instruct that such attribute should be ignored in the creating step. Preferably, the computer is programmed such that following the arrangement, by an operator, of the at least one cell-based element at a desired position in the template, the template is saved on a server. Additionally or alternatively, information saved on the server for each cell-based element in the template includes at least one of a priority of the cell-based element, its X and Y positions within the operator-selected web page, the area of the operator-selected web page taken up by the cell-based element, the number of images included in the cell-based element, the number of forms included in the cell-based element, the percentage of the area of the cell-based element which is covered by text and the percentage of the area of the cell-based element which is covered by links and the path of the cell-based element relative to the <body> tag as it appears in the tree representation of the template DOM.

In accordance with a still further preferred embodiment of the present invention information saved on the server for each cell-based element in the template include at least one of the following: for cell-based elements in which the operator added or removed content, an indication that such features exist; cell-based elements which include a basic structure which is repeated several times. Preferably, the computer is programmed to enable the operator to indicate whether one or more cell-based elements in the template are mandatory elements, such that when employing the template to generate an adapted web page for display on a mobile communicator display screen, if one of these cell-based elements in the template is not matched by an cell-based element in the web page being adapted, the template is not used. Additionally or alternatively, the template is created for a single URL. Alternatively, the template is created for a group of URLs defined by a regular expression.

There is yet further provided in accordance with a yet further preferred embodiment of the present invention a method for displaying web content on a device including:
  requesting a web page by a user;
  in response to a user request, downloading the web page to a server;
  searching for at least one template for the web page on a database of the server;
  if a template is found for the web page, effecting best matching between the template and a plurality of information bearing regions on the web page; and
  importing the plurality of information bearing regions to at least one device adapted page.

In accordance with a preferred embodiment of the present invention the template includes matching assist instructions.

There is still further provided in accordance with a still further preferred embodiment of the present invention a method of obtaining information from at least one dynamic website, the method including:
  constructing at least one template of at least a part of a web page of the at least one website when the web page is in a first state; and
  employing the at least one template to extract information from at least one web page of the at least one dynamic website when at least one of the at least one web page is in a second state, different from the first state.

In accordance with a preferred embodiment of the present invention the at least one template is based on a document object model (DOM). Preferably, the at least one template includes at least one cell-based element of the web page. Additionally or alternatively, the employing the at least one template to extract information from at least one web page of the at least one dynamic website when at least one of the at least one web page is in a second state, different from the first state, includes effecting best matching between the at least one template and document object models (DOMs) of the at least one web page in a second state.

There is additionally provided in accordance with an additional preferred embodiment of the present invention a method of obtaining information from at least one dynamic website, the method including:
  obtaining at least one document object model (DOM) of a web page of the at least one dynamic website when the web page is in a first state; and
  employing the at least one document object model (DOM) to obtain information from at least one web page of the at least one dynamic website when at least one of the at least one web page is in a second state, different from the first state.

In accordance with a preferred embodiment of the present invention the employing the at least one document object model (DOM) to extract information from at least one web page of the at least one dynamic website when at least one of the at least one web page is in a second state, different from the first state, includes effecting best matching between the at least one document object model (DOM) and document object models (DOMs) of the at least one web page in a second state. Preferably, the method also includes maintaining login information of users in a database in the form of cookies and when a user again requests the web page, the login information of the user is retrieved and a personalized web page is displayed to the user. Additionally or alternatively, the method also includes converting a web page received from the Internet into a tree representation of the DOM. and subsequently matching the web page to a suitable template, in order to generate an adapted web page for display on the mobile communicator.

In accordance with another preferred embodiment of the present invention, in order to find a template suitable for the web page, all the templates having a scope including the requested web page are found and a distance between the tree representation of the web page and the tree representations of each of the templates is calculated, using a tree comparison algorithm. Preferably, if the distance between the tree representation of the web page and the tree representation of a given template is below a predetermined threshold, that template is used for adapting the web page for display on a mobile communicator.

There is also provided in accordance with another preferred embodiment of the present invention a system for displaying web content on a device including a computer programmed to support at least the following functionality:
  requesting a web page by a user;
  in response to a user request, downloading the web page to a server;
  searching for at least one template for the web page on a database of the server;
  if a template is found for the web page, effecting best matching between the template and a plurality of information bearing regions on the web page; and
  importing the plurality of information bearing regions to at least one device adapted page.

In accordance with a preferred embodiment of the present invention the template includes matching assist instructions.

There is further provided in accordance with a further preferred embodiment of the present invention a system for obtaining information from at least one dynamic website, the system including a computer programmed to support at least the following functionality:

constructing at least one template of at least a part of a web page of the at least one website when the web page is in a first state; and employing the at least one template to extract information from at least one web page of the at least one dynamic website when at least one of the at least one web page is in a second state, different from the first state.

In accordance with a preferred embodiment of the present invention the at least one template is based on a document object model (DOM). Preferably, the at least one template includes at least one cell-based element of the web page. Additionally or alternatively, the employing the at least one template to extract information from at least one web page of the at least one dynamic website when at least one of the at least one web page is in a second state, different from the first state, includes effecting best matching between the at least one template and document object models (DOMs) of the at least one web page in a second state.

There is yet further provided in accordance with a yet further preferred embodiment of the present invention a system for obtaining information from at least one dynamic website, the system including:

obtaining at least one document object model (DOM) of a web page of the at least one dynamic website when the web page is in a first state; and employing the at least one document object model (DOM) to obtain information from at least one web page of the at least one dynamic website when at least one of the at least one web page is in a second state, different from the first state.

In accordance with a preferred embodiment of the present invention the employing the at least one document object model (DOM) to extract information from at least one web page of the at least one dynamic website when at least one of the at least one web page is in a second state, different from the first state, includes effecting best matching between the at least one document object model (DOM) and document object models (DOMs) of the at least one web page in a second state. Preferably, the system also includes a database in which login information of users is maintained in the form of cookies and wherein when a user again requests the web page, the login information of the user is retrieved from the database and a personalized web page is displayed to the user. Additionally or alternatively, the computer is operative to convert a web page received from the Internet into a tree representation of the DOM. and subsequently to match the web page to a suitable template, in order to generate an adapted web page for display on the mobile communicator.

In accordance with another preferred embodiment of the present invention the computer is operative, in order to find a template suitable for the web page, to find all the templates having a scope including the requested web page and to calculate a distance between the tree representation of the web page and the tree representations of each of the templates, using a tree comparison algorithm. Preferably, if the distance between the tree representation of the web page and the tree representation of a given template is below a predetermined threshold, that template is used for adapting the web page for display on a mobile communicator.

There is still further provided in accordance with a still further preferred embodiment of the present invention a method for displaying web content on a display screen of a mobile communicator including:

in response to a user request, downloading the web page to a server;

supplying from the server to the mobile communicator for display on a display screen thereof, an adapted web page corresponding to the web page requested by the user, the adapted web page including a Find In Page link;

clicking on the Find In Page link by the user;

displaying on the display screen of the mobile communicator a Find In Page form;

entering a search string in the Find In Page form submitted by a user; and displaying the adapted page on the display screen and designating occurrences of the search string therein.

In accordance with a preferred embodiment of the present invention the method also includes adding a link next to each occurrence of the search string in the adapted page in order to enable the user to readily navigate from occurrence to occurrence. Preferably, the method also includes displaying a list of occurrences of the search string prior to displaying the adapted page on the display screen and designating occurrences of the search string therein. Additionally or alternatively, the list of occurrences includes links to the occurrences.

In accordance with another preferred embodiment of the present invention the supplying includes providing an adapted web page to the mobile communicator, which adapted web page includes a Find In Page link. Preferably, when the user clicks on the Find In Page link, the server receives a corresponding request for a Find In Page form and provides the Find In Page form to the mobile communicator. Additionally or alternatively, the Find In Page form includes radio buttons allowing the user to select between first and second options as well as a text entry field allowing the user to enter a search string.

In accordance with yet another preferred embodiment of the present invention when the user actuates one of the radio buttons, enters a search string and submits the form to the server, this sends a request to the server to retrieve the initially requested web page and to designate on the corresponding adapted web page occurrences of the search string entered by the user. Preferably, the server is operative sequentially to:

I. reload the same web page as originally requested by the user;

II. adapt the web page for the mobile communicator, divide the adapted page into a series of sequential viewable adapted screens and search throughout the entire adapted page for occurrences of the search string; and III. designate each such occurrence in a manner enabled by the mobile communicator.

In accordance with still another preferred embodiment of the present invention the server is also operative to:

IV. add a link alongside each occurrence which leads to the sequential next occurrence, wherein the link alongside the last occurrence in the adapted page leads back to the first occurrence;

V. if a 'list results' option is selected, add at the beginning of the adapted page a list of occurrences showing their context including links which lead to each occurrence in the adapted page.

VI. if a 'show in page' option is selected, cause the first of the series of sequential viewable adapted pages in which the search string occurs to be displayed.

There is additionally provided in accordance with an additional preferred embodiment of the present invention a system for displaying web content on a display screen of a mobile communicator including a server programmed to support the following functionality:

in response to a user request, downloading a web page to the server;

supplying from the server to the mobile communicator for display on a display screen thereof, an adapted web page corresponding to the web page requested by the user, the adapted web page including a Find In Page link;

clicking on the Find In Page link by the user;

displaying on the display screen of the mobile communicator a Find In Page form;

entering a search string in the Find In Page form submitted by a user; and displaying the adapted page on the display screen and designating occurrences of the search string therein.

In accordance with a preferred embodiment of the present invention the functionality also includes adding a link next to each occurrence of the search string in the adapted page in order to enable the user to readily navigate from occurrence to occurrence. Preferably, the functionality also includes displaying a list of occurrences of the search string prior to displaying the adapted page on the display screen and designating occurrences of the search string therein. Additionally or alternatively, the list of occurrences includes links to the occurrences.

In accordance with another preferred embodiment of the present invention the supplying includes providing an adapted web page to the mobile communicator, which adapted web page includes a Find In Page link. Preferably, the functionality enables the user to click on the Find In Page link, and causes the server to receive a corresponding request for a Find In Page form and provide the Find In Page form to the mobile communicator. Additionally or alternatively, the Find In Page form includes radio buttons allowing the user to select between first and second options as well as a text entry field allowing the user to enter a search string.

In accordance with yet another preferred embodiment of the present invention the functionality enables the user to actuate one of the radio buttons and to enter a search string and submit the form to the server, and causes the server to sends a request to the server to retrieve the initially requested web page and to designate on the corresponding adapted web page occurrences of the search string entered by the user. Preferably, the functionality enables the server to be operative sequentially to:

I. reload the same web page as originally requested by the user;

II. adapt the web page for the mobile communicator, divide the adapted page into a series of sequential viewable adapted screens and search throughout the entire adapted page for occurrences of the search string; and III. designate each such occurrence in a manner enabled by the mobile communicator.

In accordance with still another preferred embodiment of the present invention the functionality also enables the server to be operative to:

IV. add a link alongside each occurrence which leads to the sequential next occurrence, wherein the link alongside the last occurrence in the adapted page leads back to the first occurrence;

V. if a 'list results' option is selected, add at the beginning of the adapted page a list of occurrences showing their context including links which lead to each occurrences in the adapted page; and VI if a 'show in page' option is selected, cause the first of the series of sequential viewable adapted pages in which the search string occurs to be displayed.

There is also provided in accordance with another preferred embodiment of the present invention a method for displaying web content on a display screen including:

requesting a web page by a user;

in response to a user request, downloading the web page to a server;

recognizing, by the server, the presence in the web page of an image comprised of sub-images;

combining, by the server, the sub-images into a single image;

supplying by the server the single image for display on the display screen.

In accordance with a preferred embodiment of the present invention at least one of the sub-images includes non-image information and wherein the combining preserves the non-image information outside of the single image. Preferably, the recognizing and combining include:

converting the web page into a modified tree representation of the DOM;

identifying the sub-images;

for each sub-image, creating a file which includes information related thereto and to the composite image, the information including the source URL and top left corner of each sub-image in addition to the width and height dimensions of the composite image and its background color;

in the tree representation, flagging all the sub images aside from the first one as being invisible;

in the src field of the first sub-image, replacing the source location thereof by the location in the server of the file, and indicating the first sub-image in the tree representation with a suitable indication, such that when the user scrolls down the adapted web page and reaches a screen in which the adapted image should be displayed and the composite image is requested from the server, due to the change in the src field of the first sub image, the location of the file is provided to the server, rather than the location of the sub-image.

In accordance with another preferred embodiment of the present invention the supplying includes:

in the server, defining an area having the dimensions of the composite image, as indicated in the file and setting the background color of the defined area to be the background color of the image as defined in the file;

retrieving each of the sub-images by using the URL indicated in the src field of its img tag; and placing each of the sub-images in the area defined in the server at its appropriate location based on the position of its top left corner, indicated in the file.

There is further provided in accordance with a further preferred embodiment of the present invention a system for displaying web content on a display screen including a server programmed to have the following functionality:

receiving a web page requested by a user;

recognizing the presence in the web page of a composite image comprised of sub-images;

combining the sub-images into a single image; and supplying the single image for display on the display screen.

In accordance with a preferred embodiment of the present invention the server is programmed to have the following additional functionality: if at least one of the sub-images includes non-image information, the combining preserves the non-image information outside of the single image. Preferably, the recognizing and combining functionalities include:

converting the web page into a modified tree representation of the DOM;

identifying the sub-images;

for each sub-image, creating a file which includes information related thereto and to the composite image, the information including the source URL and top left corner of each sub-image in addition to the width and height dimensions of the composite image and its background color;

in the tree representation, flagging all the sub images aside from the first one as being invisible;

in the src field of the first sub-image, replacing the source location thereof by the location in the server of the file, and indicating the first sub-image in the tree representation with a suitable indication, such that when the user scrolls down the adapted web page and reaches a screen in which the adapted image should be displayed and the composite image is requested from the server, due to the change in the src field of the first sub image, the location of the file is provided to the server, rather than the location of the sub-image.

In accordance with another preferred embodiment of the present invention the supplying functionality includes:

in the server, defining an area having the dimensions of the composite image, as indicated in the file and setting the background color of the defined area to be the background color of the image as defined in the file;

retrieving each of the sub-images by using the URL indicated in the src field of its img tag; and placing each of the sub-images in the area defined in the server at its appropriate location based on the position of its top left corner, indicated in the file.

There is yet further provided in accordance with a yet further preferred embodiment of the present invention a method for displaying web content on a display screen including:

in response to a user request, downloading a web page to a server;

recognizing, by the server, the presence in the web page of an image map containing a plurality of links, corresponding to portions of the image map;

dividing by the server the image map into a plurality of sub-images corresponding to the portions of the image map;

associating by the server the plurality of links corresponding ones of the plurality of sub-images;

supplying by the server the plurality of sub-images for display on the display screen.

In accordance with a preferred embodiment of the present invention the links are associated with specific geographical areas forming part of the image. Preferably, the server employs information in the image map to extract geographical areas of the image and their corresponding links and to prepare the geographical areas for display as individual images on the display screen. Additionally or alternatively, the server employs information indicating the spatial coordinates of each of the geographical areas from the image map to copy that geographical area into a new image with which is associated a unique link, corresponding to the link designated by the image map.

In accordance with another preferred embodiment of the present invention the server converts the web page into a tree representation of the DOM of the web page and thereafter, during analysis of the web page locates <map> tags, indicating the presence of image maps and, for each <map> tag found, locates the image associated therewith. Preferably, a set of links, representing each of the portions of the image map, is created.

There is still further provided in accordance with a still further preferred embodiment of the present invention a system for displaying web content on a display screen including a server programmed to enable the following functionalities:

in response to a user request, downloading a web page to the server;

recognizing, by the server, the presence in the web page of an image map containing a plurality of links, corresponding to portions of the image map;

dividing by the server the image map into a plurality of sub-images corresponding to the portions of the image map;

associating by the server the plurality of links corresponding ones of the plurality of sub-images;

supplying by the server the plurality of sub-images for display on the display screen.

In accordance with a preferred embodiment of the present invention the links are associated with specific geographical areas forming part of the image. Preferably, the server includes functionality to enable it to employ information in the image map to extract geographical areas of the image and their corresponding links and to prepare the geographical areas for display as individual images on the display screen. Additionally or alternatively, the server includes functionality enabling it to employ information indicating the spatial coordinates of each of the geographical areas from the image map to copy that geographical area into a new image with which is associated a unique link, corresponding to the link designated by the image map.

In accordance with another preferred embodiment of the present invention the server converts the web page into a tree representation of the DOM of the web page and thereafter, during analysis of the web page locates <map> tags, indicating the presence of image maps and, for each <map> tag found, locates the image associated therewith. Preferably, a set of links, representing each of the portions of the image map, is created.

There is additionally provided in accordance with an additional preferred embodiment of the present invention a method for interactive communication with a web site using a mobile communicator, the method including:

receiving, at a server, an http request from a mobile communicator being used by a user, the http request identifying a website; and should the mobile communicator not support a client-side script employed by the website, causing the server to emulate the script so as to enable the user to interact with the website.

In accordance with a preferred embodiment of the present invention the method also includes:

retrieving a user-agent field from the http request, the user-agent field identifying the mobile communicator being used by the user; and ascertaining whether the mobile communicator being used by the user supports a given computer language or script.

In accordance with another preferred embodiment of the present invention the method also includes employing a conventional browser of the mobile communicator for communicating with the server. Preferably, the method further includes employing a form submit button to replace script elements not supported by the mobile communicator. Additionally or alternatively, the form submit button appears as a picture which resembles the script element.

In accordance with still another preferred embodiment of the present invention the script is JavaScript and the server provides client-side emulation of the JavaScript. Preferably, when a user requests an HTML web page from the server, the server retrieves the requested web page from the internet and searches the web page for elements that require client-side script emulation. Additionally or alternatively, if at least one element that requires client-side script emulation is found, the following takes place on a mobile communicator adapted web page corresponding to the web page requested by the user:

each element respectively indicated as "one-way" or "return", is replaced by an input tag of a submit type (<input type=submit . . . >) having a unique name unless the mobile communicator supports use of an input tag of an image type, in which case an input tag of an image type is employed instead of the input tag of a submit type.

In accordance with a further preferred embodiment of the present invention visual appearance of the tag of a submit type preferably is set to be similar to the visual appearance of a corresponding the element. Preferably, if the element is within an HTML form tag having an action attribute, the value of the action attribute of the form tag is replaced by the IP address of the server, and if the element is not within an HTML form tag, an HTML form tag is created around the element and the action attribute of the form tag is set to be the IP address of the server. Additionally or alternatively, a look-up table is created for the requested web page and indexed by the unique names of the input tags of the submit type.

In accordance with a yet further preferred embodiment of the present invention the look-up table contains information including at least one of the following items:

a name of the element to which each input tag corresponds;
an ID attribute of the element;
a type characterizing the element; and
location of the element in the DOM of the web page.

In accordance with a still further preferred embodiment of the present invention an input tag of a "hidden" type is added to the HTML form defined by the HTML form tag and the value of the input tag is employed to identify the look-up table. Preferably, if the element is a select element, corresponding to a select region, a plurality of option-displaying adapted pages, each containing a limited number of options are prepared, each of the available options in the select region appearing on one of the adapted option-displaying pages, each of the available options being a link to the server and containing a value which is employed to identify the look-up table. Additionally or alternatively, when a user clicks on a select region this results in submission of the corresponding HTML form to the server which, upon receipt of the HTML form submission, recognizes the HTML form submission as a request to display the general listing of options if available or alternatively a first adapted option-displaying page.

In accordance with an additional preferred embodiment of the present invention a user selection of an option operates as a HTTP request to the server, which identifies the request as an emulation request and finds the unique name of the input tag of the submit type and the look up table and thus finds information to enable it to identify a corresponding option element on the DOM. Preferably, the option element is found in the following manner: the server again requests the web page from the internet and creates a DOM corresponding to the web page and the information found on the look-up table is employed to locate the option element on the DOM. Additionally or alternatively, an event identified by event attributes of the element is triggered by the server, resulting in emulation of a user operating a conventional web browser, producing an adapted page and the information found on the lookup table is saved in an emulation list associated with the look-up table so that retrieving the look-up table also retrieves the emulation list.

In accordance with another preferred embodiment of the present invention, then a user selects an element that has submit button functionality, but is not a select region, this selection operates as a HTTP request to the server and the server identifies this request as an emulation request, server finds the unique name of the input tag of the submit type and the look up table and thus finds information to enable it to identify the element selected by the user. Preferably, the user-selected element is found in the following manner: the server again requests the web page from the Internet and creates a DOM corresponding to the web page and the information found on the look-up table is employed to locate the element on the DOM.

There is also provided in accordance with another preferred embodiment of the present invention a system for interactive communication with a web site using a mobile communicator including a server programmed to support the following functionalities:

receiving, at a server, an http request from a mobile communicator being used by a user, the http request identifying a website; and should the mobile communicator not support a client-side script employed by the website, causing the server to emulate the script so as to enable the user to interact with the website.

In accordance with a preferred embodiment of the present invention the functionalities also include:

retrieving a user-agent field from the http request, the user-agent field identifying the mobile communicator being used by the user; and ascertaining whether the mobile communicator being used by the user supports a given computer language or script.

In accordance with another preferred embodiment of the present invention the functionalities also include employing a conventional browser of the mobile communicator for communicating with the server. Preferably, the functionalities also include employing a form submit button to replace script elements not supported by the mobile communicator. Additionally or alternatively, the form submit button appears as a picture which resembles the script element.

In accordance with yet another preferred embodiment of the present invention the script is JavaScript and the server provides client-side emulation of the JavaScript. Preferably, when a user requests an HTML web page from the server, the server retrieves the requested web page from the internet and searches the web page for elements that require client-side script emulation. Additionally or alternatively, if at least one element that requires client-side script emulation is found, the following takes place on a mobile communicator adapted web page corresponding to the web page requested by the user:

each element respectively indicated as "one-way" or "return", is replaced by an input tag of a submit type (<input type=submit . . . >) having a unique name unless the mobile communicator supports use of an input tag of an image type, in which case an input tag of an image type is employed instead of the input tag of a submit type.

In accordance with still another preferred embodiment of the present invention the visual appearance of the tag of a submit type preferably is set to be similar to the visual appearance of a corresponding the element.

There is further provided in accordance with a further preferred embodiment of the present invention a system for interactive communication with a web site using a mobile communicator according to either of claims 171 and 172 and wherein:

if the element is within an HTML form tag having an action attribute, the value of the action attribute of the form tag is replaced by the IP address of the server; and if the element is not within an HTML form tag, an HTML form tag is created around the element and the action attribute of the form tag is set to be the IP address of the server.

In accordance with a preferred embodiment of the present invention a look-up table is created for the requested web page and indexed by the unique names of the input tags of the submit type. Preferably, the look-up table contains information including at least one of the following items:

a name of the element to which each input tag corresponds;
an ID attribute of the element;

a type characterizing the element; and location of the element in the DOM of the web page.

In accordance with another preferred embodiment of the present invention an input tag of a "hidden" type is added to the HTML form defined by the HTML form tag and the value of the input tag is employed to identify the look-up table. Preferably, if the element is a select element, corresponding to a select region, a plurality of option-displaying adapted pages, each containing a limited number of options are prepared, each of the available options in the select region appearing on one of the adapted option-displaying pages, each of the available options being a link to the server and containing a value which is employed to identify the look-up table. Additionally or alternatively, when a user clicks on a select region this results in submission of the corresponding HTML form to the server which, upon receipt of the HTML form submission, recognizes the HTML form submission as a request to display the general listing of options if available or alternatively a first adapted option-displaying page.

In accordance with yet another preferred embodiment of the present invention a user selection of an option operates as a HTTP request to the server, which identifies the request as an emulation request and finds the unique name of the input tag of the submit type and the look up table and thus finds information to enable it to identify a corresponding option element on the DOM. Preferably, the option element is found in the following manner: the server again requests the web page from the internet and creates a DOM corresponding to the web page and the information found on the look-up table is employed to locate the option element on the DOM. Additionally or alternatively, an event identified by event attributes of the element is triggered by the server, resulting in emulation of a user operating a conventional web browser, producing an adapted page and the information found on the lookup table is saved in an emulation list associated with the look-up table so that retrieving the look-up table also retrieves the emulation list.

In accordance with still another preferred embodiment of the present invention when a user selects an element that has submit button functionality, but is not a select region, this selection operates as a HTTP request to the server and the server identifies this request as an emulation request, server finds the unique name of the input tag of the submit type and the look up table and thus finds information to enable it to identify the element selected by the user. Preferably, the user-selected element is found in the following manner: the server again requests the web page from the Internet and creates a DOM corresponding to the web page and the information found on the look-up table is employed to locate the element on the DOM.

There is yet further provided in accordance with a yet further preferred embodiment of the present invention a method for displaying web content on a mobile communicator including:

receiving an http request from a mobile communicator being used by a user;

retrieving at least one device identifying field from the http request, the at least one device identifying field identifying the mobile communicator being used by the user;

searching in a device identification database for device properties information associated with the at least one field;

if the searching is successful, adapting a web page corresponding to the http request in accordance with the device properties information;

if the searching is not successful, conducting at least one search of at least one external database to obtain device properties information regarding the mobile communicator identified by the device identifying field from the http request;

employing information received from the search to update the device identification database with properties of the mobile communicator identified in the at least one device identifying field and adapting the web page corresponding to the http request in accordance with the device properties information obtained by the search; and transmitting the web page corresponding to the http request to the user mobile communicator following the adapting.

In accordance with a preferred embodiment of the present invention a device identifying database operator can update the device identifying database and accept or reject updates to the device identification database based on information received from the search. Preferably, the at least one search includes at least one of a header search and at least one external database searches. Additionally or alternatively, a device identifying database operator is enabled to set a priority of each of a plurality of search resources available for the at least one search In accordance with another preferred embodiment of the present invention the at least one device identifying field is a user-agent field and the device identifying database is a user-agent database. Preferably, the device identifying database is a hierarchical database.

There is still further provided in accordance with a still further preferred embodiment of the present invention a system for displaying web content on a mobile communicator including a server programmed to support the following functionality:

receiving an http request from a mobile communicator being used by a user;

retrieving at least one device identifying field from the http request, the at least one device identifying field identifying the mobile communicator being used by the user;

searching in a device identification database for device properties information associated with the at least one field;

if the searching is successful, adapting a web page corresponding to the http request in accordance with the device properties information;

if the searching is not successful, conducting at least one search of at least one external database to obtain device properties information regarding the mobile communicator identified by the device identifying field from the http request;

employing information received from the search to update the device identification database with properties of the mobile communicator identified in the at least one device identifying field and adapting the web page corresponding to the http request in accordance with the device properties information obtained by the search; and transmitting the web page corresponding to the http request to the user mobile communicator following the adapting.

In accordance with a preferred embodiment of the present invention the functionality enables a device identifying database operator to update the device identifying database and accept or reject updates to the device identification database based on information received from the search. Preferably, the at least one search includes at least one of a header search and at least one external database searches. Additionally or alternatively, the functionality enables a device identifying database operator is enabled to set a priority of each of a plurality of search resources available for the at least one search In accordance with another preferred embodiment of the present invention the at least one device identifying field is a user-agent field and the device identifying database is a user-agent database. Preferably, the device identifying database is a hierarchical database.

BRIEF DESCRIPTION OF THE DRAWINGS

The present invention will be understood and appreciated from the following detailed description taken in conjunction with the drawings in which:

FIG. 2C is a simplified illustration of an adapted page screen on a display screen of a mobile communicator showing a further menu of navlinks accessed by using navlink functionality;

FIG. 2D is a simplified illustration of an adapted page screen on a display screen of a mobile communicator showing a login form of a web page accessed by using navlink functionality;

FIG. 3 is a simplified flow chart illustrating navlink functionality as illustrated in FIGS. 1-2F;

FIGS. 4C, 4D, 4E, 4F, 4G, 4H and 4I together are a simplified flowchart illustrating functionality for focusing a link cluster, which functionality is another stage of the functionality of FIG. 4A;

FIGS. 4J, 4K, 4L and 4M together are a simplified flowchart illustrating functionality for determining the type of a link cluster, which functionality is a yet another stage of the functionality of FIG. 4A;

FIGS. 4N and 4O together are a simplified flowchart illustrating functionality for determining whether a bottom aligned link cluster is a navbar, which functionality forms part of a final stage of the functionality of FIG. 4A;

FIGS. 4P, 4Q, 4R, 4S, 4T and 4U together are a simplified flowchart illustrating functionality for determining whether a top aligned link cluster is a navbar, which functionality forms part of a final stage of the functionality of FIG. 4A;

FIGS. 4V, 4W, 4X, 4Y, 4Z and 4AA together are a simplified flowchart illustrating functionality for determining whether a left aligned link cluster is a navbar, which functionality forms part of a final stage of the functionality of FIG. 4A;

FIGS. 4AB, 4AC, 4AD, 4AE, 4AF and 4AG together are a simplified flowchart illustrating functionality for determining whether a right aligned link cluster is a navbar, which functionality forms part of a final stage of the functionality of FIG. 4A;

FIG. 4AH is a simplified flowchart illustrating functionality for determining whether an HTML element is a hidden element, which functionality forms part of any of the stages of the functionality of FIG. 4A;

FIGS. 9A, 9B, 9C, 9D, 9E, 9F, 9G and 9H illustrate server-side Find in Page functionality constructed and operative in accordance with a preferred embodiment of the present invention;

FIG. 10 is a simplified flow chart illustrating the Find In Page functionality of FIGS. 9A-9H;

FIGS. 22A, 22B, 22C, 22D and 22E together are a simplified flow chart of a first phase of the matching algorithm of FIG. 21;

FIGS. 23A, 23B, 23C, 23D, 23E, 23F and 23G together are a simplified flow chart of a second phase of the matching algorithm of FIG. 21;

FIGS. 24A, 24B, 24C, 24D and 24E together are a simplified flow chart of a third phase of the matching algorithms of FIG. 21;

FIGS. 28A, 28B, 28C, 28D and 28E together are a simplified flow chart of a repeated structure-adapting algorithm used during operation of the matching algorithm of FIGS. 21-24E;

FIGS. 29A and 29C are simplified pictorial illustrations of a dynamic web page, having two different structural layouts, each being associated with a different template in accordance with the VDT functionality of FIGS. 11-18;

FIGS. 32A, 32B 32C and 32D illustrate examples of display screens of mobile communicators employing the image map functionality of FIG. 31;

FIGS. 36A, 36B, 36C, 36D, 36E, 36F and 36G illustrate examples of display screens of mobile communicators employing the client-side script emulation functionality of FIGS. 34 and 35;

FIGS. 38A and 38B together are a simplified flow chart of operation of the functionality for automatic configuration of FIGS. 37A and 37B.

Attached herewith is the following appendix which aids in the understanding and appreciation of one preferred embodiment of the invention shown and described herein:

A CD-ROM Appendix is enclosed herewith from which can be derived files which taken together provide functionalities in accordance with the preferred embodiments of the present invention.

DETAILED DESCRIPTION OF PREFERRED EMBODIMENTS

Figure 1:
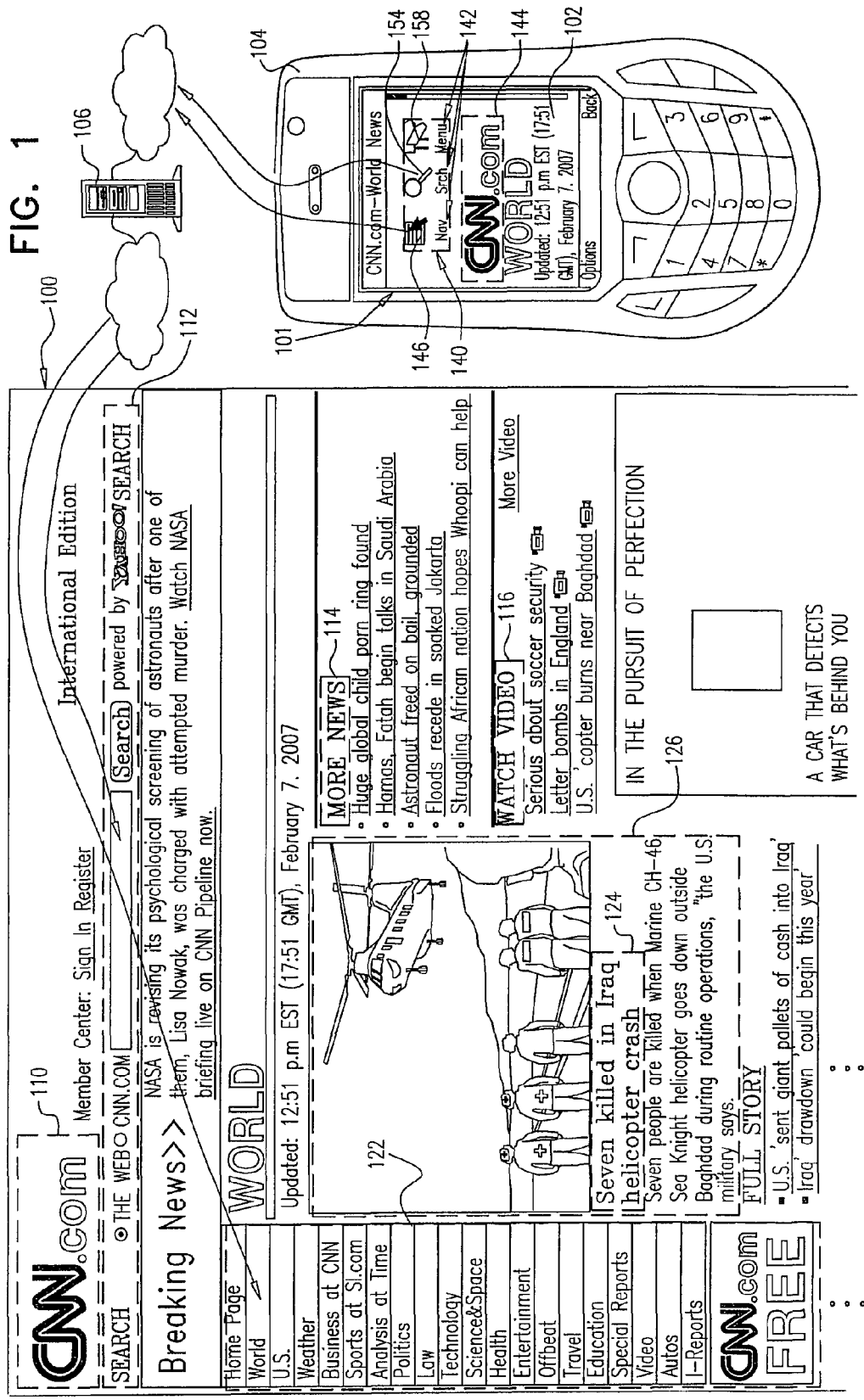
FIG. 1 is a simplified pictorial illustration of functionality for displaying web content on a mobile communicator in accordance with a preferred embodiment of the present invention, providing navlink functionality in accordance with a preferred embodiment of the present invention.

Reference is now made to FIG. 1, which is a simplified pictorial illustration of functionality for displaying web content on a mobile communicator in accordance with a preferred embodiment of the present invention, providing navlink functionality, and to FIGS. 2A-2F, which illustrate examples of display screens of mobile communicators employing navlink functionality.

As seen in FIG. 1, the functionality of the present invention is operative to display web content, such as a conventional web page 100 in the form of adapted web content, such as an adapted web page 101, on a display screen 102 of a mobile communicator 104 in a manner which is particularly suitable for viewing on display screen 102. An adapted web page may include and typically includes a plurality of typically scrollable or clickable sequentially arranged adapted web page screens. This functionality and the underlying enabling technology is based on functionality is described in applicant/assignee's U.S. Pat. No. 7,047,033, the entire disclosure of which is hereby incorporated by reference.

The functionalities described hereinbelow are preferably implemented together with all or part of the functionality described in U.S. Pat. No. 7,047,033 and may be implemented separately or in any suitable combination, all within the scope of the present invention.

The functionality described in U.S. Pat. No. 7,047,033 combined with the functionality of this embodiment of the present invention, is preferably carried out by a server 106 which serves as an intermediary between a multiplicity of mobile communicators 104 and web servers (not shown) such as those hosting web pages such as web page 100.

It is seen that a conventional web page, such as web page 100, has a plurality of information bearing regions. The information bearing regions may include a logo, designated by reference numeral 110; a search region, designated by reference numeral 112; page categories, two of which appear on web page 100 and are designated by reference numerals 114 and 116; a navigation bar or navbar, designated by reference numeral 122 and a page top title, designated by reference numeral 124.

The information bearing regions also include a cardinal region 126, which usually includes the main feature of the web page, such as the main story in a news web page. It is appreciated that the term cardinal region may also be used in the art to include a mega information bearing region, typically larger than cardinal region 126 and also including page categories, such as page categories 114 and 116, a page top title, such as page top title 124, and a search region, such as search region 112.

It is a particular feature of the present invention that there is provided a method and system for displaying web content, such as that of web page 100, on a mobile communicator, such as mobile communicator 104, including:

arranging the web content, such as that of web page 100, to be readily viewable on display screen 102 of the mobile communicator 104, in the form of at least one mobile communicator adapted web page, such as web page 101, including a plurality of adapted information bearing regions, corresponding to the information bearing regions appearing in web page 100; and providing a cluster 140 of navlinks 142 on the mobile communicator adapted page 101, at least some of the cluster 140 of navlinks 142 providing clickable access to corresponding at least ones of the information bearing regions.

The adapted information bearing regions on adapted web page 101 may be identical to the information bearing regions on web page 100 or may contain identical or similar information content thereto but in a different format.

In the illustrated embodiment, the adapted information bearing regions include an adapted logo, designated by reference numeral 144, corresponding to logo 110. In accordance with a preferred embodiment of the present invention, the cluster 140 of navlinks 142 provides clickable access to additional adapted information bearing regions, which are not seen simultaneously on an adapted page screen of the adapted page 101 due to screen size limitations. The navlinks 142 preferably are clickable icons, which provide direct access to such information bearing regions.

In the illustrated embodiment, one of the navlinks 142 appears as a Navbar navlink icon 146. Clicking on this navlink causes an adapted navbar 152, corresponding to the navigation bar or navbar 122 on web page 100, to appear, as seen in the adapted page screen of FIG. 2A.

Another one of the navlinks 142 appears as a Search navlink icon 154. Clicking on this navlink causes an adapted search region 156, corresponding to search region 112 on web page 100, to appear, as seen in the adapted page screen of FIG. 2B.

An additional one of the navlinks 142 appears as a Menu navlink icon 158. This is a different type of navlink, inasmuch as clicking on this navlink causes a further menu 160 of links to appear, as seen in the adapted page screen of FIG. 2C. The menu 160 of links may provide direct clickable access to a login form and/or to additional adapted information bearing regions such as, for example, page categories 114 and 116 and page top title 124 of web page 100.

The link that provides direct clickable access to page top titles is also termed a Titleslink. As illustrated, the menu 160 of links includes a Login link 162 and a Titleslink 163 and may also include a Page Categories link 164 and a Find in page link 165. Additionally, the menu 160 may enable a user to surf to a web site home page, a portal, a favorites list and a surfing history.

Clicking on the Login link 162 causes an adapted login region 166 to appear, as seen in the adapted page screen of FIG. 2D. Clicking on the Titleslink 163 causes an adapted list of page top titles 168, each providing a link to the page for which it is a top title, to appear, as seen in the adapted page screen of FIG. 2E. Clicking on the link of a given page top title causes the adapted portion of the web page, for which it is a page top title, to be displayed. Clicking on a Page Categories link 164 causes an adapted list of page categories 170 to appear, as seen in the adapted page screen of FIG. 2F. Preferably, each of the page categories 170 comprises a link to the area of the page where the information related to that category is detailed. Clicking on the link of a given page category causes the adapted portion of the web page, related this category, to be displayed. Additionally or alternatively, each of the page categories 170 comprises a link to a list of page top titles related to the category, similar in appearance to that shown in FIG. 2E.

Preferably, providing the cluster of navlinks includes:
analyzing the plurality of information bearing regions;
based on the analyzing, distinguishing between at least some of the information bearing regions;
based on the analyzing and distinguishing, labeling the at least ones of the information bearing regions; and
constructing the cluster of navlinks in accordance with the labeling.

In accordance with a preferred embodiment of the present invention, at least ones of the information bearing regions appear on different adapted page screens of the at least one mobile communicator adapted page.

Preferably, the cluster of navlinks includes navlinks providing clickable access to each of the information bearing regions, each navlink providing clickable access to a corresponding one of the information bearing regions.

In accordance with a preferred embodiment of the present invention, the cluster of navlinks includes navlinks providing clickable access to multiple ones of the information bearing regions. In many cases, however, the cluster of navlinks includes navlinks providing clickable access to less than all of the information bearing regions.

It is also a particular feature of the present invention that there is provided a method and system for displaying web content on a mobile communicator including:
analyzing the plurality of information bearing areas;
arranging the web content to be readily viewable on a display screen of the mobile communicator, in the form of at least one mobile communicator adapted page including a plurality of information bearing areas;
based on the analyzing, identifying titles of at least some of the plurality of information bearing areas; and
providing a clickable titleslink, which displays the titles and provides clickable access to individual ones of the information bearing regions corresponding to the titles.

It is additionally a feature of the present invention that there is provided a user operable text search functionality.

Figure 2B:
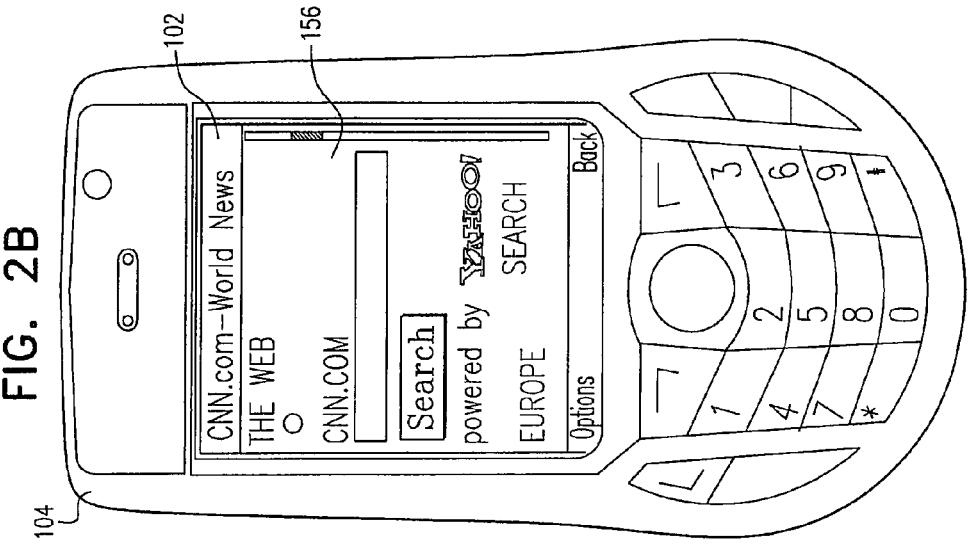
FIG. 2B is a simplified illustration of an adapted page screen on a display screen of a mobile communicator showing a search form of a web page accessed by using navlink functionality.
Figure 2A:
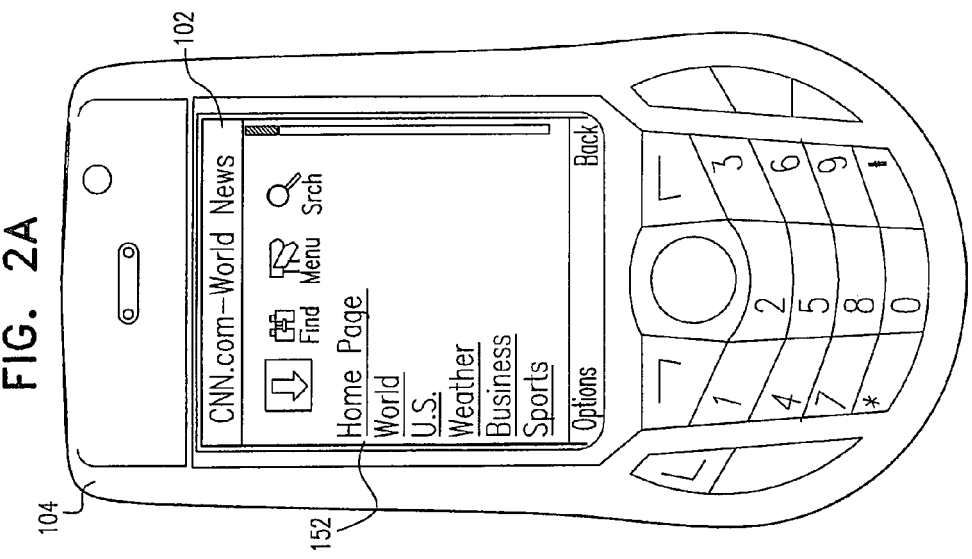
FIG. 2A is a simplified illustration of an adapted page screen on a display screen of a mobile communicator showing a portion of a navigation bar of a web page accessed by using navlink functionality.
Figure 2F:
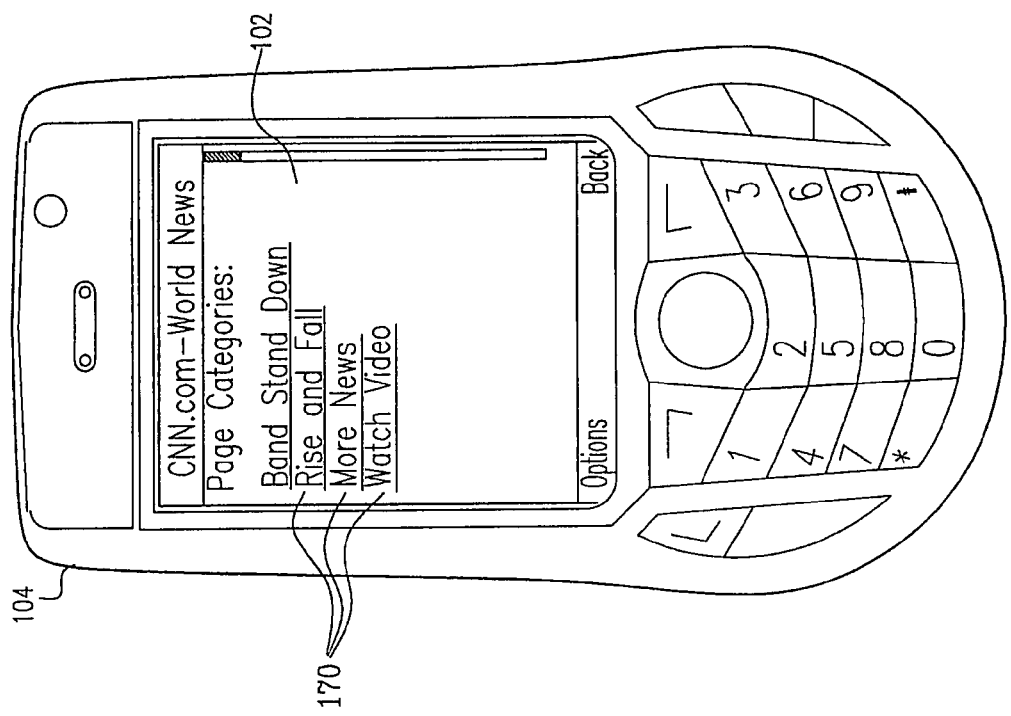
FIG. 2F is a simplified illustration of an adapted page screen on a display screen of a mobile communicator showing a list of page categories of a web page accessed by using navlink functionality.

Reference is now made to FIG. 3, which is a simplified flow chart illustrating navlink functionality as illustrated in FIGS. 1-2F. As seen in FIG. 3, when a user requests a web page, such as web page 100, the web page is downloaded to a server, such as server 106 (FIG. 1) and converted to a tree representation of the Document Object Model (DOM) thereof.

The server 106 is operative on the fly to analyze the web page and indicate in the tree representation of the DOM those elements corresponding to information bearing regions. An example of an analysis algorithm suitable for this function is described in U.S. Pat. No. 7,047,033, the disclosure of which is hereby incorporated by reference. It is appreciated that during the analysis of the web page links to the information bearing regions are saved in the server 106.

A web page which is adapted for each particular model of mobile communicator is generated using information received by the server, identifying the mobile communicator which is requesting the web page, and using the DOM representation as described hereinabove. This adapted web page, which corresponds to adapted web page 101 (FIG. 1) contains adapted information bearing regions corresponding to the information bearing regions arranged in a predetermined order, preferably as follows: the logo first, then the cardinal region and last, typically the navbar.

In accordance with a preferred embodiment of the present invention, a cluster of navlinks, such as cluster 140 (FIGS. 1-2F) is generated, providing clickable links to selected adapted information bearing regions, such as, in the example of FIGS. 1-2B, the search region and the Navbar region. It is appreciated that each of the navlinks forming part of the cluster of navlinks may be found and/or generated during the adaptation of the information bearing region to which it points.

The adapted page, including the cluster of navlinks, is supplied to the mobile communicator, such as mobile communicator 104.

Figure 4A:
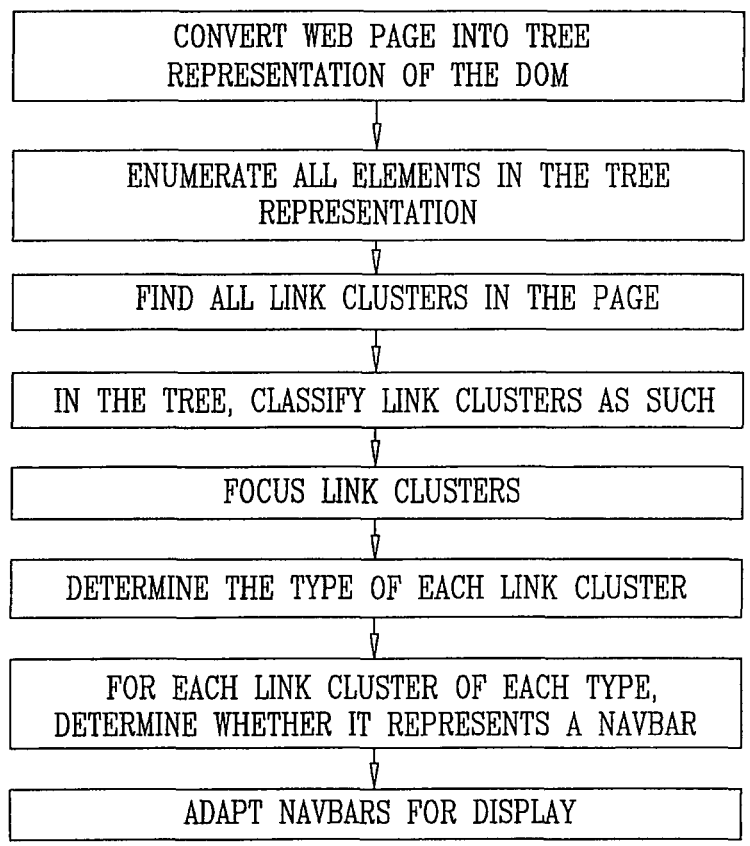
FIG. 4A is a simplified generalized flowchart illustrating functionality for location and display of a portion of a navigation bar of a web page accessed by using navlink functionality.

Reference is now made to FIG. 4A, which is a generalized simplified flow chart illustrating functionality for location and display of a portion of a navigation bar of a web page accessed by using navlink functionality. Operation of the functionality of FIG. 4A results in a display screen showing a portion of a navigation bar as illustrated in FIG. 2A.

It is appreciated that with reference to FIGS. 4A-4AH, the term 'Total Links' is defined as the total number of links contained in an entire sub-tree of a given element. The term 'Child Links' is defined as the number of links contained in nodes which are within the sub-tree of the given element, and at depth 1 therefrom, that is, links contained in the element's child elements. It is appreciated that any numbers included in FIGS. 4A-4AH are included for the sake of example only, and do not limit the scope of the invention.

As seen in FIG. 4A, as a preliminary step, the web page is converted into a tree representation of the DOM, and all the elements therein are enumerated using depth first percolation down the tree.

At a first stage, all clusters of links are found, and the elements containing the clusters are flagged in the tree representation of the DOM. At a second stage, an attempt is made to focus the link clusters by selecting one or more descendent elements thereof as link clusters instead of the current link cluster. Subsequently, the type of each link cluster is determined. The type of the link cluster may be a top link cluster, a bottom link cluster, a left link cluster or a right link cluster. Finally, the link clusters of each type are reviewed to see whether they are navbars and if they are navbars, whether they are adapted for display.

Figure 4B:
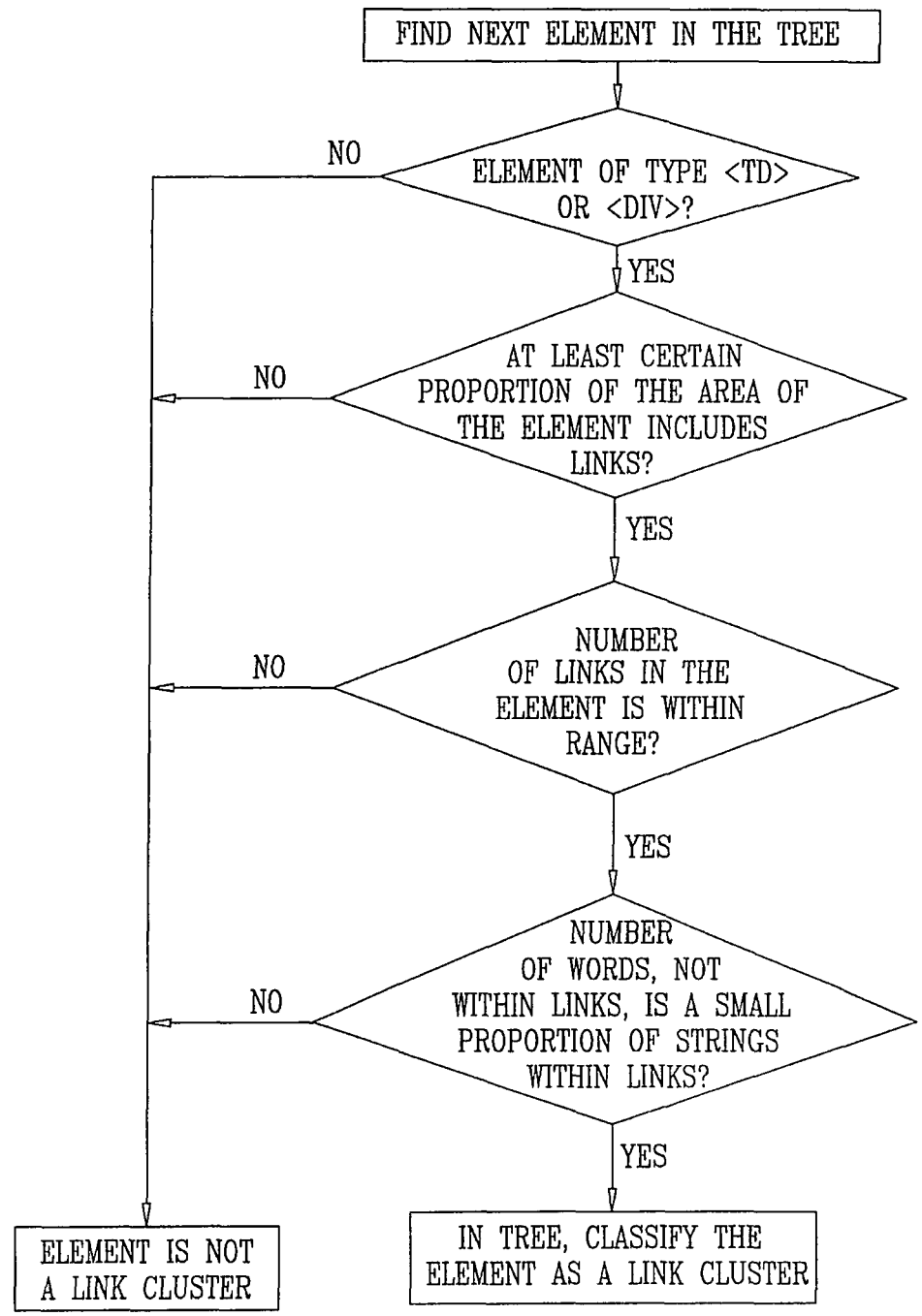
FIG. 4B is a simplified flowchart illustrating functionality for classifying an HTML element as a link cluster, which functionality is a stage of the functionality of FIG. 4A.

Reference is now made to FIG. 4B, which is a simplified flowchart illustrating functionality for classifying an HTML element as a link cluster, forming a first stage of the functionality of FIG. 4A. As seen in FIG. 4B, at a first stage, all clusters of links are found, and are flagged as such in the tree representation of the DOM. An element in the tree will be classified as a link cluster, if all the following conditions are fulfilled:

The element is of type <td> or of type <div>;

At least a certain, predetermined, proportion of the area of the element, typically 60% of the area of the element, includes links;

The number of links in the element is within a predetermined range; and

The number of words in the element, which are not within links and do not form parts of links, are a relatively small proportion, typically no more than 40%, of the number of strings in the element which are within links.

As seen in FIG. 4C, in order to focus the link clusters in the page, the following algorithm is performed for each link cluster element in the tree representation of the DOM.

If the link cluster is a hidden element in the tree representation of the DOM, remove the classification of the element such that it is no longer considered to be a link cluster. The algorithm then proceeds to focus the next link cluster element.

If the link cluster contains an image having a non-empty UseMap tag, the process for this link cluster ends, and the algorithm proceeds to focus the next link cluster.

If the number of hidden links in the link cluster is greater than a predetermined number of hidden links, typically 19, which are classified as hidden elements by the algorithm as described hereinbelow with reference to FIG. 4AH, the algorithm proceeds to review all the child elements of the link cluster in the tree representation of the DOM to see whether they include hidden links.

If only one of the child elements includes hidden links, that child element is classified as a link cluster, the classification of the current element is removed such that it is no longer considered to be a link cluster, and the algorithm then proceeds to focus the next link cluster. If more than one child element of the current link cluster includes hidden links, the process for this link cluster ends and the algorithm proceeds to focus the next link cluster. If the number of hidden links in the link cluster is less than or equal to the predetermined number of hidden links, the algorithm proceeds as described in FIG. 4D.

Figure 4D:
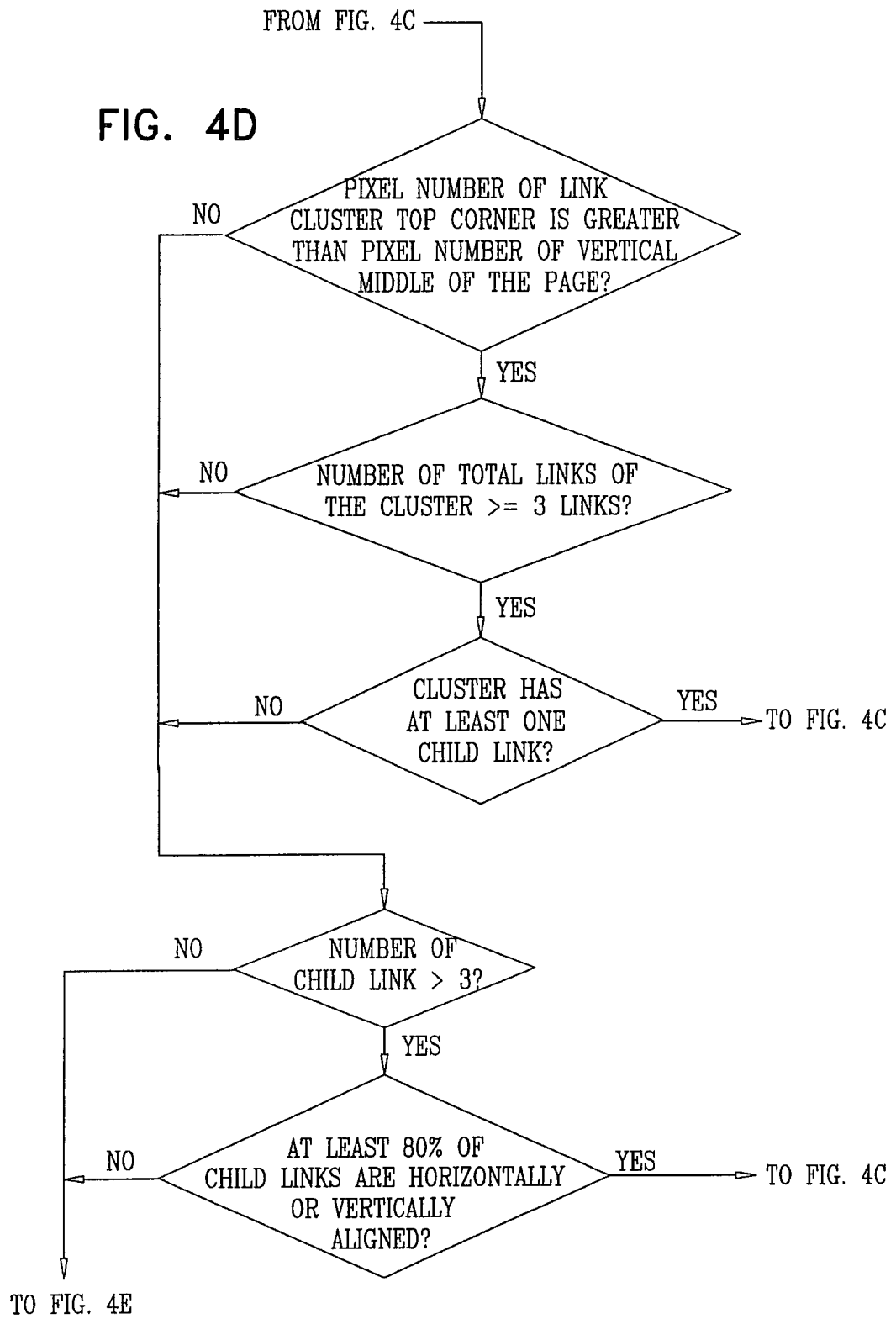

Turning to FIG. 4D, it is seen that the algorithm then proceeds to evaluate the following condition:

1. if the pixel number of the link cluster top corner is greater than the pixel number representing the vertical middle of the page, and the total number of links in the cluster is at least a predetermined number of links, typically three, and the link cluster has at least one child link, then the process for this link cluster ends and the algorithm proceeds to focus the next link cluster.

If condition 1 is false, the algorithm proceeds to evaluate the following condition:

2. If the number of child links of the link cluster is greater than a predetermined number of child links, typically 3; and at least a predetermined percentage, typically 80% of the child links of the link cluster are horizontally or vertically aligned, then the process for this link cluster ends and the algorithm proceeds to focus the next link cluster.

If condition 2 is false, the algorithm proceeds as described in FIG. 4E.

As seen in FIG. 4E, if both of the conditions described in reference to FIG. 4D are false, the algorithm then proceeds to consider only the child elements of the link cluster containing internal links. For each of these child elements, the algorithm proceeds to evaluate the following conditions:

1. If, for each of these child elements, all of the links contained in the entire sub-tree of the child element are either vertically or horizontally aligned, and the links in each the child elements are aligned in the same direction; and 2. If there is more than one child element of the link cluster element containing links and the area of the child elements including links covers at least a predetermined percentage of the cluster area, typically 75% of the cluster area.

If both conditions 1 and 2 are true, then the process for this link cluster ends and the algorithm proceeds to focus the next link cluster.

If condition 1 is false, the algorithm then proceeds as described hereinbelow with reference to FIG. 4G. If condition 1 is true and condition 2 is false, the algorithm then proceeds as in FIG. 4F.

As seen in FIG. 4F, the algorithm proceeds to evaluate the following condition:

1. If all the child elements of the current element are vertically aligned, and there are one or two links placed on the page above the top most child element of the link cluster.

If condition 1 is true, then the process for this link cluster ends and the algorithm proceeds to focus the next link cluster.

If condition 1 is false, then the algorithm proceeds to classify all the child elements including internal links as link clusters and the classification of the current element is removed such that it is no longer considered to be a link cluster. The algorithm proceeds to focus the next link cluster.

Figure 4G:
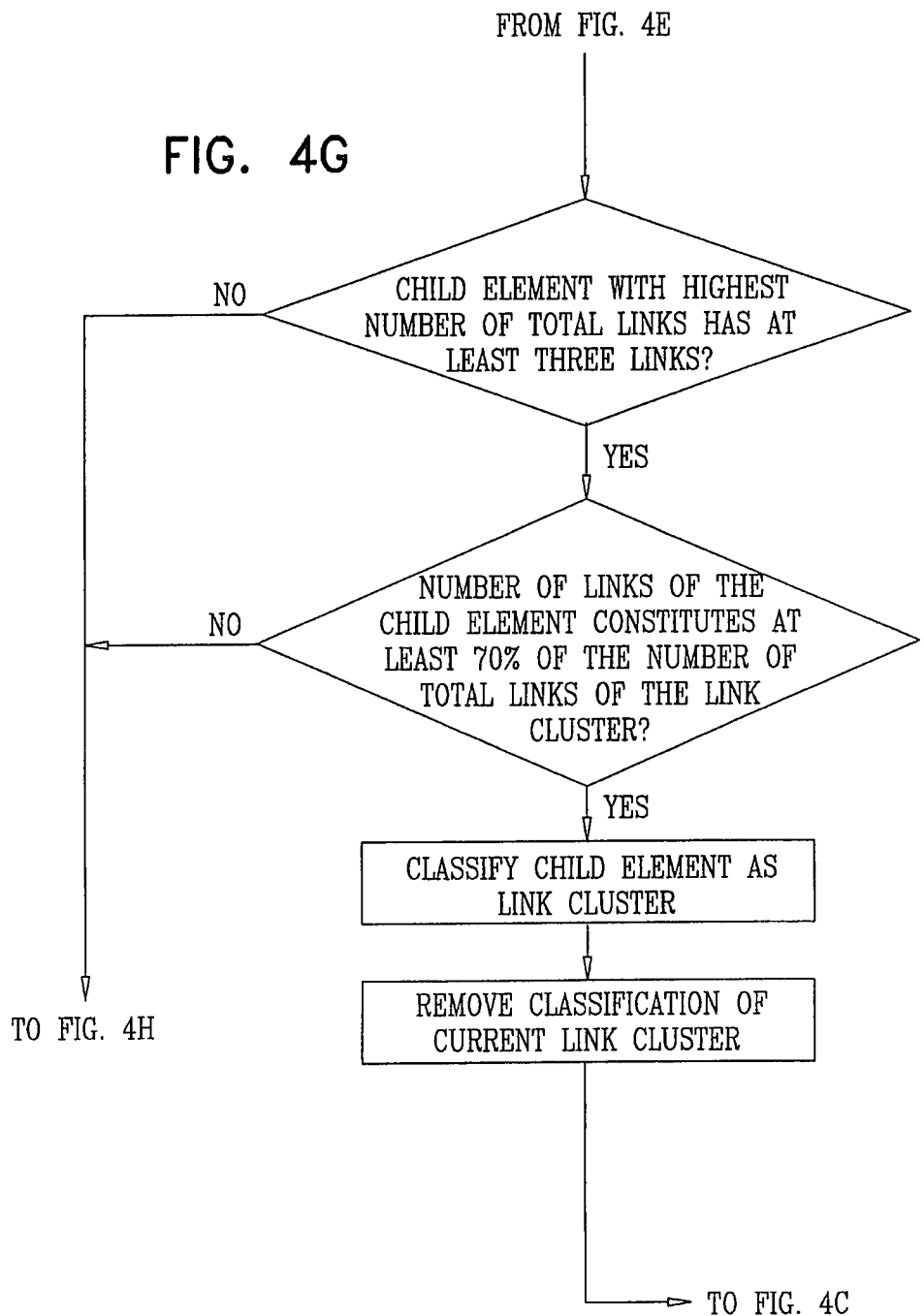

As seen in FIG. 4G, if condition 1 described hereinabove with reference to FIG. 4E is false, the algorithm then proceeds to evaluate the following condition:

1. If the child element with the highest number of total links has at least a predetermined number of links, typically three links, and the number of links of this child constitutes at least a predetermined percentage, typically 70%, of the number of total links of the current link cluster.

If condition 1 is true the algorithm proceeds to classify this child element as a link cluster, the classification of the current element is removed such that it is no longer considered to be a link cluster, and the algorithm proceeds to focus the next link cluster.

If condition 1 is false, the algorithm proceeds as described in FIG. 4H.

As shown in FIG. 4H, the algorithm then proceeds to evaluate the following condition:

1. If the number of total links of the child element with the highest number of total links constitutes at least a first predetermined percentage, typically 50%, of the number of total links of the current link cluster.

If condition 1 is false, the algorithm proceeds as described hereinbelow with reference to FIG. 4I.

If condition 1 is true, this child element is classified as a link cluster and the classification of the current element is removed such that it is no longer considered to be a link cluster. The algorithm then proceeds to evaluate the following condition:

2. If the number of total links of the child element with the second highest number of total links constitutes at least a second predetermined percentage, typically 30%, of the number of total links of the current link cluster, and this child element includes at least a predetermined number of internal links, typically three internal links.

If condition 2 is true, this child element is classified as a link cluster. The algorithm then proceeds to focus the next link cluster regardless of the value of condition 2.

Figure 4I:
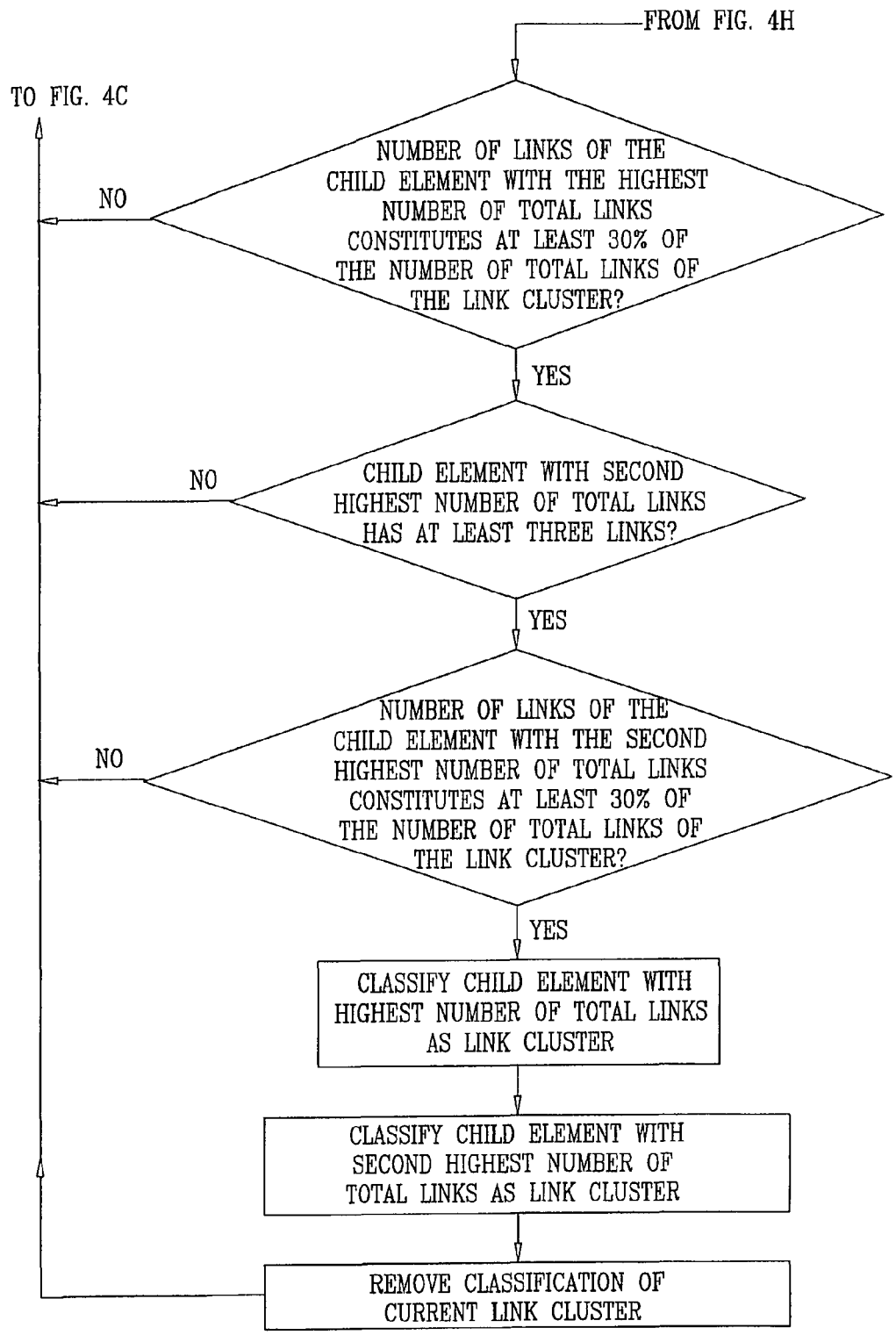

As seen in FIG. 4I, if condition 1 described hereinabove with reference to FIG. 4H is false the algorithm then proceeds to evaluate the following condition:

1. If the number of total links of the child element with the highest number of total links constitutes at least a first predetermined percentage, typically 30%, of the number of total links of the current link cluster, and the number of total links of the child element with the second highest number of total links is at least a predetermined number of links, typically three, and constitutes at least a second predetermined percentage, typically 30%, of the number of total links of the current link cluster.

If condition 1 is true, the algorithm classifies both of these child elements as link clusters and the classification of the current element is removed such that it is no longer considered to be a link cluster. The algorithm then proceeds to focus the next link cluster regardless of the value of condition 1.

Reference is now made to FIGS. 4J-4M, which together are a simplified flowchart illustrating functionality for determining the type of a link cluster, which functionality is a third stage of the functionality of FIG. 4A. The type of the link cluster may be a top link cluster, a bottom link cluster, a left link cluster or a bottom link cluster.

As seen in FIG. 4J, in order to determine the types of the link clusters, the following algorithm is performed for each link cluster element in the tree representation of the DOM.

As seen in FIG. 4J, the algorithm evaluates the following condition:

1. If the top corner of the cluster is below the vertical middle of the page.

If condition 1 is true, the cluster is considered to be a bottom cluster.

If condition 1 is false, the algorithm evaluates the following condition:

2. If the width of the cluster is greater than 300 pixels, or the width of the cluster is greater than four times the height of the cluster.

If condition 2 is true, the cluster is considered to be a top cluster.

If condition 2 is false, the algorithm evaluates the following condition:

3. If the number of hidden links within the cluster is greater than 25.

If condition 3 is false, the algorithm proceeds as described hereinbelow with reference to FIG. 4L.

Figure 4K:
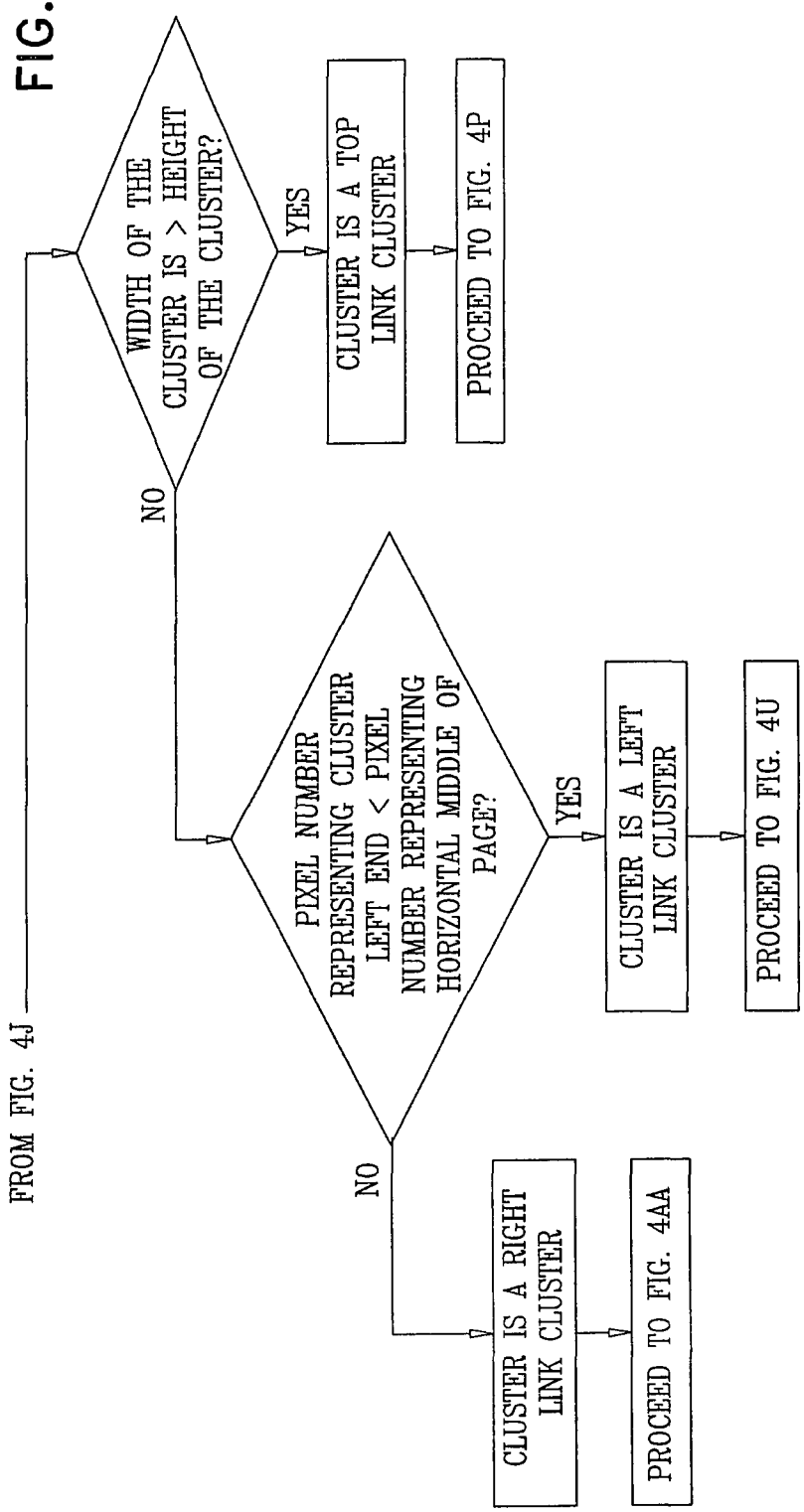

If condition 3 is true, the algorithm proceeds as if FIG. 4K.

As seen in FIG. 4K, the algorithm then evaluates the following condition:

1. If the width of the cluster is greater than the height of the cluster.

If condition 1 is true, the cluster is considered to be a top cluster. If condition 1 is false, the cluster is considered to be a vertical cluster.

For a vertical cluster, the algorithm then evaluates the following condition:

2. If the pixel number representing cluster left corner is less than the pixel number representing the horizontal middle of the page.

If condition 2 is true, the cluster is considered to be to be a left cluster. If condition 2 is false, it is considered to be a right cluster.

Figure 4L:
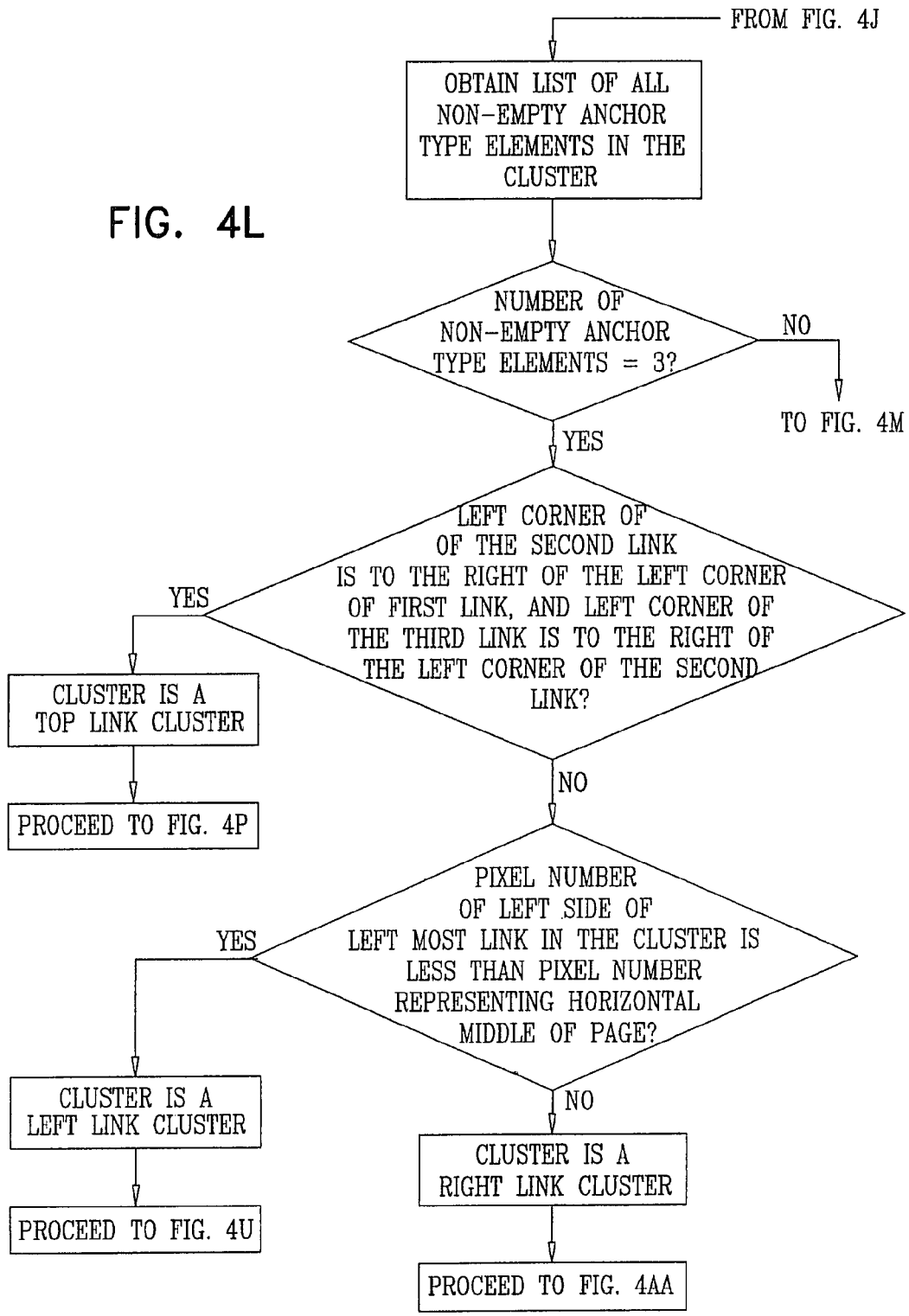

As seen in FIG. 4L, if condition 3 described hereinabove with reference to FIG. 4J is false the algorithm then proceeds as follows:

As seen in FIG. 4L, a list of all the non-empty anchor type elements, that is, anchor type elements pointing to an image element or a text element, is obtained.

The algorithm then valuates the following condition:

1. If the list contains exactly a predetermined number of links, typically three links.

If condition 1 is false, the algorithm proceeds as described hereinbelow with reference to FIG. 4M. If condition 1 is true, the algorithm then evaluates the following condition:

2. If the left corner of the second link is to the right of the left corner of the first link and the left corner of the third link is to the right of the left corner of the second link.

If condition 2 is true, the cluster is considered to be a top cluster. If condition 2 is false, the algorithm then evaluates the following condition:

3. If the pixel number of the left side of the left most link of the cluster is less than the pixel number representing the horizontal middle of the page.

If condition 3 is true, the cluster is considered to be a left cluster. If condition 3 is false, the cluster is considered to be a right cluster.

As seen in FIG. 4M, the algorithm evaluates the following condition:

1. If the list of non-empty anchor type elements contains more than the predetermined number of links defined in FIG. 4L.

If condition 1 is false, the cluster does not represent a navbar and can be ignored. If condition 1 is true, the algorithm then evaluates the following condition:

2. If the third link is located to the right of the second link, and the second to last link is located to the right of the third to last link.

If condition 2 is true, the cluster is considered to be a top cluster. If condition 2 is false, the algorithm then evaluates the following condition:

3. If the number representation of the pixel at the left most end of the left most link is less than, a first predetermined value, typically 200.

If condition 3 is true, the cluster is considered to be a left cluster. If condition 3 is false, the algorithm then evaluates the following condition:

4. If the number representation of the pixel at the left most end of the left most link is greater than a second predetermined value, typically 600.

If condition 4 is true, the cluster is considered to be a right cluster. If condition 4 is false, the cluster does not represent a navbar and can be ignored.

As mentioned hereinabove with reference to FIG. 4A, at a fourth stage, the link clusters of each type are reviewed to see whether they are navbars.

Figure 4O:
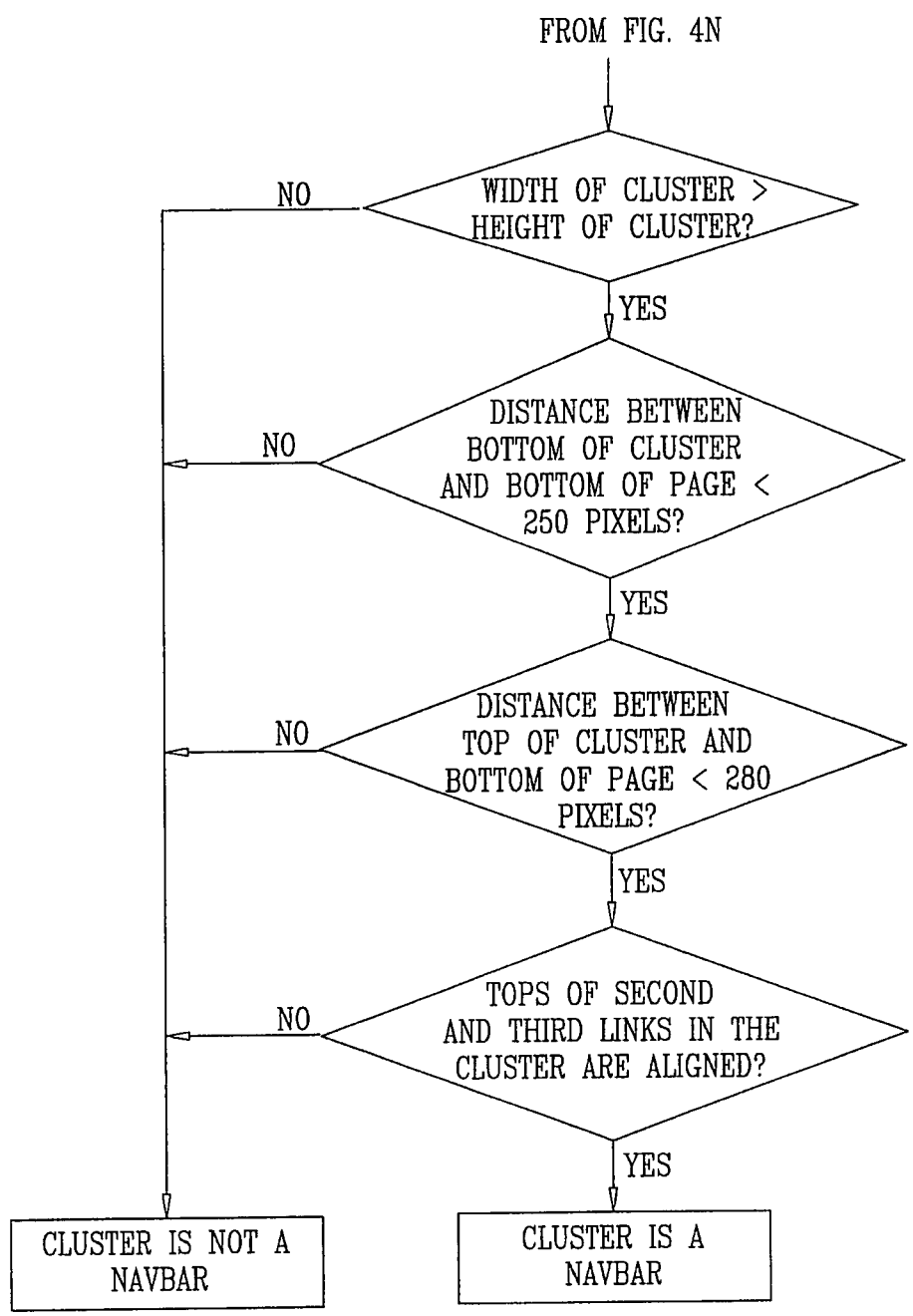

Reference is now made to FIGS. 4N and 4O, which together are a simplified flowchart illustrating functionality for determining whether a bottom aligned link cluster is a navbar, which functionality forms part of a final stage of the functionality of FIG. 4A. As seen in FIG. 4N, for bottom clusters, the following two conditions are evaluated:

1. the number of text links is greater than a first predetermined number, typically two; AND the average number of characters per link is equal to or less than a second predetermined number, typically thirty; AND the number of average words per link is less than a third predetermined number, typically 4.5; and 2. the number of image links is greater than a fourth predetermined number, typically two; AND the number of image links is greater than the number of text links.

If both of conditions 1 and 2 are false, the bottom cluster is not considered to be a navbar.

If either of conditions 1 or 2 are true, the following conditions are evaluated, as seen in FIG. 4O:

1. the width of the cluster is greater than the height of the cluster;

2. the distance between the bottom left side corner of the cluster and the bottom of the page is less than a first predetermined number of pixels, typically 250 pixels;

3. the distance between the top left side corner of the cluster and the bottom of the page is less that a second predetermined number of pixels, typically 280 pixels;

4. the tops of the second and third links in the cluster are aligned.

If all of conditions 1-4 are true, then the cluster is considered to be a navbar. If any of conditions 1-4 are false, the cluster is not considered to be a navbar.

Figure 4P:
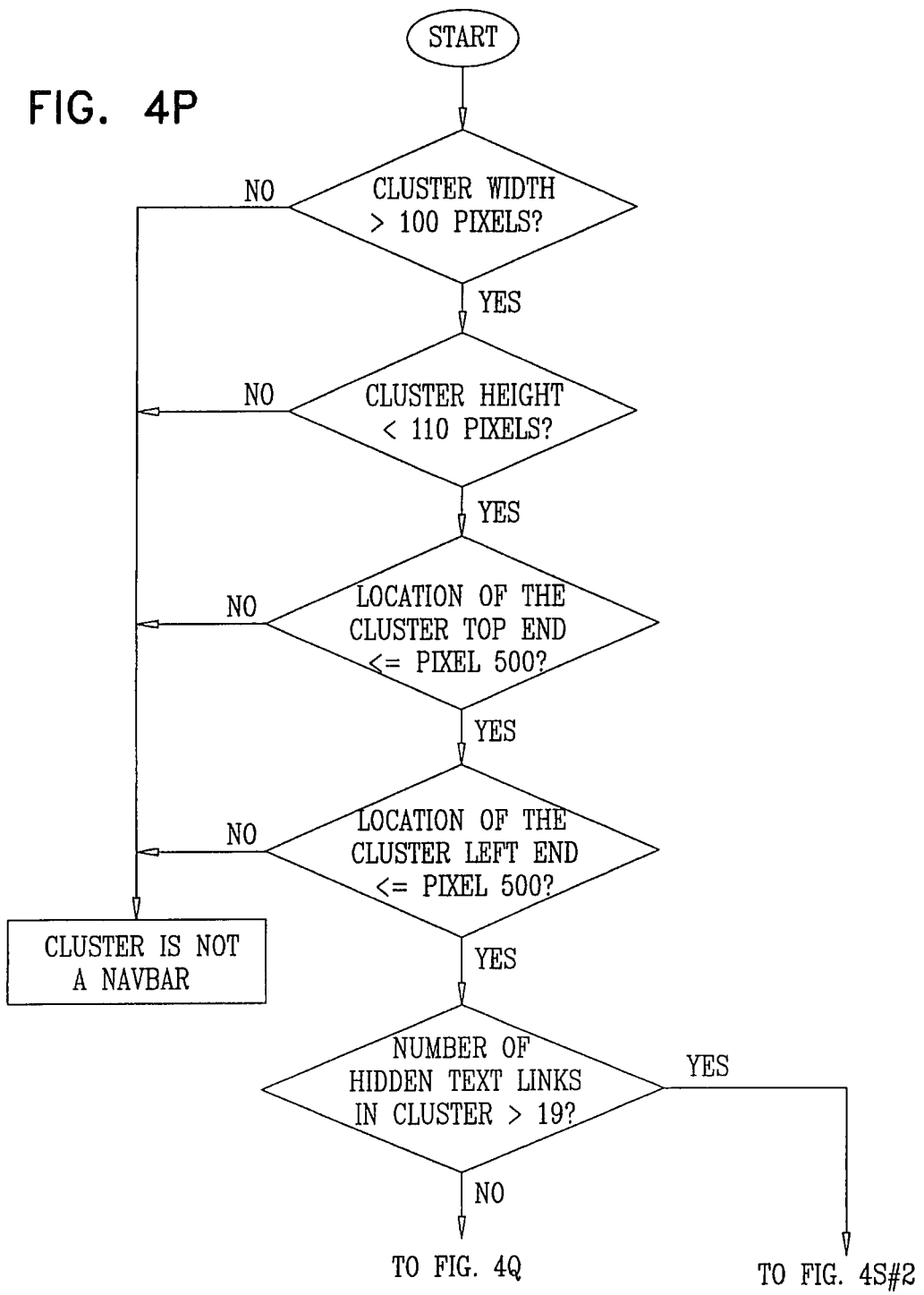
Figure 4R:
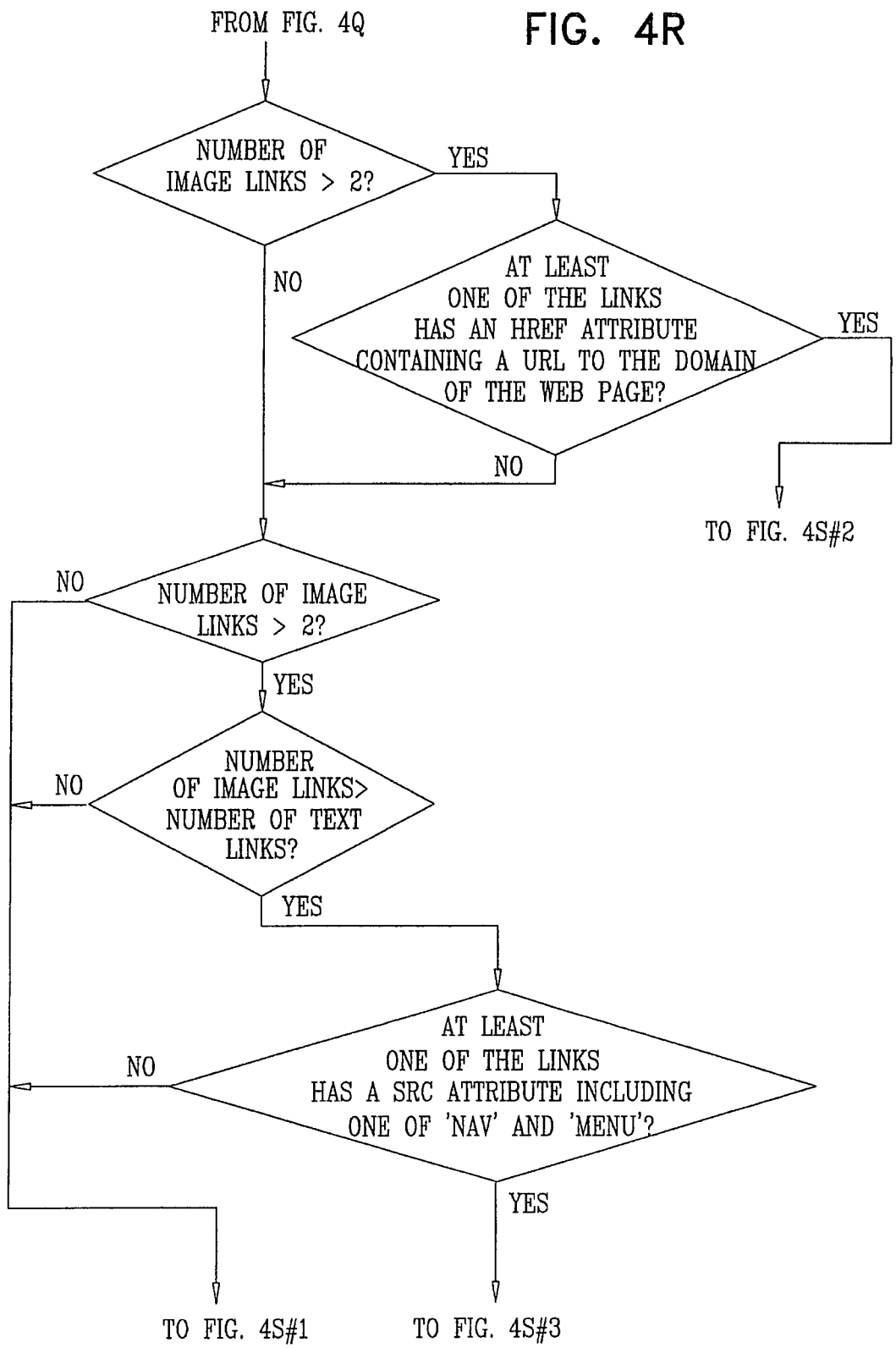

Reference is now made to FIGS. 4P, 4Q, 4R, 4S, 4T and 4U, which together are a simplified flowchart illustrating functionality for determining whether a top aligned link cluster is a navbar, which functionality forms part of a final stage of the functionality of FIG. 4A. As seen in FIG. 4P, for top clusters, the following conditions are evaluated:

1. cluster width is greater than a first predetermined number of pixels, typically 100;

2. cluster height is less than a second predetermined number of pixels, typically 110;

3. location of the cluster top end is at a pixel which is equal to or less than a first predetermined pixel number, typically 500;

4. location of the cluster left end is at a pixel which is equal to or less than a second predetermined pixel number, typically 500.

If any one of conditions 1-4 is false, the cluster is not considered to be a navbar. If all of conditions 1-4 are true, the following conditions, as seen in FIGS. 4P, 4Q, 4R and 4S, are evaluated:

1. the number of hidden text links is greater than a first predetermined number, typically 19;

2. the number of hidden image links is greater than a second predetermined number, typically 19;

3. the word 'home' appears as a single word in a text link or in an image alt field;

4. there is an image with a UseMap field including at least a predetermined number of links, typically three;

5. the number of text links is greater than a predetermined number, typically 2; AND at least one of the links has an href attribute containing a URL which is identical to the web page domain;

6. the number of image links is greater than a predetermined number, typically 2; AND at least one of the links has an href attribute containing a URL which is identical to the web page domain;

7. the number of image links is greater than a predetermined number, typically 2; AND the number of image links is greater than the number of text links; AND at least one of the links has a src attribute including one of the words 'menu' and 'nav'; AND at least one image link includes an href field in which the parent directory is the domain name, or at least two image links have identical parent directories.

Figure 4S:
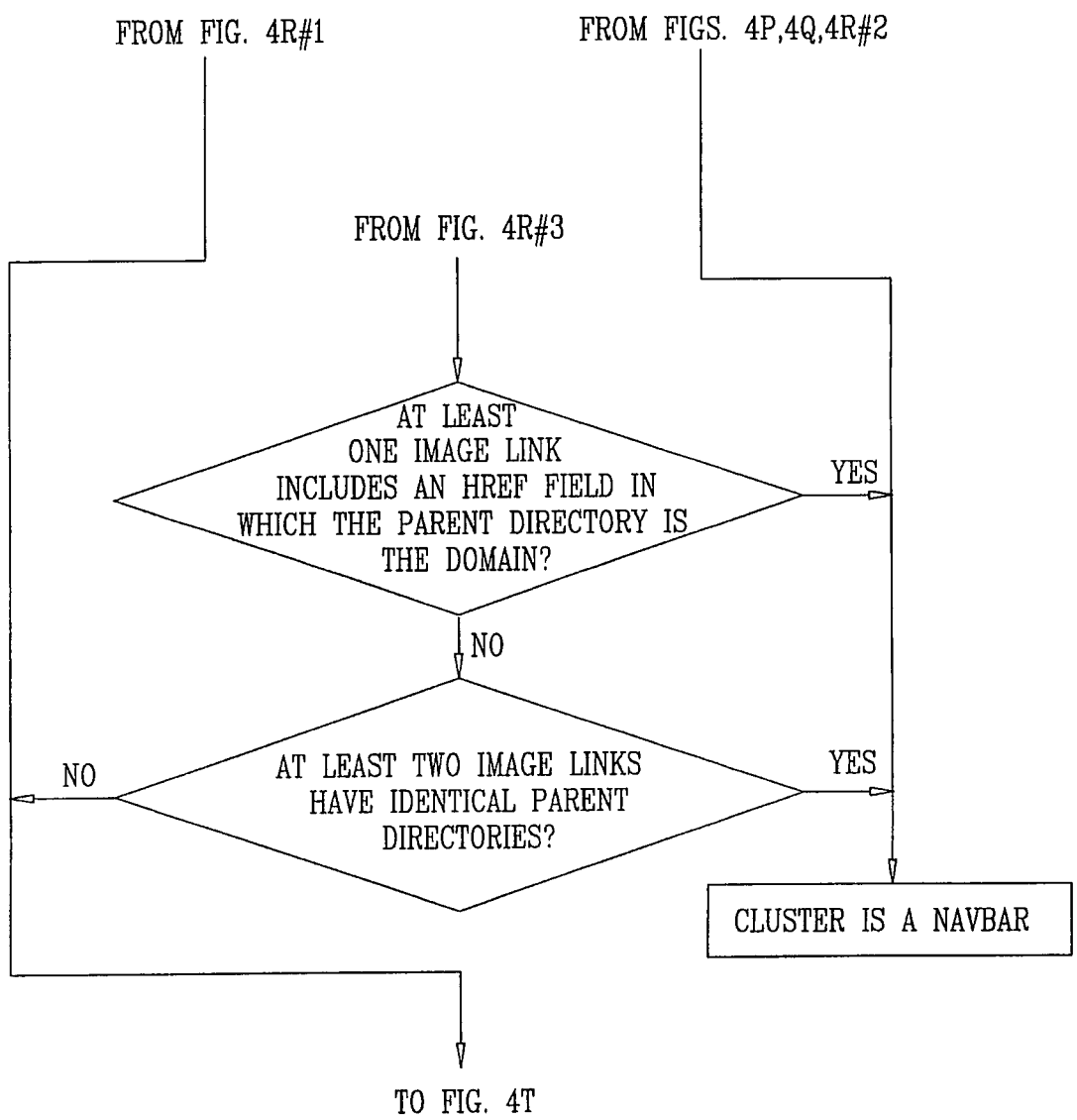

If at least one of conditions 1-7 is true, the cluster is considered to be a top navbar, as shown in FIG. 4S. As seen in FIG. 4T, if all of conditions 1-7 are false, the following conditions are evaluated:

1. the width of the cluster is greater than a predetermined cluster width upper bound, typically 450

2. the pixel number representing the top alignment of the cluster is less than a predetermined number, typically 100;

3. the cluster width is less than the predetermined cluster width upper bound; AND the cluster width is greater than a predetermined cluster width lower bound, typically 250; AND the href attributes of all the links in the cluster start with the same domain name or with the same directory.

If all of conditions 1-3 are false, the cluster is not considered to be a navbar.

Figure 4U:
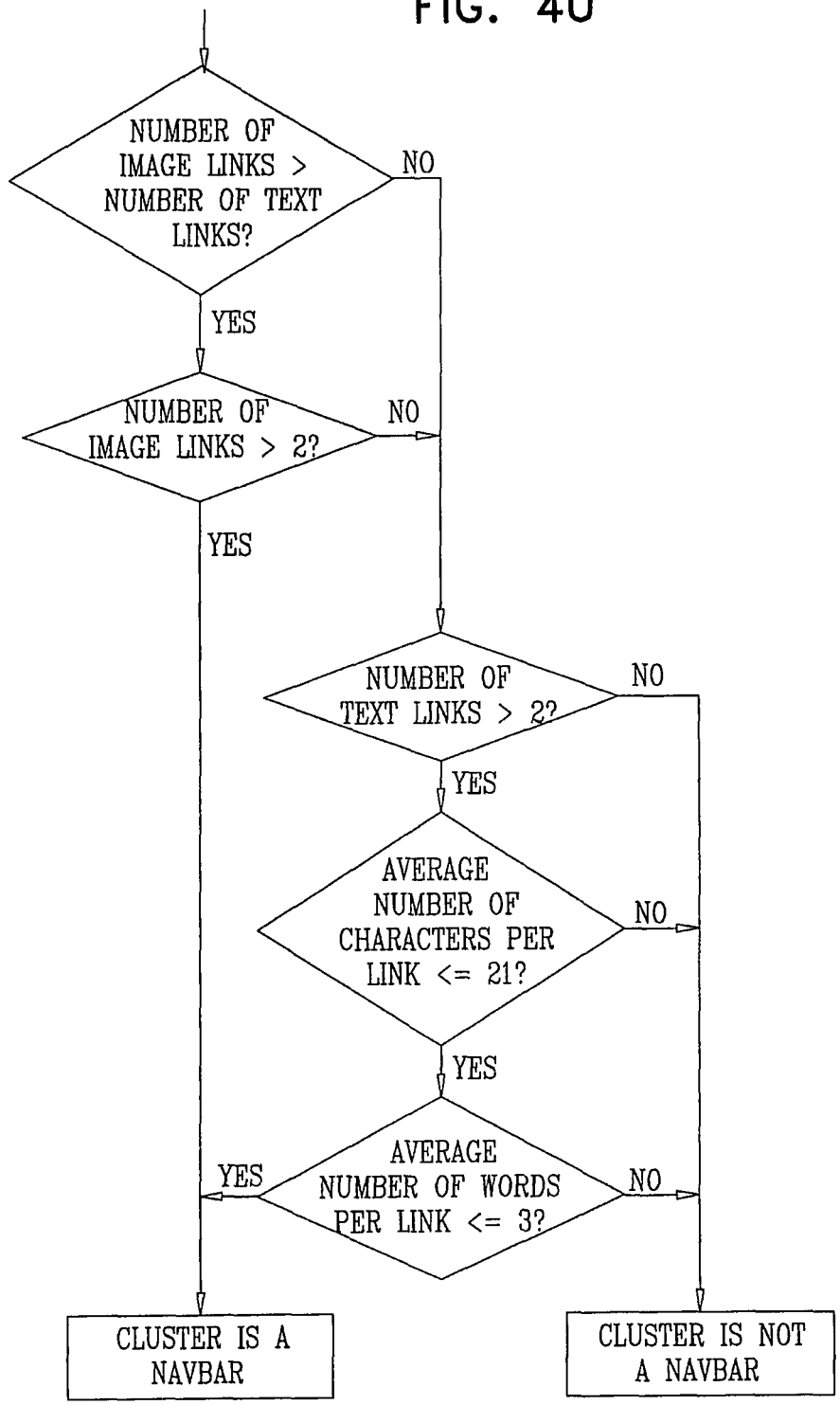

As seen in FIG. 4U, if at least one of conditions 1-3 is true, the following conditions are evaluated:

1. the number of image links is greater than the number of text links; AND the number of image links is greater than a first predetermined number, typically 2;

2. the number of text links is greater than a second predetermined number, typically 2; AND the average number of characters per link is equal to or less than a third predetermined number, typically 21; AND the average number of words per link is equal to or less than a fourth predetermined number, typically 3.

If at least one of conditions 1-2 is true, the cluster is considered to be a top aligned navbar. If both conditions 1 and 2 are false, the cluster is not considered to be a navbar.

Reference is now made to FIGS. 4V, 4W, 4X, 4Y, 4Z and 4AA, which together are a simplified flowchart illustrating functionality for determining whether a left aligned link cluster is a navbar, which functionality forms part of a final stage of the functionality of FIG. 4A. As seen in FIG. 4V, for left clusters, the following conditions are evaluated:

1. cluster width is greater than or equal to a first predetermined number of pixels, typically 30;
2. cluster height is greater than or equal to a second predetermined number of pixels, typically 30;
3. location of the cluster top end is at a pixel which is equal to or less than a first predetermined pixel number, typically 500;
4. location of the cluster top end is at a pixel which is greater than or equal to a second predetermined pixel number, typically 40;
5. location of the cluster left end is at a pixel which is equal to or less than a third predetermined pixel number, typically 25.

If any one of conditions 1-5 is false, the cluster is not considered to be a navbar.

Figure 4W:
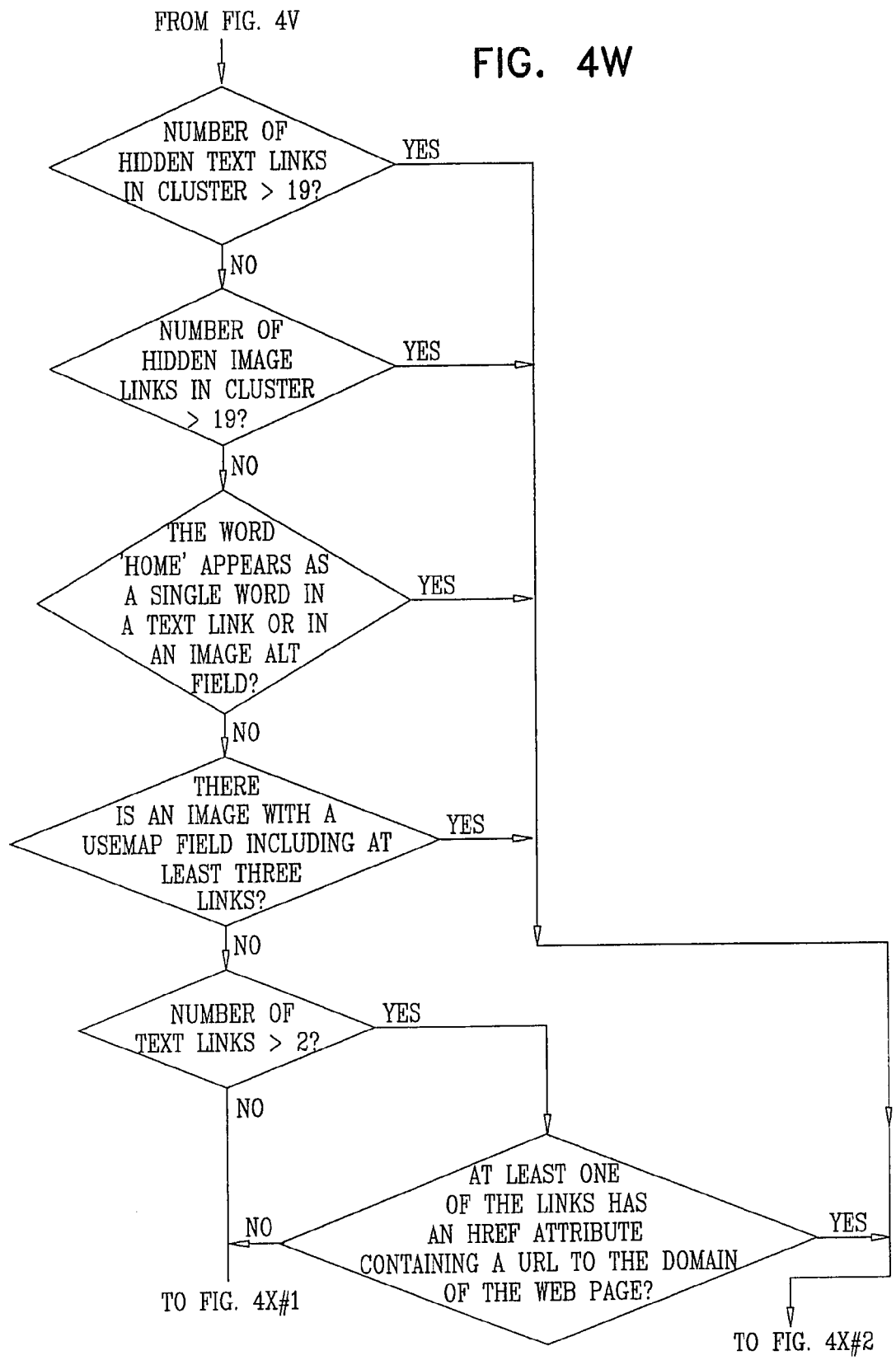

As seen in FIGS. 4W, 4X and 4Y, if all of the conditions 1-5 are true, the following conditions are evaluated:

1. the number of hidden text links is greater than a first predetermined number, typically 19;
2. the number of hidden image links is greater than a second predetermined number, typically 19;
3. the word 'home' appears as a single word in a text link or in an image alt field;
4. there is an image with a UseMap field including at least a third predetermined number of links, typically three;
5. the number of text links is greater than a fourth predetermined number, typically 2; AND
   at least one of the links has an href attribute containing a URL which is identical to the web page domain;
6. the number of image links is greater than a fifth predetermined number, typically 2; AND
   at least one of the links has an href attribute containing a URL which is identical to the web page domain;
7. the number of image links is greater than a sixth predetermined number, typically 2; AND
   the number of image links is greater than the number of text links; AND
   at least one of the links has a src attribute including one of the words 'menu' and 'nav'; AND
   at least one image link includes an href field in which the parent directory is the domain name, or at least two image links have identical parent directories.

If at least one of conditions 1-7 is true, the cluster is considered to be a left aligned navbar. If all of conditions 1-7 are false, the following conditions, shown in FIGS. 4Y and 4Z, are evaluated:

1. the cluster width is greater than or equal to a predetermined cluster width lower bound, typically 25;
2. the cluster width is less than or equal to a predetermined cluster width upper bound, typically 225;
3. the cluster height is greater than or equal to a predetermined cluster height lower bound, typically 75;
4. the cluster height is less than or equal to a predetermined cluster height upper bound, typically 1000;
5. the area covered by the cluster is less than 2.5 times the sum of the areas of all the children of the element that include links.

If at least one of conditions 1-5 is false, the cluster is not considered to be a navbar.

Figure 4Z:
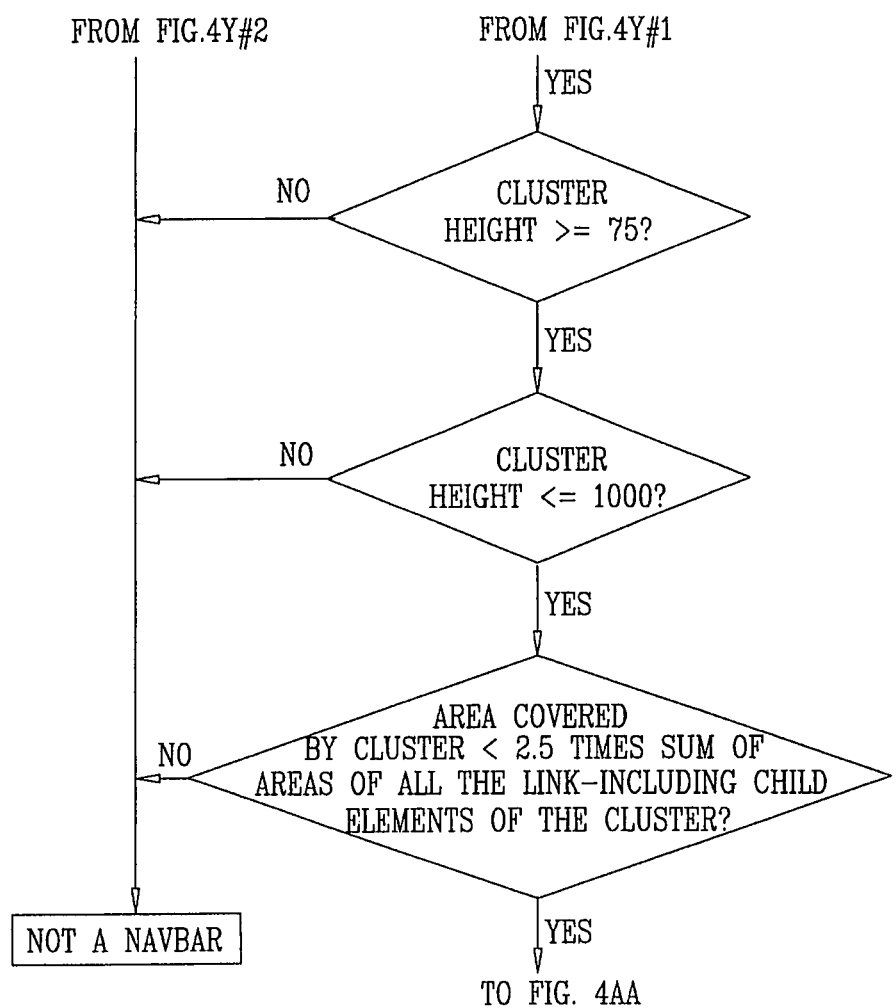
Figure 4A:
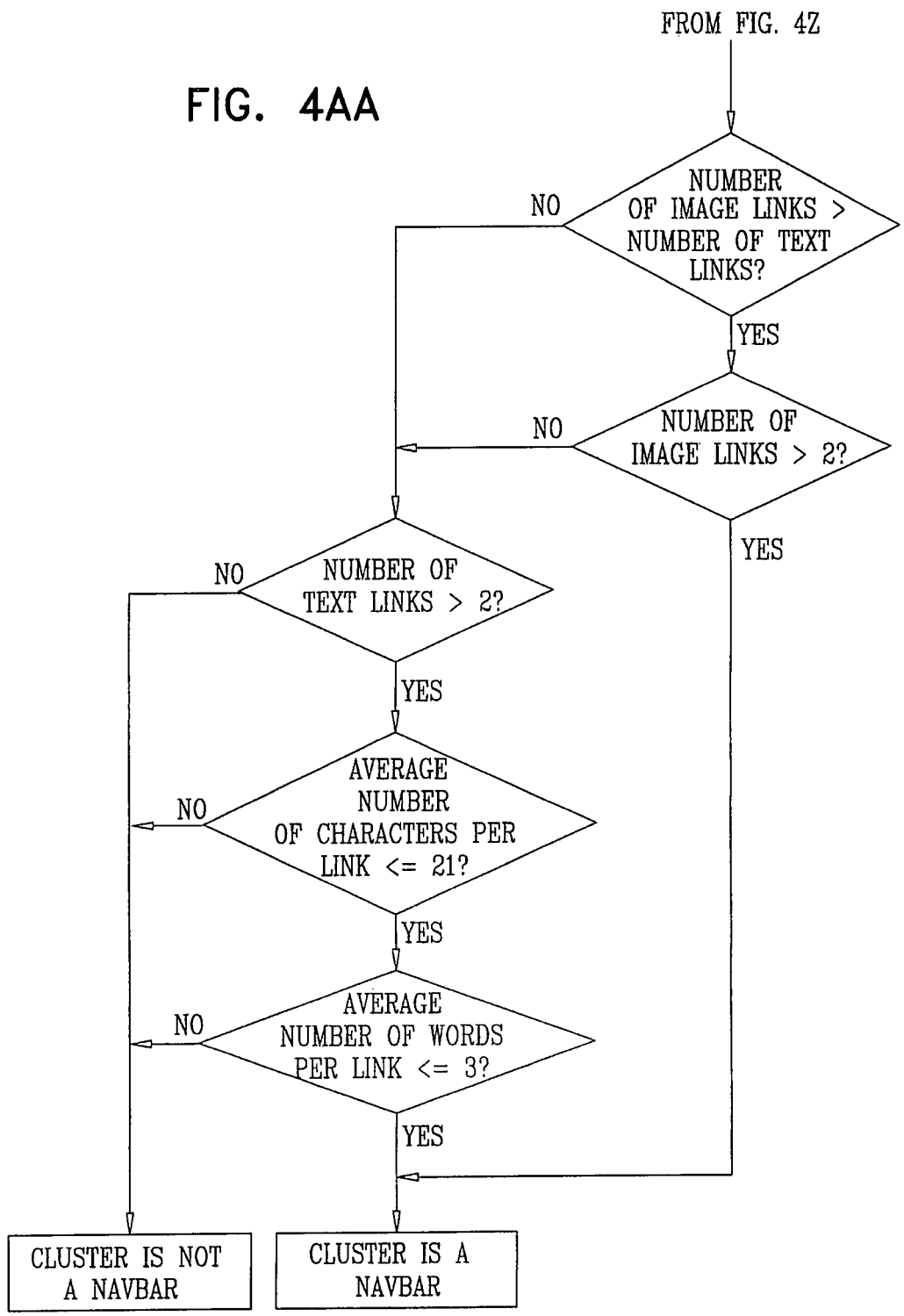
Figure 4A:
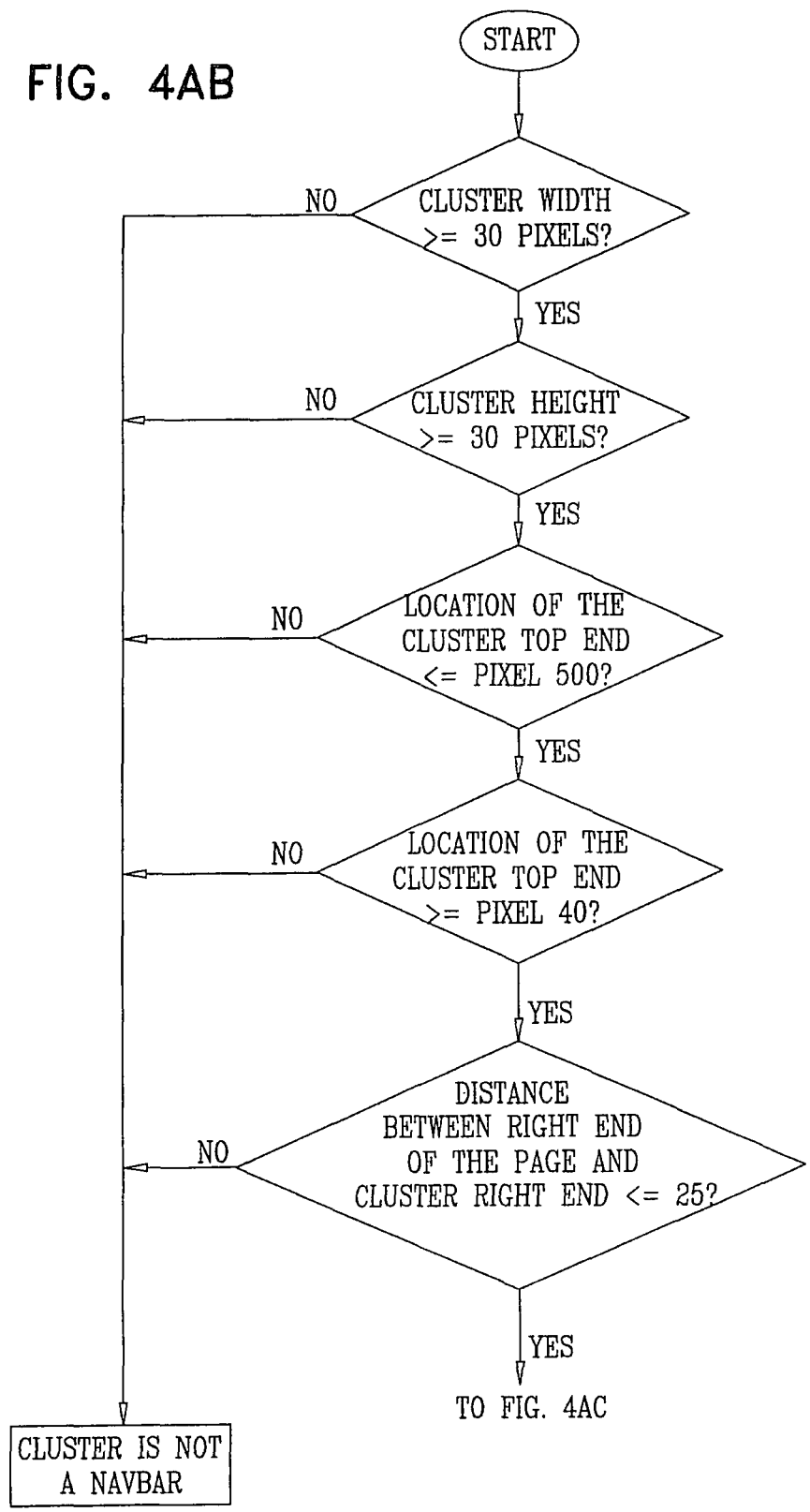
Figure 4A:
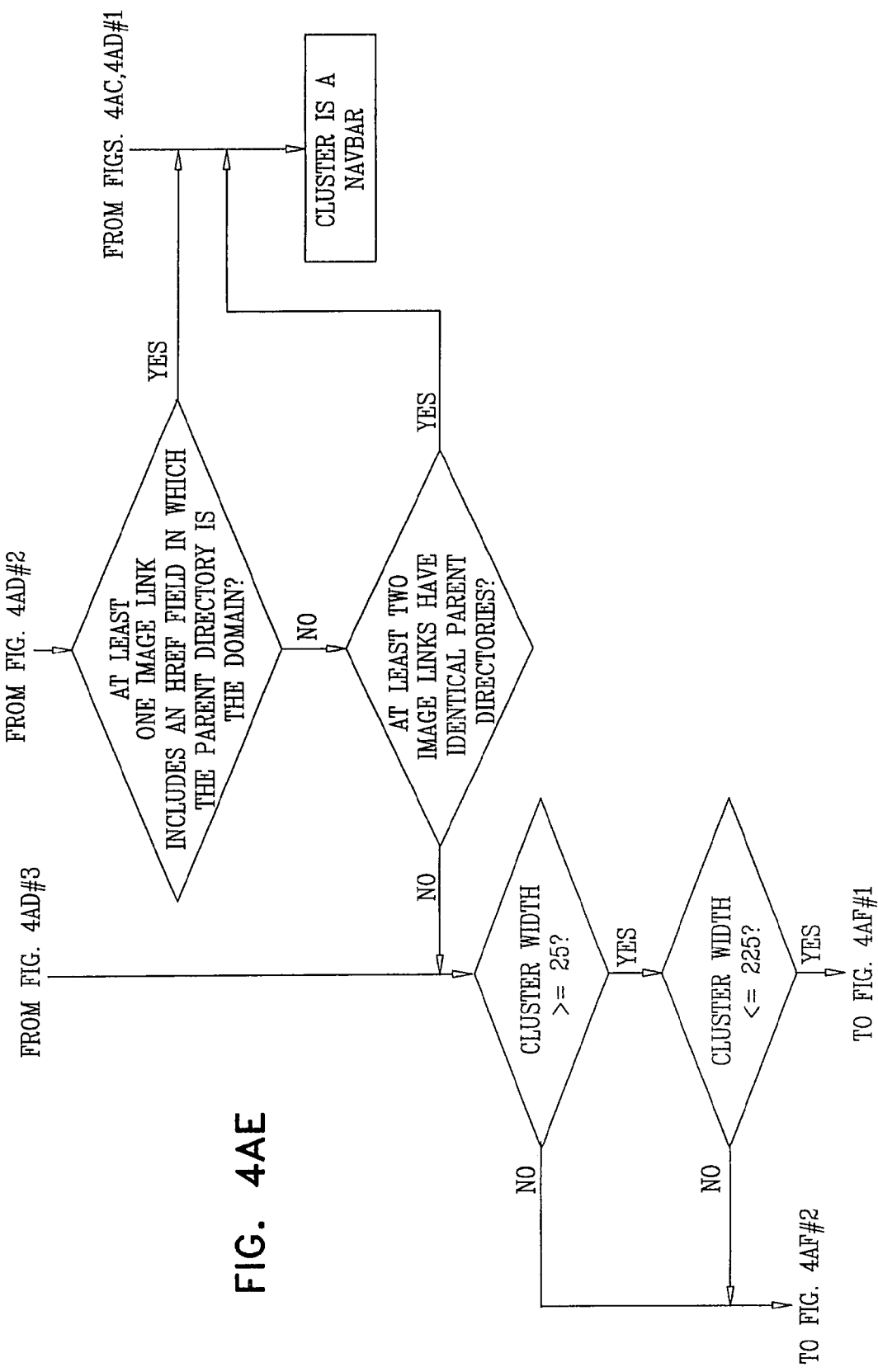
Figure 4A:
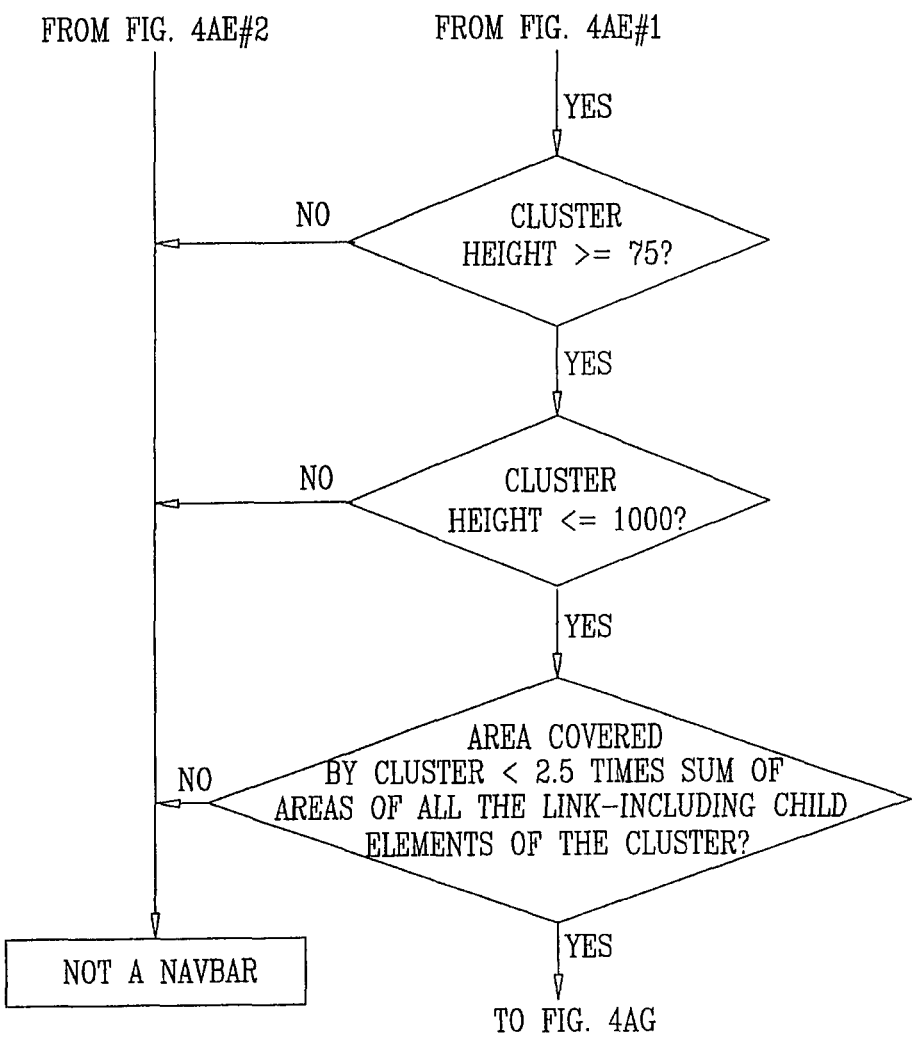

As seen in FIG. 4AA, if all of conditions 1-5 of FIGS. 4Y and 4Z are true, the following conditions are evaluated:

1. the number of image links is greater than the number of text links; AND
   the number of image links is greater than a first predetermined number, typically 2;
2. the number of text links is greater than a second predetermined number, typically 2; AND
   the average number of characters per link is equal to or less than a third predetermined number, typically 21; AND
   the average number of words per link is equal to or less than a fourth predetermined number, typically 3.

If at least one of conditions 1-2 is true, the cluster is considered to be a left aligned navbar. If both conditions 1 and 2 are false, the cluster is not considered to be a navbar.

Reference is now made to FIGS. 4AB, 4AC, 4AD, 4AE, 4AF and 4AG, which together are a simplified flowchart illustrating functionality for determining whether a right aligned link cluster is a navbar, which functionality forms part of a final stage of the functionality of FIG. 4A. As seen in FIG. 4AB, for right clusters, the following conditions are evaluated:

1. cluster width is greater than or equal to a first predetermined number of pixels, typically 30;
2. cluster height is greater than or equal to a second predetermined number of pixels, typically 30;
3. location of the cluster top end is at a pixel which is equal to or less than a first predetermined pixel number, typically 500;
4. location of the cluster top end is at a pixel which is greater than or equal to a second predetermined pixel number, typically 40;
5. the distance between the right end of the page and the location of the cluster right end is equal to or less than a predetermined number, typically 25.

If any one of conditions 1-5 is false, the cluster is not considered to be a navbar.

As seen in FIGS. 4AC, 4AD and 4AE, if all of conditions 1-5 are true, the following conditions are evaluated:

1. the number of hidden text links is greater than a first predetermined number, typically 19;
2. the number of hidden image links is greater than a second predetermined number, typically 19;
3. the word 'home' appears as a single word in a text link or in an image alt field;
4. there is an image with a UseMap field including at least a third predetermined number of links, typically three;
5. the number of text links is greater than a fourth predetermined number, typically 2; AND
   at least one of the links has an href attribute containing a URL which is identical to the web page domain;
6. the number of image links is greater than a fifth predetermined number, typically 2; AND
   at least one of the links has an href attribute containing a URL which is identical to the web page domain;
7. the number of image links is greater than a sixth predetermined number, typically 2; AND
   the number of image links is greater than the number of text links; AND
   at least one of the links has a src attribute including one of the words 'menu' and 'nav'; AND
   at least one image link includes an href field in which the parent directory is the domain name, or at least two image links have identical parent directories.

If at least one of conditions 1-7 is true, the cluster is considered to be a right aligned navbar. If all of conditions 1-7 are false, the following conditions, shown in FIGS. 4AE and 4AF, are evaluated:

1. the cluster width is greater than or equal to a predetermined cluster width lower bound, typically 25;
2. the cluster width is less than or equal to a predetermined cluster width upper bound, typically 225;

3. the cluster height is greater than or equal to a predetermined cluster height lower bound, typically 75;

4. the cluster height is less than or equal to a predetermined cluster height upper bound, typically 1000;

5. the area covered by the cluster is less than 2.5 times the sum of the areas of all the children of the element that include links.

If at least one of conditions 1-5 is false, the cluster is not considered to be a navbar. As seen in FIG. 4AG, if all of conditions 1-5 of FIGS. 4AE and 4AF are true, the following conditions are evaluated:

1. the number of image links is greater than the number of text links; AND the number of image links is greater than a first predetermined number, typically 2;

2. the number of text links is greater than a second predetermined number, typically 2; AND the average number of characters per link is equal to or less than a third predetermined number, typically 21; AND the average number of words per link is equal to or less than a fourth predetermined number, typically 3.

If at least one of conditions 1-2 is true, the cluster is considered to be a right aligned navbar. If both conditions 1 and 2 are false, the cluster is not considered to be a navbar.

Reference is now made to FIG. 4AH, which is a simplified flowchart illustrating functionality for determining whether an HTML element is a hidden element, which functionality forms part of a fourth stage of the functionality of FIG. 4A.

As seen in FIG. 4AH, an element, such as a link cluster, is considered to be a hidden element if one or more of the following conditions are true:

1. the direct ancestor of the element in the tree is a hidden element;

2. the visibility set to the element in the element tag parameters is 'hidden' or 'none';

3. the pixel number of the left of the element is smaller than −600;

4. the element name is not of type <div> and is not of type <form>, and one of the element width and element height are equal to zero.

If all of conditions 1-4 listed above are false, the element is not considered to be a hidden element.

Figure 5:
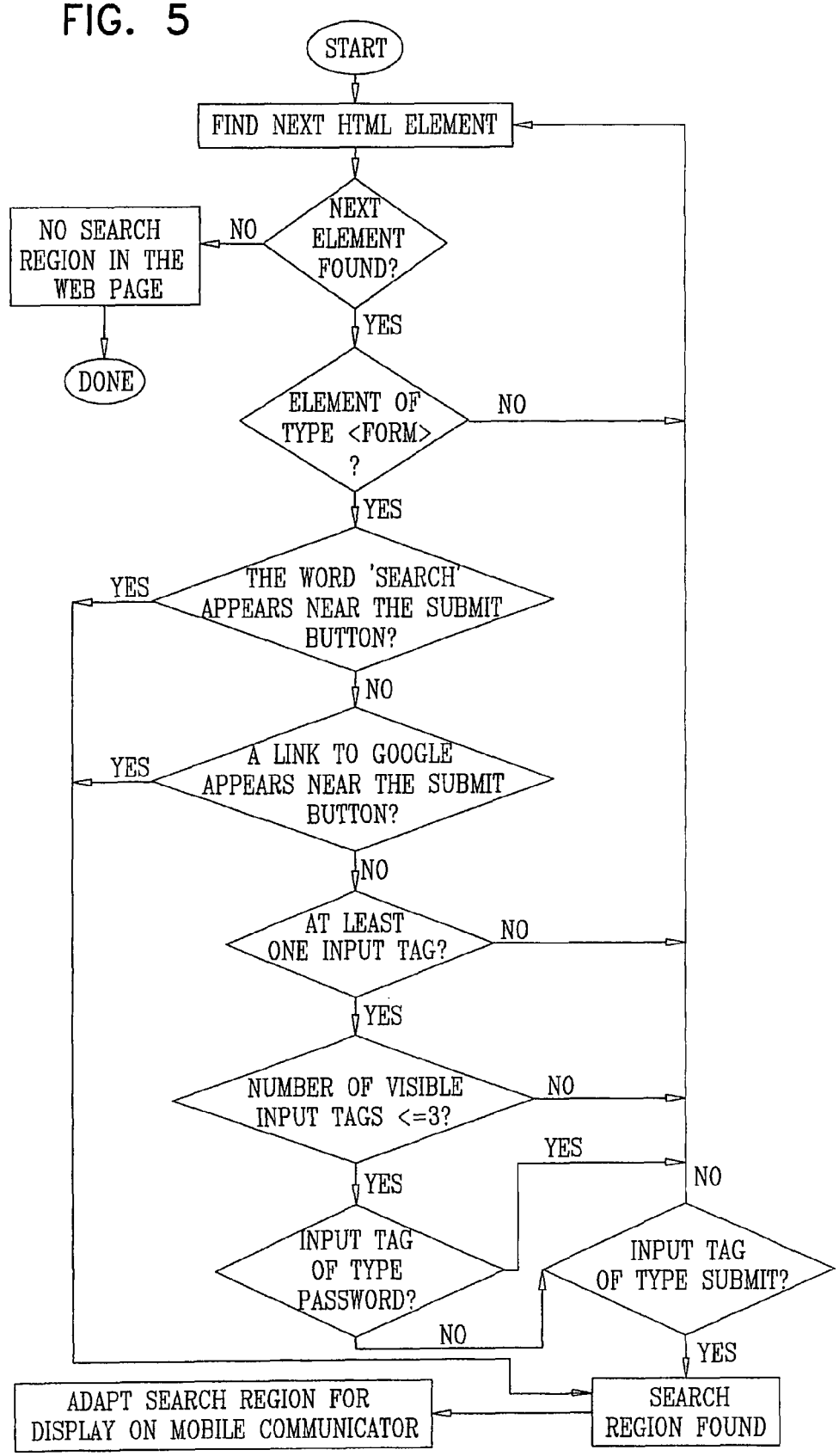
FIG. 5 is a simplified flow chart illustrating functionality for display of a search region of a web page accessed by using navlink functionality.

Reference is now made to FIG. 5, which is a simplified flow chart illustrating functionality for display of a search form of a web page accessed by using navlink functionality. Operation of the functionality of FIG. 5 results in a display screen showing a search form of a web page as illustrated in FIG. 2B.

As seen in FIG. 5, the following algorithm is performed for each HTML element of the web page until a search region is found or all HTML elements have been checked and no search region has been found.

As seen in FIG. 5, for each HTML element found, the HTML element is checked to see whether it is an element of the type <form>. If the element is not of the type <form>, the algorithm proceeds to look for the next HTML element in the web page.

If the element is of the type <form>, the element is checked to see whether the word 'search' appears as text or as an image alt element, i.e. a tag of the type <img alt="search"/> near the submit button of the form indicated by the tag <input type=submit/> or <input type=img/>. Typically, the word 'search' should appear within 100 characters from the submit button. If the word 'search' is found, the algorithm notes that a search region has been found and proceeds as described hereinbelow.

If the word 'search' is not found, the <form> element is checked to see whether it contains a link to GOOGLE® near the submit button of the form, indicated by the tag <input type=submit/> or <input type=img/>. Typically, a link to GOOGLE® appearing within 100 characters or tags from the submit button, is indicative of a search form. If a link to GOOGLE® is found, the algorithm notes that a search region has been found and proceeds as described hereinbelow.

If a link to GOOGLE® was not found in the <form> element, several additional checks are carried out. Initially, the form is checked to see whether it includes at least one tag of type <input>. Next, the form is checked to see whether it includes more than a predetermined number of tags, typically three tags, of the type <input> which are visible to the user, i.e. more than the predetermined number of input tags which are not of the type <input type=hidden/>. As a further stage, the input tags in the form are checked to see whether any of them are password input tags, that is input tags of the type <input type=password/>. Finally, input tags in the form are checked to see whether at least one of them is a submit input tag, that is an input tag of the type <input type=submit/> or <input type=img/>.

If the checks above show that the form does not include an input tag, includes more than the predetermined number of visible input tags, includes a password input tag or does not include a submit input tag, the form does not include a search region and the next HTML element in the page is found. If the checks above show that the form does include at least one input tag AND does not include more than the predetermined number of visible input tags AND does not include a password input tag AND does include a submit input tag, the algorithm notes that a search region has been found and proceeds as described hereinbelow.

If a search region is found, the search region is modified for display on a mobile communicator of the type identified by the server, as described hereinabove with reference to FIG. 3.

Figure 6:
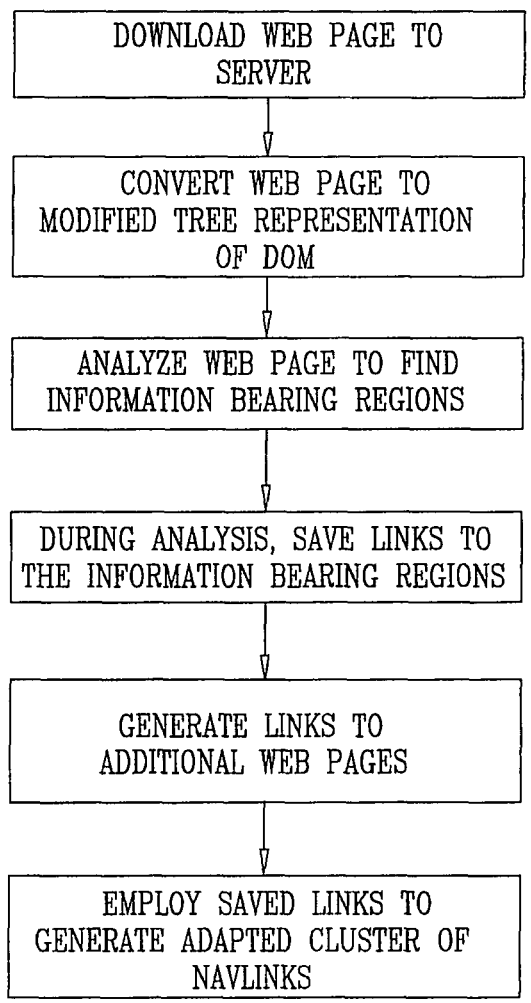
FIG. 6 is a simplified flow chart illustrating functionality for display of a further menu of navlinks accessed by using navlink functionality.

Reference is now made to FIG. 6, which is a simplified flow chart illustrating functionality for display of a further cluster of navlinks accessed by using navlink functionality. Operation of the functionality of FIG. 6 results in a display screen showing a further cluster of navlinks as illustrated in FIG. 2C.

As seen in FIG. 6, the web page, for which the menu of navlinks is being created, is downloaded to a server, such as server 106 (FIG. 1) and converted to a tree representation of the Document Object Model (DOM). The server then analyzes the web page to find in the tree representation of the DOM those elements corresponding to information bearing regions. Links to the information bearing regions found during the analysis are saved by the server. Additionally, links to additional web pages, such as history, favorites and home page, are generated. The links to the information bearing regions and the links to the additional web pages are adapted for display on the mobile communicator from which the page is requested.

Figure 7:
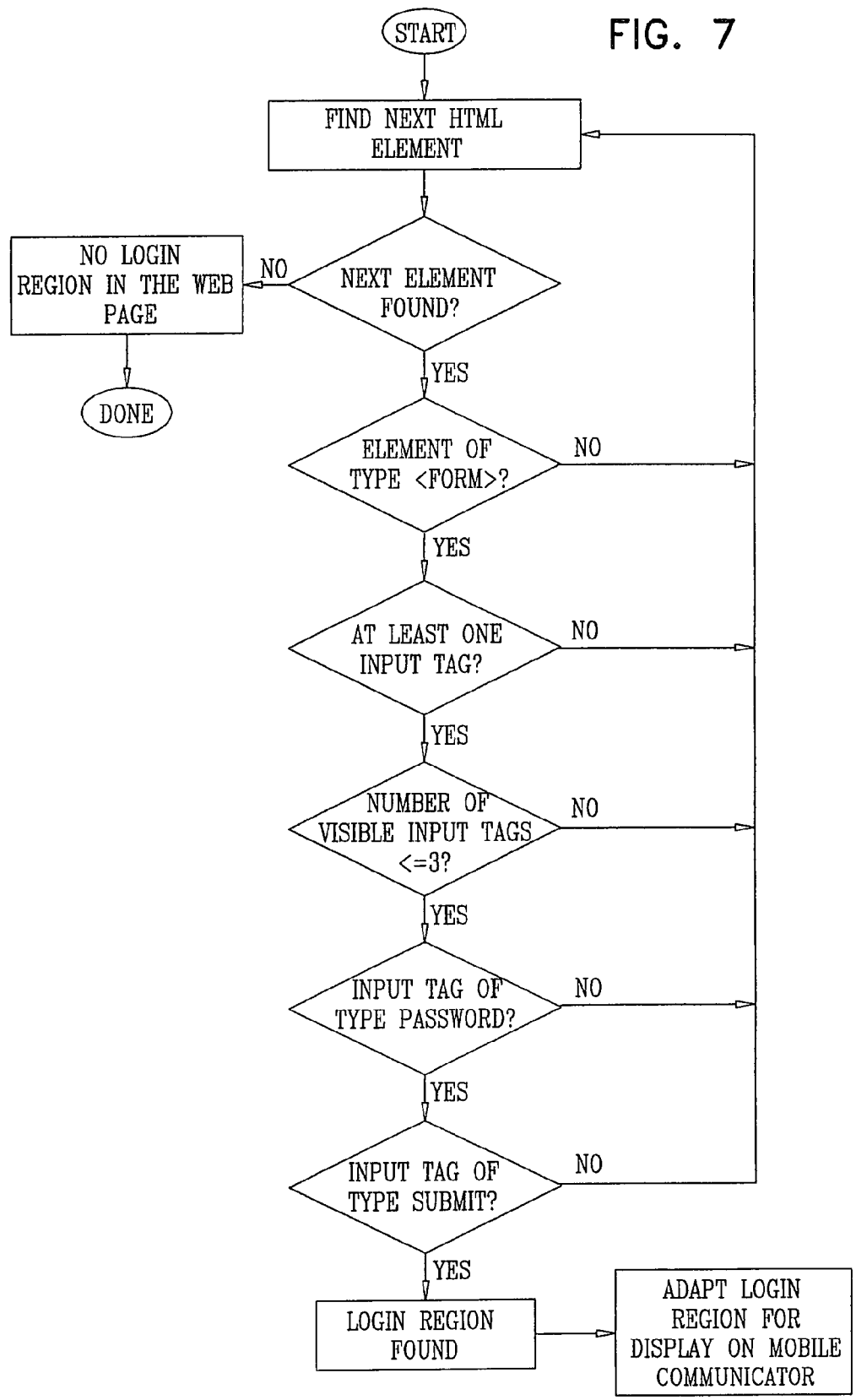
FIG. 7 is a simplified flow chart illustrating functionality for display of a login region of a web page accessed by using navlink functionality.

Reference is now made to FIG. 7, which is a simplified flow chart illustrating functionality for display of a login form of a web page accessed by using navlink functionality. Operation of the functionality of FIG. 7 results in a display screen showing a login form of a web page as illustrated in FIG. 2D.

As seen in FIG. 7, the following algorithm is performed for each HTML element of the web page until a login region is found or all HTML elements have been checked and no login region has been found.

As seen in FIG. 7, for each HTML element found, the HTML element is checked to see whether it is an element of the type <form>. If the element is not of the type <form>, the algorithm proceeds to look for the next HTML element in the web page.

If the element is of the type <form>, the form is checked to see whether it includes at least one tag of type <input>. Next, the form is checked to see whether it includes more than a predetermined number of tags, typically three tags, of the type <input> which are visible to the user, i.e. more than the predetermined number of input tags which are not of the type <input type=hidden/>. As a further stage, the input tags in the form are checked to see whether any of them are password input tags, that is input tags of the type <input type=password/>. Finally, input tags in the form are checked to see whether at least one of them is a submit input tag, that is an input tag of the type <input type=submit/>.

If the checks above show that the form does not include an input tag, includes more than the predetermined number of visible input tags, does not include a password input tag or does not include a submit input tag, the form does not include a login region and the next HTML element in the page is found. If the checks above show that the form does include at least one input tag AND does not include more than the predetermined number of visible input tags AND does include a password input tag AND does include a submit input tag, the algorithm notes that a login region has been found.

If a login region is found, the login region is modified for display on a mobile communicator of the type identified by the server, as described hereinabove with reference to FIG. 3.

Figure 2E:
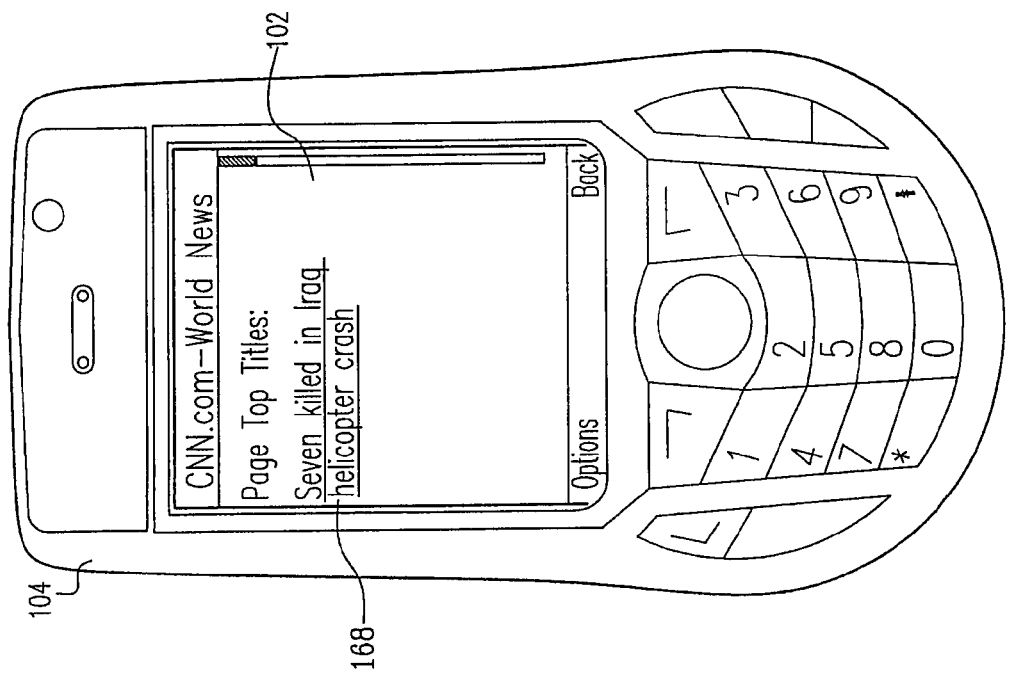
FIG. 2E is a simplified illustration of an adapted page screen on a display screen of a mobile communicator showing a list of page top titles of a web page accessed by using navlink functionality.
Figure 8A:
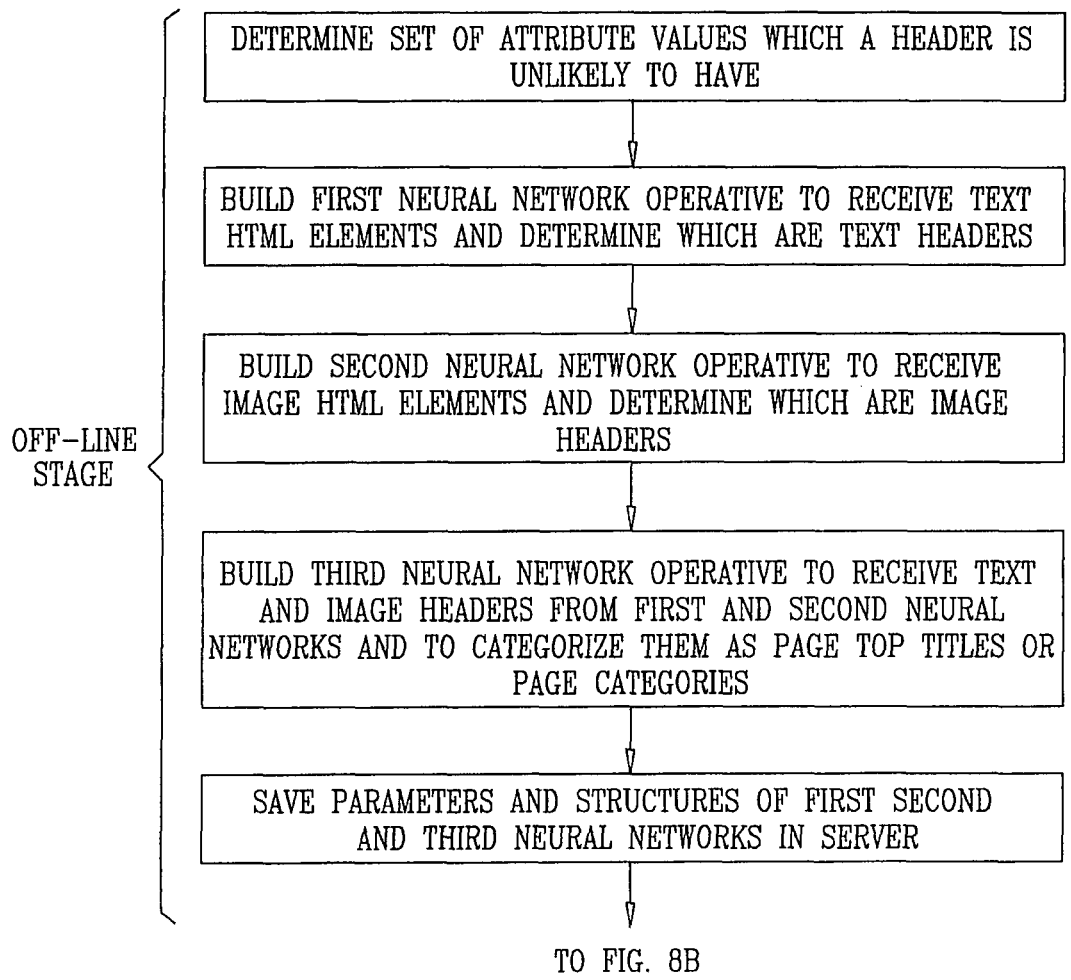
FIGS. 8A, 8B and 8C are together a simplified flow chart illustrating functionality for display of a list of page top titles and/or a list of page categories of a web page accessed by using navlink functionality.
Figure 8B:
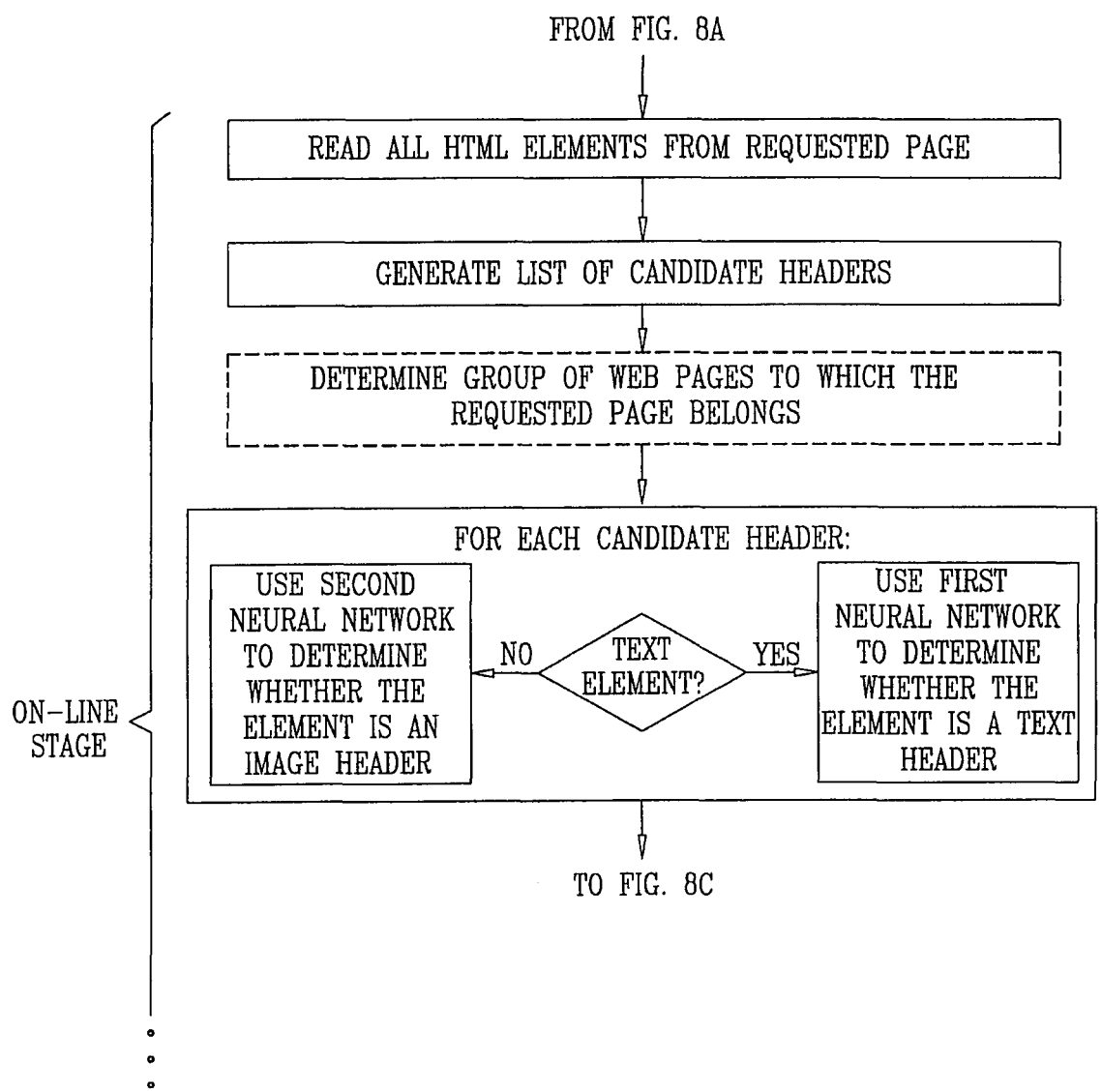
Figure 8C:
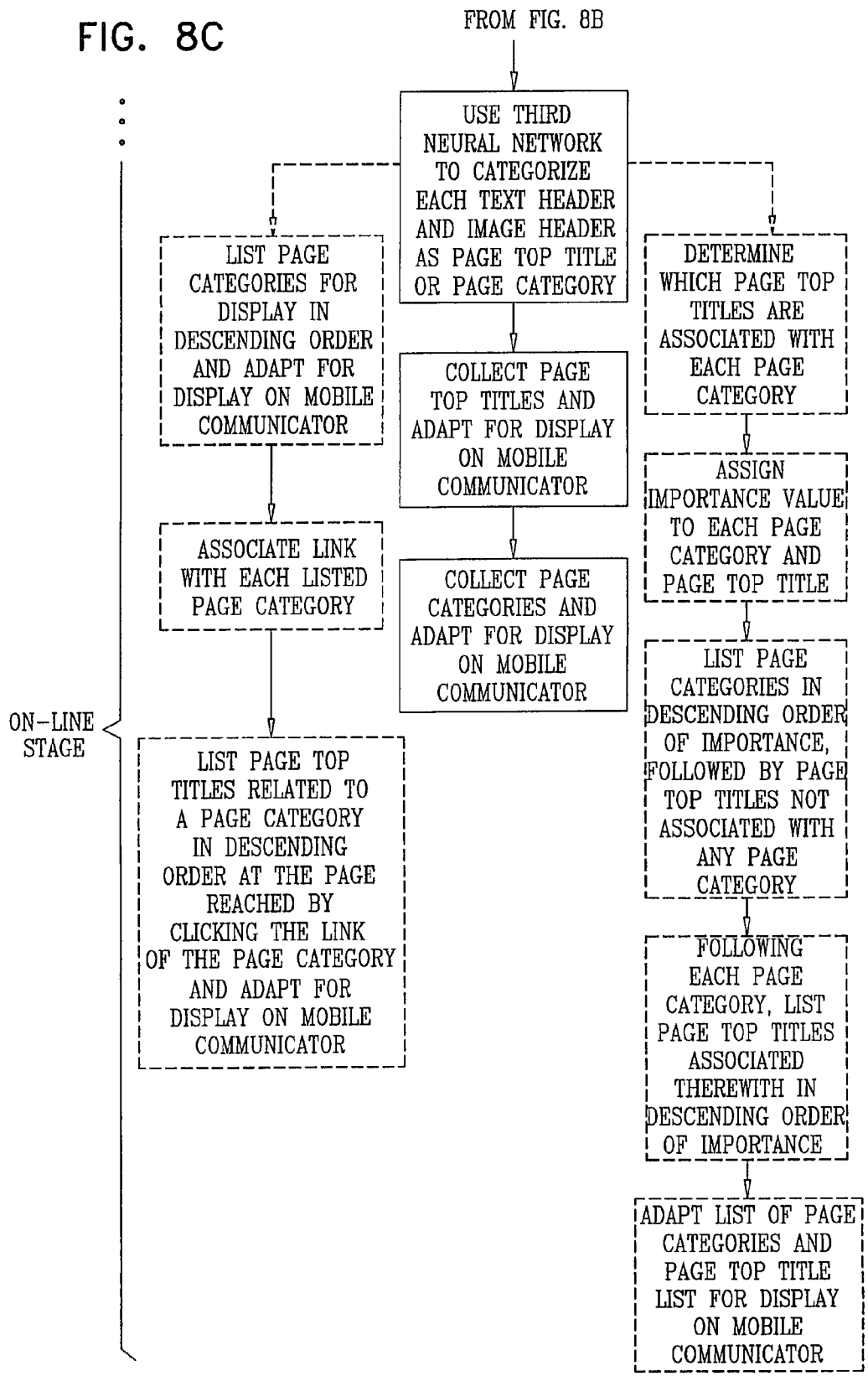

Reference is now made to FIGS. 8A-8C, which together are a simplified flow chart illustrating functionality for display of a list of page top titles and/or a list of page categories of a web page accessed by using navlink functionality. Operation of the functionality of FIGS. 8A-8C results in a display screen showing a list of page top titles of a web page as seen in FIG. 2E and/or showing a list of page categories of the web page as seen in FIG. 2F.

The functionality of FIGS. 8A-8C includes two stages, the first of which is illustrated in FIG. 8A, typically is performed off line and is preferably performed once for all web pages or once for each of several distinguishable types of web pages. The second stage is an online stage, illustrated in FIGS. 8B and 8C, which is performed on-line at the server for each web page requested by a user.

As seen in FIG. 8A, during the off-line stage, a set of attribute values which a header is unlikely to have is determined. The attribute values are saved in a server, such as server 106 (FIG. 1).

Once these attributes have been determined, three neural networks are built. The first neural network is operative to receive text HTML elements and to determine which of them are text headers. The second neural network is operative to receive image HTML elements and to determine which of them are image headers. The third neural network is operative to receive HTML elements which have been determined by the first and second neural networks to be text or image headers, and to categorize the received headers as page top titles or as page categories. Once the three neural networks are built, their parameters and structures are saved in the server. It is appreciated that text headers and image headers are elements corresponding to outstanding areas in the web page, which are likely to be titles or other headings of sections.

The attributes for building the first neural network may include attributes belonging to some or all of the following groups of attributes:

attributes pertaining to the size and shape of the text HTML element;

attributes pertaining to the text in the text HTML element;

attributes pertaining to the position of the text HTML element on the page relative to other HTML elements thereon; and attributes pertaining to the appearance of the text HTML element relative to surrounding HTML elements on the same webpage.

Examples of attributes pertaining to the size and shape of the text HTML element include:

binary attribute indicating whether an element includes a link;

binary attribute indicating whether an element includes a link to a page in the same domain as the current page;

attributes indicating the height and width of link in pixels; and attribute indicating the link width/link height ratio.

Examples of attributes pertaining to the text in the text HTML element include:

binary attribute indicating if all the text in the element is in bold letters;

binary attribute indicating if all the letters in the text are capital letters;

binary attribute indicating whether the text includes at least one word which is non-numeric and does not include special characters, such as % and &;

attribute indicating a fraction of the words in the text element that start with a capital letter;

attribute indicating the font size binary attribute indicating if the font size of the text element is maximal in this page; and attributes indicating the numbers of words and lines in the text element.

Examples of attributes pertaining to the position of the text HTML element on the page relative to other HTML elements therein include:

binary attribute indicating whether there is any element above and close to the text HTML element. Typically, an element is considered to be close to the text HTML element if it is within a window of height 45 pixels and the width of the text element;

attribute indicating the distance between the text HTML element and an HTML element below it if such an element exists; and attribute indicating whether the text HTML element is above any HTML input field.

Examples of attributes pertaining to the appearance of the text HTML element relative to surrounding HTML elements on the web page include:

binary attribute indicating whether the background color of the text HTML element is different from the background color of the element just above it and/or of the element just below it;

binary attribute indicating whether the font color of the text HTML element is different from the font color of the element just above it and/or of the element just below it;

binary attribute indicating whether the background color of the text HTML element is different from the background image of the element just above it and/or of the element just below it; and binary attribute indicating whether the font style of the text HTML element is different from the font style of the element just above it and/or of the element just below it.

The attributes for building the second neural network, which attributes pertain to images, include some or all of the following:

binary attribute indicating whether the HTML image includes a link;

binary attribute indicating whether the HTML image includes a link to a page in the same domain as the current page;

attributes indicating the height and width of the HTML image in pixels;

attribute indicating the width/height ratio of the HTML image;

attribute indicating the image type; and attribute indicating whether the HTML image element includes an alt parameter.

The attributes for building the third neural network, include some or all of the following:

attribute indicating the number of words in the header;

binary attribute indicating whether all the words in the header begin with a capital letter;

binary attribute indicating whether all the letters in the header are capital letters;

attribute indicating the number of lines in the header;

binary attribute indicating whether the header includes a verb; and binary attribute indicating whether the header includes one or more conjunction words, such as 'and', 'but', 'to' or 'because'.

Turning to FIG. 8B, once a user requests a web page, the server reads all the HTML elements in the page. The server then generates a list of candidate headers by discarding HTML elements which are unlikely to be headers, typically because they have attribute values such as those saved in the server during the first step of the off-line stage.

It is appreciated that if the off-line stage is performed several times for different distinguishable groups of web pages, prior to reading all the HTML elements in the page requested by the user the system must determine to which group of web pages the requested page belongs, in order to employ the appropriate neural networks during following stages.

Next, for each element in the list of candidate headers, if the element is a text element the first neural network is used to determine whether it is really a text header. If the element is not a text element, that is if the element is an image element, the second neural network is used to determine whether it is an image header.

Turning to FIG. 8C, it is seen that the third neural network is used to categorize each of the text headers and image headers, found by employing the first and second neural networks, as a page top title or as a page category.

Typically, the page top titles are then collected and adapted for display on the mobile communicator requesting the web page, as seen in FIG. 2E, and the page categories are collected and adapted for display on the mobile communicator as seen in FIG. 2F.

Alternatively, the server may determine which of the page top titles are associated with each of the page categories. An importance value may then be assigned to each of the page top titles and page categories found. When adapting the page categories and page top titles for display, the page categories are displayed in descending order of importance, followed by page top titles not associated with any page category. Following each given page category, and before the display of the next page category, the page top titles associated with the given page category are displayed in descending order of importance.

As a further alternative, the page categories may be adapted for display in descending order of importance, such that each page category comprises a link or is associated therewith. When a user presses a link associated with a page category, a list of the page top titles associated with that page category is displayed. The page top titles may be displayed in descending order of importance.

Figure 9B:
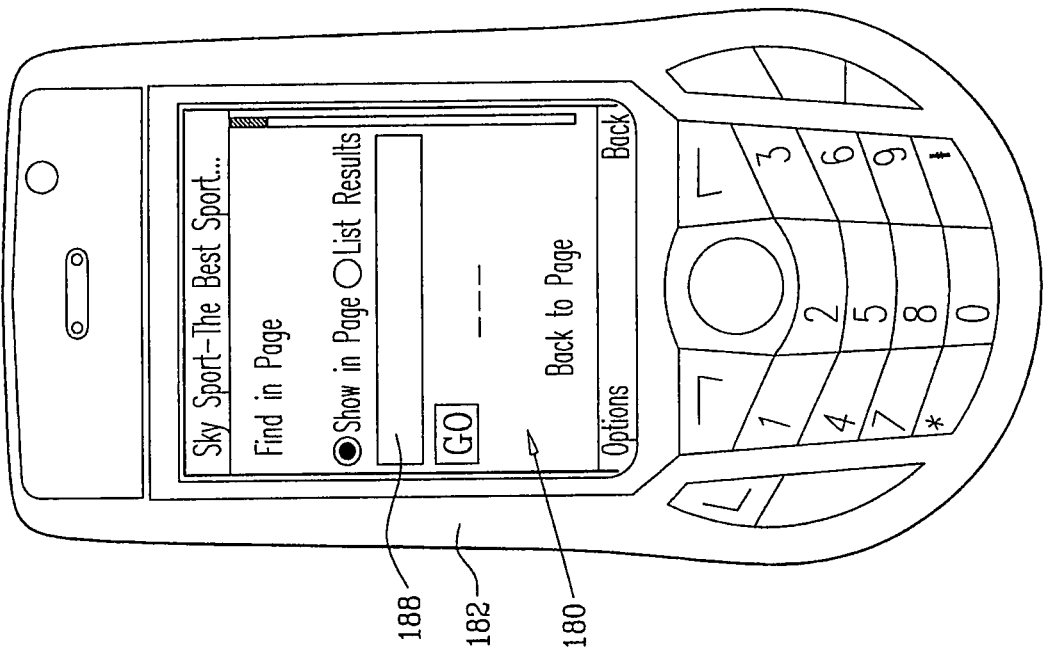
Figure 9A:
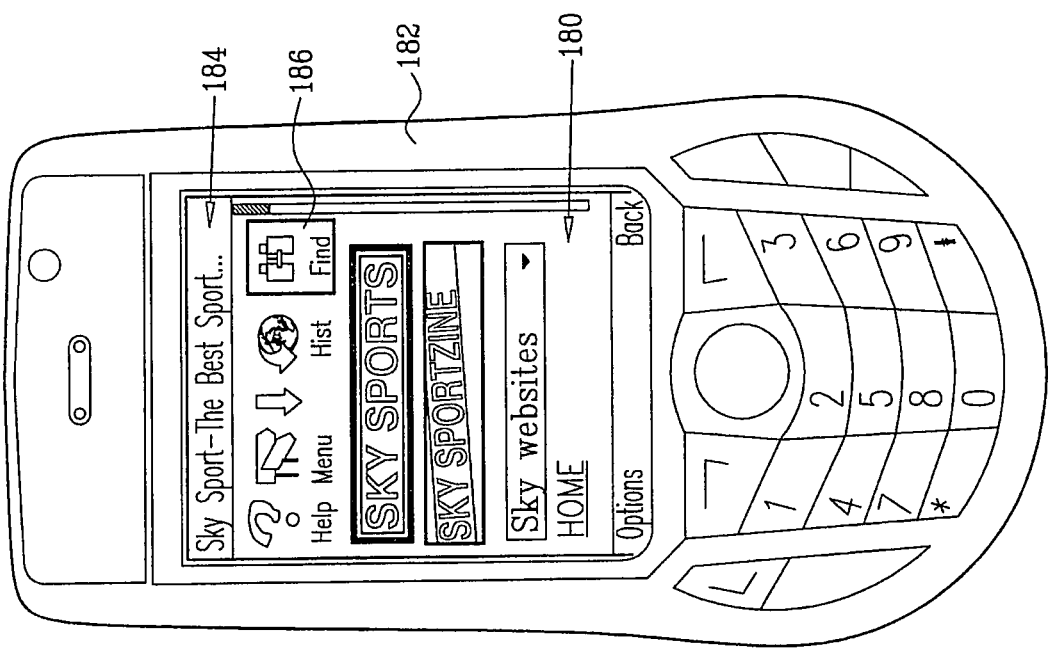

Reference is now made to FIGS. 9A, 9B, 9C, 9D, 9E, 9F, 9G and 9H, which illustrate server side Find in Page functionality constructed and operative in accordance with a preferred embodiment of the present invention. In accordance with a preferred embodiment of the present invention, there is provided a method and system for displaying web content on a display screen 180 of a mobile communicator 182 including requesting a web page by a user; in response to a user request, downloading the web page to a server (not shown), such as server 106 (FIG. 1); supplying from the server to the mobile communicator 182 for display on display screen 180 thereof, an adapted web page 184 corresponding to the web page requested by the user, the adapted web page including a Find In Page link 186, as shown in FIG. 9A.

When the user clicks the Find In Page link 186 (FIG. 9A) a Find In Page form 188 is displayed on the display screen 180 of the mobile communicator 182, as seen in FIG. 9B. The user enters a search string in the Find In Page form 188, as seen in FIG. 9C, and submits the form.

As seen in FIG. 9C, since the user selected a 'show in page' option prior to submitting the form, an adapted web page having the occurrences designated therein is displayed on display screen 180, as seen in FIG. 9D. As seen in FIG. 9D, preferably each occurrence of the search string in the adapted web page is associated which a link 190, which, upon clicking thereon, provides display of the next occurrence of the search string in the adapted web page.

Alternatively, the user may select a 'list results' option prior to entering the search string, as shown in FIG. 9E, or following entering the search string, as shown in FIG. 9F. In this case, a list 192 of occurrences and links is presented to the user, as seen in FIG. 9G, and upon clicking on a link, an adapted web page having the occurrence designated therein is presented to the user, as seen in FIG. 9H. As seen in FIG. 9H, each occurrence of the search string in the adapted web page is associated which a link 194, which, upon clicking thereon, provides display of the next occurrence of the search string in the adapted web page.

Reference is now made to FIG. 10, which is a simplified flow chart illustrating the Find In Page functionality of FIGS. 9A-9H.

Initially, the user requests a web page from the server. The server provides an adapted web page 184 to the mobile communicator 182 which includes a Find In Page link 186. When the user clicks on the Find In Page link 186, the server receives a corresponding request for Find In Page form 188 and provides the Find In Page form 188 to the mobile communicator 182.

The Find In Page form 182 typically includes radio buttons allowing the user to select between options A and B, as described above, as well as a text entry field allowing the user to enter a search string.

The user actuates one of the radio buttons, enters a search string and submits the form to the server. Submission of the form by the user sends a request to the server to retrieve the initially requested web page and to designate on the corresponding adapted web page occurrences of the search string entered by the user.

This is achieved by the following steps taken by the server:

I. The server reloads the same web page as originally requested by the user;

II. The server adapts the page for the mobile communicator 182 and divides the adapted page into a series of sequential viewable adapted screens and searches throughout the entire adapted page for occurrences of the search string.

III. The server designates each such occurrence in a manner enabled by the mobile communicator 182.

IV. The server preferably adds a link alongside each occurrence which leads to the sequential next occurrence. The link alongside the last occurrence in the adapted page leads back to the first occurrence. These links are preferably directed to string token instances.

V. If the 'list results' option is selected, the server adds at the beginning of the adapted page a list of occurrences showing their context including links which lead to each occurrences in the adapted page.

VI. If the 'show in page' option is selected, server causes the first of the series of sequential viewable adapted pages in which the search string occurs to be displayed.

Figure 11:
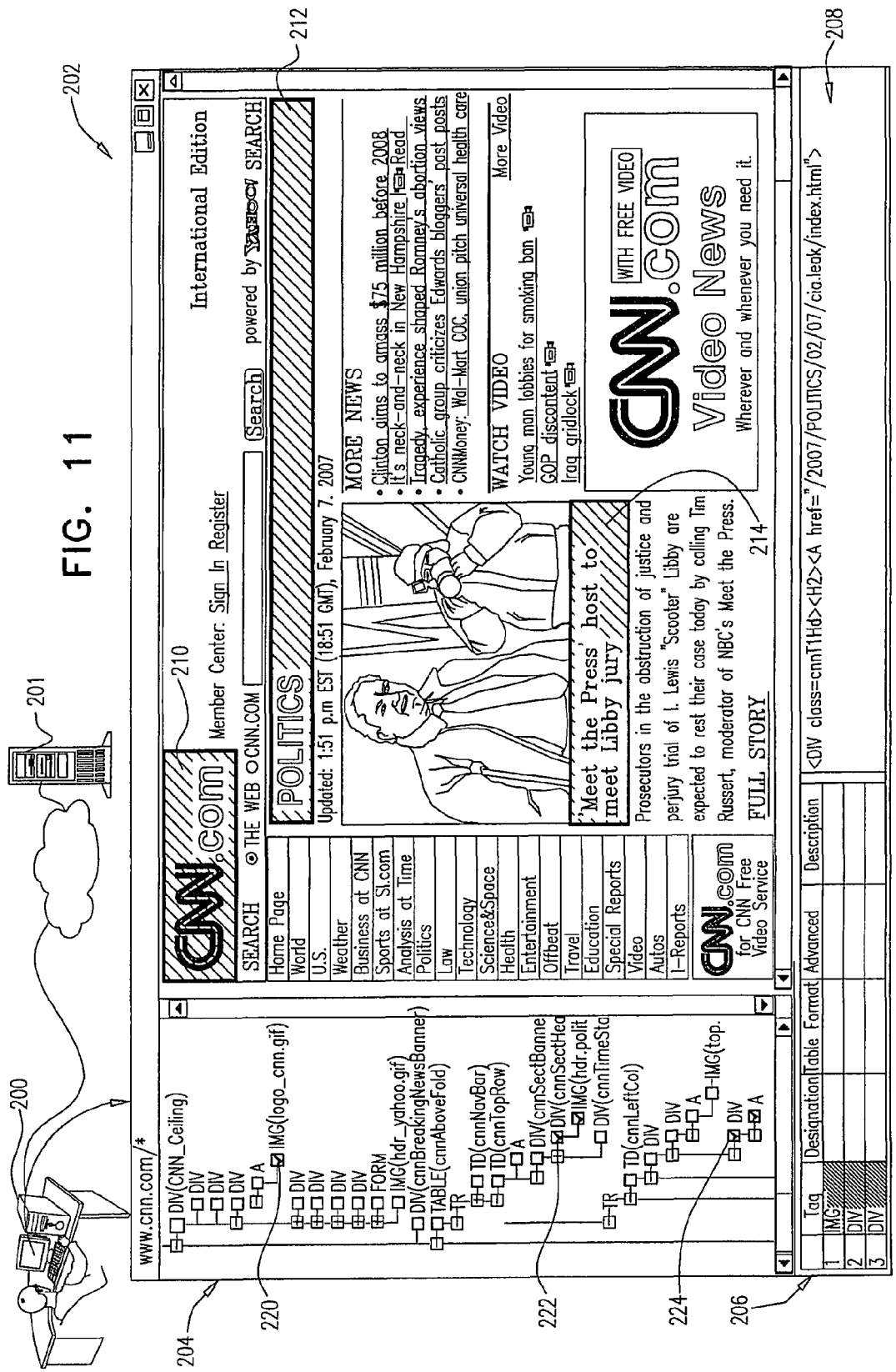
FIG. 11 is a simplified pictorial illustration of visual design tool (VDT) functionality for enabling an operator to prioritize web content to be displayed on a mobile communicator in accordance with a preferred embodiment of the present invention.
Figure 12:
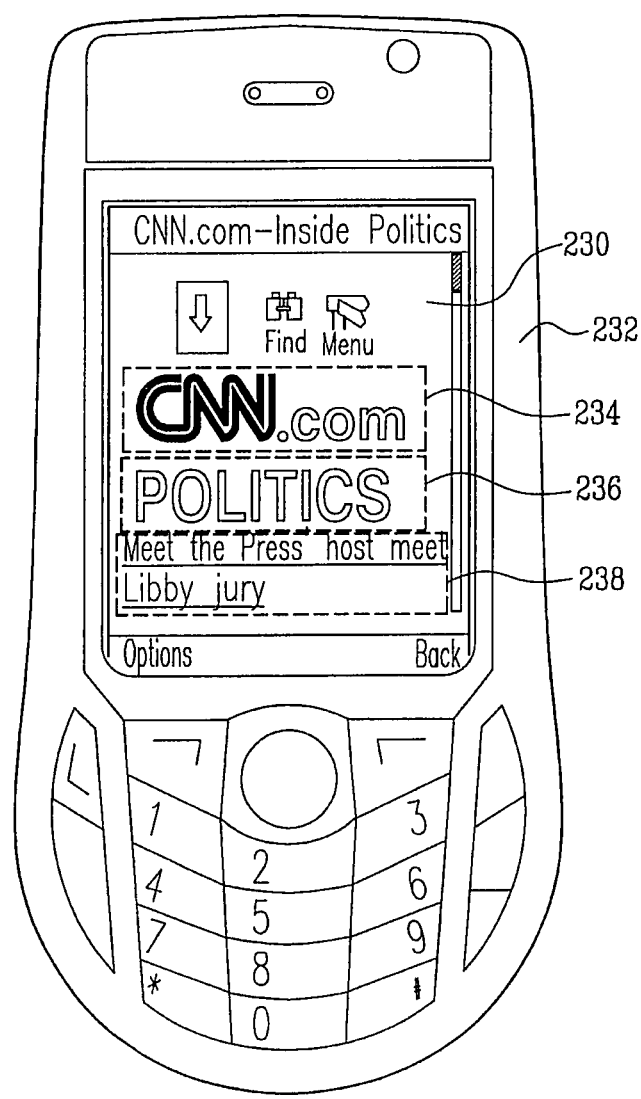
FIG. 12 is a simplified illustration of a display screen of a mobile communicator showing the prioritized web content selected by the operator in FIG. 11.

Reference is now made to FIG. 11, which is a simplified pictorial illustration of visual design tool (VDT) functionality for enabling an operator to prioritize web content to be displayed on a mobile communicator in accordance with a preferred embodiment of the present invention and to FIG. 12, which is a simplified illustration of a display screen of a mobile communicator showing the prioritized web content selected by the operator.

As seen in FIG. 11, an operator, typically an employee of a cellular telephone company or content provider, using a computer 200, views web sites on the Internet and arranges and prioritizes the web content thereof for viewing on mobile communicators typically used by customers of his company. It may be understood that the operator decides how given web sites appear on display screens of mobile communicators, such as display screens 102 of mobile communicators 104 (FIG. 1), which communicate with a server 201, such as server 106 (FIG. 1). The operator instructs the server how to arrange the web content displayed on the display screens of the mobile communicators.

In the illustrated embodiment of FIG. 11, an operator-selected web page 202, such as an internal CNN web page, appears on the screen of the operator's computer 200. Alongside the web page 202 appears a modified tree representation of the Document Object Model (DOM) 204. Typically at the lower, left corner of the screen of the operator's computer 200, there appears a prioritization and arrangement table 206, alongside of which appears a text box 208 containing the HTML code corresponding to operator-selected information bearing regions listed in table 206.

In accordance with a preferred embodiment of the present invention, there is provided by the VDT functionality of the present invention a method and system for displaying web content on a mobile communicator including:

1. Receiving a web page, such as web page 202, by an operator;

2. Selection by the operator, typically using computer 200, of at least one cell-based element of the web page 202. Typical cell-based elements include an image of the CNN logo, designated by reference numeral 210, an image of the name of the CNN internal web page, designated by reference numeral 212 and a page top title, designated by reference numeral 214. These cell-based elements are designated in the DOM 204 respectively as IMG 220, DIV 222 and DIV 224. In the designation field, the operator may designate a selected element as a specific type of information bearing region, such as a logo, a page top title or a page category.

3. Arrangement by an operator of the at least one cell-based element at a desired position in a page template. In the illustrated embodiment, the order of the cell-based elements is as follows, as seen in table 206: IMG 220, DIV 222 and DIV 224.

4. Creating at least one mobile communicator adapted page by automatically placing at least one cell-based element, indicated by the template, of at least another web page, having a page structure similar to that of the web page, at a desired position indicated by the template. This step employs a matching algorithm, preferably an algorithm that is described hereinbelow.

It is appreciated that the "another web page" may be a future web page and/or a different web page having at least certain structural similarities to the web page which is viewed by the operator.

Preferably, the selection, arrangement and creating steps take place without changing HTML code of the web page.

The creating step preferably includes adding additional content, within selected elements, which was not present in the web page. Alternatively, the operator may indicate that content should be removed from selected elements when creating the template.

When the template includes portions having a basic structure which is repeated several times, an addition of content or a removal of content in the basic structure may be indicated for only one instance of the basic structure, and an indication may be made that this addition or removal should be carried out for each of the repetitions of the basic structure when adapting a web page based on the template.

FIG. 12 illustrates a display screen 230 of a mobile communicator 232 showing the prioritized web content selected by the operator. It is seen that nearest to the top of the screen 230 appears an image 234 of the CNN logo corresponding to an image of the CNN logo 210 and IMG 220, given top priority by the operator, followed by an image 236 of a page category, corresponding to an image of a page category 212 and DIV 222, given a second priority by the operator and followed by a page top title 238, corresponding to a page top title 214 and DIV 224, given a third priority by the operator.

Figure 13:
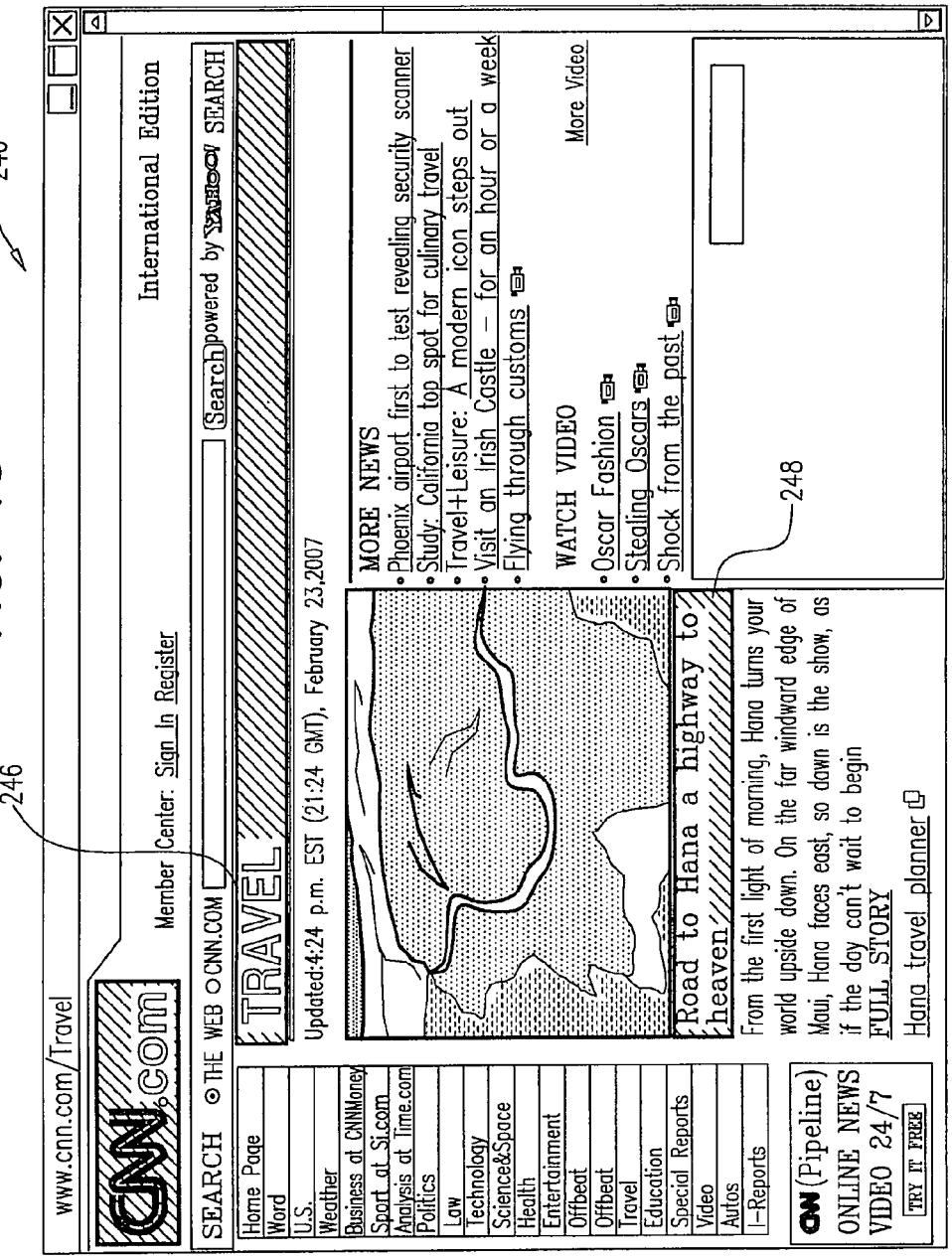
FIGS. 13 and 14 are respectively a simplified pictorial illustration of a web page similar to that appearing in FIG. 11 and the corresponding display screen of a mobile communicator, produced in accordance with the VDT functionality illustrated in FIGS. 11 and 12.
Figure 14:
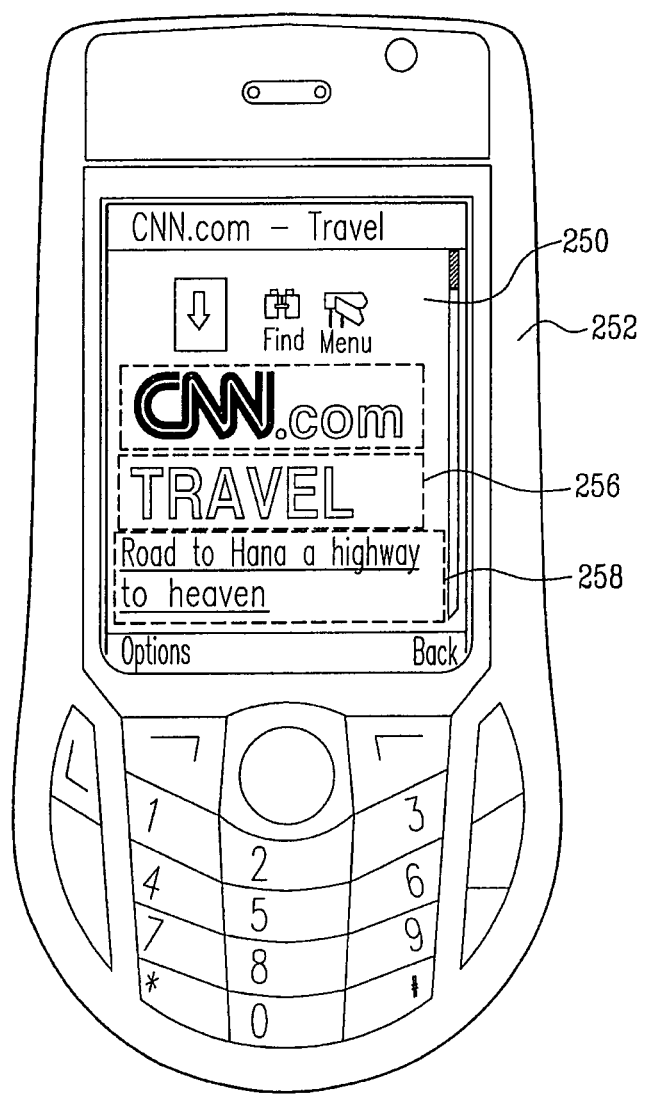

Reference is now made to FIG. 13, which illustrates another web page 240, having a page structure similar to that of the web page appearing in FIG. 11 and to FIG. 14, which illustrates a corresponding mobile communicator display. It is seen that the page category 246 is different from page category 212 (FIG. 11) and corresponding page category 236 (FIG. 12). Additionally, the page top title 248 is different from page top title 214 (FIG. 11) and corresponding page top title 238 (FIG. 12). The VDT functionality is operative, notwithstanding this difference, and even notwithstanding more significant differences in the arrangement of the web pages, to identify and place the page category 246 and the page top title 248 in their proper locations on the display screen 250 of a mobile communicator 252, as seen in FIG. 14 as adapted page category 256 and adapted page top title 258.

Figure 15:
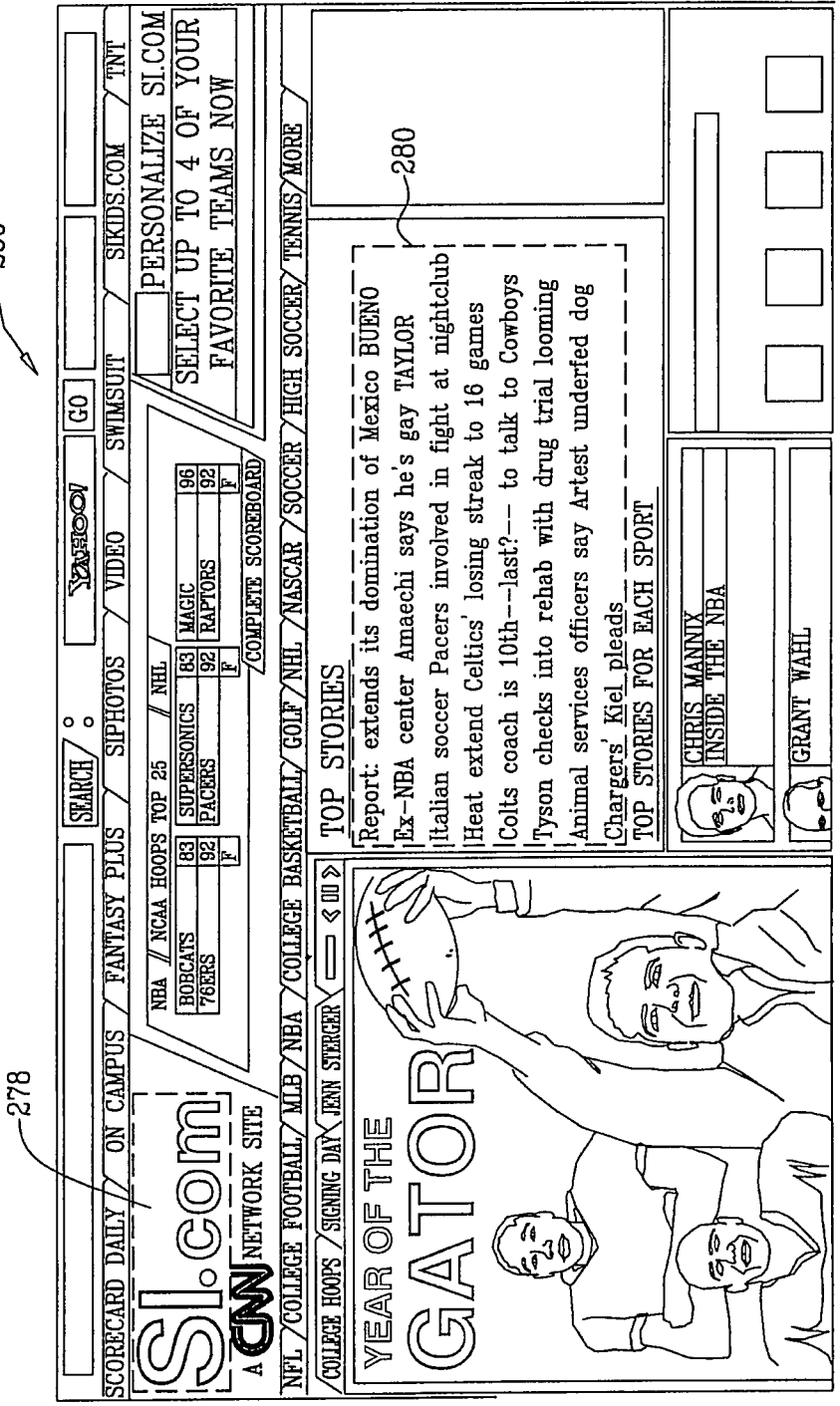
FIGS. 15 and 16 are respectively a simplified pictorial illustration of a web page, which is different from that appearing in FIG. 11, and the corresponding display screen of a mobile communicator.
Figure 16:
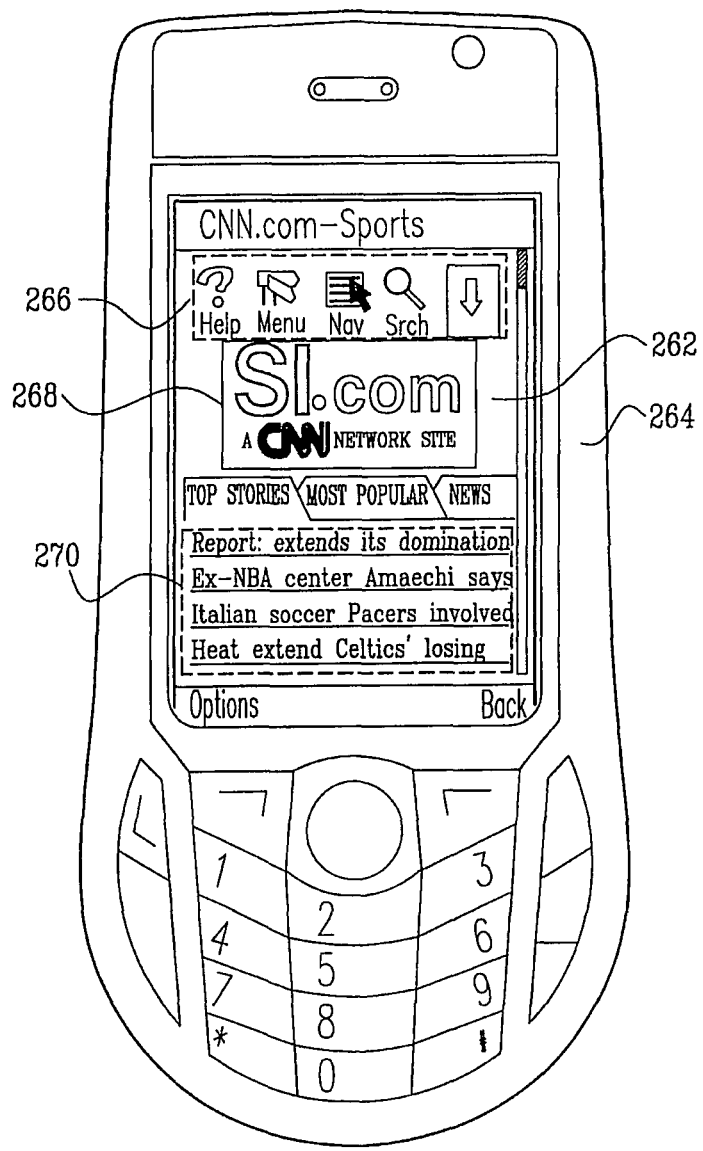

Reference is now made to FIG. 15, which illustrates another web page 260, which is reached via the CNN.com webpage but has a completely different page structure than that of the web page appearing in FIG. 11, and to FIG. 16, which illustrates a corresponding mobile communicator display. It is seen that due to the fact that the page structure of web page 260 is so different from that of the web page appearing in FIG. 11, the VDT functionality does not recognize the web page 260 as conforming to the template defined for the web page of FIG. 11, and the web page 260 is displayed on the display screen 262 of a mobile communicator 264 in accordance with the automatic display functionality described hereinabove with reference to U.S. Pat. No. 7,047, 033 and FIGS. 1-8C. As seen in FIG. 16, the adapted web page displayed on display screen 262 includes a group of navlinks 266, an adapted logo 268 and an adapted list of page top titles 270 corresponding respectively to logo 278 and the page top titles 280 in web page 260.

Figure 17:
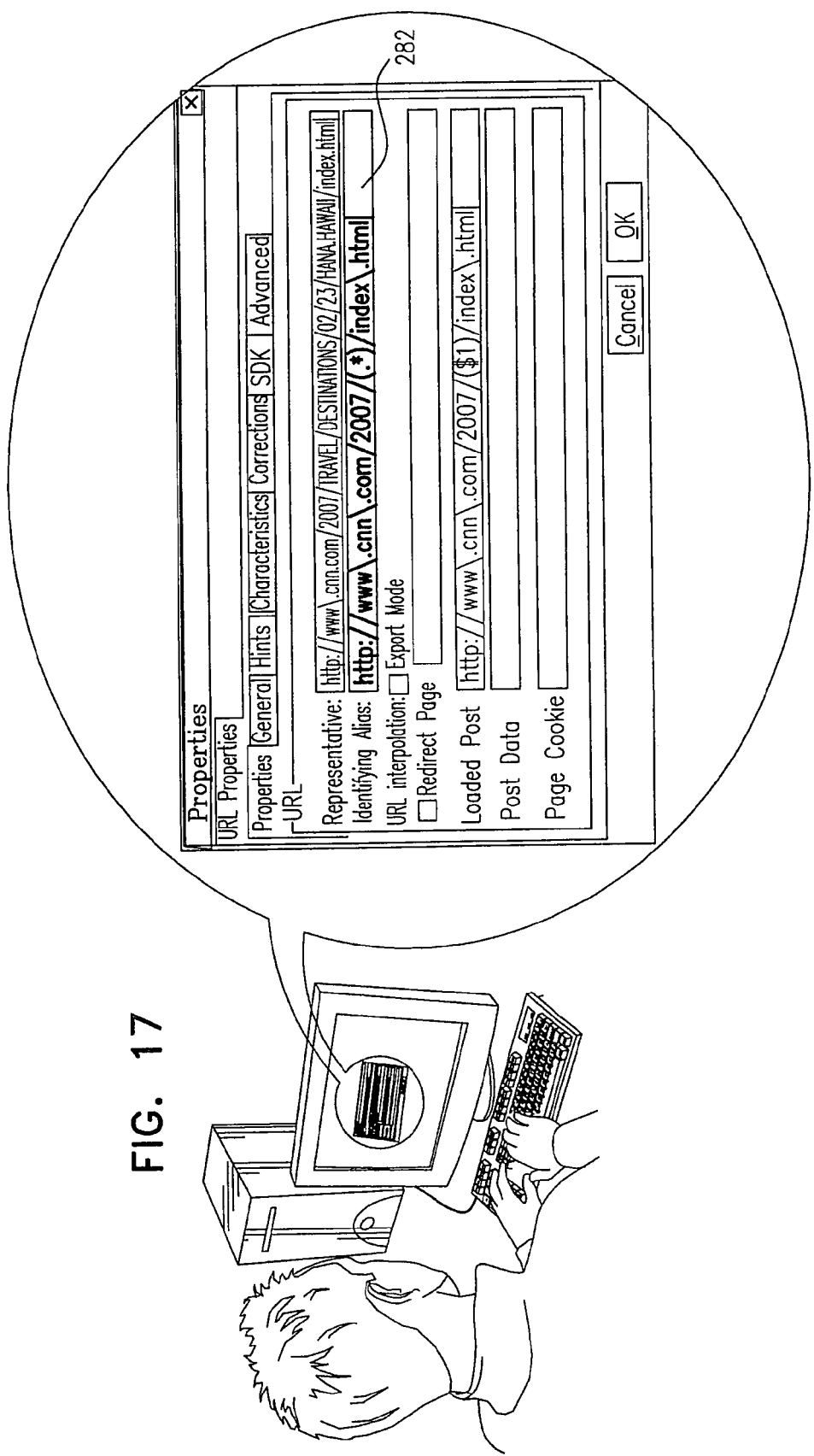
FIG. 17 is a simplified pictorial illustration of a form enabling an operator of the VDT functionality of FIGS. 11 to 16 to create a template based on a regular expression.

Reference is now made to FIG. 17, which is a simplified pictorial illustration of a form enabling an operator of the VDT functionality of FIGS. 11 to 16 to create a template based on a regular expression 282 and to include therein web pages not covered by that regular expression.

Figure 18:
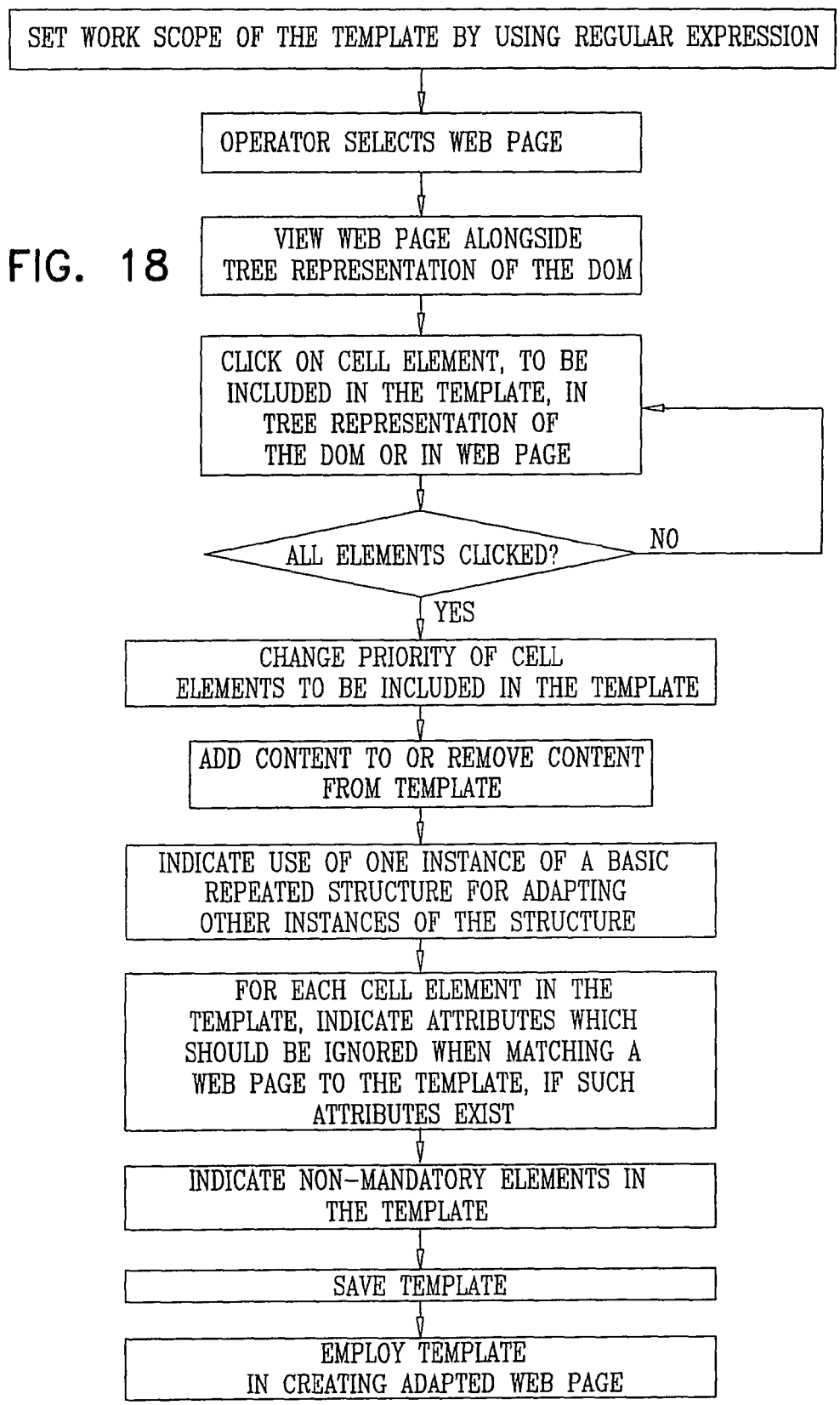
FIG. 18 is a simplified flow chart illustrating the operation of the VDT functionality illustrated in FIGS. 11-16.

Reference is now made to FIG. 18, which is a simplified flow chart illustrating operation of the VDT functionality described hereinabove with reference to FIGS. 11 to 17. As seen in FIG. 18, the operator initially selects the scope of a template to be created by using regular expressions. For example, if the operator wishes to create a template intended to cover multiple web pages having similar structures, such as, for example, www.cnn.com/2007/news/us . . .
www.cnn.com/2007/news/world . . .
www.cnn.com/2007/news/politics . . .

the operator would use the regular expression: www.cnn.com/2007/news/*

If the operator wishes to create a template intended to cover another web page, having a different structure, such as, for example, www.cnn.com/2007/sports . . . , the operator typically uses the regular expression: www.cnn.com/2007/sports/*.

The operator then selects an appropriate web page and views it on computer 200 alongside a tree representation of the Document Object Model (DOM) 204. The operator then clicks on cell elements in the DOM 204 or in the page in order to select them for addition to the template being created.

Typically, the elements will be displayed on a mobile communicator display screen in the order in which they were added to the template. Optionally, the operator may change the priority of some or all of the elements added to the template. In this case, the elements will be displayed on a mobile communicator display screen in descending order of priority.

Optionally, the operator may add to the template, within elements selected from the original web page, additional content which was not present in the web page. The additional content provided in the template will be added to any adapted web page created using the template. In this case, the content, and the location of the node in the tree representation of the template, following which the content should be added, will be saved on the server.

As a further option, the operator may remove from the template content which is contained within elements selected from the original web page. The removed content indicated in the template will be removed from any adapted web page created using the template. In this case, the content, and the location, in the tree representation of the template, of the content to be removed, is saved on the server.

If the web page from which the template is created includes portions having a basic structure which is repeated several times, an addition of content or a removal of content may be indicated for only one instance of the basic structure, and an indication may be made that this addition or removal should be carried out for each of the repetitions of the basic structure when adapting a web page based on the template.

Any other suitable content may be added to the template by the operator.

It is appreciated that for elements in the template having an attribute which is likely to be different at different times at which the web page is viewed, the operator may indicate to a server that this specific attribute should be ignored when matching a given page to the template, as described hereinbelow. Such indications may be considered as "hints" for ignoring certain attributes of an element in the template.

Once the operator has added all the desired elements to the template, the template is saved on a server, such as server 201 (FIG. 11). Preferably, the information saved on the server for each element in the template includes some or all of the priority of the element, its X and Y positions within the web page, the area of the web page taken up by the element, the number of images included in the element, the number of forms included in the element, the percentage of the area of the element which is covered by text and the percentage of the area of the element which is covered by links and the path of the element relative to the <body> tag as it appears in the tree representation of the template DOM. Preferably, the template also includes a tree representation of the web page from which the template was created.

In this context, the path of the element is defined as a sequence of numbers indicating the location of an element within a tree representation of a DOM relative to a given root node. Starting with a root node, the first number in the element path represents the ordinal number of the child element that should be selected when traversing the tree to find the element, the second number represents the ordinal number of the child element relative to the previous child element that should be selected and so forth, such that the last number locates the element. In accordance with this definition, the length of the element path corresponds to the depth of the element relative to the given root node.

For elements in which the operator added or removed content, the information for the element includes an indication that content was added or removed. Additionally, elements are specifically indicated in the template if such elements include a basic structure which is repeated several times.

It is further appreciated that the operator may indicate whether one or more elements in the template are mandatory elements. If elements are considered to be mandatory and they are not matched by an element in the web page being adapted, the template is not used and the web page is displayed on the mobile communicator display screen as described hereinabove with reference to FIGS. 1-8C.

Once all this information is saved on the server, the template is created, and may be employed in creating the page as seen on the display screen of the mobile communicator for both present and future, structurally similar web pages. It is appreciated that a template may be created separately for each URL, or alternatively may be created once for a group of URLs defined by a regular expression.

Reference is now made to FIGS. 19A, 19B, 20A and 20B, which illustrate the results of operation of a matching algorithm, preferably, but not necessarily, within the context of the VDT functionality.

Figure 19A:
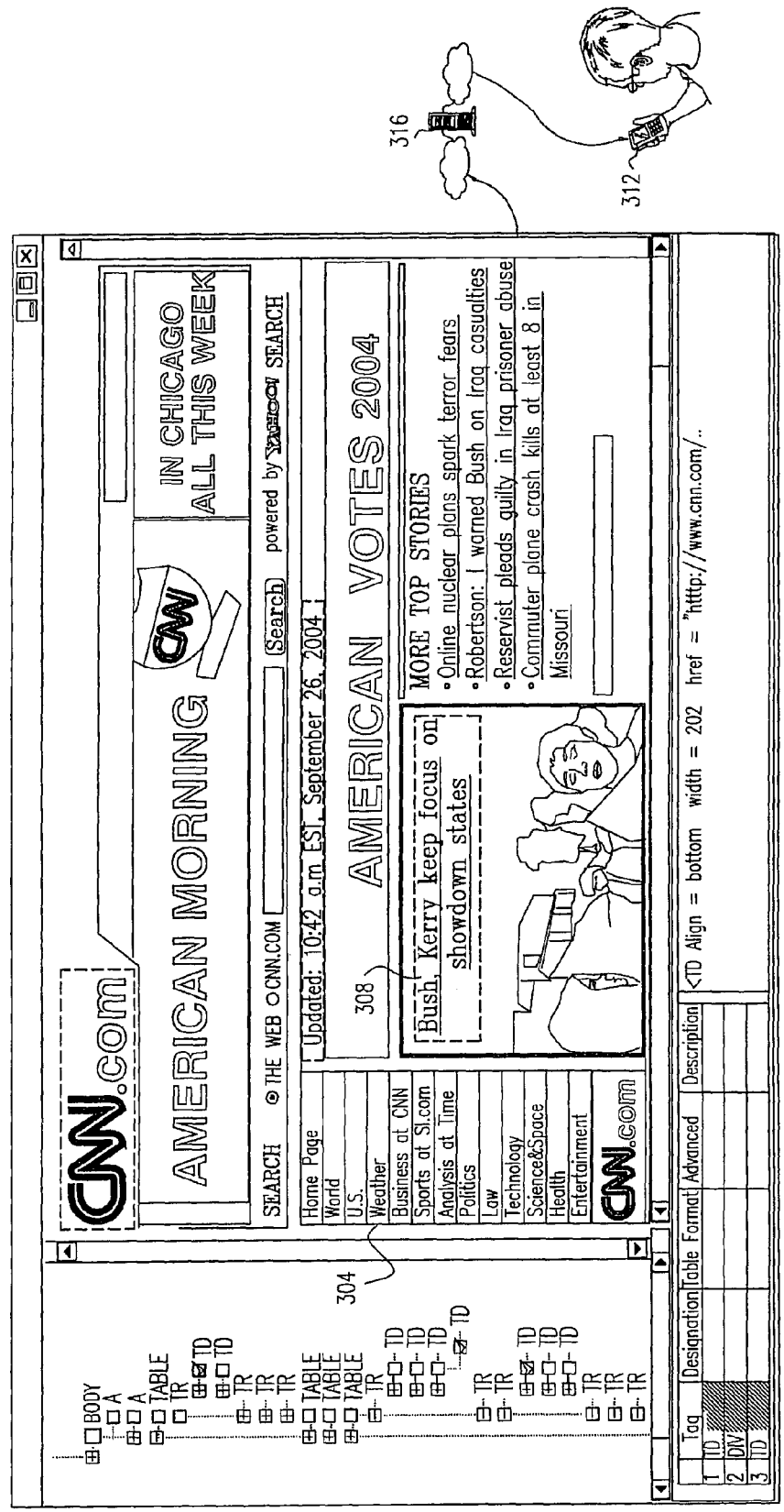
FIGS. 19A and 19B are simplified pictorial illustrations of two web pages having structural similarities but significant differences therebetween, adapted for display on a mobile communicator display screen in accordance with matching algorithms constructed and operative in accordance with a preferred embodiment of the present invention.
Figure 19B:
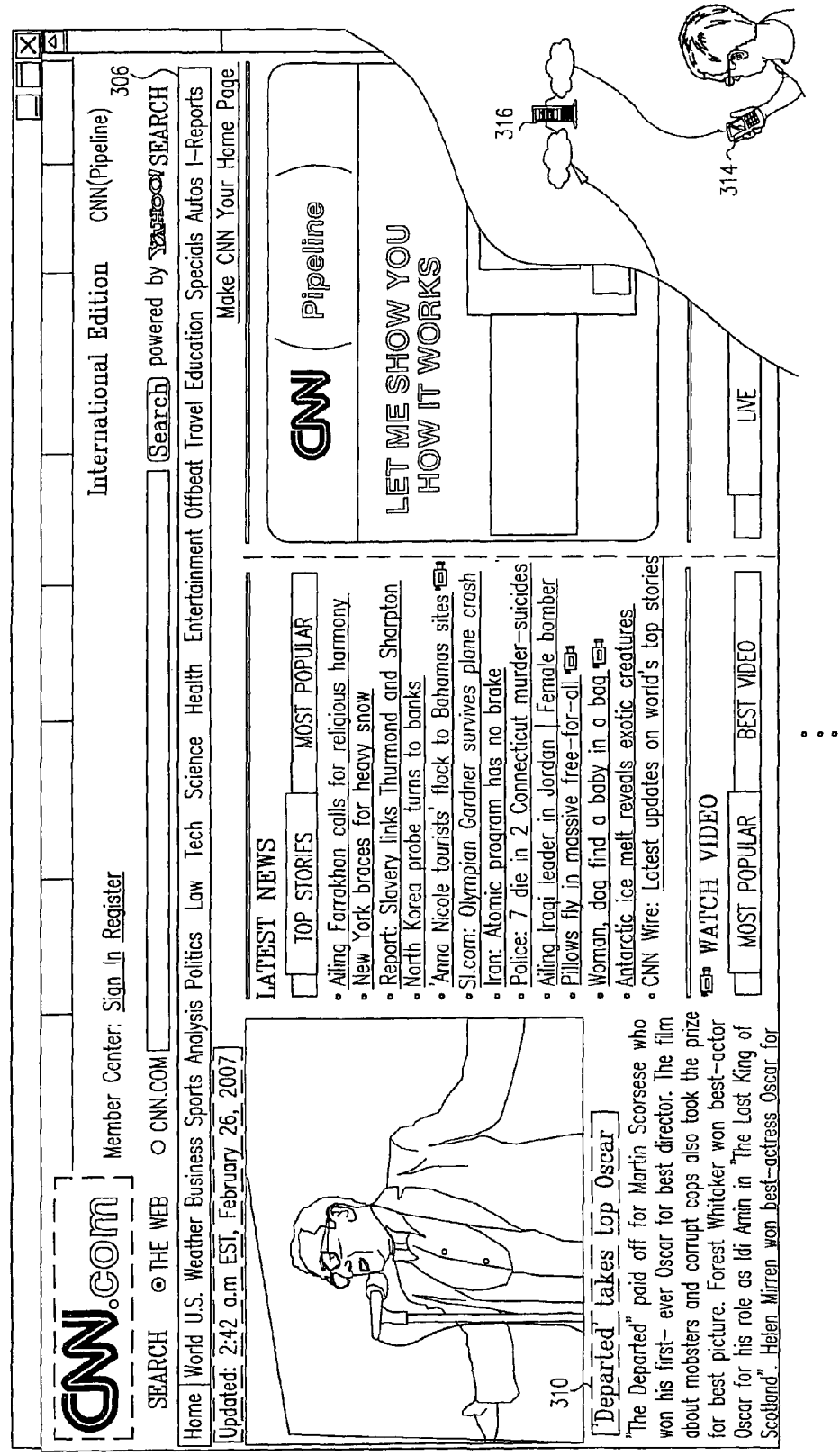

FIGS. 19A and 19B show two web pages, respectively designated by reference numerals 300 and 302, having structural similarities but significant differences between them. It is seen that in both web pages 300 and 302, the CNN logo remains generally in the same place. In contrast to the foregoing, the navbar 304 of web page 300 appears at the left portion of the page 300, while the navbar 306 in web page 302 appears at the top of the web page. Additionally, the page top title 308 in web page 300 appears in the lower center portion of the page 300, while the page top title 310 in web page 302 appears at the middle of the left most portion of the web page. Notwithstanding these differences, the matching algorithm of the present invention is operative to identify both page top titles 308 and 310 as page top titles for the purpose of creation of web pages for mobile communicators.

As seen in FIGS. 19A and 19B, users request respective web pages 300 and 302 from mobile communicators, respectively designated by reference numerals 312 and 314. The requests are provided to a server 316, which is operative to adapt the requested web pages 300 and 302 for display on the mobile communicators 312 and 314.

Figure 20B:
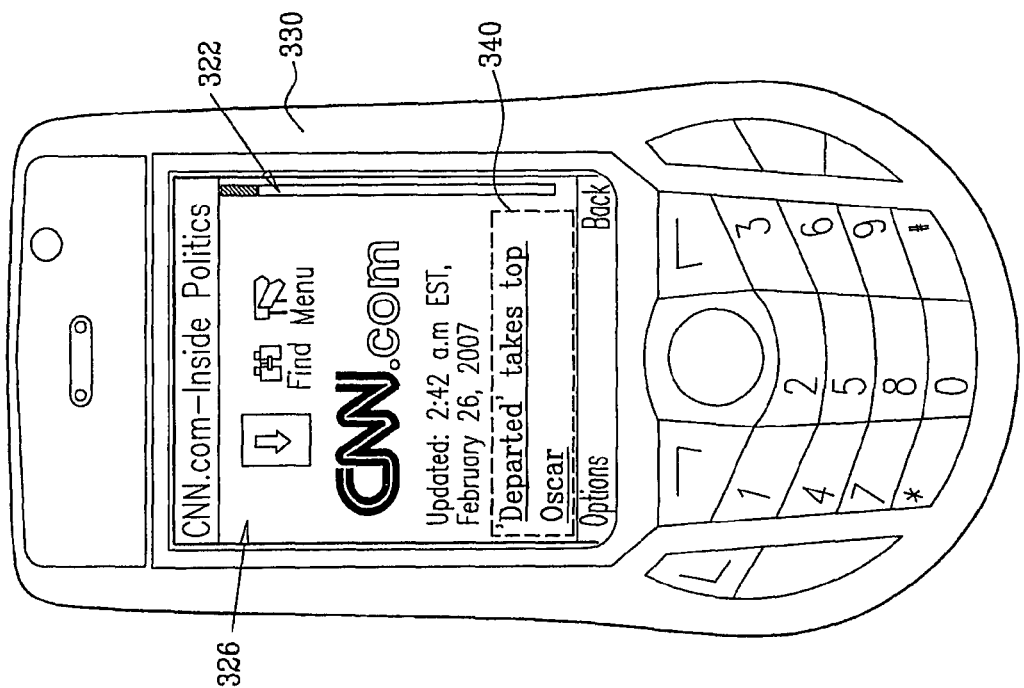
FIGS. 20A and 20B are simplified pictorial illustrations of display screens of mobile communicators showing the web pages of FIGS. 19A and 19B as adapted for display on a mobile communicator display screen.
Figure 20A:
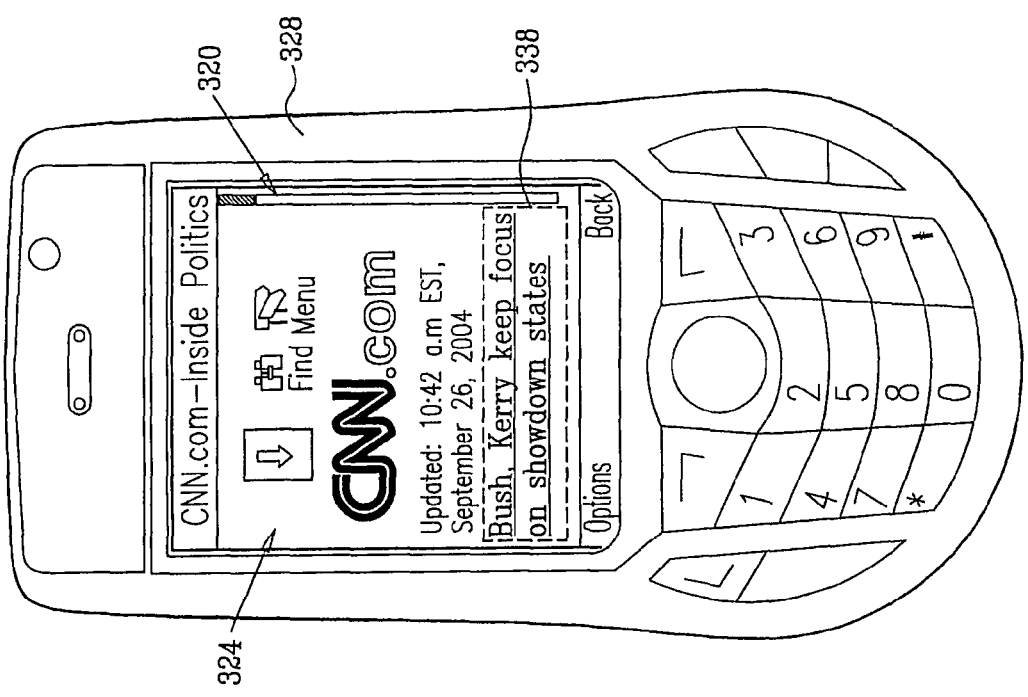

FIGS. 20A and 20B show two adapted web pages, respectively designated by reference numerals 320 and 322, appearing on corresponding display screens 324 and 326 of respective mobile communicators 328 and 330. These web pages correspond respectively to web pages 300 and 302 shown in FIGS. 19A and 19B, respectively. It is seen that notwithstanding the difference in position of the page top titles 308 and 310 in web pages 300 and 302 respectively, the corresponding page top titles 338 and 340 on web pages 320 and 322 are both located in their correctly prioritized locations.

In accordance with a preferred embodiment of the present invention, there is provided a method and system for displaying web content on a mobile communicator enabling the following functionality:

requesting a web page by a user;

in response to a user request, downloading the web page to a server;

searching for at least one template for the web page on a database of the server;

if a template is found for the web page, effecting best matching between the template and a plurality of information bearing regions on the web page; and importing the plurality of information bearing regions to at least one mobile communicator adapted page.

Preferably, the template includes matching assist instructions.

Figure 21:
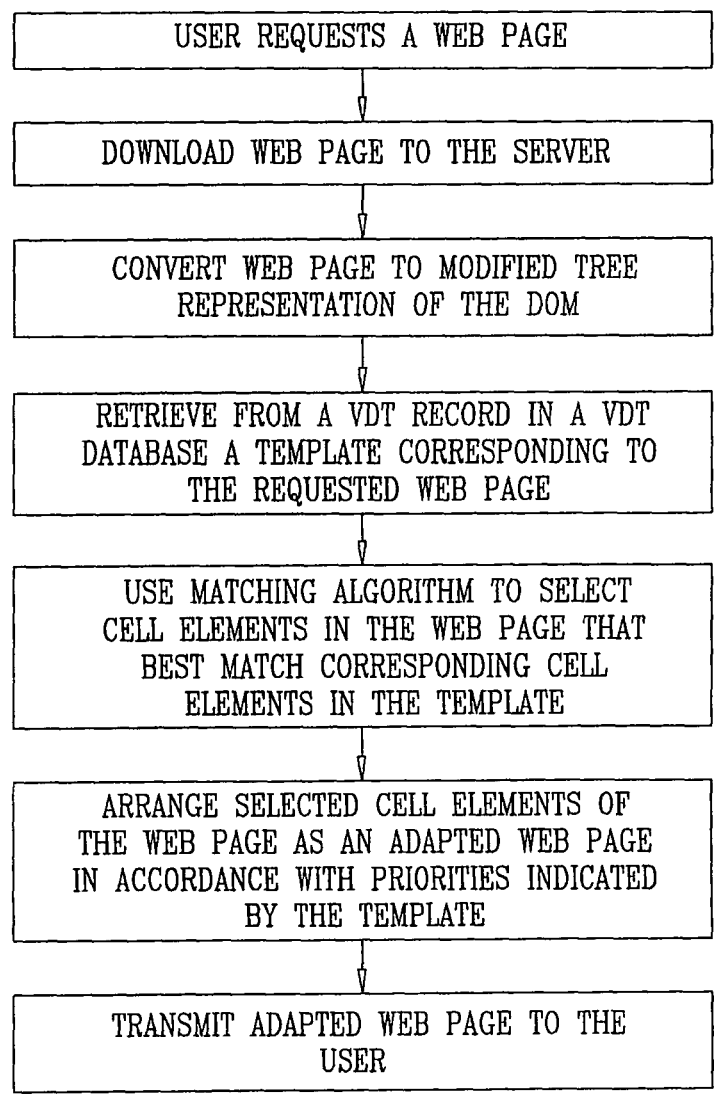
FIG. 21 is a simplified generalized flowchart illustrating the operation of the matching algorithm having the functionality illustrated in FIGS. 19A-20B.

Reference is now made to FIG. 21, which is a generalized flowchart illustrating the operation of the matching algorithms having the functionality illustrated in FIGS. 19A to 20B.

It is appreciated that the following terms will have the definitions provided herein below throughout the description of the matching algorithm, and generally throughout the specification and claims.

'element'—an HTML tag, or a node representing this tag in the tree representation of the DOM;

'element name'—the name of an HTML tag associated with an element;

'box element'—an HTML element of one of the following types: <body>, <table>, <tr>, <th>, <td>, <div>, <form> and <span>;

'end element'—any HTML element which is not a box element;

'boxed tree'—a tree representation of the DOM in which only box elements are considered;

'element path'—a sequence of numbers indicating the location of an element within a tree representation of a DOM relative to a given root node. Starting with the root node, the first number in the element path represents the ordinal number of the child element that should be selected when traversing the tree to find the element, the second number represents the ordinal number of the child element relative to the previous element that should be selected and so forth, such that the last number locates the element. In accordance with this definition, the length of the element path corresponds to the depth of the element relative to the given root node;

'element closest box'—the closest box element to an element. For box elements, this is the element itself. For end elements, the closest box element is the box element relative to which the end element has the lowest depth;

'full tree traversal mode'—traversal of the tree representation of the DOM from root to leaves in which all the elements are considered.

'boxed tree traversal mode'—traversal of the tree representation of the DOM from root to leaves in which only box elements are considered, and end elements are ignored. The end elements are also ignored in the definition of the element path for the boxed tree.

Turning now to FIG. 21, it is seen that a user requests a web page via a server, such as server 201 (FIG. 11). The web page is downloaded via the Internet to the server and converted by the server to a tree representation of the DOM. The server retrieves from a VDT record in a VDT database a template corresponding to the requested web page.

A matching algorithm, described in more detail hereinbelow with reference to FIGS. 22A-24E, is used to select cell elements in the requested web page that best match corresponding cell elements in the template. The cell elements of the web page found by the matching element are then arranged by the server as an adapted web page, in accordance with the priority indicated by the template. If so indicated in the template, content is added to or removed from the elements, or repetitive structures are used for adapting the elements. The adapted web page is then transmitted by the server to the user.

Reference is now made to FIGS. 22A-24E, which are detailed flow charts of three phases of the matching algorithm of FIG. 21. FIGS. 22A, 22B, 22C, 22D and 22E together are a simplified flow chart of a first phase of the matching algorithm, in which elements are matched based on their element path. FIGS. 23A, 23B, 23C, 23D, 23E, 23F and 23G together are a simplified flow chart of a second phase of the matching algorithm, which is reached if the first phase was unsuccessful, and in which elements are matched based on a search of elements surrounding the element found by following the element path. FIGS. 24A, 24B, 24C, 24D and 24E together are a simplified flow chart of a third phase of the matching algorithm, which is reached if the second phase was unsuccessful, in which elements are matched by searching the entire tree representation of the DOM.

Generally, each element in the web page is matched to an element in the template by selecting an element, locating the element closest box thereof, and matching thereto a box element from the web page. Once the element closest boxes are matched, the algorithm proceeds to match the element of the template to an element within the matched box element of the web page.

Figure 22A:
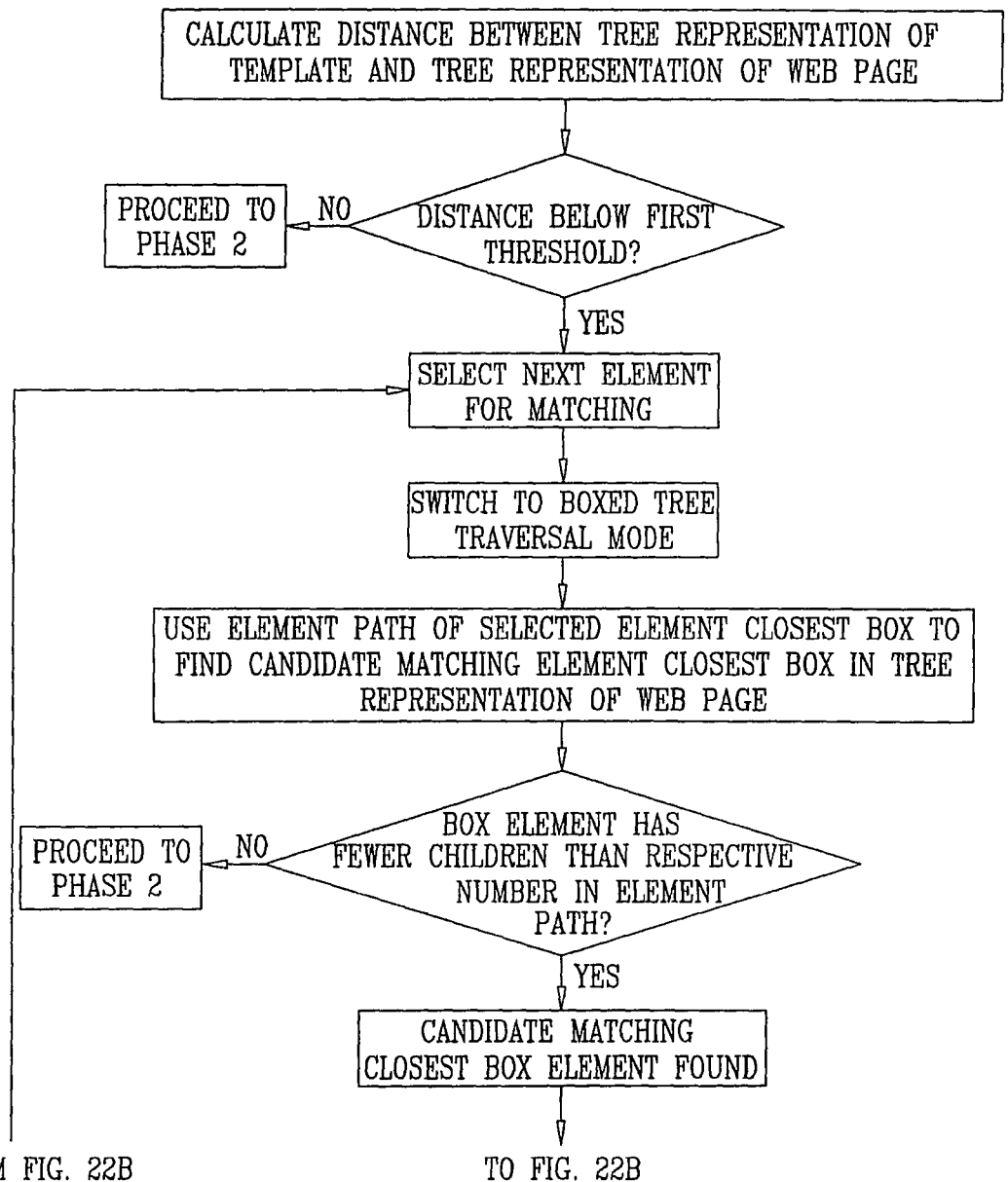
Figure 25:
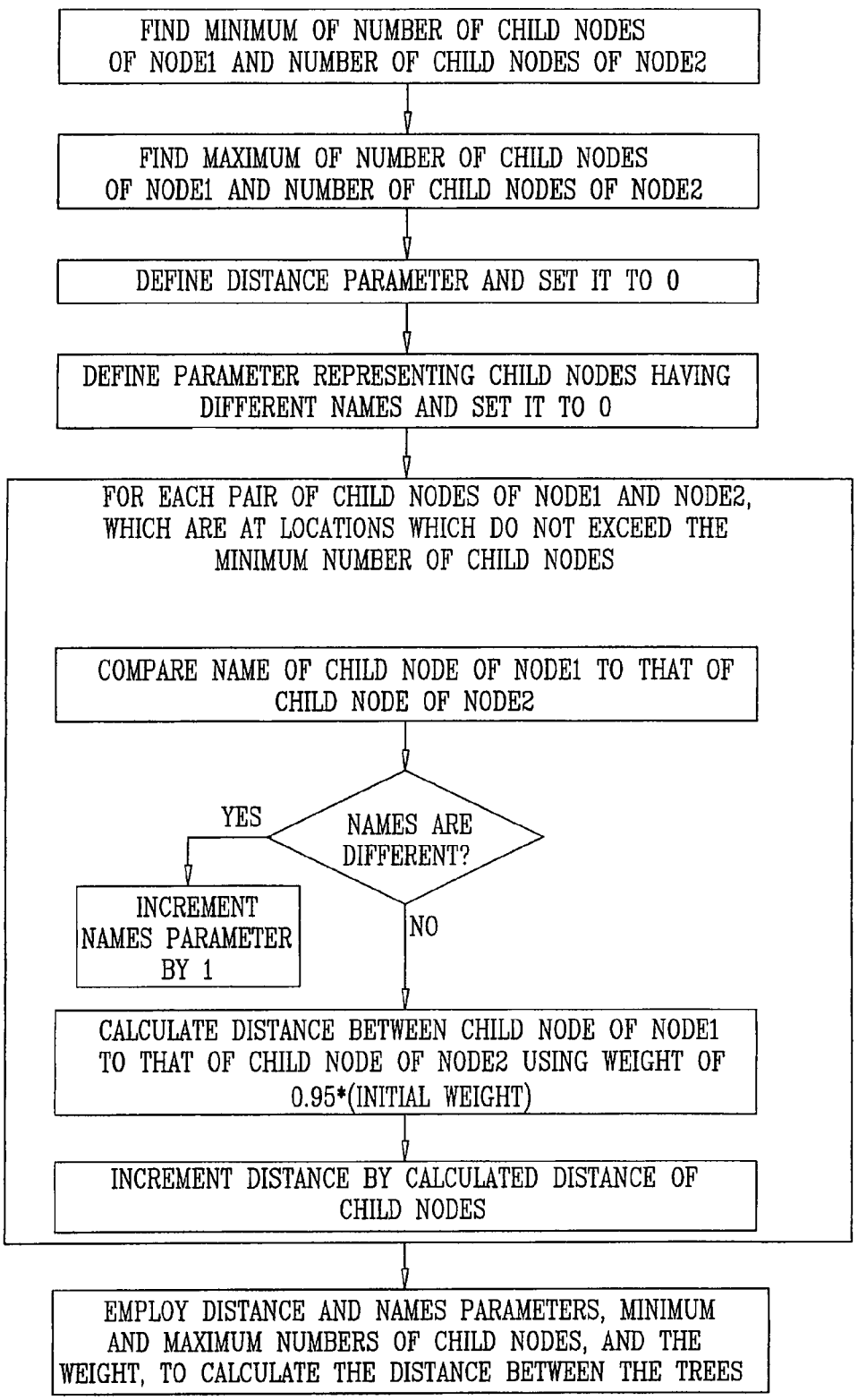
FIG. 25 is a simplified flow chart of a tree comparison algorithm used during operation of the matching algorithm of FIGS. 21-24E.

Turning specifically to FIG. 22A, it is seen that at a first stage, a tree comparison algorithm, described in detail hereinbelow with reference to FIG. 25, is employed to calculate the distance between the tree representation of the web page and the tree representation of the template. If the calculated distance is above a first predetermined threshold, typically 0.1, the matching algorithm proceeds to the second phase thereof, which is described hereinbelow with reference to FIGS. 23A-23G.

If the calculated distance is below the first threshold, the algorithm is iteratively carried out for each element in the template. Initially, the boxed tree traversal mode is employed. The element path to the selected element closest box in the template is used in order to locate a candidate matching element closest box in the tree representation of the web page. If, during the process of descending the tree in search of the candidate matching element closest box, a box element in the tree representation of the web page has fewer children than the respective number in the element path, the matching algorithm proceeds to the second phase thereof, which is described hereinbelow with reference to FIGS. 23A-23G. Otherwise, a candidate matching element closest box is found.

Turning now to FIG. 22B, it is seen that if, in the template, the information related to the selected element closest box includes information regarding ignoring all the element characteristics aside from the element name and its location in the tree, the name of the selected element closest box and of the candidate matching element closest box are compared. If the two names are identical, the matching element closest box has been found. Otherwise, there is no matching element for the selected element. In this case, if the selected element is indicated by the operator to be a mandatory element the matching algorithm terminates and the page is displayed in order without use of the VDT template. If the selected element is not a mandatory one, an attempt is made to match the next element.

If, in the template, no information was provided regarding ignoring element characteristics, or if the template includes an indication to ignore only some of the element characteristics, the distance between the candidate matching element closest box and the selected element closest box is calculated using a box element comparison algorithm, described hereinbelow with reference to FIG. 26. If the calculated distance is above a second predetermined threshold, typically 0.2, the matching algorithm proceeds to the second phase thereof, which is described hereinbelow with reference to FIGS. 23A-23G. Otherwise, the matching element closest box was found.

As seen in FIG. 22C, once the matching element closest box is found, the algorithm checks whether the selected element is a box element. If the selected element is a box element, the matching element is the matching element closest box found in the previous stage. If the selected element is not a box element, the algorithm matches the selected element with an end element within the matching element closest box, as described further hereinbelow.

Once a matching box element is found in the tree representation of the web page, the selected box element in the template is checked to see whether it includes an indication of added or removed content therein or of use of an instance of a basic structure repeated therein.

If the selected box element includes an indication that content should be added, the required content is found in the template, and the content is added following the node whose location is designated in the template.

Figure 22D:
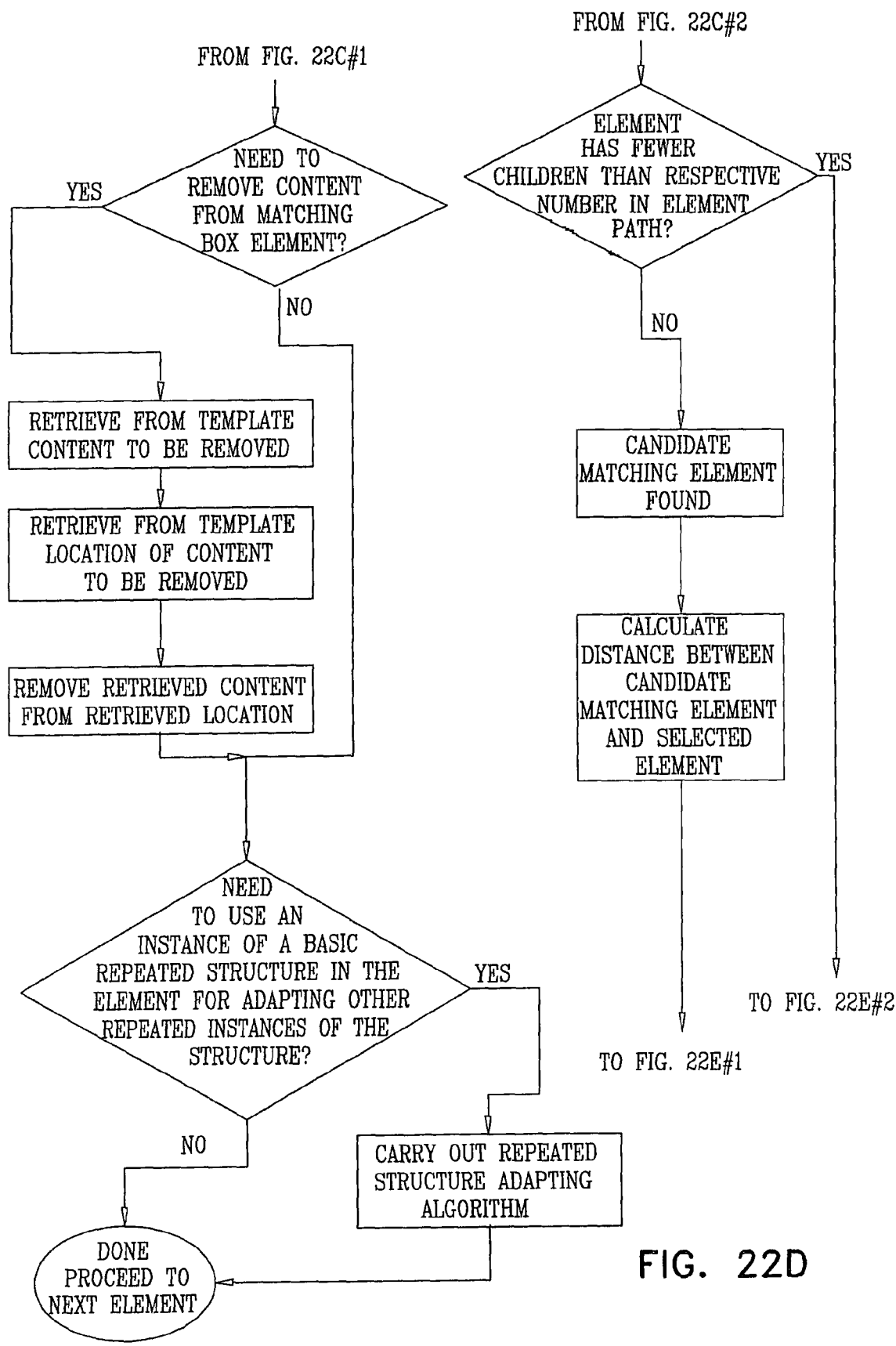

As seen in FIG. 22D, if the selected box element includes an indication that content should be removed therefrom, the required content is found in the template, and the content is removed from the location designated in the template.

If the selected box element includes an indication of use of an instance of a basic structure repeated therein for adapting other instances of the repeated structure, a repeated structure adapting algorithm, described hereinbelow with reference to FIGS. 28A-28E, is employed.

Returning to FIG. 22C, if, as mentioned above, the selected element is not a box element, the algorithm matches the selected element with an end element within the matching element closest box. In order match end elements, full tree traversal mode is employed. Using an element path of the selected element relative to its closest box element, a candidate matching element is located within the matching closest box element.

As seen in FIG. 22D, if, during the process of descending the sub tree of the matching element closest box in search of the candidate matching element, an element in the tree representation of the web page has fewer children than the respective number in the element path, the matching algorithm proceeds as described further hereinbelow with reference to FIG. 22E.

As seen in FIG. 22D, if, during the process of descending the sub tree of the matching element closest box in search of the candidate matching element, no element in the tree representation of the web page has fewer children than the respective number in the element path, the candidate matching element is found and the distance between the candidate matching element and the selected element is calculated using an end element comparison algorithm, described hereinbelow with reference to FIGS. 27A and 27B.

Figure 22E:
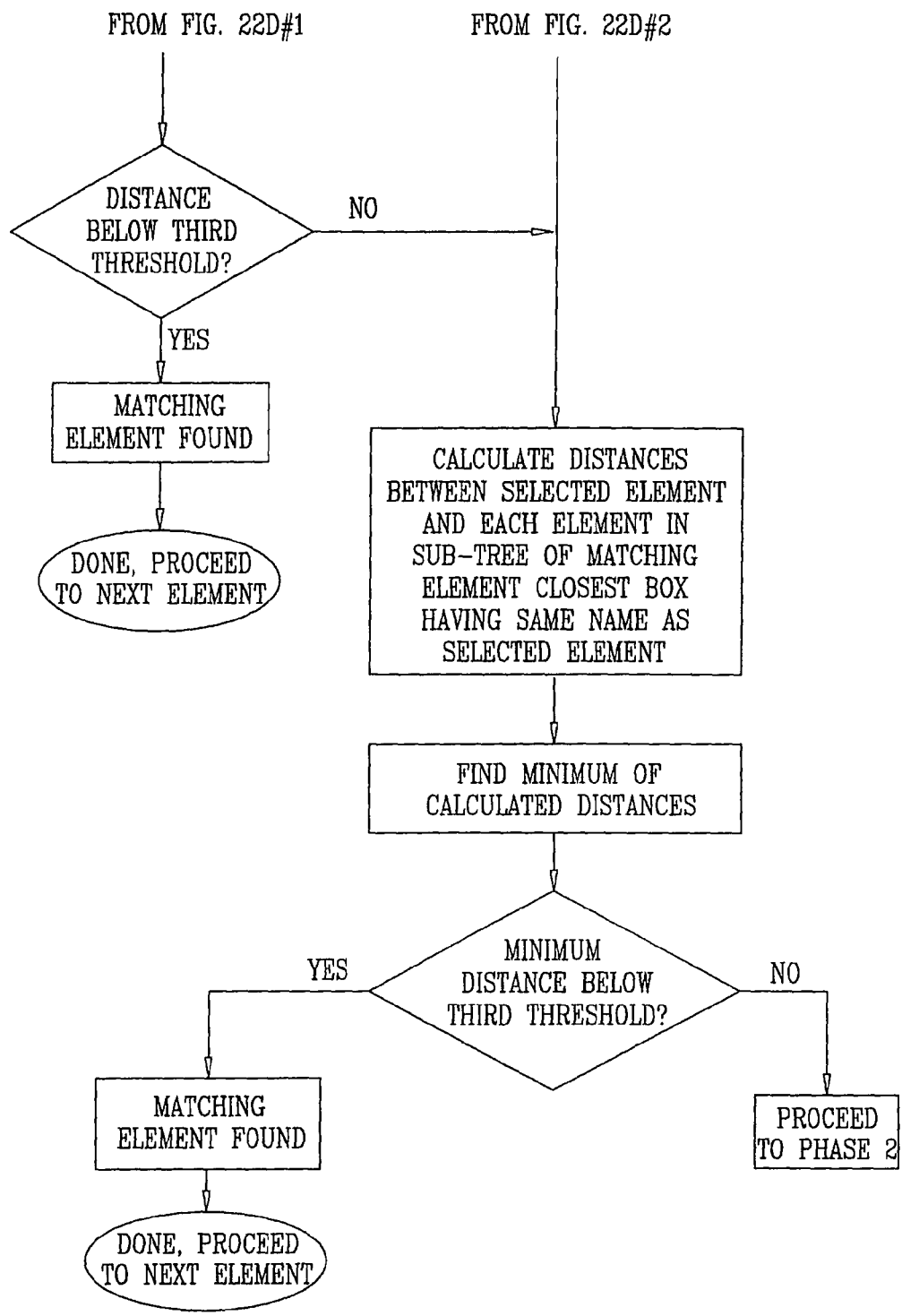

As seen in FIG. 22E, if the calculated distance is below a third predetermined threshold, the matching element is found, and the algorithm proceeds to match the next element.

If the calculated distance is above the third predetermined threshold, or alternatively, as described hereinabove, if during the process of descending the sub tree of the matching element closest box in search of the candidate matching element, an element in the tree representation of the web page has fewer children than the respective number in the element path, the algorithm finds the minimum of the distances between the selected end element and any element within the sub-tree of the matching element closest box having the same name as the selected element.

The distances are calculated using the end element comparison algorithm, described hereinbelow with reference to FIGS. 27A and 27B. If the minimum distance is below the third predetermined threshold, the matching element is found, and the algorithm proceeds to match the next element. If the minimum distance is not below the third predetermined threshold, the matching algorithm proceeds to the second phase thereof, which is described hereinbelow with reference to FIGS. 23A-23G.

Reference is now made to FIGS. 23A, 23B, 23C, 23D, 23E, 23F and 23G, which together are a simplified flow chart of a second phase of the matching algorithm, which is reached if the first phase was unsuccessful, and in which elements are matched based on a search of elements surrounding the element found based on the element path.

Figure 23A:
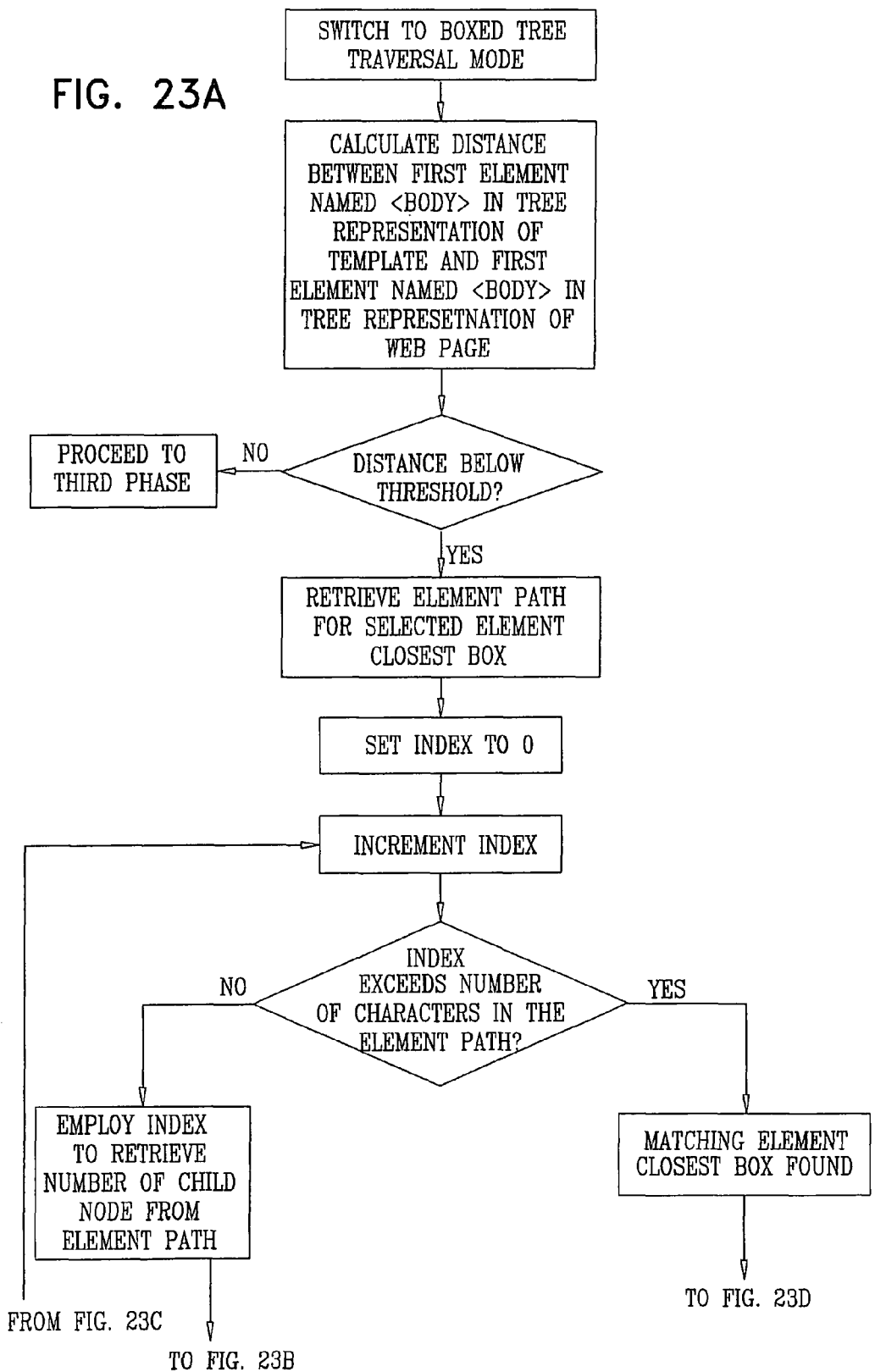

As seen in FIG. 23A, this phase of the matching algorithm starts by employing boxed tree traversal mode. The distance between the first element named <body> in the tree representation of the template and the first element named <body> in the tree representation of the web page is calculated, using the box element comparison algorithm, described hereinbelow with reference to FIGS. 26A-26C. If the calculated distance is above a first predetermined threshold, the matching algorithm proceeds to the third phase thereof, which is described hereinbelow with reference to FIGS. 24A-24E.

If the calculated distance is below the first predetermined threshold, the element path of the selected element closest box is retrieved, and an index is defined and set to 0. The index indicates the location of the algorithm within the element path, and accessing the index provides the character located at the indicated location in the element path. The following stages are performed in a loop.

The index is incremented. If the index, exceeds the number of characters in the element path, the matching element closest box is found and is the box element found by following the element path in the tree representation of the web page. The algorithm then proceeds as described hereinbelow with reference to FIG. 23D.

If the index does not exceed the number of characters in the element path, the number of the child node, as indicated by the character of the element path to which the index is currently directed, is retrieved. Next, as seen in FIG. 23B, if the current element in the tree representation of the web page has a child node of the number retrieved from the element path, the box element having the number indicated by the element path is retrieved from the tree representation of the template and from the tree representation of the web page. The distance between the retrieved template box element and web page box element is calculated using the box element comparison algorithm, described hereinbelow with reference to FIGS. 26A-26C. If the calculated distance is below a second predetermined threshold, the index is incremented and the loop repeats itself for the next index.

If the calculated distance is above the second predetermined threshold, or alternatively if the child number retrieved from the element path is greater than the number of children nodes of the element in the tree representation of the web page, a more complete search is conducted in the tree representation of the web page. In this search, the distance of the element in the template tree located at the current location in the path from each of the elements which are at the same depth of the tree as the current element, and which share the same immediate root node (sibling nodes of the element) is calculated.

Figure 23C:
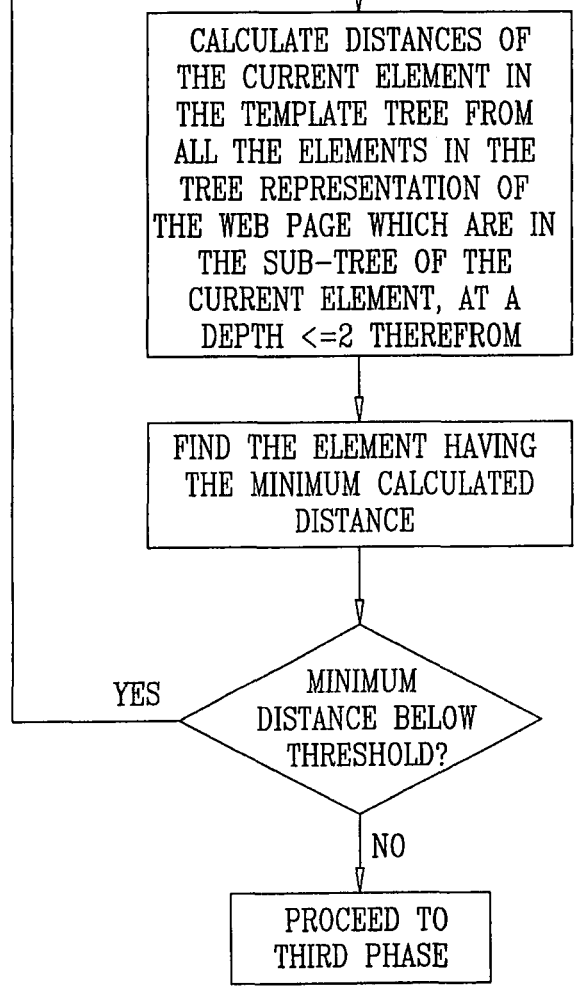

Additionally, as seen in FIG. 23C, the distance of the element in the template tree located at the current location in the path from each of the elements in a sub-tree of the current element which are within a predetermined depth therefrom, typically depth 2, is calculated. The minimum distance of all the distances is found, and if it is lower than the second predetermined threshold, the index is incremented and the loop repeats itself for the next index. Otherwise, the matching algorithm proceeds to the third phase thereof, which is described hereinbelow with reference to FIG. 24A-24E. Once the loop terminates, the matching element closest box is found.

Figure 23D:
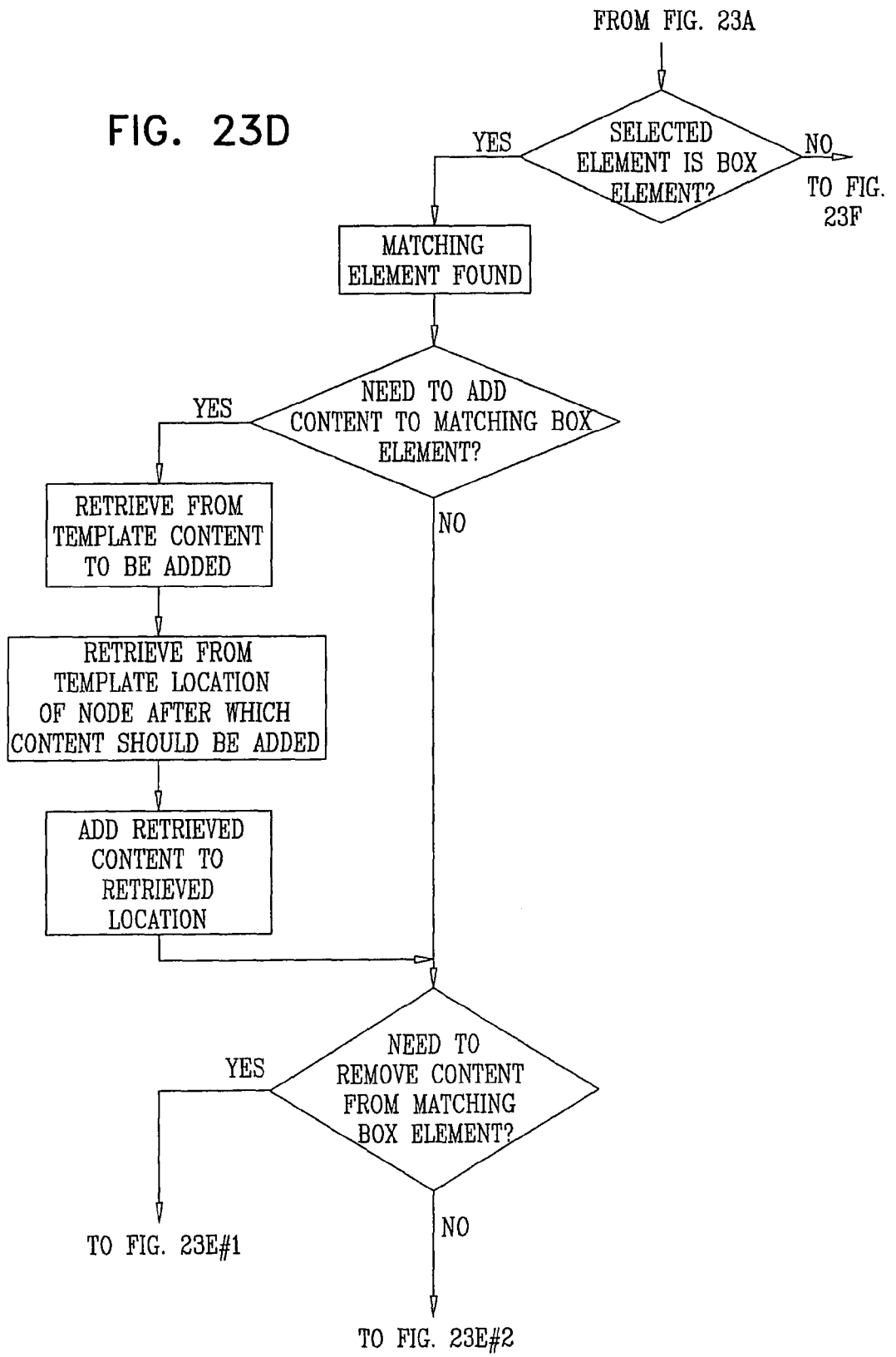

As seen in FIG. 23D, once the matching element closest box is found, the algorithm checks whether the selected element is a box element. If the selected element is a box element, the matching element is the matching element closest box found in the previous stage. If the selected element is not a box element, the algorithm matches the selected element with an end element within the matching element closest box, as described hereinbelow with reference to FIGS. 23F and 23G.

Once a matching box element is found in the tree representation of the web page, the selected box element in the template is checked to see whether it includes an indication of added or removed content therein, or of use of an instance of a basic structure repeated therein for adapting other instances of the repeated structure.

If the selected box element includes an indication that content should be added, the required content is found in the template, and the content is added following the node whose location is designated in the template.

Figure 23E:
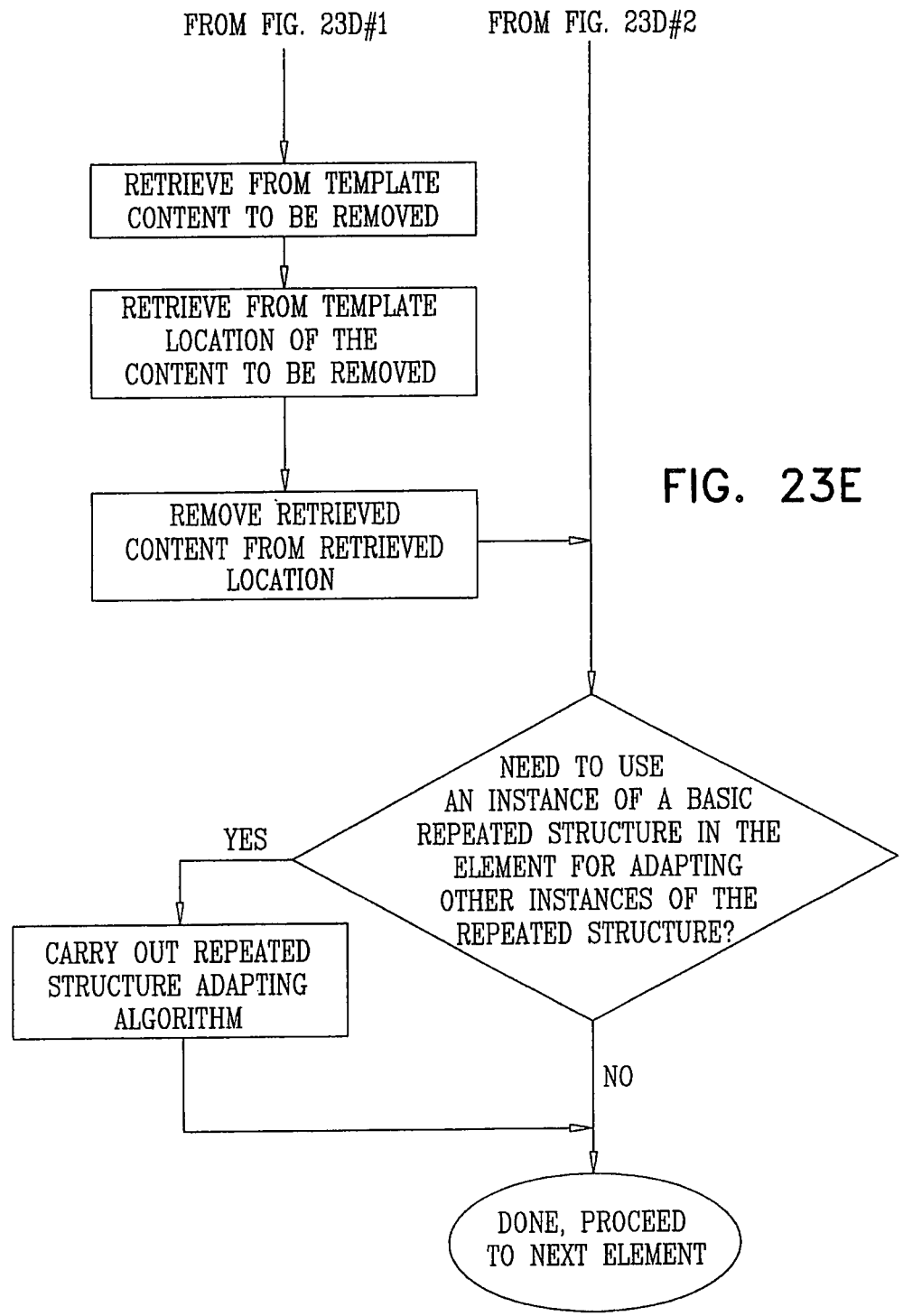

As seen in FIG. 23E, if the selected box element includes an indication that content should be removed therefrom, the required content is found in the template, and the content is removed from the location designated in the template.

If the selected box element includes an indication of use of an instance of a basic structure repeated therein for adapting other instances of the repeated structure, a repeated structure adapting algorithm, described hereinbelow with reference to FIGS. 28A-28E, is employed.

As mentioned hereinabove with reference to FIG. 23D, if the selected element is not a box element, the algorithm matches the selected element with an end element within the matching element closest box. As seen in FIG. 23F, in order to match end elements, full tree traversal mode is employed. Using an element path of the selected element relative to its closest box element, a candidate matching element is located within the matching element closest box.

As seen in FIG. 23F, if, during the process of descending the sub tree of the matching closest box element in search of the candidate matching element, an element in the tree representation of the web page has fewer children than the respective number in the element path, the matching algorithm proceeds as described further hereinbelow.

As seen in FIG. 23F, if, during the process of descending the sub tree of the matching closest box element in search of the candidate matching element, no element in the tree representation of the web page has fewer children than the respective number in the element path, the candidate matching element is found, and the distance between the candidate matching element and the selected element is calculated using an end element comparison algorithm, described hereinbelow with reference to FIGS. 27A and 27B. If the calculated distance is below a third predetermined threshold, the matching element is found, and the algorithm proceeds to match the next element.

If the calculated distance is above the third threshold, or alternatively, as described hereinabove, if during the process of descending the sub tree of the matching closest box element in search of the candidate matching element, an element in the tree representation of the web page has fewer children than the respective number in the element path, the algorithm finds the minimum of the distances between the selected end element and any element within the sub-tree of the matching closest element box having the same name as the selected element. The distances are calculated using the end element comparison algorithm, described hereinbelow with reference to FIGS. 27A and 27B.

Figure 23G:
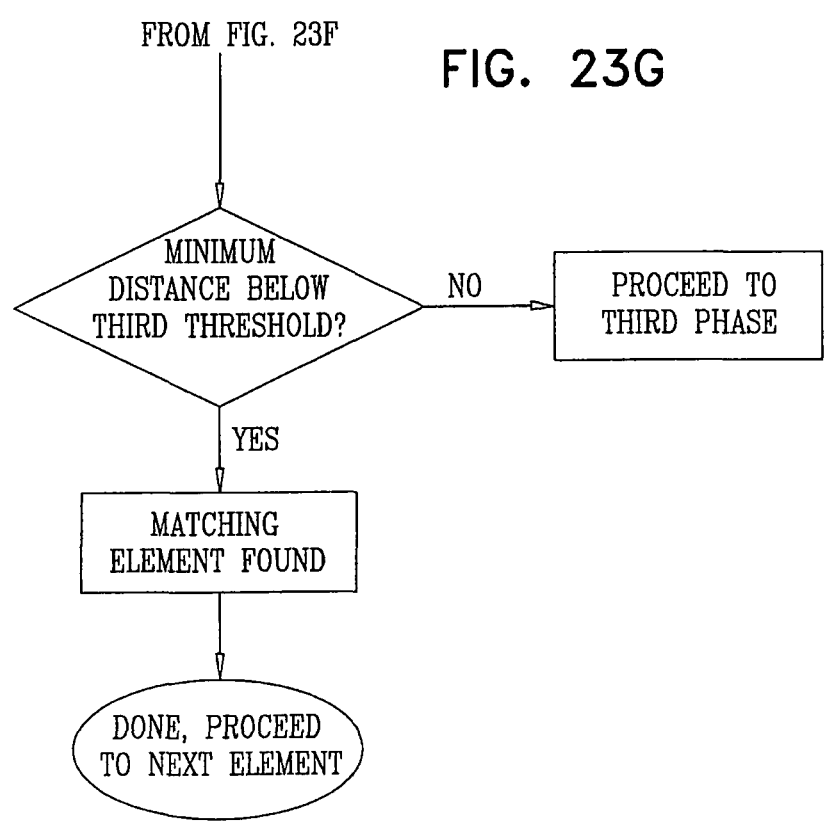

As seen in FIG. 23G, if the minimum distance is below the third predetermined threshold, the matching element is found, and the algorithm proceeds to match the next element. If the minimum distance is not below the third predetermined threshold, the matching algorithm proceeds to the third phase thereof, which is described hereinbelow with reference to FIG. 24A-24E.

Reference is now made to FIGS. 24A, 24B, 24C, 24D and 24E, which together are a simplified flow chart of a third phase of the matching algorithm, which is reached if the second phase was unsuccessful, and in which elements are matched by searching the entire tree representation of the DOM.

Figure 24A:
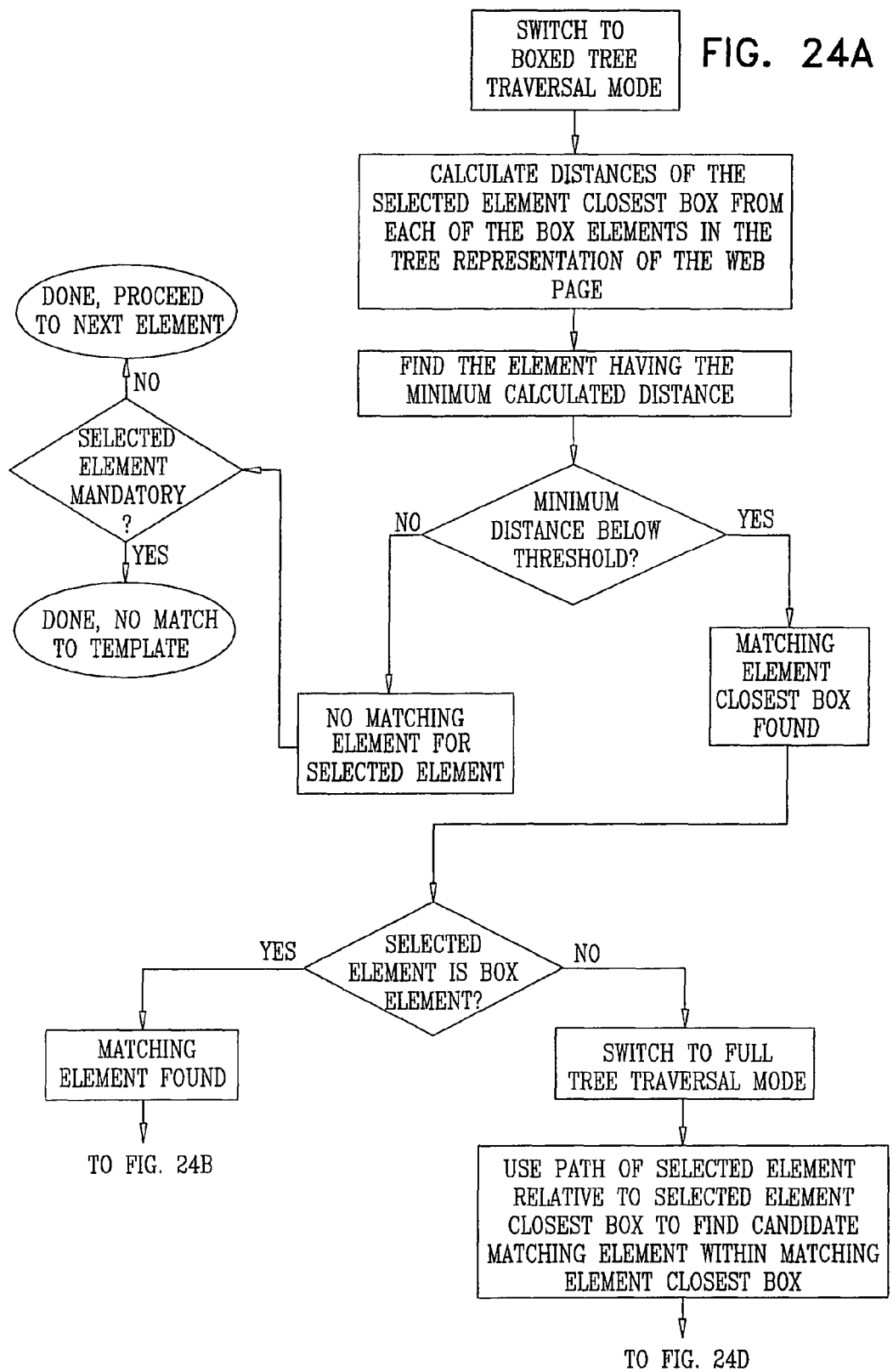

As seen in FIG. 24A, this phase of the matching algorithm starts by employing boxed tree traversal mode. In order to find a candidate matching element closest box, the distance between each of the box elements in the tree representation of the DOM and the selected element closest box is calculated, using the box element comparison algorithm, described hereinbelow with reference to FIGS. 26A-26C. The element having the minimum of all the distances is found, and is considered to be the candidate matching element closest box. If the minimum distance is lower than a predetermined threshold, the matching element closest box is found and the algorithm proceeds as described further hereinbelow.

If the minimum distance is not lower than a first predetermined threshold, there is no matching element for the selected element. If the selected element is indicated by the operator to be a mandatory element the matching algorithm terminates and the page is displayed in order without use of the VDT template. If the selected element is not mandatory, the algorithm proceeds to process the next element.

As described hereinabove, if the minimum distance is lower than a first predetermined threshold, the matching element closest box is found and the algorithm checks whether the selected element is a box element. If the selected element is a box element, the matching element is the matching element closest box found in the previous stage. If the selected element is not a box element, the algorithm matches the selected element with an end element within the matching element closest box as described hereinbelow with reference to FIGS. 24D and 24E.

Figure 24B:
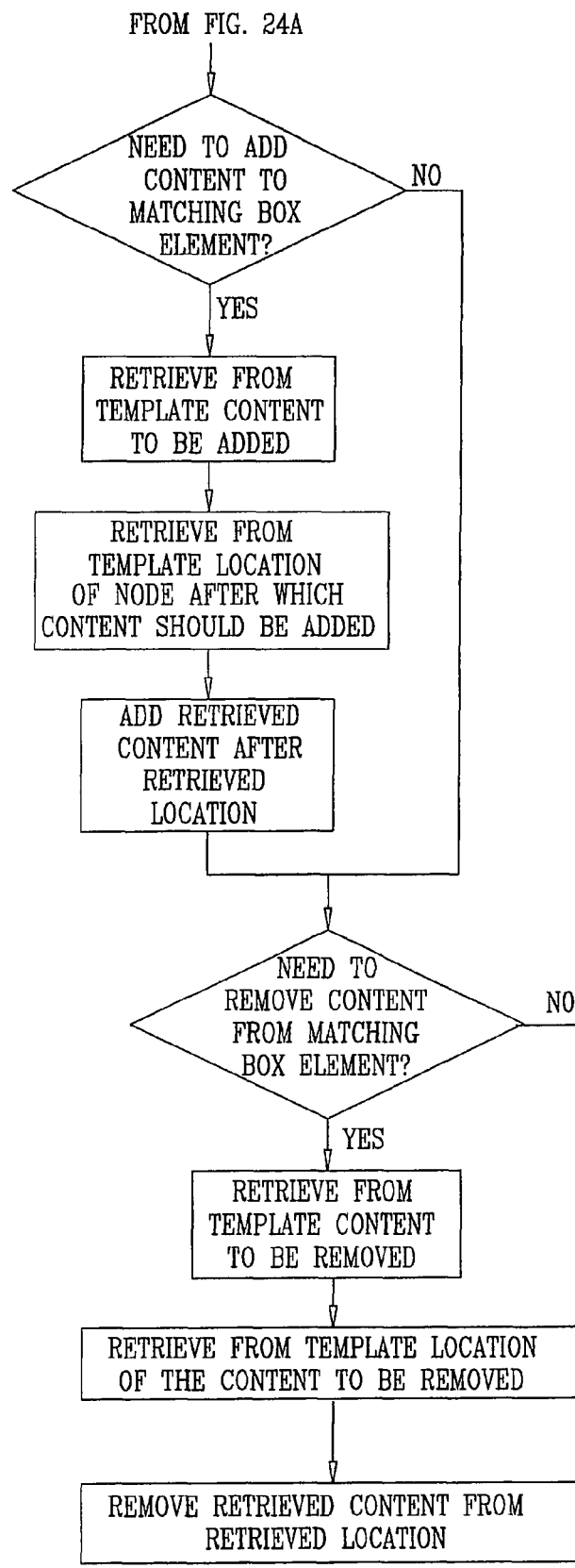

Turning to FIG. 24B, it is seen that once a matching box element is found in the tree representation of the web page, the selected box element in the template is checked to see whether it includes an indication of added or removed content therein, or of use of an instance of a basic structure repeated therein for adapting other instances of the repeated structure.

If the selected box element includes an indication that content should be added, the required content is found in the template, and the content is added following the node whose location is designated in the template.

If the selected box element includes an indication that content should be removed therefrom, the required content is found in the template, and the content is removed from the location designated in the template.

Figure 24C:
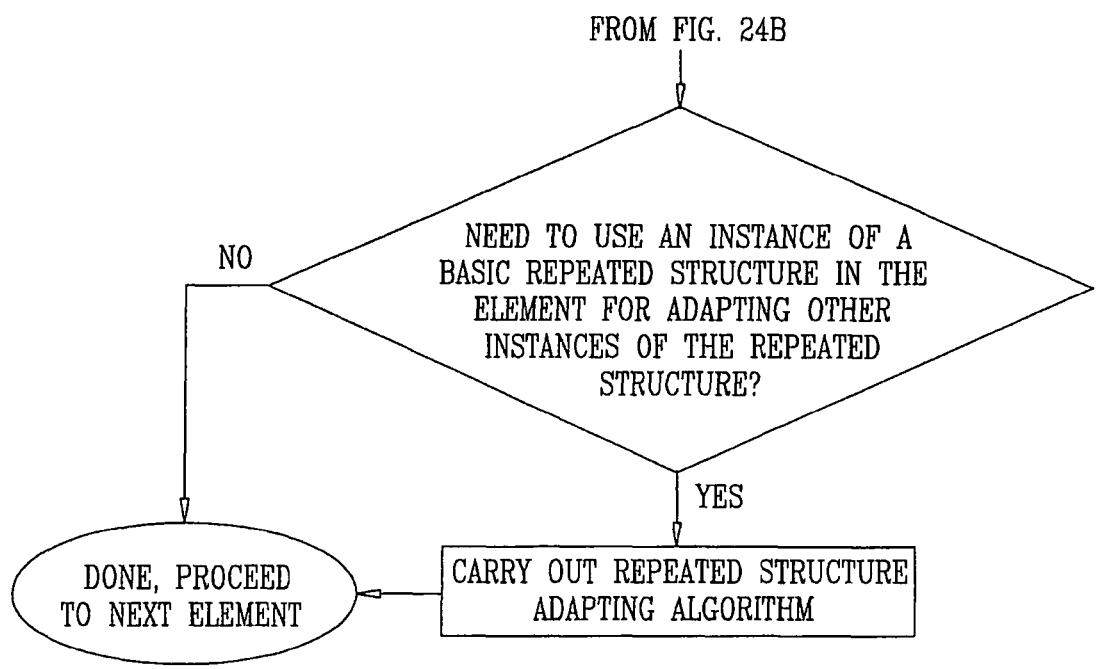

As seen in FIG. 24C, if the selected box element includes an indication of use of an instance of a basic structure repeated therein for adapting other instances of the repeated structure, a repeated structure adapting algorithm, described hereinbelow with reference to FIGS. 28A-28E, is employed.

As mentioned hereinabove with reference to FIG. 24A, if the selected element is not a box element, the algorithm matches the selected element with an end element within the matching element closest box.

As seen in FIG. 24A, in order to match end elements, full tree traversal mode is employed. Using an element path of the selected element relative to its closest box element, a candidate matching element is located within the matching closest box element.

Figure 24D:
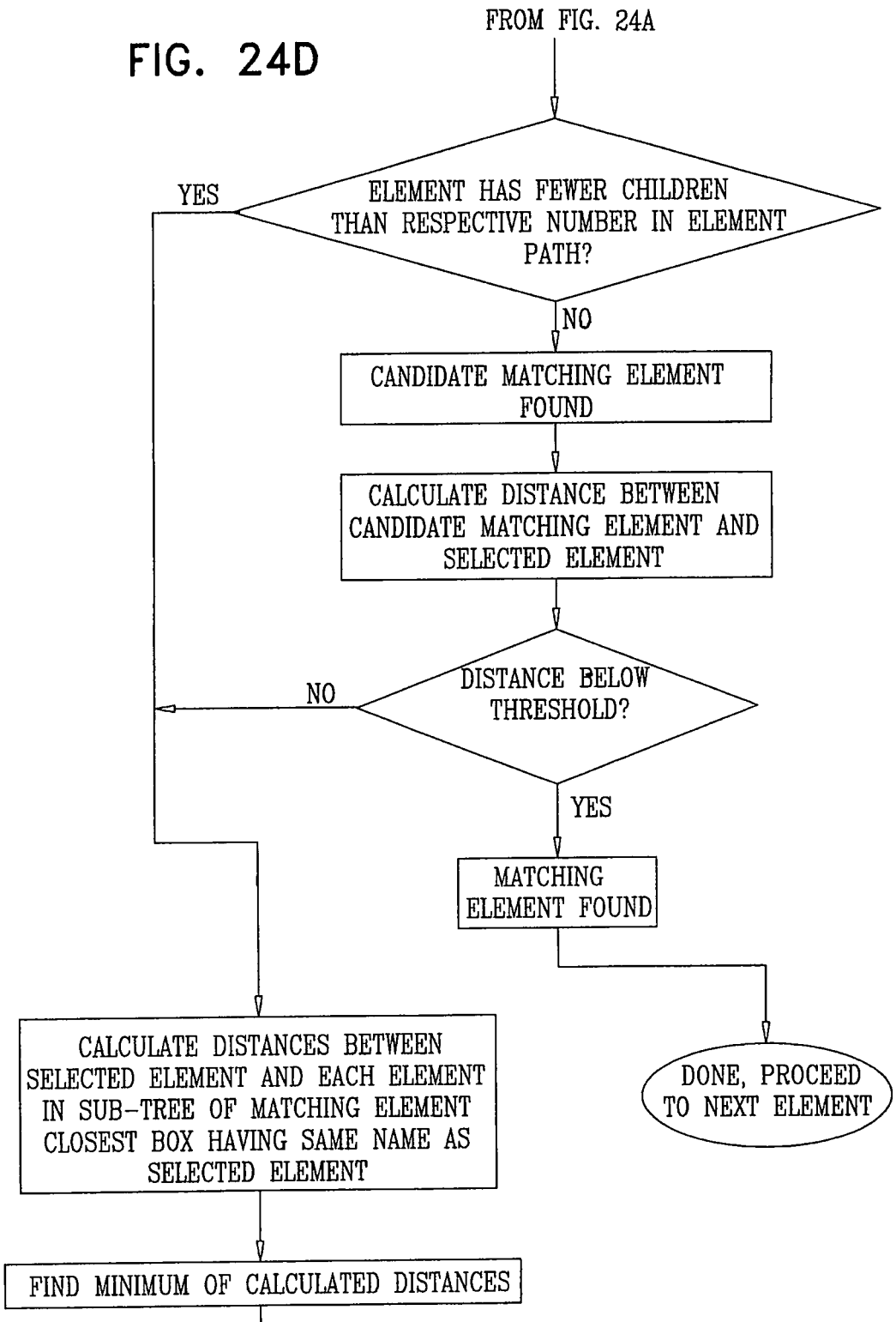

As seen in FIG. 24D, if, during the process of descending the sub tree of the matching closest box element in search of the candidate matching element, an element in the tree representation of the web page has fewer children than the respective number in the element path, the matching algorithm proceeds as described further hereinbelow.

As seen in FIG. 24D, if, during the process of descending the sub tree of the matching closest box element in search of the candidate matching element, no element in the tree representation of the web page has fewer children than the respective number in the element path, the candidate matching element is found, and the distance between the candidate matching element and the selected element is calculated using an end element comparison algorithm, described hereinbelow with reference to FIGS. 27A and 27B. If the calculated distance is below a third predetermined threshold, the matching element is found, and the algorithm proceeds to match the next element.

If the calculated distance is above the third threshold, or alternatively, as described hereinabove, if during the process of descending the sub tree of the matching closest box element in search of the candidate matching element, an element in the tree representation of the web page has fewer children than the respective number in the element path, the algorithm finds the minimum of the distances between the selected end element and any element within the sub-tree of the matching closest element box having the same name as the selected element. The distances are calculated using the end element comparison algorithm, described hereinbelow with reference to FIGS. 27A and 27B.

As seen in FIG. 24E, if the minimum distance is below the third predetermined threshold, the matching element is found, and the algorithm proceeds to match the next element. If the minimum distance is not below the third predetermined threshold, there is no matching element for the selected element. If the selected element is indicated by the operator to be a mandatory element the matching algorithm terminates and the page is displayed in order without use of the VDT template. If the selected element is not mandatory, the algorithm proceeds to process the next element.

Reference is now made to FIG. 25, which is a simplified flow chart of a tree comparison algorithm used during operation of the matching algorithm of FIGS. 21-24E. In the tree comparison algorithm, a distance is measured between a first root node of a first tree, hereinafter termed node1, and a second root node of a second tree, hereinafter termed node2. In general terms, the distance of a pair of trees is calculated recursively, by calculating the distances of the sub-trees thereof, and combining the results, based on a weight function which may be determined by the user or configured by the operator.

As seen in FIG. 25, the minimum of the number of child nodes of node1 and the number of child nodes of node2 is found. Additionally, the maximum of the number of child nodes of node1 and the number of child nodes of node2 is found. Parameters representing the distance and the number of child nodes having different names in the two trees, referred to hereinbelow as 'names parameter', are initially set to 0.

For each of the child nodes of the parent nodes, such that the minimum number of child nodes is not exceeded, the name of the child node of node1 located at a given location is compared to the name of the child node of node2 which is at the same location. If the names are not the same, the names parameter is incremented by 1.

If the nodes have the same name, the distance parameter is incremented by the distance of the two child nodes whose names were compared, such that the weight function is multiplied by a fraction, typically 0.95.

The distance between the two trees is then considered to be a function of the distance and names parameters, the assigned weight, and the maximum and minimum numbers of child nodes calculated at the initial stages.

Figure 26A:
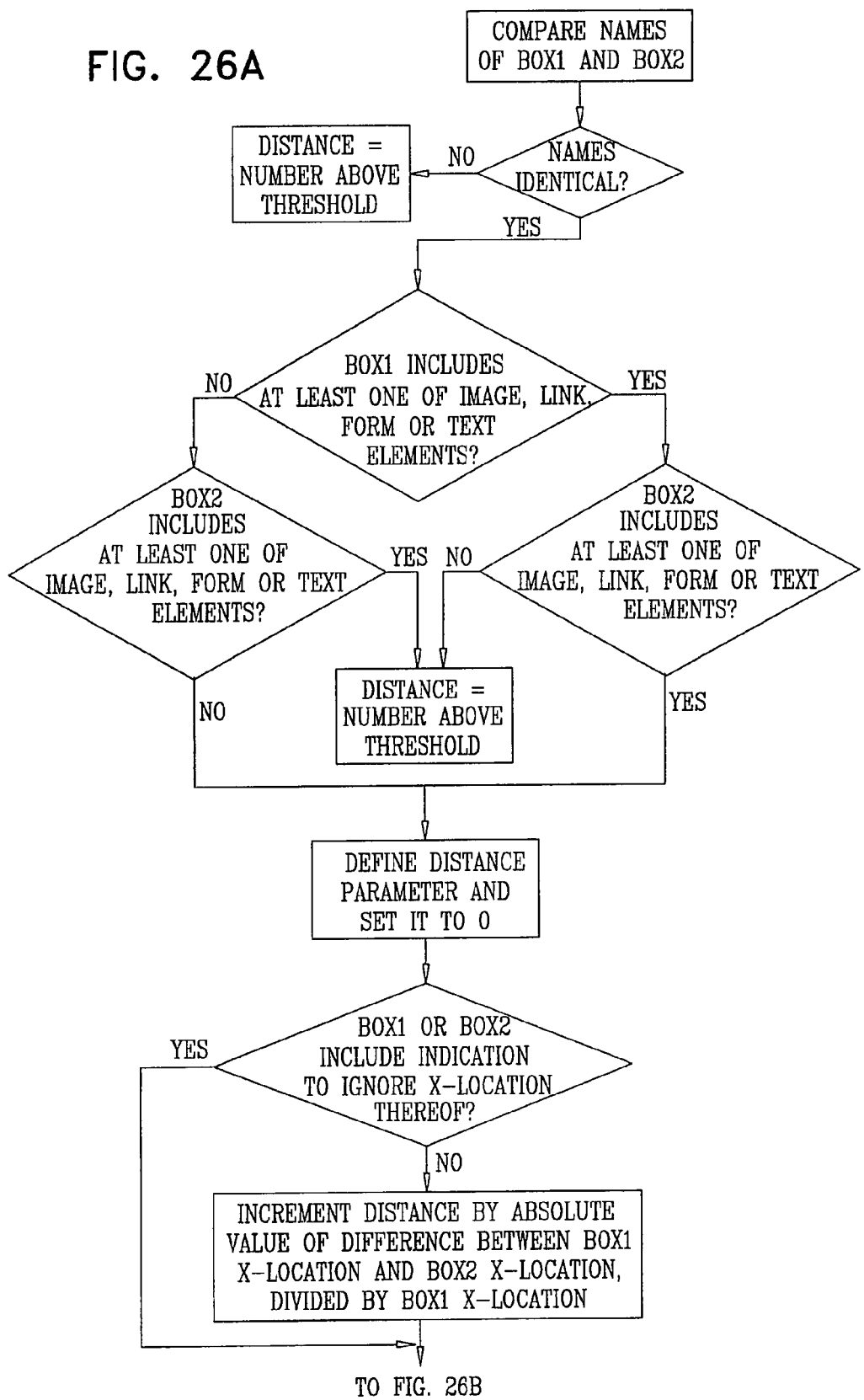
FIGS. 26A, 26B and 26C together are a simplified flow chart of a box element comparison algorithm used during operation of the matching algorithm of FIGS. 21-24E.
Figure 26B:
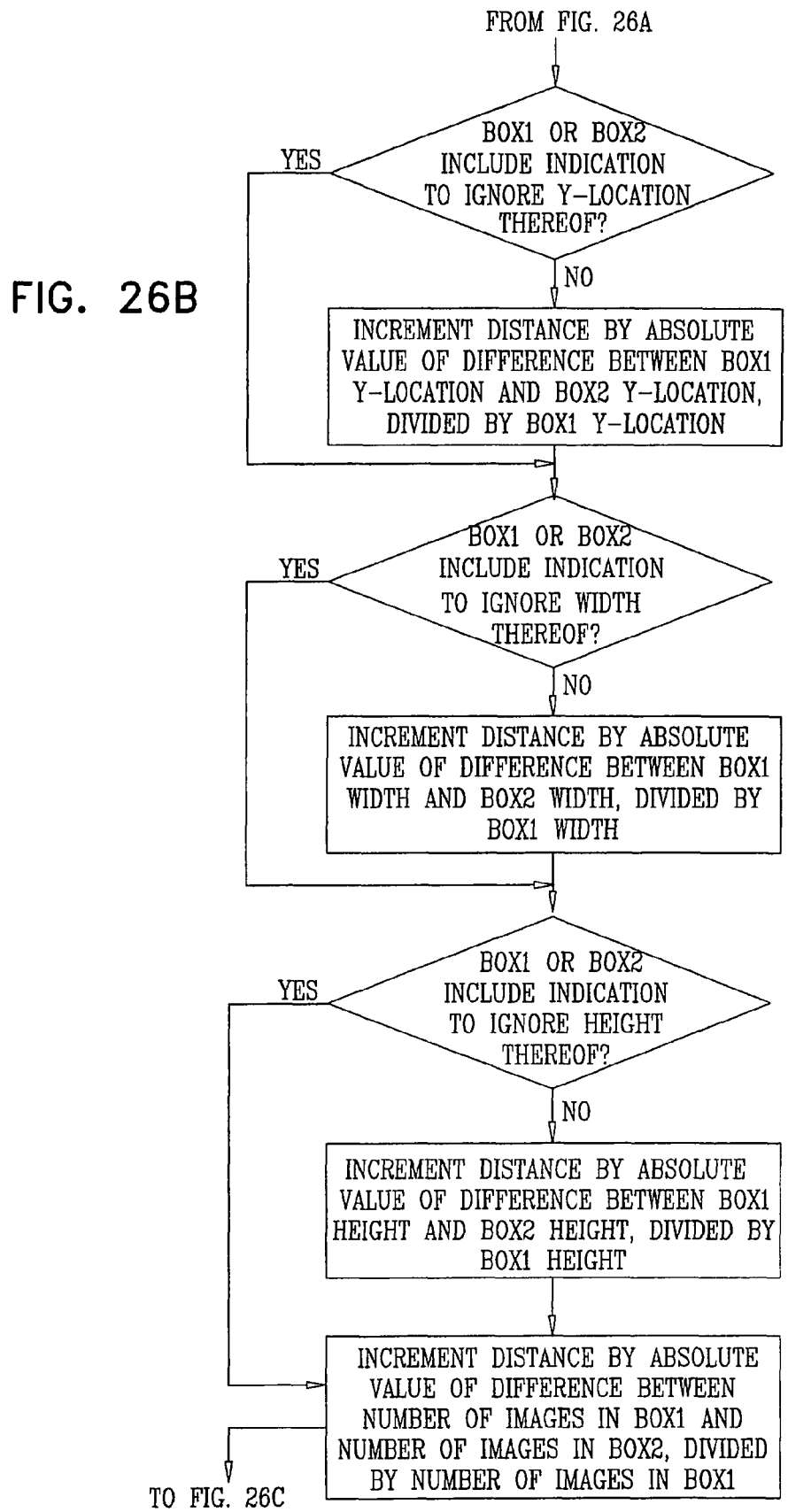
Figure 26C:
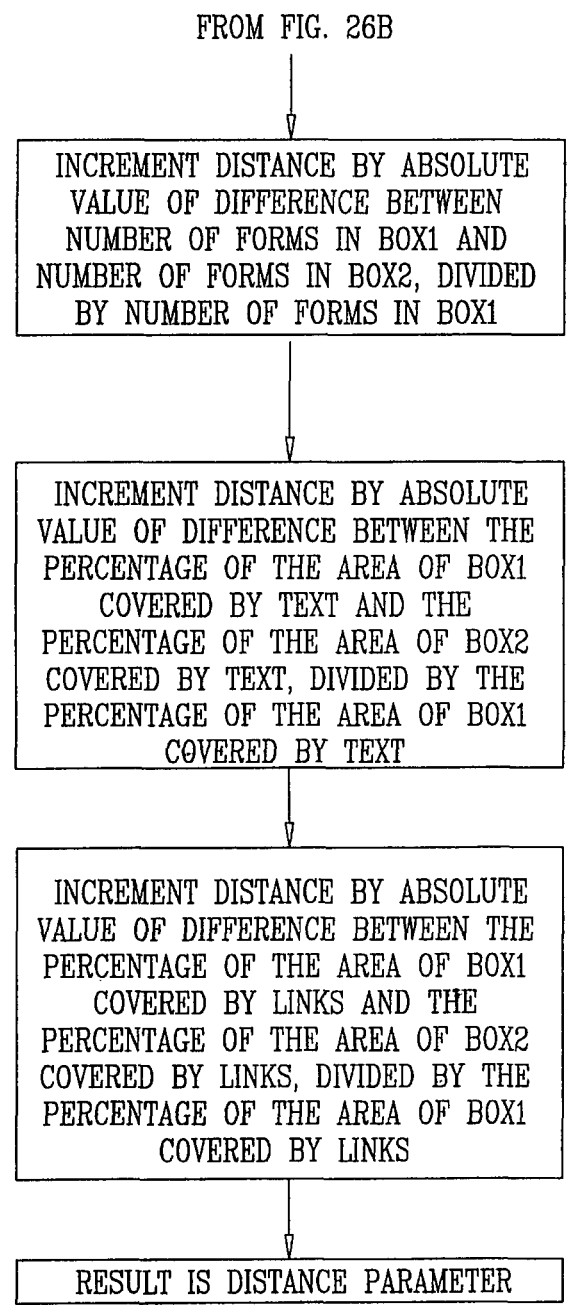

Reference is now made to FIGS. 26A, 26B and 26C, which together are a simplified flow chart of a box element comparison algorithm used during operation of the matching algorithm of FIGS. 21-24E. The box element comparison algorithm receives a pair of box elements, referred to hereinbelow as box1 and box2, and returns as a result a number indicating the distance between the received elements. It will be appreciated that for the purpose of the matching algorithm described hereinabove with reference to FIGS. 21-24E, box1 is considered to be the template element, and box 2 is considered to be the web page element.

As seen in FIG. 26A, the elements names initially are compared. If the elements have different names, the algorithm return as a result a number which is above the comparison threshold used hereinabove with reference to FIGS. 21-24E.

If the element names are identical, the elements are checked to see whether they include at least one of an image, a link, a form or a text element. If one of the elements includes a sub-element of the listed types, and the other element includes no such sub-element, the algorithm returns as a result a number which is above the comparison threshold used hereinabove with reference to FIGS. 21-24E.

If both of the elements include at least one of an image, a link, a form or a text element, or if both of the elements do not include at least one sub-element of the listed types, a distance parameter is defined and set to 0. If neither of box1 and box2 includes an indication that the X location thereof should be ignored, the distance is incremented by the absolute value of the difference between the X locations of box1 and box2, divided by the X location of box1.

As seen in FIG. 26B, if neither of box1 and box2 includes an indication that the Y location thereof should be ignored, the distance is incremented by the absolute value of the difference between the Y locations of box1 and box2, divided by the Y location of box1. It is appreciated that the X and Y locations of box1 and box2 are measured relative to the previous box element in the web page of which they form part.

If neither of box1 and box2 includes an indication that the width thereof should be ignored, the distance is incremented by the absolute value of the difference between the widths of box1 and box2, divided by the width of box1.

If neither of box1 and box2 includes an indication that the height thereof should be ignored, the distance is incremented by the absolute value of the difference between the heights of box1 and box2, divided by the height of box1.

The distance is then incremented by the absolute value of the difference between the number of images in box1 and box2, divided by the number of images in box1.

As seen in FIG. 26C, the distance is further incremented by the absolute value of the difference between the number of forms in box1 and box2, divided by the number of forms in box1. The distance is then incremented by the absolute value of the difference between the percentage of area of box1 covered by text and the percentage of area of box2 which is covered by text, divided by the percentage of area of box1 which is covered by text. The distance is further incremented by the absolute value of the difference between the percentage of area of box1 covered by links and the percentage of area of box2 which is covered by links, divided by the percentage of area of box1 which is covered by links.

The algorithm returns as a result the distance parameter following all the calculations described hereinabove.

Figure 27A:
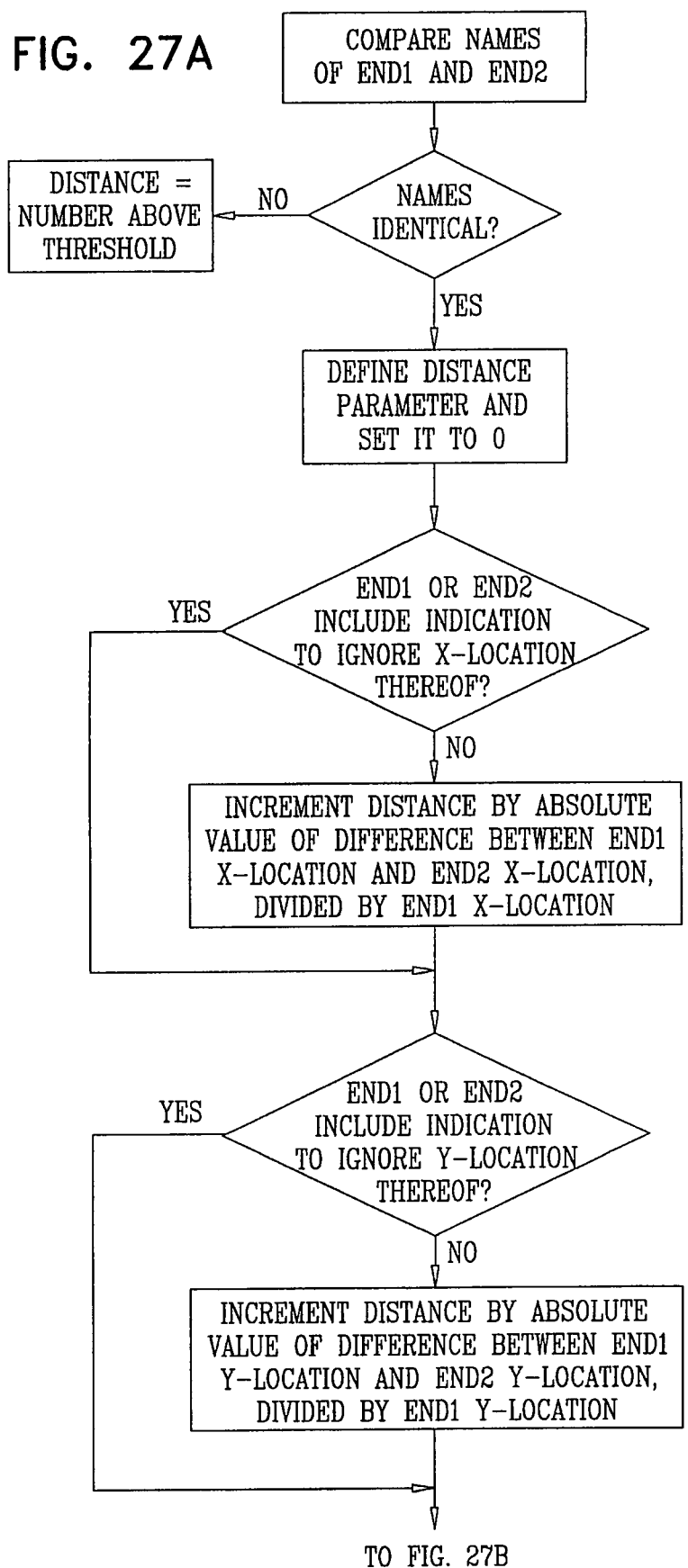
FIGS. 27A and 27B together are a simplified flow chart of an end element comparison algorithm used during operation of the matching algorithm of FIGS. 21-24E.
Figure 27B:
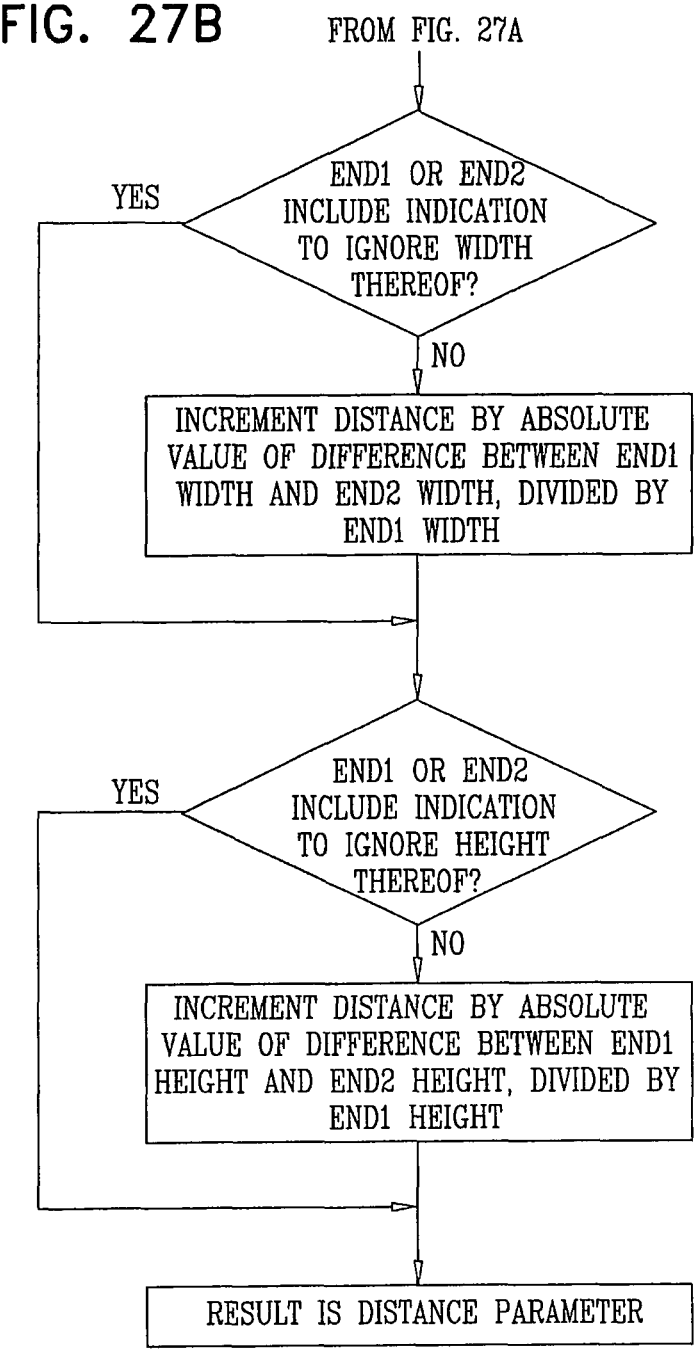

Reference is now made to FIGS. 27A and 27B, which together are a simplified flow chart of an end element comparison algorithm employed in the operation of the matching algorithm of FIGS. 21-24E. The end element comparison algorithm receives a pair of end elements, referred to hereinbelow as end1 and end2, and returns as a result a number indicating the distance between the received elements. It will be appreciated that for the purpose of the matching algorithm described hereinabove with reference to FIGS. 21-24E, end1 is considered to be the template element, and end2 is considered to be the web page element.

As seen in FIG. 27A, the elements names initially are compared. If the elements have different names, the algorithm returns as a result a number which is above the comparison threshold used hereinabove with reference to FIGS. 21-24E.

If the element names are identical, a distance parameter is defined and is set to 0. If neither of end1 and end2 includes an indication that the X location thereof should be ignored, the distance is incremented by the absolute value of the difference between the X locations of end1 and end2, divided by the X location of end1.

If neither of end1 and end2 includes an indication that the Y location thereof should be ignored, the distance is incremented by the absolute value of the difference between the Y locations of end1 and end2, divided by the Y location of end1.

It is appreciated that the X and Y locations of end1 and end2 are measured relative to the previous end element in the web page of which they form part.

Turning to FIG. 27B, it is seen that if neither of end1 and end2 includes an indication that the width thereof should be ignored, the distance is incremented by the absolute value of the difference between the widths of end1 and end2, divided by the width of end1.

If neither of end1 and end2 includes an indication that the height thereof should be ignored, the distance is incremented by the absolute value of the difference between the heights of end1 and end2, divided by the height of end 1.

The algorithm returns as a result the distance parameter following all the calculations described hereinabove.

Reference is now made to FIGS. 28A, 28B, 28C, 28D and 28E which are together a simplified flow chart of a repeated structure adapting algorithm used during operation of the matching algorithm of FIGS. 21-24E. The algorithm is applied to a box element which is indicated in the template to contain a repeated structure. In order to employ the repeated structure adapting algorithm, the instance of the repeated structure for which adapting instructions are provided must be found. Once that instance is found, additional instances of the repeated structure, to which the adapting instructions are applied, are found. Once the adapting instructions are applied to the additional instances, the box element containing the repeated structure has been fully adapted, and the next element may be matched.

Figure 28A:
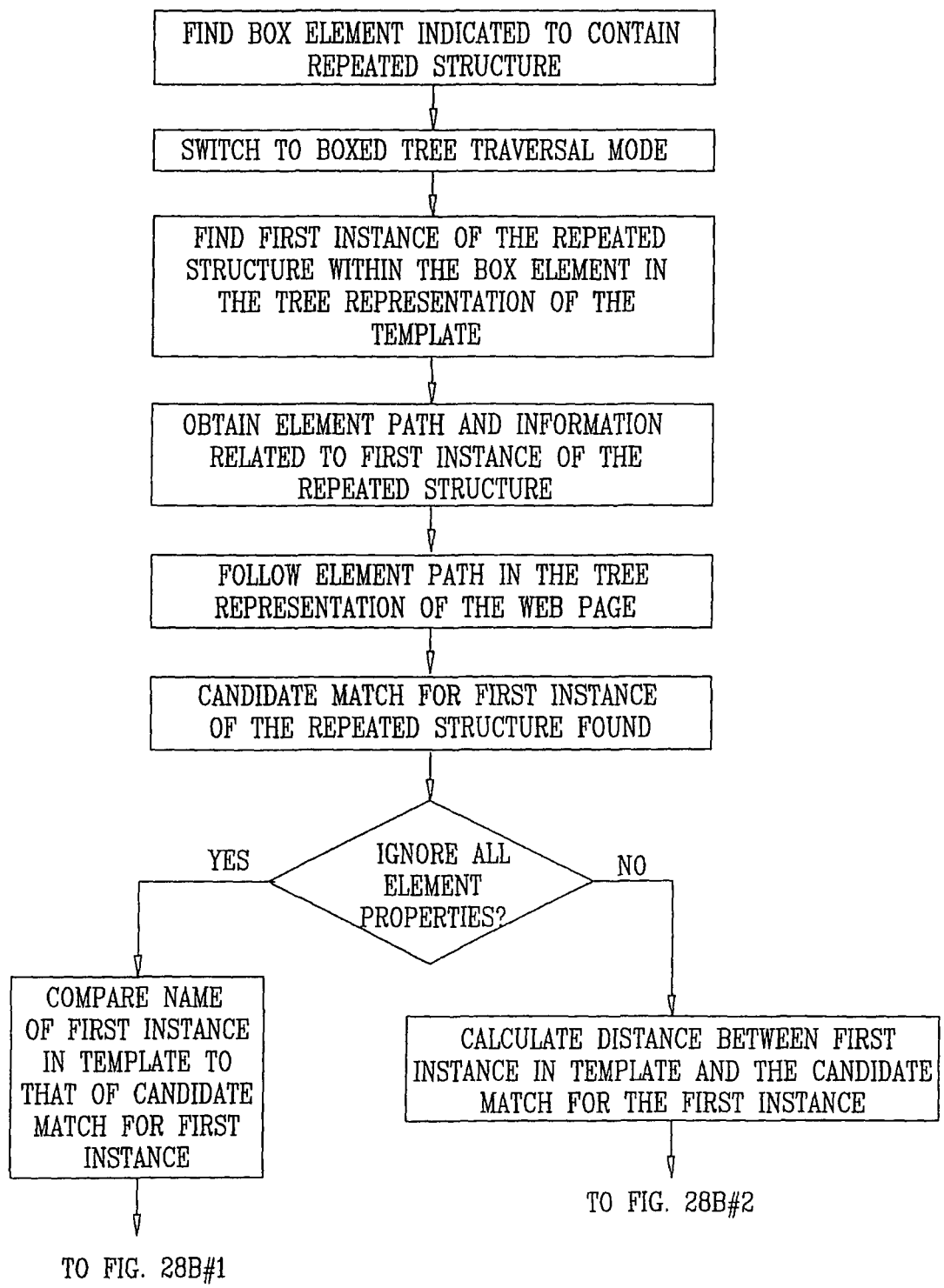

As seen in FIG. 28A, boxed tree traversal mode is employed. The first instance of the repeated structure, for which adapting instructions are provided, is found in the tree representation of the template, and the element path thereof and is obtained. Information for the first instance of the repeated structure is obtained from the template. The element path of the first instance of the repeated structure is followed in the tree representation of the web page.

If the information includes an indication that all the element properties, aside from its name and location in the tree, are to be ignored, the following takes place.

As seen in FIG. 28B, if the element found in the tree representation of the web page, and the first instance of the repeated structure found in the template have the same element name, the element found in the tree representation of the web page is considered to be the first instance of the repeated structure in the web page, and is adapted in accordance with the adapting instructions found in the template. Otherwise, if the elements have different names, a candidate matching element is found in a similar manner to that described hereinabove with reference to FIGS. 23A-23C, as described in more detail hereinbelow.

If the information does not include an indication that all the element properties, aside from its name and location in the tree, are to be ignored, the following takes place: The distance between the element found in the tree representation of the web page and the first instance of the repeated structure found in the template is calculated, using the box element comparison algorithm described hereinabove with reference to FIGS. 26A-26C. Additionally, the structures of the sub-trees of the elements found in the tree representation of the web page and in the tree representation of the template are compared. If the distance is below a predetermined threshold, and the structures of the sub-trees of the elements are similar, the first instance of the repeated structure in the web page is found.

If the distance is above the threshold, or the structures of the sub-trees of the elements are not similar, or the elements have different names, a candidate matching element is found in a similar manner to that described hereinabove with reference to FIGS. 23A-23C.

Figure 28C:
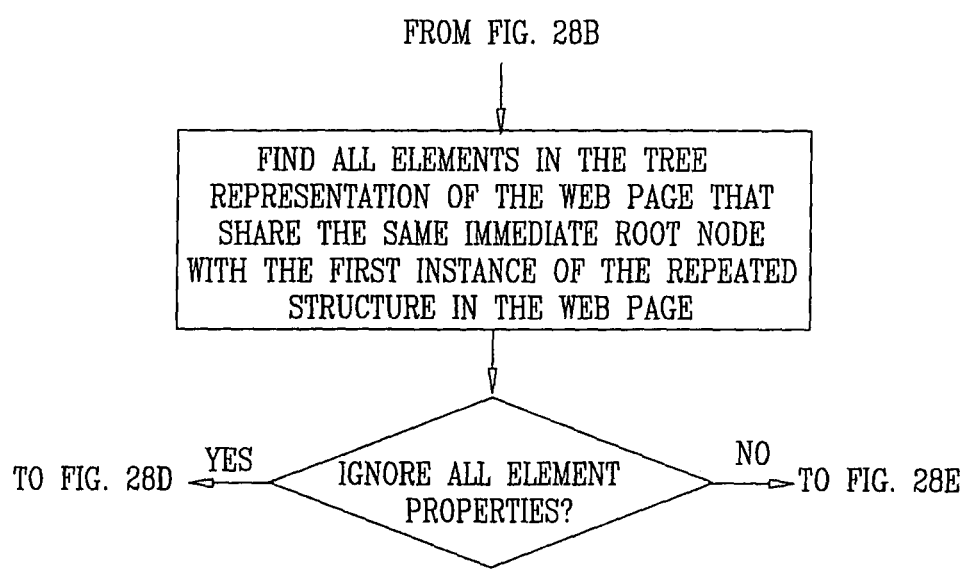

As seen in FIG. 28C, once the first instance in the web page of the repeated structure is found, the algorithm proceeds to find additional instances of the repeated structure. All the elements in the tree representation of the web page which share the same immediate root node as the element representing the first instance of the repeated structure (sibling nodes of the element) are found.

Figure 28D:
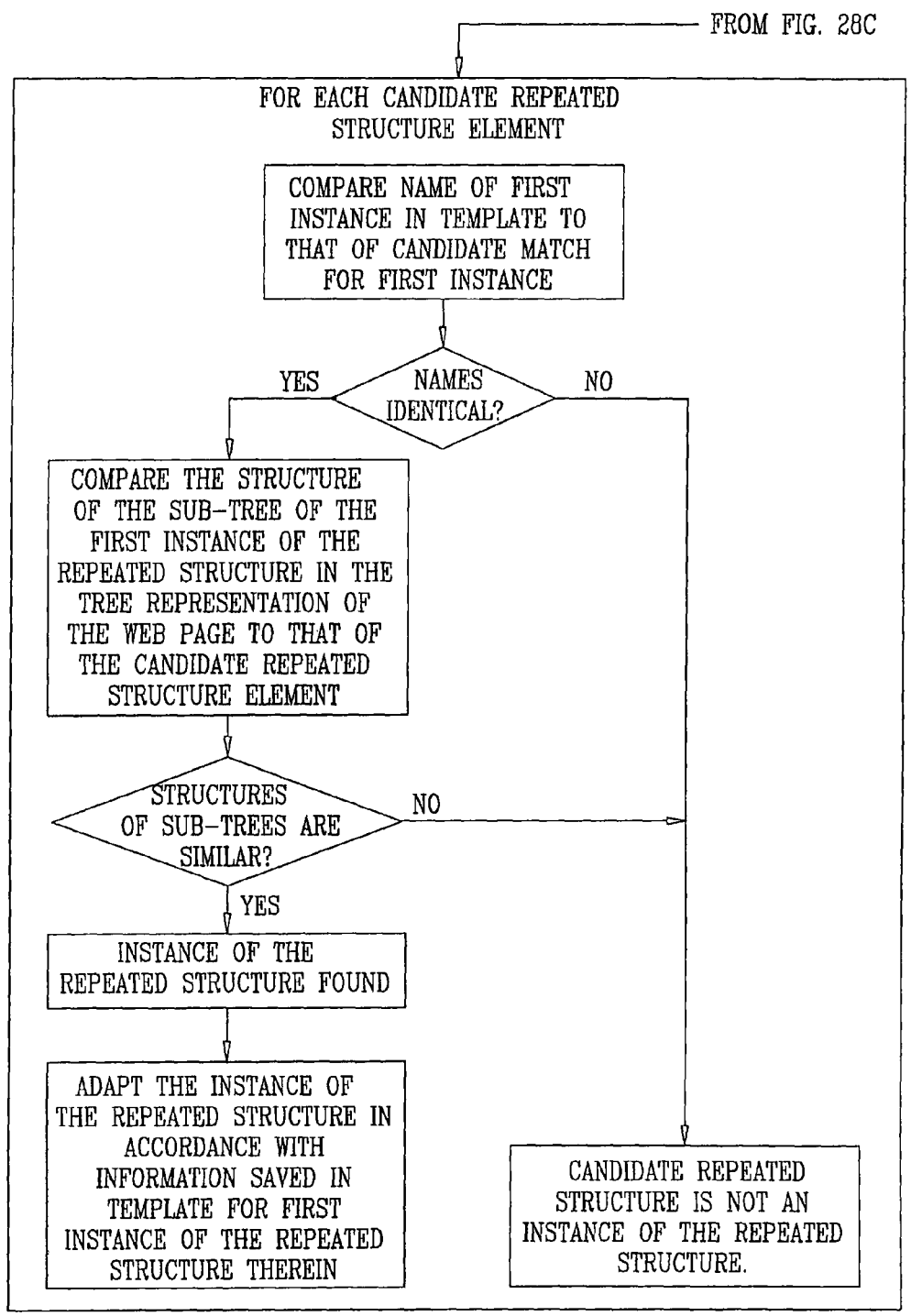

If, as mentioned above, the first instance in the template tree of the repeated structure includes an indication that all the element properties, aside from its name and location in the tree, should be ignored, the following takes place. As seen in FIG. 28D, for each of the candidate repeated structure elements found, the name of the candidate repeated structure is compared to that of the first instance of the repeated structure in the tree representation of the web page. If the name is not the same, the candidate repeated structure is not considered to be an instance of the repeated structure.

Otherwise, if the name is the same, the structures of the sub-trees of the candidate repeated structure element and of the first instance of the repeated structure in the tree representation of the web page are compared. If the structures of the sub-trees are not similar, the candidate repeated structure is not considered to be an instance of the repeated structure. Otherwise, if the structures of the sub-trees are similar, the candidate repeated structure is considered to be an instance of the repeated structure and is adapted in accordance with the adapting instructions found in the template.

Figure 28E:
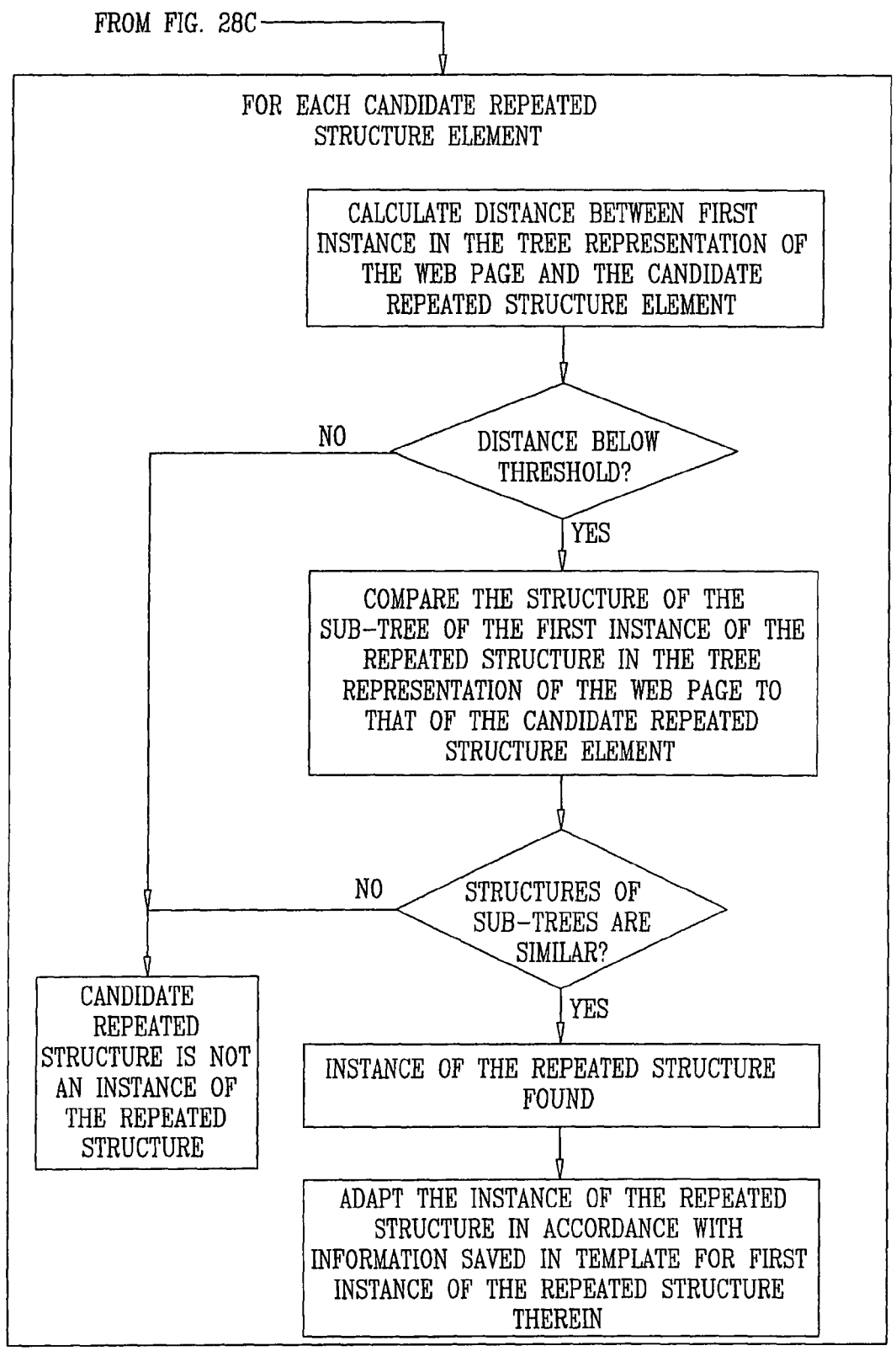

As seen in FIG. 28E, if the first instance in the template tree of the repeated structure does not include an indication that all the element properties, aside from its name and location in the tree, should be ignored, the following takes place. For each of the candidate repeated structure elements found, its distance from the first instance of the repeated structure in the tree representation of the web page is calculated, using the box element comparison algorithm described hereinabove with reference to FIGS. 26A-26C.

Additionally, the structures of the sub-trees of the candidate repeated structure element and of the first instance of the repeated structure in the tree representation of the web page are compared. If the distance is below a predetermined threshold, and the structures of the sub-trees of the elements are similar, the candidate repeated structure is considered to be an instance of the repeated structure and is adapted in accordance with the adapting instructions found in the template. Otherwise, the candidate repeated structure is not considered to be an instance of the repeated structure.

Reference is now made to FIGS. 29A, 29B, 29C and 29D, which illustrate the results of operation of a matching algorithm on a dynamic website, preferably, but not necessarily, within the context of the VDT functionality.

Figure 29A:
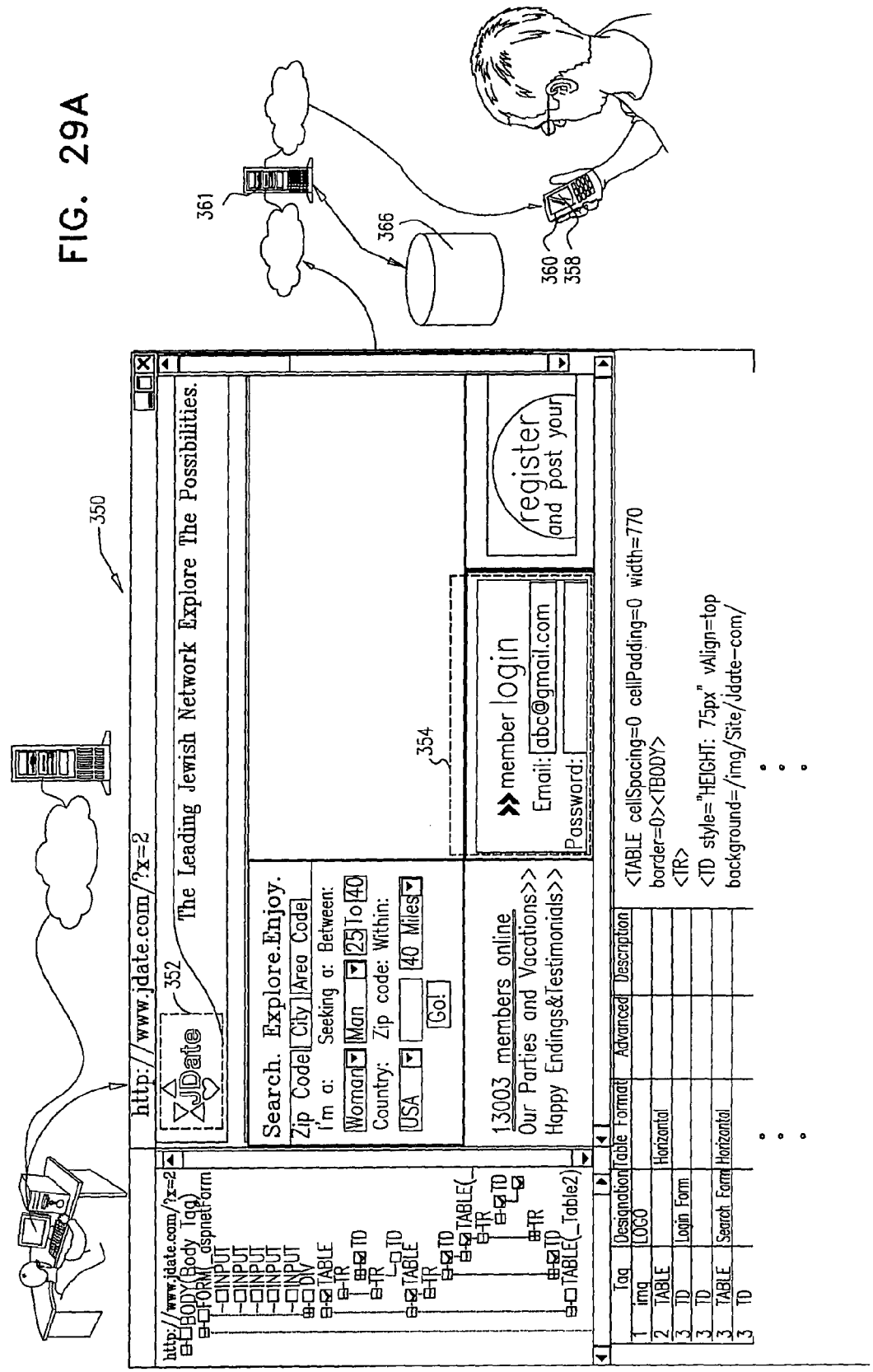

FIG. 29A shows a web page 350, including a logo region 352 and a login region 354. The web page 350 has a first general layout. As seen, an operator employs the VDT functionality of FIGS. 11-18 to define a template suitable for display of an adapted web page 356, corresponding to web page 350, on a display screen 358 of a mobile communicator 360. As described hereinabove, the template is saved on a server 361, for future requests of the page 350.

Figure 29B:
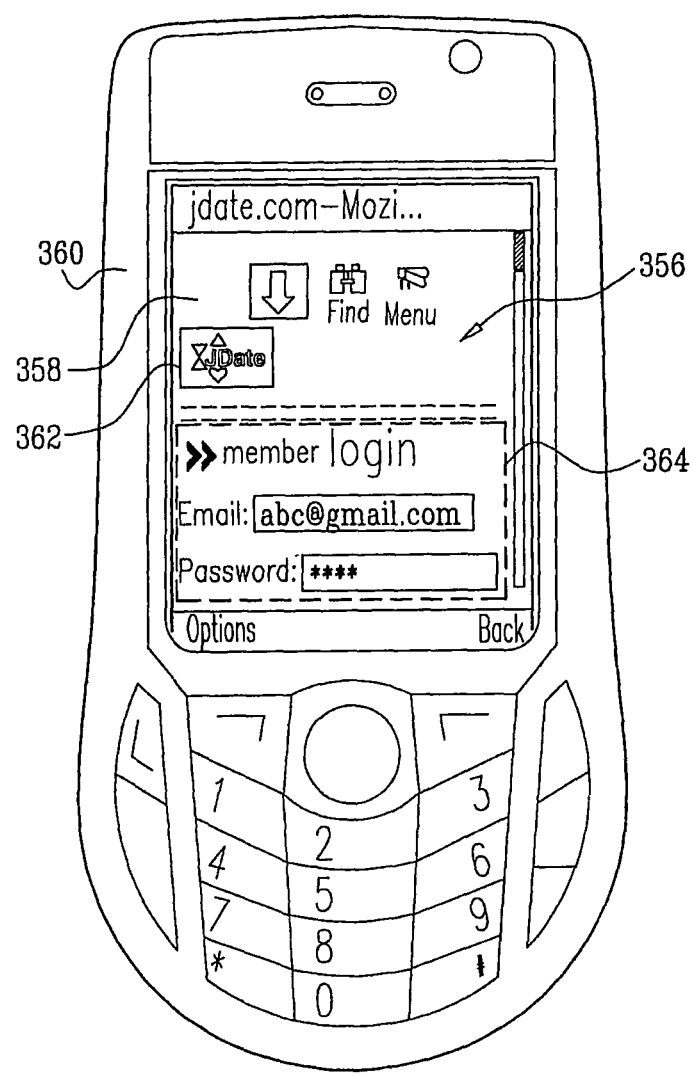
FIGS. 29B and 29D are simplified pictorial illustrations of display screens of mobile communicators showing the respective web pages of FIGS. 29A and 29C as adapted for display on a mobile communicator display screen, due to operation of the matching algorithm of FIGS. 21-28E.

Turning to FIG. 29B, it is seen that the adapted web page 356, corresponding to web page 350, is displayed on display screen 358 of the mobile communicator 360. Based on the template defined by the operator, an adapted logo region 362, corresponding to logo region 352, and an adapted login region 364, corresponding to login region 354, are provided on the mobile communicator 360.

As seen in FIG. 29A, the server 361 is preferably associated with a database 366, in which login information of users is maintained, typically in the form of cookies. If a cookie for a specific user or computer is saved in the database 366, when a user requests the same web page again, the login information of the user is retrieved from the database and a personalized web page 368 is provided, as shown in FIG. 29C.

As seen in FIG. 29C, the personalized web page 368 includes a logo region 370, a login status region 372, a website status region 374, and a personal information region 376, and typically has a very different layout than that of the initial web page 350. Due to the extreme differences in the layout, preferably the operator defines a second template, suitable for display of an adapted personalized web page 378, corresponding to personalized web page 368, on the display screen 358 of the mobile communicator 360.

Figure 29D:
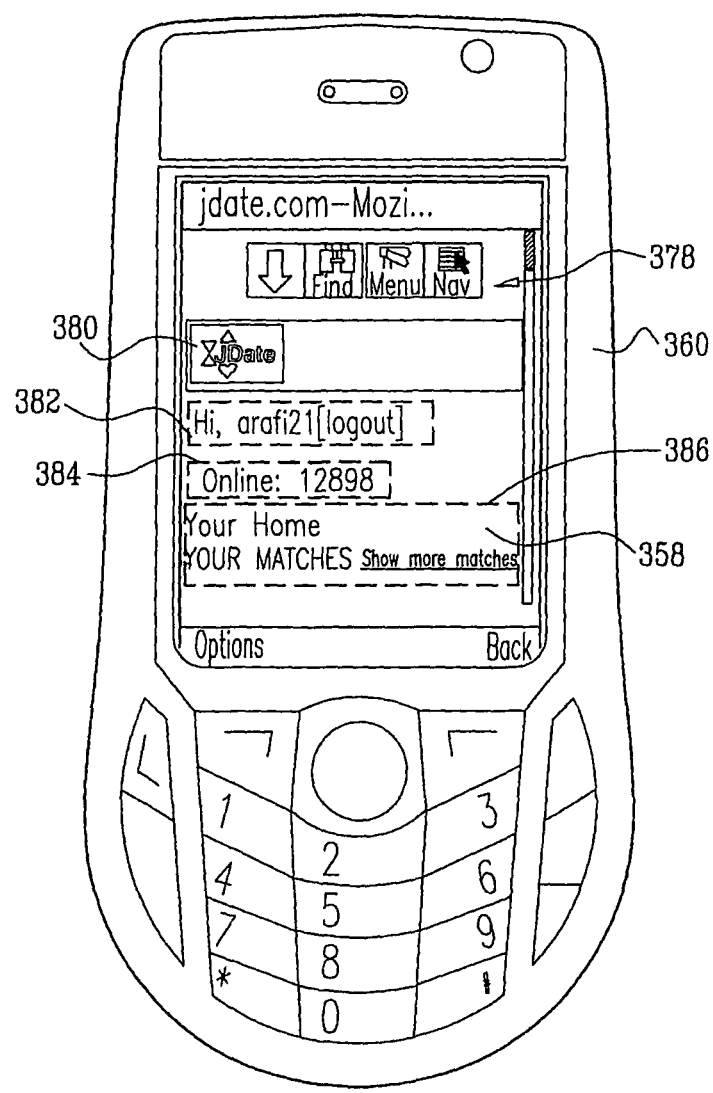

Turning to FIG. 29D, it is seen that the adapted personalized web page 378, corresponding to personalized web page 368, is displayed on display screen 358 of the mobile communicator 360. Based on the second template defined by the operator, an adapted logo region 380, corresponding to logo region 370, an adapted login status region 382, corresponding to login status region 372, an adapted website status region 384, corresponding to website status region 374, and an adapted personal information region 386, corresponding to personal information region 376, are displayed on the mobile communicator 360.

It is appreciated that upon further requests of the web page, the server 361 retrieves the web page from the Internet, and converts it into a tree representation of the DOM. Subsequently, the web page is matched to a suitable template, in order to generate an adapted web page for display on a mobile communicator. Typically, in order to find the suitable template for a web page, the server finds all the templates having a scope including the requested web page. The distance between the tree representation of the web page and the tree representations of each of the templates is calculated, using the tree comparison algorithm described hereinabove with reference to FIG. 25. If the distance between the tree representation of the web page and the tree representation of a given template is below a predetermined threshold, that template is used for adapting the web page for display on a mobile communicator.

It is further appreciated that the tree comparison algorithm described hereinabove with reference to FIG. 25 is suitable for determining whether any two tree representations of DOMs match each other.

In accordance with a preferred embodiment of the present invention, there is provided a method and system for obtaining information from at least one dynamic website including:

constructing at least one template of at least a part of a web page of the at least one website when the web page is in a first state; and employing the at least one template to extract information from at least one web page of the at least one dynamic website when at least one of the at least one web page is in a second state, different from the first state.

Typically, employing the at least one template to extract information from at least one web page of the at least one dynamic website when at least one of the at least one web page is in a second state, different from the first state, includes effecting a best match between the at least one template and document object models (DOMs) of the at least one web page in the second state.

In accordance with another preferred embodiment of the present invention, there is provided a method and system for obtaining information from at least one dynamic website including:

obtaining at least one document object model (DOM) of a web page of the at least one dynamic website when the web page is in a first state; and employing the at least one document object model (DOM) to obtain information from at least one web page of the at least one dynamic website when at least one of the at least one web page is in a second state, different from the first state.

Typically, employing the at least one document object model (DOM) to extract information from at least one web page of the at least one dynamic website when at least one of the at least one web page is in a second state, different from the first state, includes effecting a best match between the at least one document object model (DOM) and document object models (DOMs) of the at least one web page in the second state.

Figure 30A:
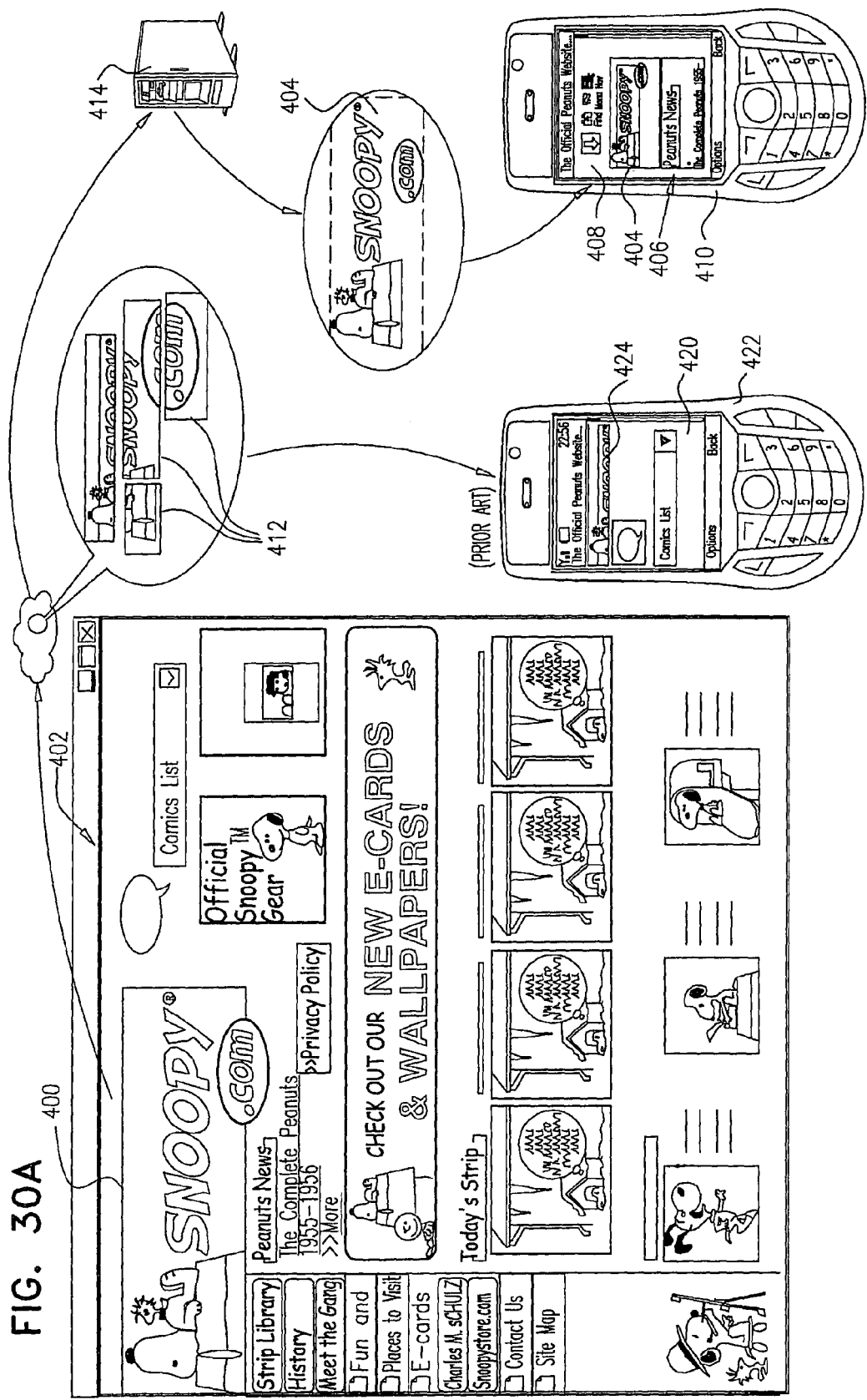
FIG. 30A is a simplified pictorial illustration of functionality for reconstruction of fragmented images for display on a mobile communicator in accordance with a preferred embodiment of the present invention.
Figure 30B:
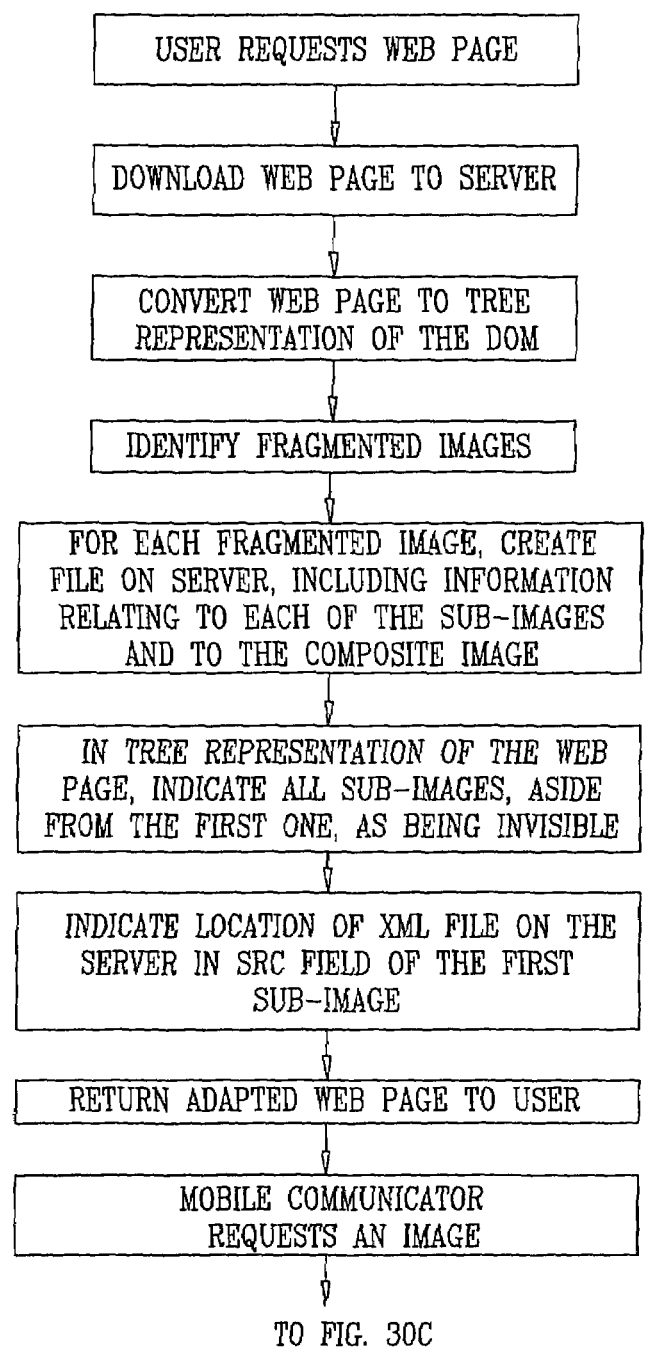
FIGS. 30B and 30C together are a simplified flow chart showing the operation of the functionality for reconstruction of fragmented images.
Figure 30C:
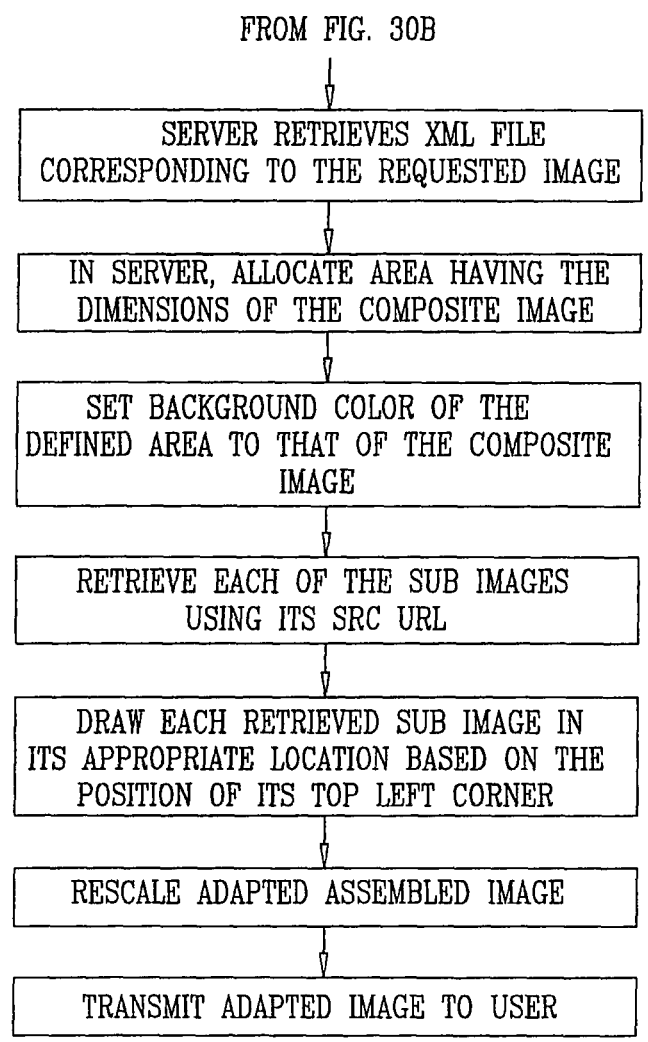

Reference is now made to FIG. 30A, which is a simplified pictorial illustration of functionality for reconstruction of fragmented images for display on a mobile communicator in accordance with a preferred embodiment of the present invention and to FIGS. 30B and 30C, which together are a simplified flow chart showing the operation of the functionality for reconstruction of fragmented images.

As seen in FIG. 30A, the functionality of the present invention is operative to display an image forming part of a web page, such as image 400 on web page 402, in the form of an adapted image 404 shown on an adapted web page 406, on a display screen 408 of a mobile communicator 410, in a manner which is particularly suitable for viewing on display screen 408. It is a particular feature of the present invention that the adapted image 404 is displayed on the display screen 408 in its complete form, even if in the web page 402 it is formed of multiple sub-images, indicated by reference numeral 412.

It is seen that a conventional web page, such as web page 402, includes an image, such as image 400, which is formed of a plurality of sub-images 412. It is a particular feature of the present invention that when a user requests a web page, such as web page 402, the web page is downloaded to a server 414, which is operative to recognize the presence of an image 400 comprised of sub images 412. The server is further operative to combine the sub images 412 into a single adapted image 404, and to supply the single adapted image 404 for display on the display screen 408.

Preferably, if one or more of the sub-images 412 includes non-image information, that non-image information is preserved outside of the single adapted image 404 during the combining of the sub-images 412.

As seen in FIG. 30A, in the prior art, when a web page containing an image formed of multiple sub-images, such as image 400, is displayed on a display screen 420 of a mobile communicator 422, only the first sub-image is displayed, as indicated by reference numeral 424.

Turning now to FIG. 30B, it is seen that a user initially requests a web page, and the web page is downloaded to the server. The server then converts the web page into a modified tree representation of the DOM.

During the analysis of the page, described hereinabove with reference to FIG. 3, fragmented images are identified. For each fragmented image, the server creates a file, typically an XML file, which includes information related to each of the sub-images and to the whole image. Typically, the source URL, top left corner, the width and the height of each sub-image is written to the XML file, in addition to the width and height dimensions of the composite image and its background color.

In the tree representation of the web page, all of the sub-images except for the first sub-image, are flagged as being invisible. In the src field of the first sub-image, the source location is replaced by the location on the server of the XML file. Preferably, the width and height of the first sub-image are ignored, in order to enable flexibility in adapting the composite image. An adapted web page, including the location on the server of the XML file, is returned to the user.

When the adapted web page is received by the mobile communicator, the mobile communicator requests the image from the server. Due to the change in the src field of the first sub image, when requesting the image from the server the location of the XML file is provided to the server, rather than the location of the sub-image.

As seen in FIG. 30C, the server retrieves the XML file corresponding to the requested image. In the server, a memory area having the dimensions of the composite image, as indicated in the XML file, is allocated, and the background color of the allocated area is set to be the background color of the image as defined in the XML file. Each of the sub-images is retrieved by using the URL indicated in the src field of its img tag, and is drawn in the allocated area in its appropriate location and having the appropriate dimensions, as indicated in the XML file.

If necessary, once the adapted image is assembled, it may be rescaled to fit the dimensions of the display screen of the mobile communicator from which it was requested. The adapted image is then converted to the file format specified in the user request, and transmitted to the user.

Reference is now made to FIGS. 31 and 32A-32D which illustrate image map functionality constructed and operative in accordance with a preferred embodiment of the present invention. The image map functionality of the present invention provides a method and system for displaying web content on a display screen including requesting a web page by a user; in response to a user request, downloading the web page to a server; recognizing, by the server, the presence in the web page of an image map containing a plurality of links, corresponding to portions of the image map; dividing the image map into a plurality of sub-images corresponding to the portions of the image map; associating the plurality of links with corresponding ones of the plurality of sub-images; and supplying the plurality of sub-images for display on the display screen.

Figure 31:
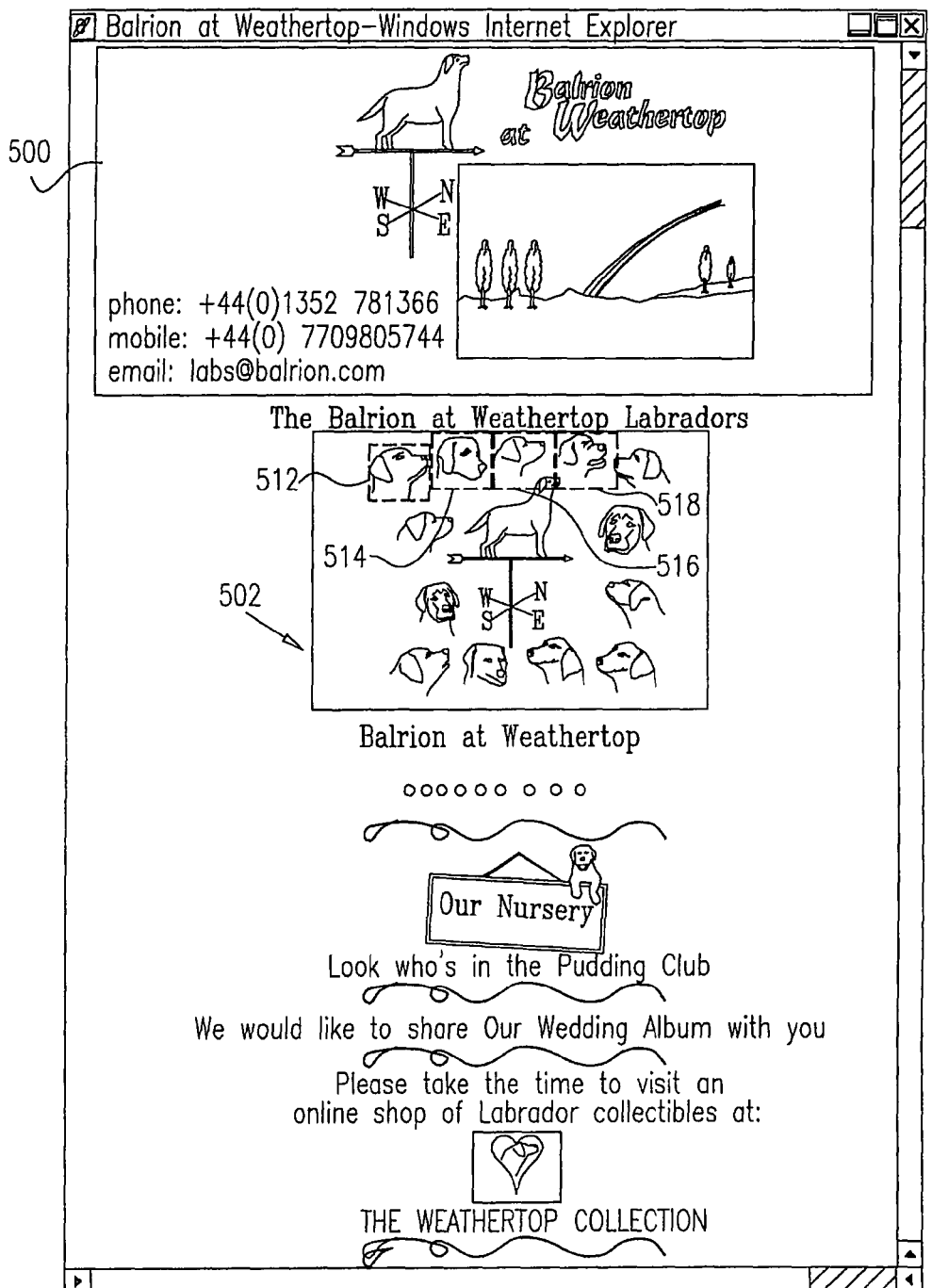
FIG. 31 is a simplified pictorial illustration of functionality for displaying web content on a mobile communicator in accordance with a preferred embodiment of the present invention, providing image map functionality.

FIG. 31 is a simplified pictorial illustration of functionality for displaying web content on a mobile communicator in accordance with a preferred embodiment of the present invention, providing image map functionality and FIGS. 32A, 32B, 32C and 32D illustrate examples of display screens of mobile communicators employing image map functionality.

As seen in FIG. 31, the functionality of the present invention is operative to display web content, such as a conventional web page 500 having an image 502 and an associated image map on a display screen 506 of a mobile communicator 508 in a manner which is particularly suitable for viewing on display screen 506.

A server 510, requesting web page 500 from the Internet, detects that the image 502 has an image map associated therewith. The image map provides links associated with specific geographical areas forming part of the image 502, such as areas designated by reference numerals 512, 514, 516 and 518.

The server 510 employs information in the image map to extract the geographical areas of the image 502 and their corresponding links and to prepare the geographical areas for display as individual images on display screen 506. This is typically achieved by employing information indicating the spatial coordinates of each geographical areas of the image 502 from the image map to copy that geographical area into a new image with which is associated a unique link, corresponding to the link designated by the image map.

As seen in FIG. 32A, a portion of an adapted web page 520 is displayed on display screen 506 of mobile communicator 508. By scrolling down, the individual geographical areas of the image 502 are sequentially displayed. The geographical areas corresponding to areas 512 and 514 are respectively designated by reference numerals 522 and 524 in FIGS. 32B, 32C and 32D.

Figure 33:
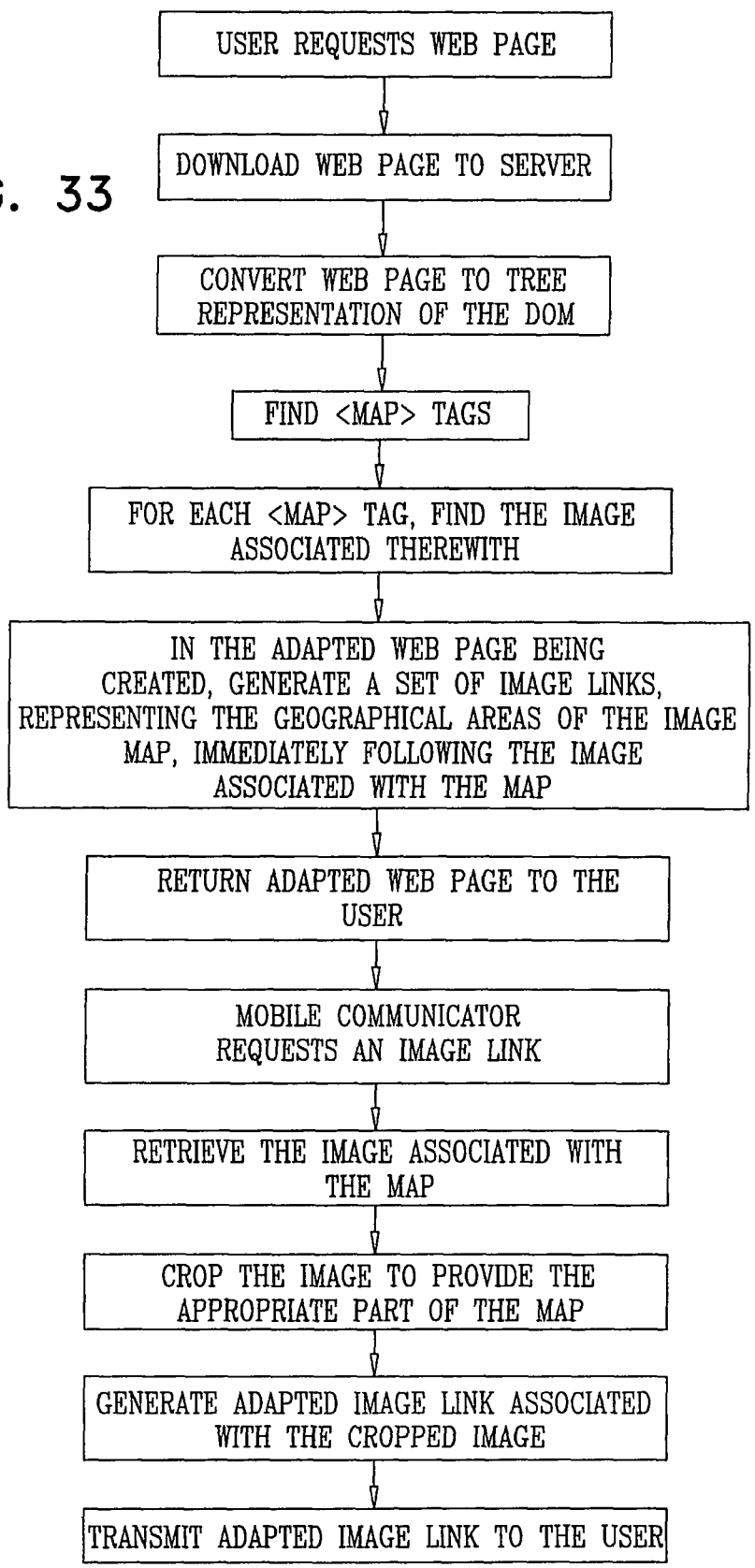
FIG. 33 is a simplified flow chart illustrating the image map functionality of FIGS. 31-32D.

Reference is now made to FIG. 33, which is a simplified flow chart illustrating the image map functionality of FIGS. 31-32D. As seen in FIG. 33, a user initially requests a web page, and the web page is downloaded to the server. The server then converts the web page into a modified tree representation of the DOM.

During the analysis of the page, described hereinabove with reference to FIG. 3, <map> tags, indicating the presence of image maps, are located. For each <map> tag found, the image associated therewith is located.

In the adapted web page being created, a set of image links, representing each of the geographical areas of the image map, is created immediately following the image. Typically, each of the image links corresponds to a given geographical area of the image map. Each image link includes as its src field the URL of the original image, such as image 502 (FIGS. 31-32D), information indicating the borders of the geographical area to which the link corresponds, and additional information required for displaying an image on a display screen of a mobile communicator, such as display screen 506 of mobile communicator 508 (FIGS. 31-32D). An adapted web page, including the added set of links, is returned to the user.

When the adapted web page is received by the mobile communicator, the mobile communicator requests the image links from the server. The server then retrieves the image from the Internet, crops the image in accordance with the parameters provided in the link, and transmits the adapted link to the user.

It will be appreciated that the link transmitted to the user, which is displayed beneath the image, corresponds in all manners to the link defined as part of the image map in the given geographical area, and provides a link to the same web page.

Figure 34:
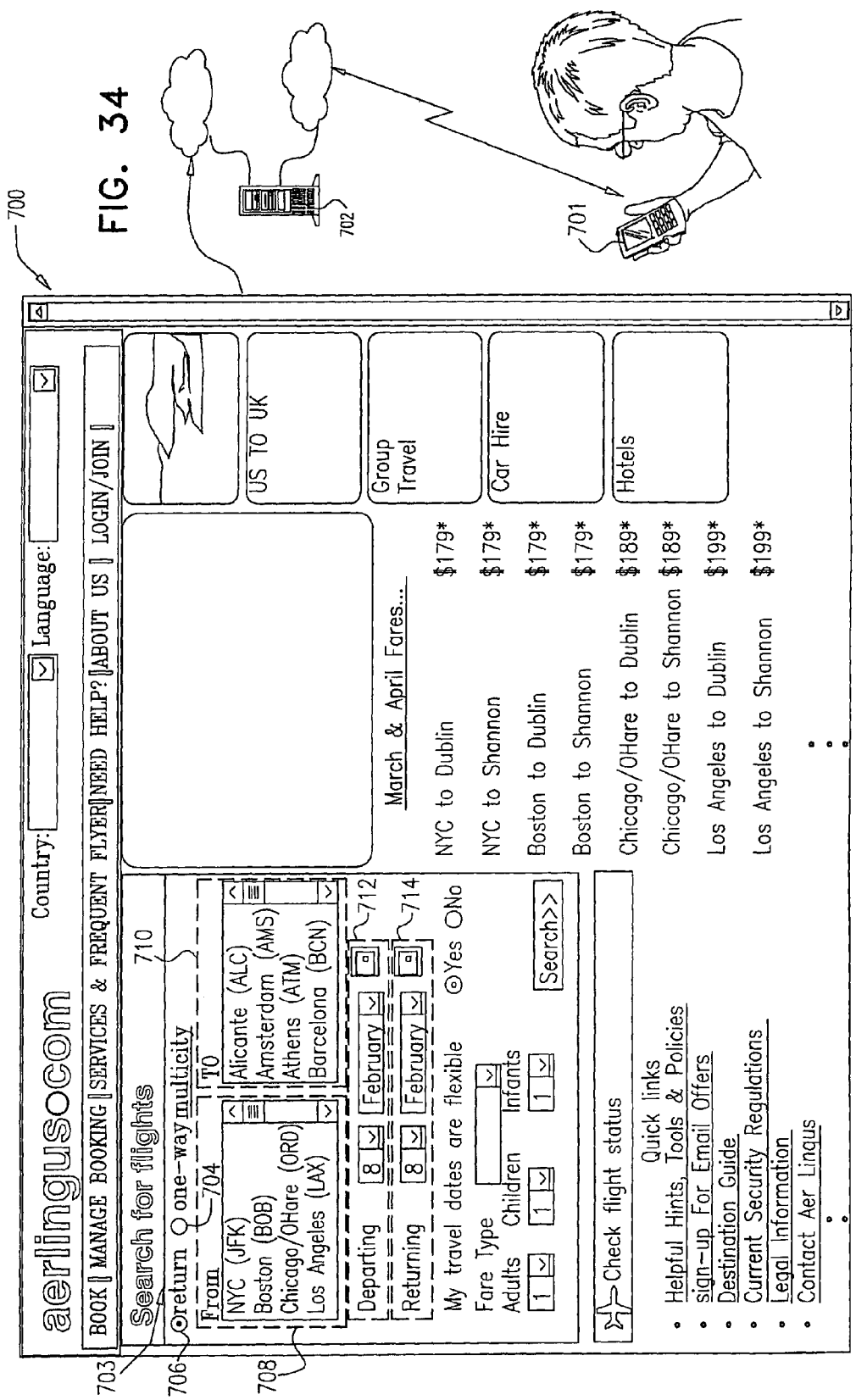
FIG. 34 is a simplified pictorial illustration of functionality for client-side script emulation in accordance with a preferred embodiment of the present invention.

Reference is now made to FIG. 34, which illustrates interactive communication between a conventional interactive web page 700 having a client-side script, such as JavaScript, and a mobile device, such as a mobile communicator 701 via a server 702 which provides client-side script emulation in accordance with a preferred embodiment of the present invention. It is seen that the web page 700 includes a radio button selection region 703 which here includes two radio buttons 704 and 706, respectively indicated as "one-way" or "return". Below the radio button selection region 703 is an event triggering select region 708 and an event triggered select region 710. The event triggering select region 708 here includes a number of clickable departure locations and the event triggered select region 710 here includes a number of clickable destination locations. It is appreciated that the destination locations appearing in region 710 are determined by the selected departure location.

Below regions 708 and 710 there is typically found a departure date selection location 712 which enables a user to enter a desired departure date. When the "return" radio button 706 is selected, a return date selection location 714 is activated. Various other selection regions are also present on web page 700.

Figure 35A:
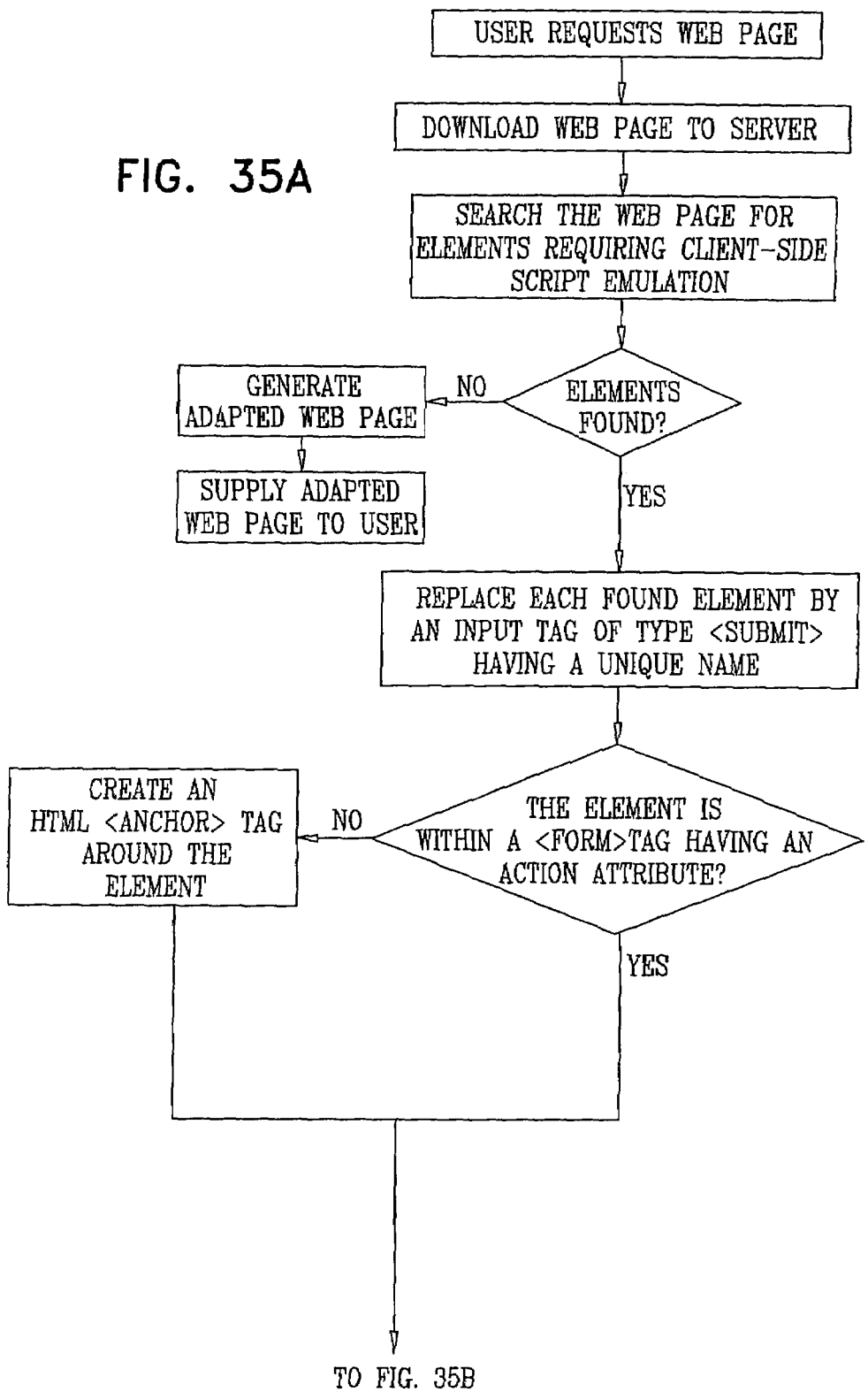
FIGS. 35A, 35B and 35C together are a simplified flow chart illustrating operation of the client-side script emulation of FIG. 34.
Figure 35B:
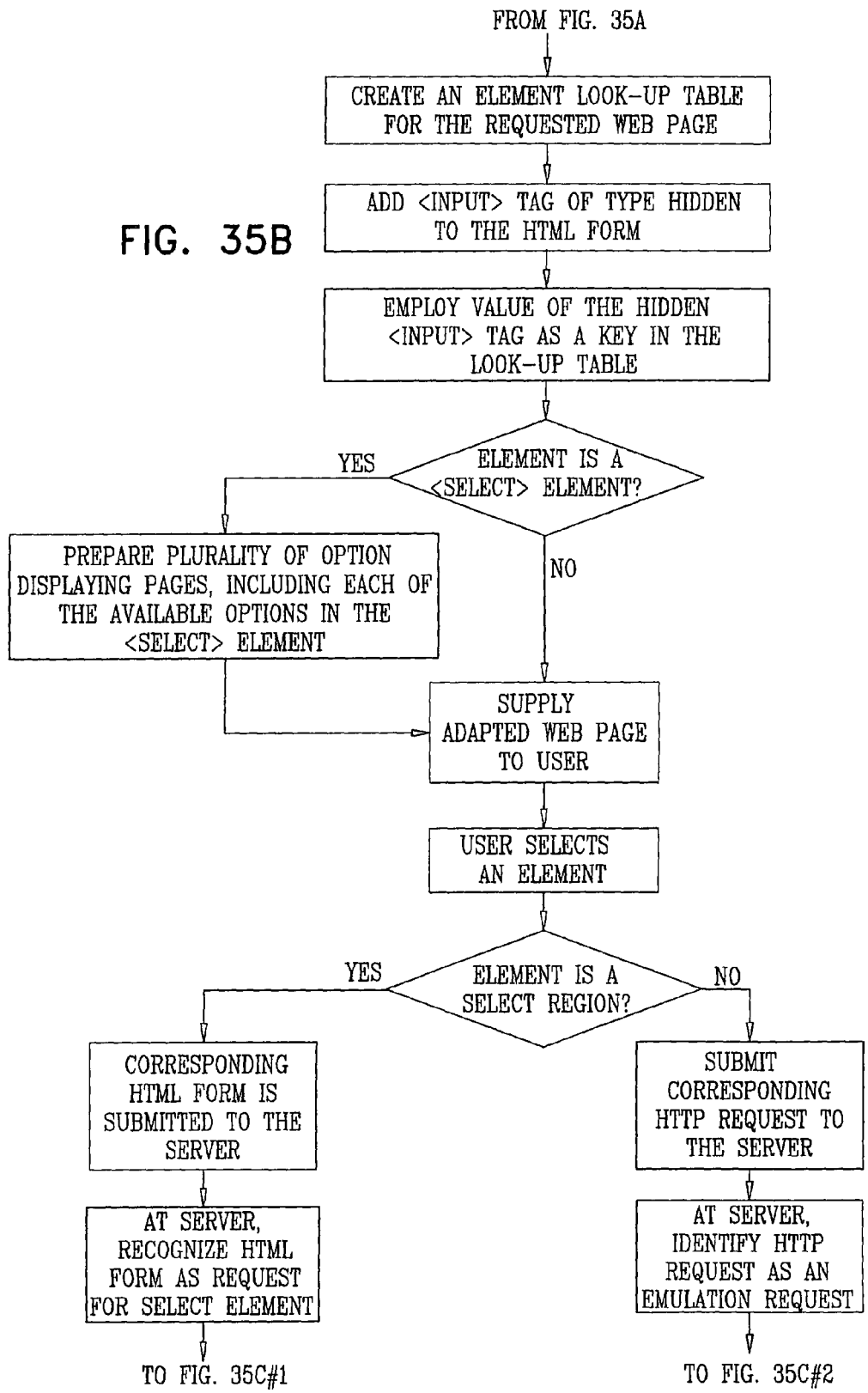
Figure 35C:
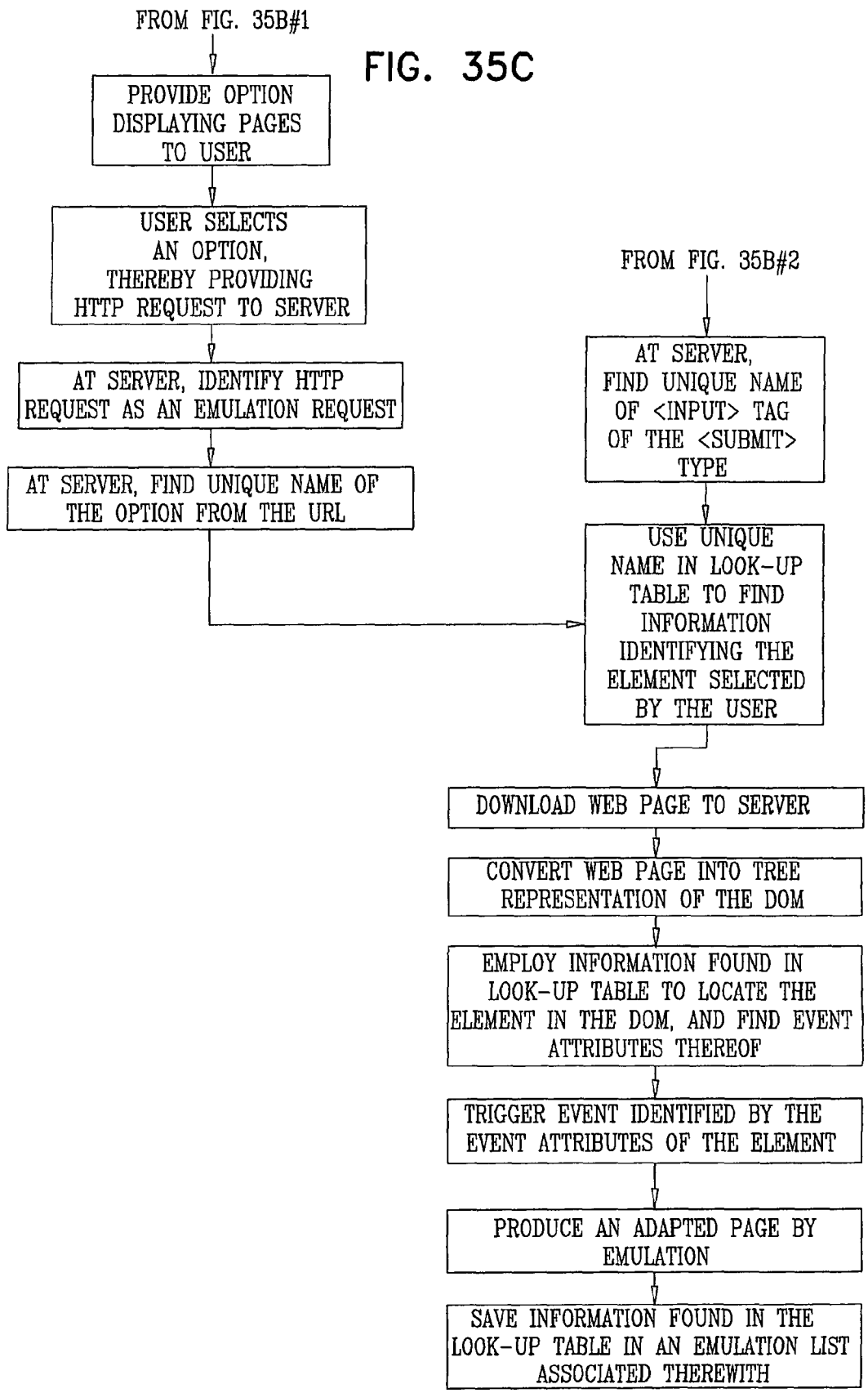

Reference is now made to FIGS. 35A-35C, which together are a simplified flow chart illustrating operation of client-side script emulation in accordance with a preferred embodiment of the present invention, and to FIGS. 36A-36G, which illustrate a display screen 718 of a mobile device 720, such as a Nokia 6630, illustrating the results of this emulation.

Turning to FIG. 35A, it is seen that a user requests an HTML web page from server 702, which retrieves the requested web page from the internet and searches the web page for elements that contain event attributes such as "onevent" and thus require client-side script emulation. If no such elements are found, a mobile communicator adapted web page corresponding to the web page 700 is supplied by server 702 to the mobile communicator 701.

If at least one element that requires client-side script emulation is found, the following takes place on the mobile communicator adapted web page corresponding to the web page 700:

I. Each element, such as radio buttons 704 and 706, respectively indicated as "one-way" or "return", is replaced by an input tag of a submit type (<input type=submit . . . >) having a unique name. The visual appearance of the input tag of a submit type preferably is set to be similar to the visual appearance of the original element. Preferably, if the mobile communicator supports use of an input tag of an image type, an input tag of an image type is used instead of the input tag of a submit type. The visual appearance of the input tag of an image type typically is set to be similar to the visual appearance of the original element.

II. If an element is not within an HTML form tag, an HTML anchor tag is created around the element.

Turning to FIG. 35B, the process continues as follows:

III. A look-up table is created for the requested web page and indexed by the unique names of the input tags of the submit type. The table contains information such as a name of the element to which each input tag corresponds, an ID attribute of the element, the type of the element and the location of the element in the DOM of the web page 700. Alternatively, the look-up table may be replaced by any other suitable key-accessed information storage medium.

IV. An input tag of a "hidden" type is added to the HTML form defined by an HTML form tag referenced in II and III above. The value of this input tag is employed to identify the look-up table.

V. If the element is a select element, corresponding to a select region, such as region 708 or 710 (FIG. 34), a plurality of option-displaying adapted pages, each containing a limited number of options, such as ten, are prepared. Each of the available options in the select region appears on one of the adapted option-displaying pages. Each of the available options is a link to server 702 and contains a value which is employed to identify the look-up table. If the options are arranged in a predetermined order, such as an alphabetical order, an adapted page containing a listing thereof is preferably prepared.

Figure 36A:
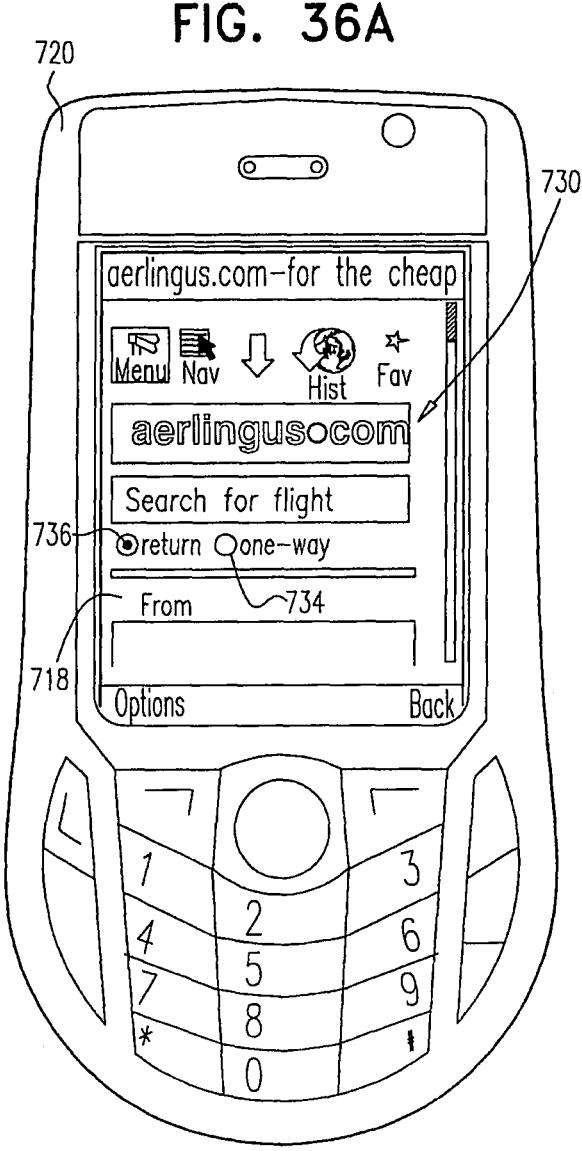
Figure 36B:
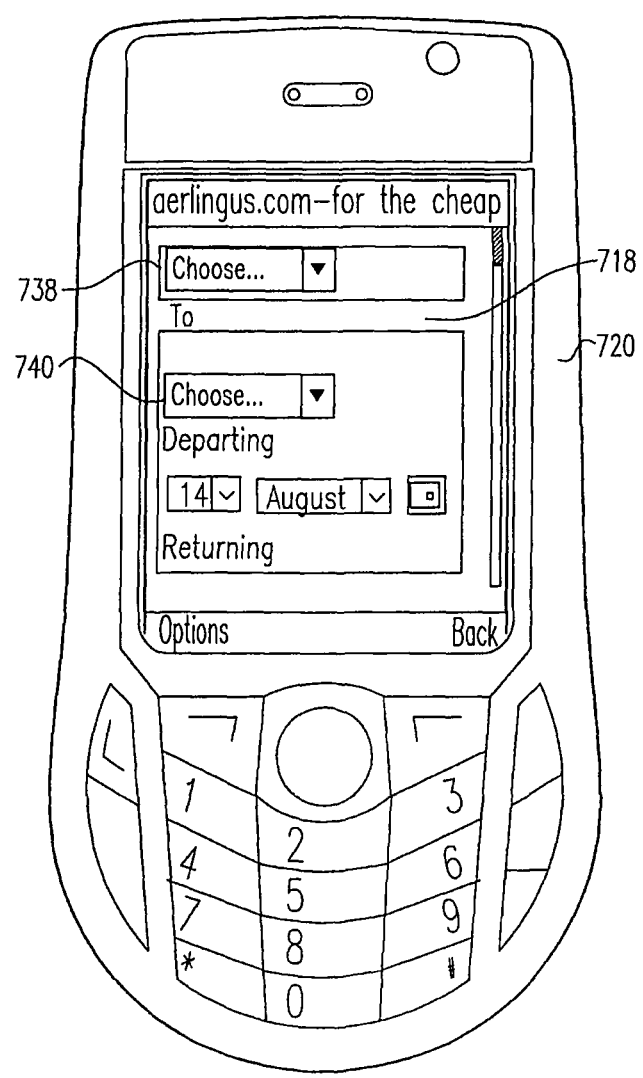
Figure 36C:
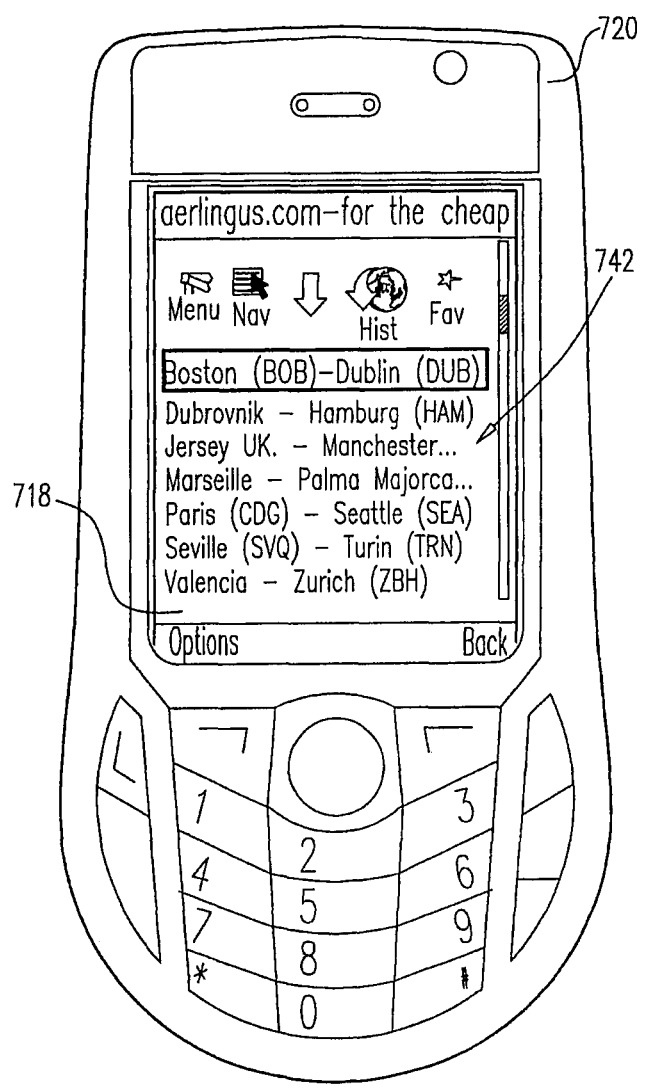

The adapted web page, downstream of steps I-V, is supplied to the mobile communicator 701, as web page 730, seen in FIG. 36A. It is a particular feature of the present invention that the buttons 734 and 736 which appear identical to radio buttons 704 and 706 in web page 700 (FIG. 34), have submit button functionality. Similarly, in FIG. 36B, which illustrates a scrolled down view of web page 730, select regions 738 and 740, which appear similar or identical to select regions 708 and 710 (FIG. 34) also have submit button functionality.

Typically, when a user clicks on an element that is a select region, such as select region 738 (FIG. 36B), the corresponding HTML form is submitted to server 702 (FIG. 34). The server 702, upon receipt of the HTML form submission, recognizes the HTML form submission as a request to display the general listing of options 742 (FIG. 36C), if available.

As seen in FIG. 35C, if there is no general listing of options, a first adapted option-displaying page is shown. Alternatively, if the general listing of options is displayed, the user may select a specific adapted options displaying page 744 (FIG. 36D).

The user then selects an option. This selection operates as a HTTP request to the server 702. The server 702 identifies this request as an emulation request. The server 702 finds the unique name of the input tag of the submit type and the look up table and thus finds information to enable it to identify a corresponding option element on the DOM. The option element is found in the following manner: The server 702 again requests the web page 700 from the Internet and creates a DOM corresponding to the web page. The information found on the look-up table is employed to locate the option element on the DOM and the event attributes thereof.

An event identified by the event attributes of the element is triggered by the server 702, resulting in emulation of a user operating a conventional web browser, producing an adapted page 750, such as that shown in FIG. 36E. The information found on the lookup table is saved in an emulation list associated with the look-up table so that retrieving the look-up table also retrieves the emulation list. Alternatively, the information may be stored in any suitable storage medium.

Returning to FIG. 35B, it is seen that when a user selects an element, such as one of radio buttons 734 and 736, that has submit button functionality, but is not a select region, this selection operates as a HTTP request to the server 702. The server 702 identifies this request as an emulation request. As seen in FIG. 35C, the server 702 finds the unique name of the input tag of the submit type and the look up table and thus finds information to enable it to identify the element selected by the user. The user-selected element is found in the following manner: The server 702 again requests the web page 700 from the Internet and creates a DOM corresponding to the web page. The information found on the look-up table is employed to locate the element on the DOM.

Figure 36G:
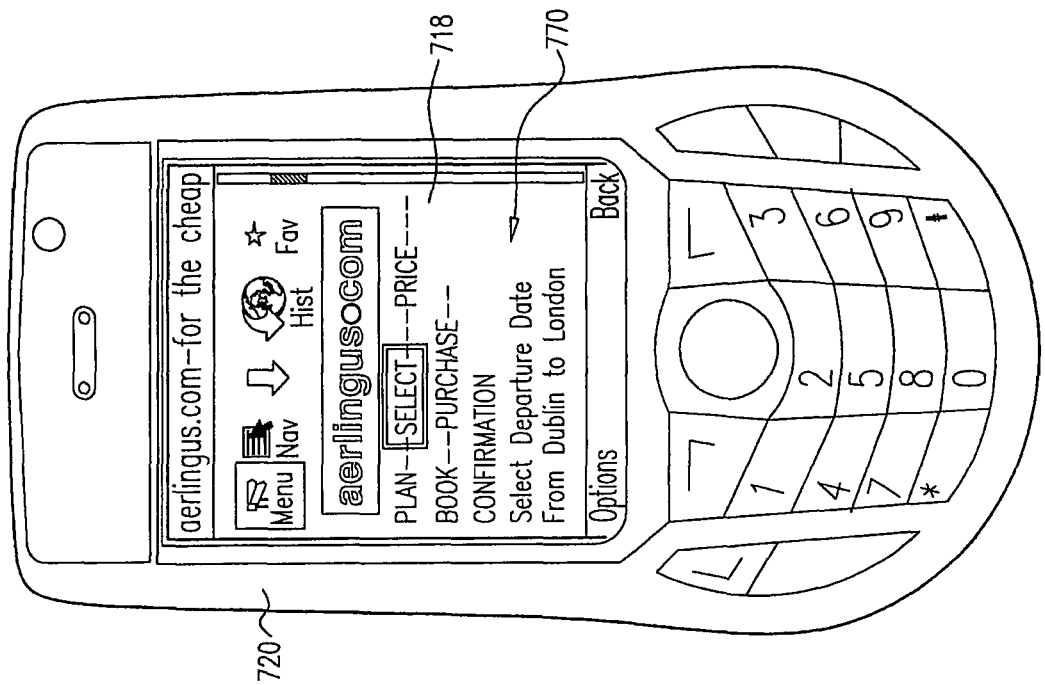
Figure 36F:
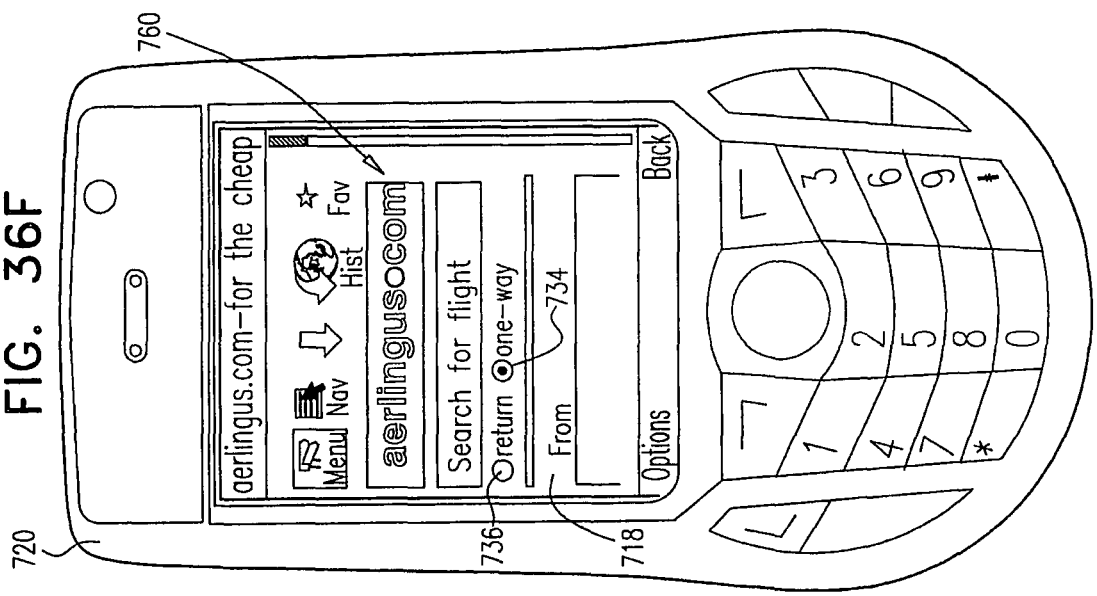

An event identified by the event attributes of the user-selected element is triggered by the server 702, resulting in emulation of a user operating a conventional web browser, producing an adapted page 760, such as that shown in FIG. 36F. The information found on the lookup table is saved in an emulation list associated with the look-up table so that retrieving the look-up table also retrieves the emulation list. Alternatively, the information may be stored in any suitable storage medium.

If on an adapted page 750 or 760, the user selects a further element that has submit button functionality, then the selection operates as a HTTP request to the server 702. The server 702 identifies this request as an emulation request. The server 702 finds the unique name of the input tag of the submit type and the look up table and the emulation list. The emulation list contains the information of the previous emulations. The server 702 requests the web page 700 from the Internet and creates a DOM corresponding to the web page. The information of all the previous emulations in the emulation list is used to trigger the emulations in the order of their occurrence. The look-up table enables the server 702 to identify the further user-selected element. The look-up table enables the server 702 to identify the further user-selected element on the DOM.

An event identified by the event attributes of the user-selected element is triggered by the server 702, resulting in emulation of a user operating a conventional web browser, producing an adapted page 770, such as that shown in FIG. 36G. The information found on the lookup table is saved in an emulation list associated with the look-up table so that retrieving the look-up table also retrieves the emulation list. Alternatively, the information may be stored in any suitable storage medium.

Figure 37A:
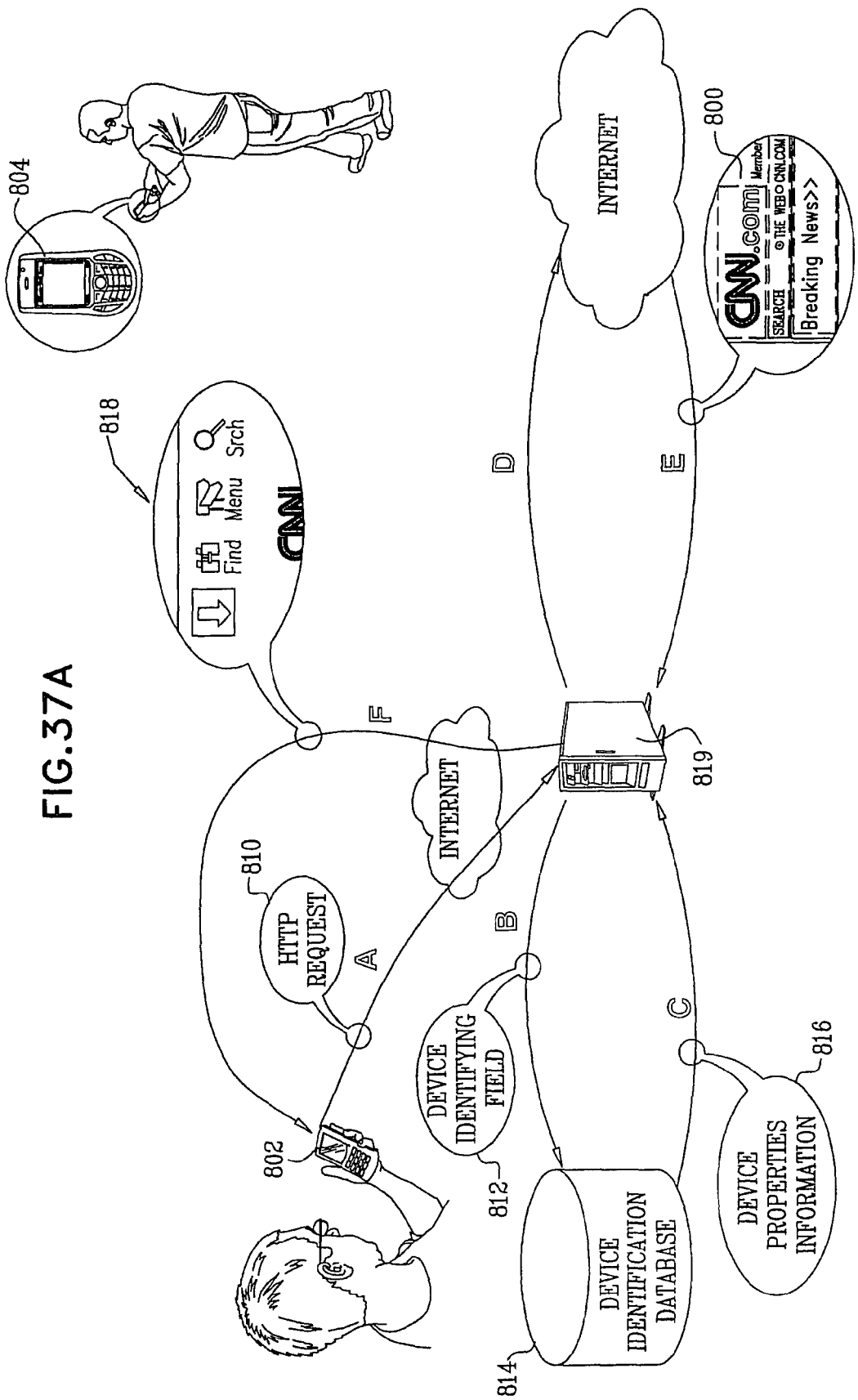
FIGS. 37A and 37B together are simplified illustrations of the structure and operation of functionality for automatic configuration of a database used to adapt web content for use with mobile communicators, constructed and operative in accordance with a preferred embodiment of the present invention.
Figure 37B:
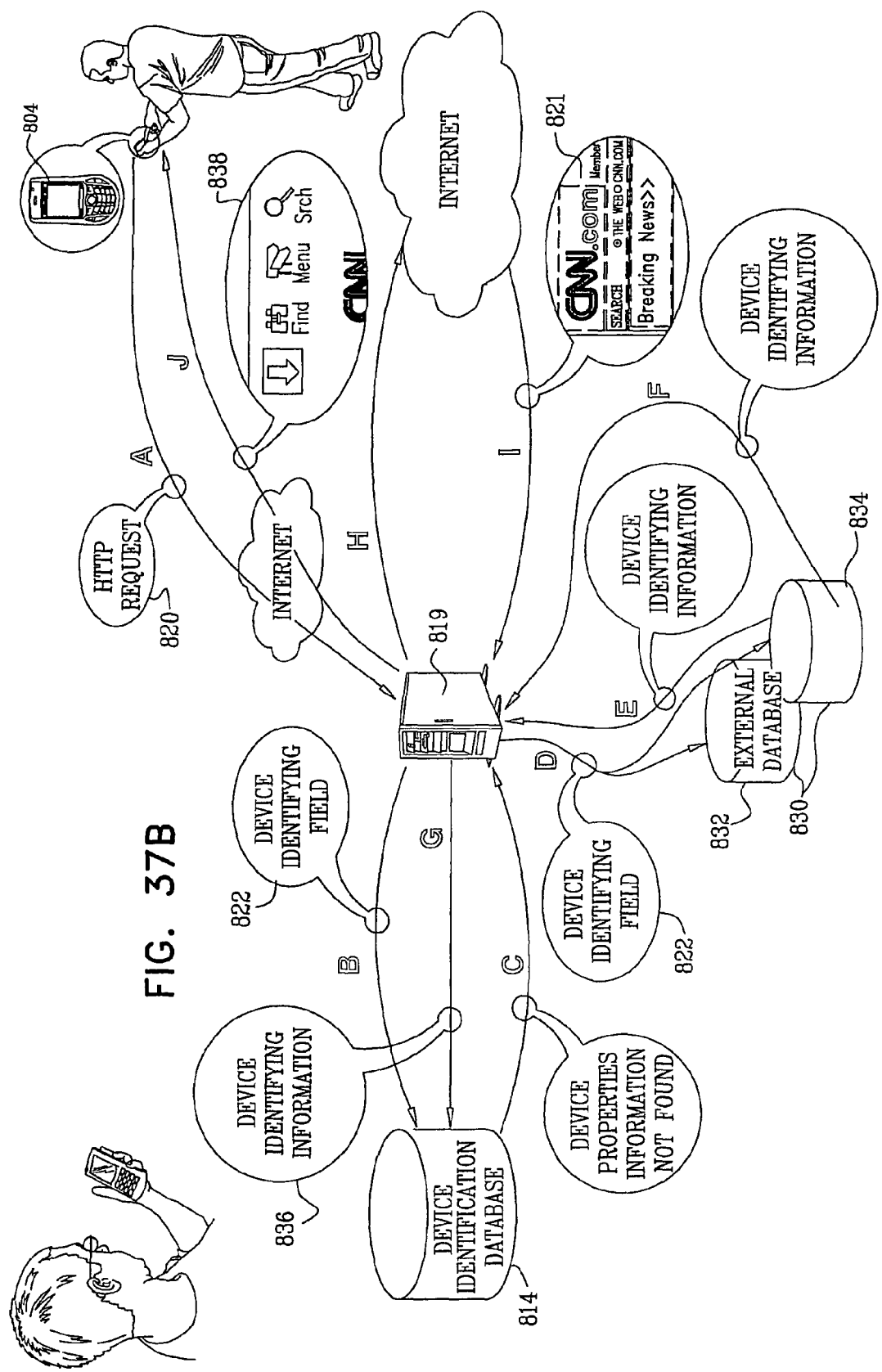
Figure 38B:
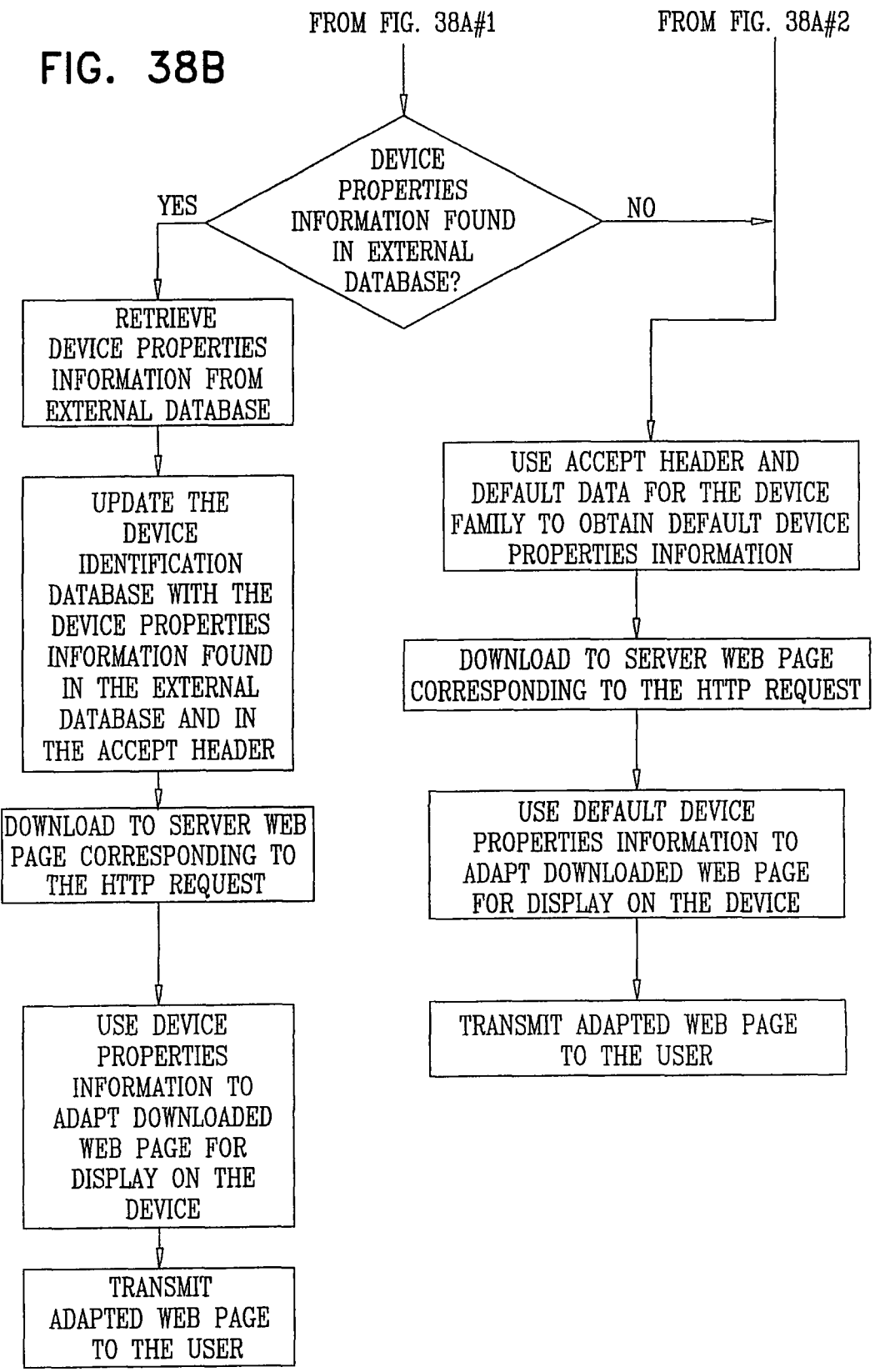

Reference is now made to FIGS. 37A and 37B, which together are simplified illustrations of the structure and operation of functionality for automatic configuration of a database used to adapt web content for use with mobile communicators, constructed and operative in accordance with a preferred embodiment of the present invention, and to FIGS. 38A and 38B, which together are a simplified flow chart of operation of the functionality for automatic configuration of FIGS. 37A and 37B.

As seen in FIG. 37A, the functionality of the present invention is operative to display web content, associated with a web page 800, on a display screens of mobile communicators 802 and 804, having differing properties by employing the following general steps:

receiving an http request 810 from one of the mobile communicators, typically mobile communicator 802;

retrieving at least one device identifying field 812, such as a user-agent field or pattern in the http request 810, which field 812 identifies the mobile communicator 802;

searching in a device identification database 814 for device properties information 816 associated with the field 812;

if the searching is successful, adapting web page 800 corresponding to the http request 810 in accordance with the device properties information 816; and transmitting the adapted web page 818 corresponding to the http request 810 to the mobile communicator 802.

As illustrated in FIG. 37A, the user employs mobile communicator 802 to request a web page. The http request 810 is provided to a server 819, as indicated by arrow A. The server 819 is operative to retrieve from the headers of the http request 812, at least one device identifying field 812, such as a user-agent pattern or regular expression thereof. As seen at arrow B, the device identifying field 812 is employed as a key in accessing a device identification database 814, which is typically associated with the server 819, in order to retrieve device properties information 816 therefrom.

The database 814 is preferably a hierarchical database. Typically, the process of matching the device identifying field 812 to the device properties information 816 in the database 814 begins at a root of the family of devices within the database 814, and continues down the database hierarchy to subsequent levels, until the exact device, identified by the device identifying field 812, is found, and device properties information 816 therefor are retrieved. The device properties information 816 found in the database 814 is transmitted to the server 819 as indicated by arrow C.

Subsequently or in parallel, the server 819 requests the web page corresponding to the http request 810 as indicated by arrow D, and downloads the corresponding web page, such as web page 800, from the Internet, as indicated by arrow E.

At the server 819, the web page 800 is adapted in accordance with the device properties information 816, and the adapted web page 818, corresponding to the http request 810, is transmitted to the user, as indicated by arrow F.

Turning now to FIG. 37B, it is seen that in another case, involving another mobile communicator, such as mobile communicator 804, which sends an http request 820 corresponding to a web page 821, the following general steps take place:

retrieving at least one device identifying field 822, such as a user-agent pattern in the http request 820, which field 822 identifies the mobile communicator 804;

searching in the device identification database 814 for device properties information associated with the field 822;

if the searching is not successful, as in this case, conducting at least a search of at least one external database 830 to obtain device properties information 836 regarding the mobile communicator 804;

employing information received from the search of database 830 to update the device identification database 814 with properties of the mobile communicator 804 identified by the device identifying field 822 and adapting the web page 821 corresponding to the http request 820 in accordance with the device properties information 836 obtained by the search of external database 830; and transmitting the adapted web page 838 corresponding to the http request 820 to the mobile communicator 804.

As illustrated in FIG. 37B, the user employs mobile communicator 804 to request a web page 821. The http request 820 is provided to a server 819, as indicated by arrow A. The server 819 is operative to retrieve from the headers of the http request 820, at least one device identifying field 822, such as a user-agent pattern or regular expression thereof. As seen at arrow B, the device identifying field 822 is employed as a key in accessing a device identification database 814, which is typically associated with the server 819, in order to retrieve therefrom device properties information associated with the device 804.

As seen at arrow C, some or all of the device properties information for the device identified by the device identifying field 822 is not found in database 814. Typically, for each device or device family, the database includes an indication whether auto-configuration of the device family should be carried out if properties are missing. If, in the database 814, the device family of the device 804 identified by the device identifying field 822 includes an indication that auto-configuration should be carried out, this indication is provided to the server 819.

Subsequently, the server 819 employs the device identifying field 822, and possibly additional device identifiers, such as information provided in an accept header of the http request 820, as keys in accessing at least one external database 830, to search for properties of the device therein. Typically, as seen at arrow D, the external databases 830 may be prioritized, such that a search is initially carried out in one external database, and if not all the required information is found therein, a subsequent search is carried out in additional external databases. Examples of external databases which may be used for auto-configuration are a UAProf provided by the device manufacturer, and a WURFL database, which is accessible through http://wurfl.sourceforge.net/index.php.

As seen in FIG. 37B, some of the device properties information is found in a first external database, indicated by reference numeral 832, and is returned to the server 819, as indicated at arrow E. The remaining required device properties information is found in a second external database, indicated by reference numeral 834, and is returned to the server as indicated at arrow F.

As seen at arrow G, the device properties information collected from the external databases 830 is combined into complete device properties information 836, which is automatically added by server 819 to database 814. Typically, the device properties information includes default information retrieved from database 814, and additional information obtained from external databases 830.

Preferably, an operator of database 814 may update, change, accept or reject device properties information which was automatically added to database 814.

Subsequently or in parallel, the server 819 requests the web page corresponding to the http request 820 as indicated by arrow H, and downloads the corresponding web page 821 from the Internet, as indicated by arrow I.

At the server 819, the web page 821 is adapted in accordance with the device properties information 836, and the adapted web page 838, corresponding to the http request 820, is transmitted to the user, as indicated by arrow J.

As seen with particular clarity in FIGS. 38A and 38B, it is appreciated that if the device properties information for the device identified by the device indicating field 822 is not found in any of the external databases 830, or alternatively if the device family in database 814 does not include an auto-configuration indication, the data provided in the accept header of the http request 820 and additional default data for the device family is used as device properties information, and the web page 821 is adapted accordingly.

A CD-ROM Appendix is enclosed herewith from which can be derived files which, taken together, provide functionalities in accordance with the preferred embodiment of the present invention.

In order to generate a system implementing functionalities described hereinabove, based on the CD-ROM appendix, the following method may be employed:

1. Provide an Intel compatible computer with having the following hardware properties:
   a. Two Dual Core Intel® Xeon® 5160 processors (3.0 GHz, 1333 MHz FSB), 4 MB L2 Cache (Xeon 5100).
   b. 2 GB 667 MHz, Ranked DIMMs
   c. Two NC7781 PCI-X Gigabit NICs 10/100/1000 WOL
   d. RAID 1 setting
   e. 2×36 GB Pluggable Ultra320 SCSI 15,000 rpm Universal Hard Drive
   f. 24× Low-profile IDE CD-ROM Drive
   g. Two 1" Ultra 320 SCSI Hot Plug Drive Bays
   h. Redundant Hot Plug Power Supplies
   i. Redundant Hot Plug Fans 2. On the Intel compatible computer, provide the following software:
   a. Microsoft Windows 2003 R2 standard Edition
   b. Microsoft Internet Information Services 6.0
   c. Microsoft Internet Security and Acceleration 2004 with service pack 2
   d. Microsoft Core XML Services 6 (MSXML)
   e. Microsoft Internet Explorer 6

3. Provide an always-open Internet connection

4. Make sure the computer has two hard drive partitions labeled 'C' and 'D' with at least 500 MB free space on the 'D' partition.

5. Log into the server as the Administrator

6. Copy the file setupexe.hex located in folder \apndx-I\ stored in the appended CD-ROM into a temporary directory.

7. Unhex the computer listing setupexe.hex mentioned in step 6 using HEX IT V1.8 or greater by John Augustine, 3129 Earl St., Laureldale, Pa. 19605, USA creating file setup.exe 8. rename the file setup.exe mentioned in step 7 to "infogin setup.exe"

9. Copy the file proxyexe.hex located in folder \apndx-I\ stored in the appended CD-ROM into a temporary directory.

10. Unhex the computer listing proxyexe.hex mentioned in step 9 using HEX IT V1.8 or greater by John Augustine creating file "proxy.exe"

11. Copy the file setupini.hex located in folder \apndx-I\ stored in the appended CD-ROM into a temporary directory.

12. Unhex the computer listing setupini.hex mentioned in step 11 using HEX IT V1.8 or greater by John Augustine creating file "setup.ini"

13. Edit the 'Setup.ini' file by replacing the placeholder 'IPADDRESS' with the IP address of the server 14. Run the file 'Infogin Setup.exe'

15. Agree to the license

16. Specify the location of the 'Setup.ini' file

17. At the end of the installation, an Internet Explorer window will open to the macromedia flash update page—follow the instructions on the web page to make sure the server is installed with the latest version 18. Click OK after verifying the update of the flash version 19. Click Finish.

It will be appreciated by persons skilled in the art that the present invention is not limited by what has been particularly shown and described hereinabove. Rather the scope of the present invention includes combinations and subcombinations of various features of the present invention as well as modifications which would occur to persons reading the foregoing description and which are not in the prior art.

The invention claimed is:

1. A method for interactive communication with a web site using a mobile communicator that does not support a client-side script employed by said web site, the method comprising:
   receiving, at a server, an hypertext transfer protocol (http) request from said mobile communicator being used by a user, said http request identifying said website; and
   causing said server to emulate said client-side script by running said client-side script entirely on said server thereby enabling said user to interact with said website;
   said enabling said user to interact comprising:
   receiving at least one user input from said mobile communicator; and
   based on said at least one user input, emulating at least one additional client-side script by running said at least one additional client-side script entirely on said server; and
   wherein, when a user requests an Hyper Text Markup Language (HTML) web page from said server, said server retrieves the HTML web page requested from the internet and searches the HTML web page for elements that require client-side script emulation, and
      when at least one element that requires client-side script emulation is found, the following takes place on a mobile communicator adapted web page corresponding to said HTML web page requested by said user:
      each element respectively indicated as "one-way" or "return" is replaced by an input tag of a submit type (<input type=submit . . . >) having a unique name unless the mobile communicator supports use of an input tag of an image type, in which case an input tag of an image type is employed instead of the input tag of a submit type.

2. A method for interactive communication with a web site using a mobile communicator according to claim 1 and also comprising:
   retrieving a user-agent field from said http request, said user-agent field identifying said mobile communicator being used by said user; and
   ascertaining whether said mobile communicator being used by said user supports a given computer language or script.

3. A method for interactive communication with a web site using a mobile communicator according to claim 1 and also comprising:
   employing a conventional browser of the mobile communicator for communicating with said server.

4. A method for interactive communication with a web site using a mobile communicator according to claim 1 and also comprising:
   employing a form submit button to replace script elements not supported by said mobile communicator.

5. A method for interactive communication with a web site using a mobile communicator according to claim 4 and wherein said form submit button appears as a picture which resembles said script element.

6. A method for interactive communication with a web site using a mobile communicator according to claim 1 and wherein said client-side script is JavaScript and said server provides client-side emulation of said JavaScript.

7. A method for interactive communication with a web site using a mobile communicator according to claim 1 and wherein visual appearance of said input tag of a submit type is set to be similar to a visual appearance of an element to which it corresponds.

8. A method for interactive communication with a web site using a mobile communicator according to claim 1 and wherein:
   if said element is within an HTML form tag having an action attribute, a value of the action attribute of the HTML form tag is replaced by an Internet Protocol (IP) address of said server; and
   if said element is not within an HTML form tag, an HTML form tag is created around said element and the action attribute of the HTML form tag is set to be the IP address of said server.

9. A method for interactive communication with a web site using a mobile communicator according to claim 1 and wherein:
   a look-up table is created for the HTML web page requested; and
   said look-up table is indexed by the unique names of the input tags of the submit type.

10. A method for interactive communication with a web site using a mobile communicator according to claim 9 and wherein said look-up table contains information including at least one of the following items:
    a name of said element to which each input tag corresponds;
    an ID attribute of said element;
    a type characterizing said element; and
    location of the element in the Document Object Model (DOM) of said HTML web page.

11. A method for interactive communication with a web site using a mobile communicator according to claim 10 and wherein an input tag of a "hidden" type is added to an HTML form defined by said HTML form tag and the value of said input tag is employed to identify the look-up table.

12. A method for interactive communication with a web site using a mobile communicator according to claim 11 and wherein if said element is a select element, corresponding to a select region, a plurality of option-displaying adapted pages, each containing a limited number of available options, are prepared, each of said available options in said select region appearing on one of the option-displaying adapted pages, each of the available options being a link to said server and containing a value which is employed to identify the look-up table.

13. A method for interactive communication with a web site using a mobile communicator according to claim 12 and wherein when a user clicks on a select region, a corresponding HTML form is submitted to said server which, upon receipt of the HTML form submitted, recognizes the HTML form submitted as a request to display either a general listing of options, if available, or to display a first adapted option-displaying page.

14. A method for interactive communication with a web site using a mobile communicator according to claim 13 and wherein a user selection of an option operates as a HTTP request to said server, which identifies said HTTP request as an emulation request and finds said unique name of said input tag of the submit type and said look up table and identifies a corresponding option element on the DOM based on said unique name and said look-up table.

15. A method for interactive communication with a web site using a mobile communicator according to claim 14 and wherein said corresponding option element is found in the following manner:
said server again requests said HTML web page from the internet and creates a DOM corresponding to said HTML web page and said information found on said look-up table is employed to locate the corresponding option element on the DOM.

16. A method for interactive communication with a web site using a mobile communicator according to claim 15 and wherein an event identified by event attributes of said corresponding option element is triggered by said server, resulting in emulation of a user operating a conventional web browser, producing an adapted page, and said information found on said lookup table is saved in an emulation list associated with the look-up table so that retrieving the look-up table also retrieves the emulation list.

17. A method for interactive communication with a web site using a mobile communicator according to claim 1 and wherein when a user selects an element that has submit button functionality, but is not a select region, an HTTP request is submitted to said server and the server identifies the HTTP request as an emulation request, finds the unique name of the input tag of the submit type and the look up table, and identifies the element that has submit button functionality selected by the user.

18. A method for interactive communication with a web site using a mobile communicator according to claim 17 and wherein said element that has submit button functionality is found in the following manner:
said server again requests said HTML web page from the Internet and creates a DOM corresponding to the HTML web page and said information found on the look-up table is employed to locate the element on the DOM.

19. A system for interactive communication with a web site using a mobile communicator that does not support a client-side script employed by said web site, the system comprising:
a server operative to:
receive an hypertext transfer protocol (http) request from said a mobile communicator being used by a user, said http request identifying said website; and
emulate said client-side script by running said client-side script entirely on said server so as to enable user interaction with said website,
said user interaction comprising:
receiving, at said server, at least one user input from said mobile communicator; and
based on said at least one user input, emulating at least one additional client-side script by running said at least one additional client-side script entirely on said server; and wherein, when a user requests an Hyper Text Markup Language (HTML) web page from said server, said server retrieves the HTML web page requested from the internet and searches the HTML web page for elements that require client-side script emulation, and
when at least one element that requires client-side script emulation is found, the following takes place on a mobile communicator adapted web page corresponding to said HTML web page requested by said user:
each element respectively indicated as "one-way" or "return" is replaced by an input tag of a submit type (<input type=submit . . . >) having a unique name unless the mobile communicator supports use of an input tag of an image type, in which case an input tag of an image type is employed instead of the input tag of a submit type.

20. A system for interactive communication with a web site using a mobile communicator according to claim 19 and wherein said functionalities also comprise:
retrieving a user-agent field from said http request, said user-agent field identifying said mobile communicator being used by said user; and
ascertaining whether said mobile communicator being used by said user supports a given computer language or script.

21. A system for interactive communication with a web site using a mobile communicator according to claim 19 and wherein said functionalities also comprise:
employing a conventional browser of the mobile communicator for communicating with said server.

22. A system for interactive communication with a web site using a mobile communicator according to claim 19 and wherein said functionalities also comprise:
employing a form submit button to replace script elements not supported by said mobile communicator.

23. A system for interactive communication with a web site using a mobile communicator according to claim 22 and wherein said form submit button appears as a picture which resembles said script element.

24. A system for interactive communication with a web site using a mobile communicator according to claim 19 and wherein said client-side script is JavaScript and said server provides client-side emulation of said JavaScript.

25. A system for interactive communication with a web site using a mobile communicator according to claim 19 and wherein visual appearance of said input tag of a submit type is set to be similar to a visual appearance of an element to which it corresponds.

26. A system for interactive communication with a web site using a mobile communicator according to claim 19 and wherein:
if said element is within an HTML form tag having an action attribute, a value of the action attribute of the HTML form tag is replaced by an Internet Protocol (IP) address of said server; and
if said element is not within an HTML form tag, an HTML form tag is created around said element and the action attribute of the HTML form tag is set to be the IP address of said server.

27. A system for interactive communication with a web site using a mobile communicator according to claim 19 and wherein:
a look-up table is created for the HTML web page requested; and
said look-up table is indexed by the unique names of the input tags of the submit type.

28. A system for interactive communication with a web site using a mobile communicator according to claim 27 and wherein said look-up table contains information including at least one of the following items:
- a name of said element to which each input tag corresponds;
- an ID attribute of said element;
- a type characterizing said element; and
- location of the element in the Document Object Model (DOM) of said HTML web page.

29. A system for interactive communication with a web site using a mobile communicator according to claim 28 and wherein an input tag of a "hidden" type is added to an HTML form defined by said HTML form tag and the value of said input tag is employed to identify the look-up table.

30. A system for interactive communication with a web site using a mobile communicator according to claim 29 and wherein if said element is a select element, corresponding to a select region, a plurality of option-displaying adapted pages, each containing a limited number of available options are prepared, each of said available options in said select region appearing on one of the option-displaying adapted pages, each of the available options being a link to said server and containing a value which is employed to identify the look-up table.

31. A system for interactive communication with a web site using a mobile communicator according to claim 30 and wherein when a user clicks on a select region, a corresponding HTML form is submitted to said server which, upon receipt of the HTML form submitted, recognizes the HTML form submitted as a request to display either a general listing of options, if available, or to display a first adapted option-displaying page.

32. A system for interactive communication with a web site using a mobile communicator according to claim 31 and wherein a user selection of an option operates as a HTTP request to said server, which identifies said HTTP request as an emulation request and finds said unique name of said input tag of the submit type and said look up table and identifies a corresponding option element on the DOM based on said unique name and said look-up table.

33. A system for interactive communication with a web site using a mobile communicator according to claim 32 and wherein said corresponding option element is found in the following manner:
- said server again requests said HTML web page from the internet and creates a DOM corresponding to said HTML web page and said information found on said look-up table is employed to locate the corresponding option element on the DOM.

34. A system for interactive communication with a web site using a mobile communicator according to claim 33 and wherein an event identified by event attributes of said corresponding option element is triggered by said server, resulting in emulation of a user operating a conventional web browser, producing an adapted page, and said information found on said lookup table is saved in an emulation list associated with the look-up table so that retrieving the look-up table also retrieves the emulation list.

* * * * *